United States Patent [19]

Arima et al.

[11] Patent Number: 5,148,514
[45] Date of Patent: Sep. 15, 1992

[54] NEURAL NETWORK INTEGRATED CIRCUIT DEVICE HAVING SELF-ORGANIZING FUNCTION

[75] Inventors: Yutaka Arima; Ichiro Tomioka; Toshiaki Hanibuchi, all of Hyogo, Japan

[73] Assignee: Mitsubishi Denki Kabushiki Kaisha, Tokyo, Japan

[21] Appl. No.: 515,476

[22] Filed: Apr. 24, 1990

[30] Foreign Application Priority Data

May 15, 1989 [JP] Japan .................... 1-121916
Sep. 19, 1989 [JP] Japan .................... 1-242998

[51] Int. Cl.⁵ .............................. G06F 7/00
[52] U.S. Cl. ............................ 395/24; 364/807; 307/201
[58] Field of Search ............. 364/513, 807; 307/201, 307/353; 395/24

[56] References Cited

U.S. PATENT DOCUMENTS

| | | | |
|---|---|---|---|
| 4,906,865 | 3/1990 | Holler | 307/353 |
| 4,926,180 | 5/1990 | Anastassiou | 307/201 |
| 4,988,891 | 1/1991 | Mashiko | 307/201 |
| 5,021,988 | 6/1991 | Mashiko | 364/807 |

OTHER PUBLICATIONS

"Electronic Implementation of Neuromorphic System", CICC, 1988, p. 10.1.3.
"Parallel Distributed Processing", Chapter 7 (The Boltzmann Machine Learning Algorithm).
Alspector, J. and Allen, R. B., "A Neuromorphic VLSI Learning System", *Advanced Research in VLSI*, MIT Press, 1987, pp. 313-327.

Primary Examiner—Allen R. MacDonald
Assistant Examiner—George Davis
Attorney, Agent, or Firm—Lowe, Price, LeBlanc & Becker

[57] ABSTRACT

An extension directed integrated circuit device having a learning function on a Boltzmann model, includes a plurality of synapse representing units arrayed in a matrix to form a rectangle including a first and second triangles on a semiconductor chip, a plurality of neuron representing units and a plurality of educator signal control circuits which are arranged along first and second sides of the rectangle, and a plurality of buffer circuits arranged along third and fourth sides of the rectangle. The first side is opposite to the third side, and the second side is opposite to the fourth side. Axon signal transfer lines and dendrite signal lines are so arranged that the neuron representing units are full-connected in each of the first right triangle the second right triangle. Alternatively, axon signal lines and dendrite signal ines are arranged in parallel with rows and columns of the synapse representing unit matrix, so that the neuron representing units are full-connected in the rectangle. Each synapse representing unit is connected to a pair of axon signal transfer lines and a pair of dendrite signal transfer lines.

45 Claims, 57 Drawing Sheets

SY : SYNAPSE REPRESENTING CIRCUIT
TC : EDUCATOR SIGNAL CONTROL CIRCUIT
PG : PROBABILITY REPRESENTING CIRCUIT
CM : COMPARATOR

SYNAPSE REPRESENTING CIRCUIT

* LEARNING CAPABLE OF EXECUTING HEBB'S RULE

SYNAPSE LOAD MATRIX

CHIP CONNECTION

: STRUCTURE OF NON-DIAGONAL PART REPRESENTING CHIP

MASTER STRUCTURE

DIAGONAL PART REPRESENTATION
(CUSTOMIZED IN SLICE STEP)

EXEMPLARY STRUCTURE DEDICATED
TO NON-DIAGONAL PART
REPRESENTATION

SYNAPSE LOAD MATRIX

211 : DENDRITE SIGNAL LINE

FIG.35A

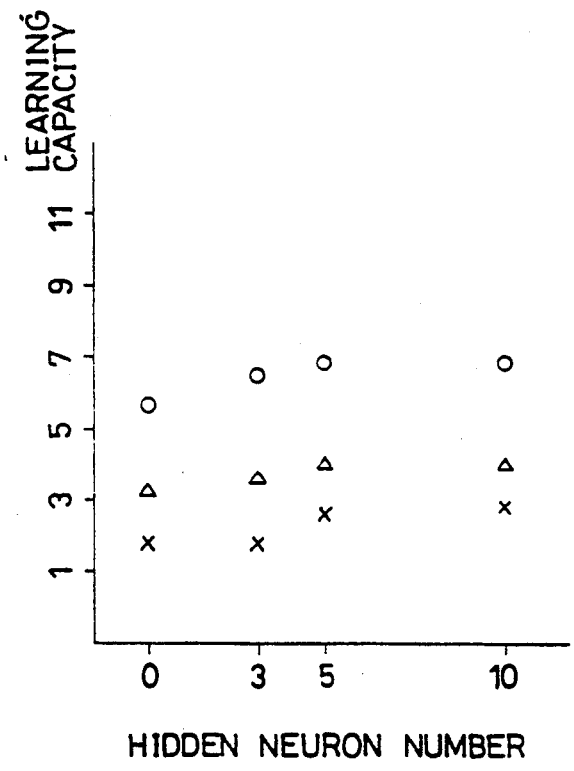

HIDDEN NEURON NUMBER (VISIBLE NEURON NUMBER = 25)

FIG.35B

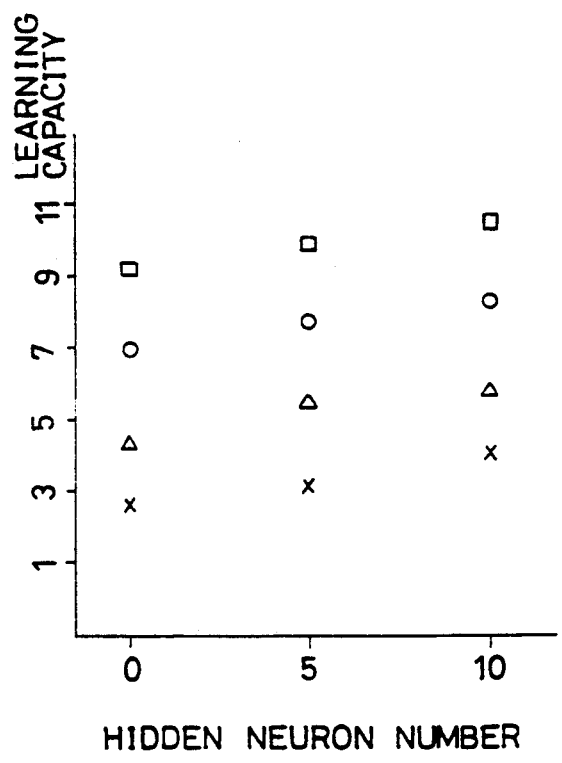

HIDDEN NEURON NUMBER (VISIBLE NEURON NUMBER = 30)

LEARNING CAPACITY:
NUMBER OF LEARNING PATTERNS CAPABLE OF ACHIEVING DEGREE OF LEARNING OF AT LEAST 96% IN CASE OF INPUTTING PATTERN HAVING HAMMING DISTANCE OF 4 GENERATED AT RANDOM.
EACH EDUCATOR PATTERN HAS HAMMING DISTANCE OF AT LEAST 8

SYNAPSE WIDTH
- × : 2 BITS
- △ : 3 BITS
- ○ : 4 BITS
- □ : 5 BITS $$i = \frac{E}{\gamma L_{41}} \sin \gamma t \cdot e^{-\alpha t}$$

$C \approx C_{42}$ $$\alpha = \frac{R_{41}}{2L_{41}}$$

$$\gamma = \sqrt{\frac{1}{CL_{41}} - \frac{R_{41}^2}{4L_{41}^2}}$$

$R \approx R_{44}$ $$e(t) = Em \sin(\omega t + \phi)$$

$$i = \frac{Em}{Z} \sin(\omega t + \phi + \theta) - \frac{1}{RC_{41}}\left\{Q_1 + \frac{Em}{\omega Z}\cos(\phi + \theta)\right\} e^{-\frac{1}{RC_{41}}t}$$

$$Z = \sqrt{R^2 + \frac{1}{\omega^2 C^2}}$$

$$\theta = \tan^{-1}\frac{1}{R\omega C_{41}}$$

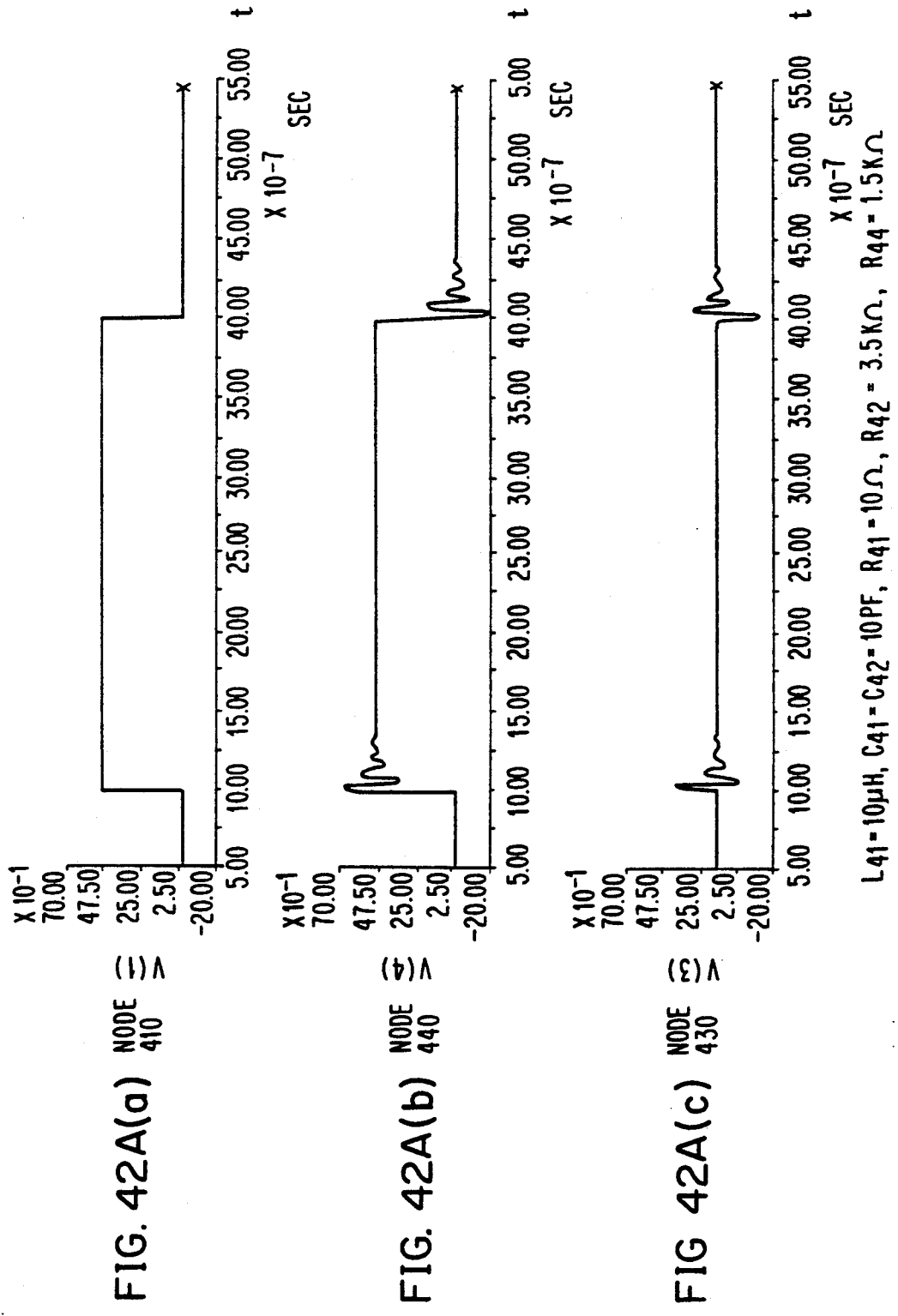
FIG. 42A(a) NODE 410
FIG. 42A(b) NODE 440
FIG 42A(c) NODE 430
$L_{41}=10\mu H$, $C_{41}=C_{42}=10 pF$, $R_{41}=10\Omega$, $R_{42}=3.5 k\Omega$, $R_{44}=1.5 k\Omega$

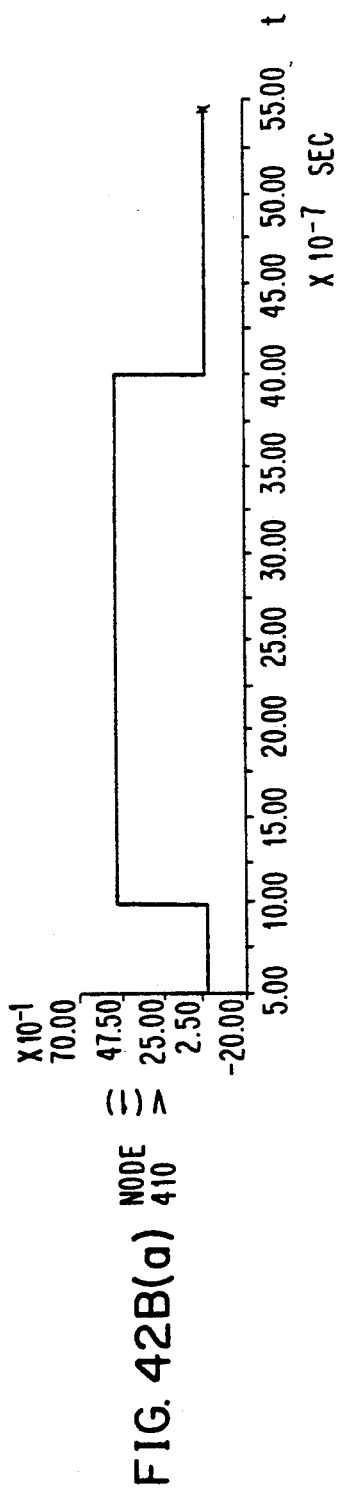
FIG. 42B(a) NODE 410
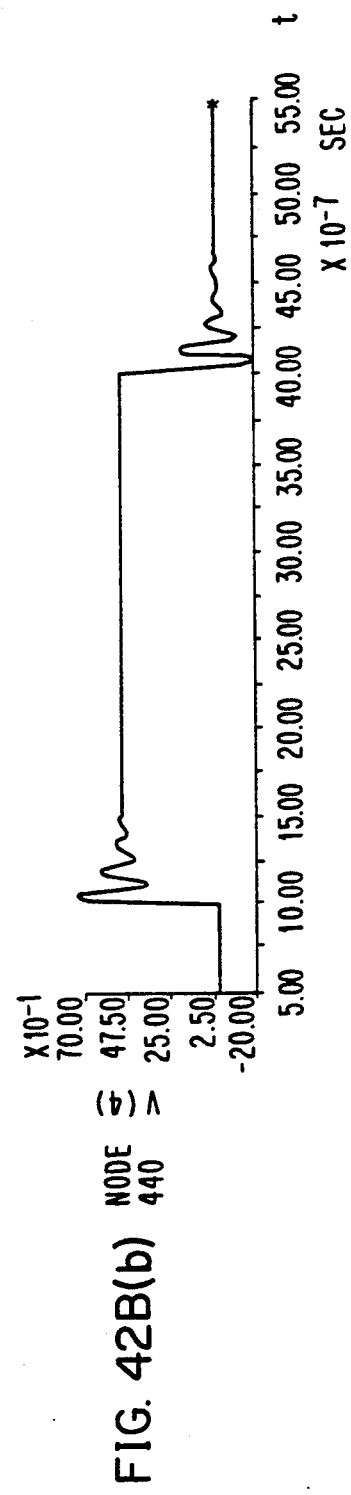
FIG. 42B(b) NODE 440
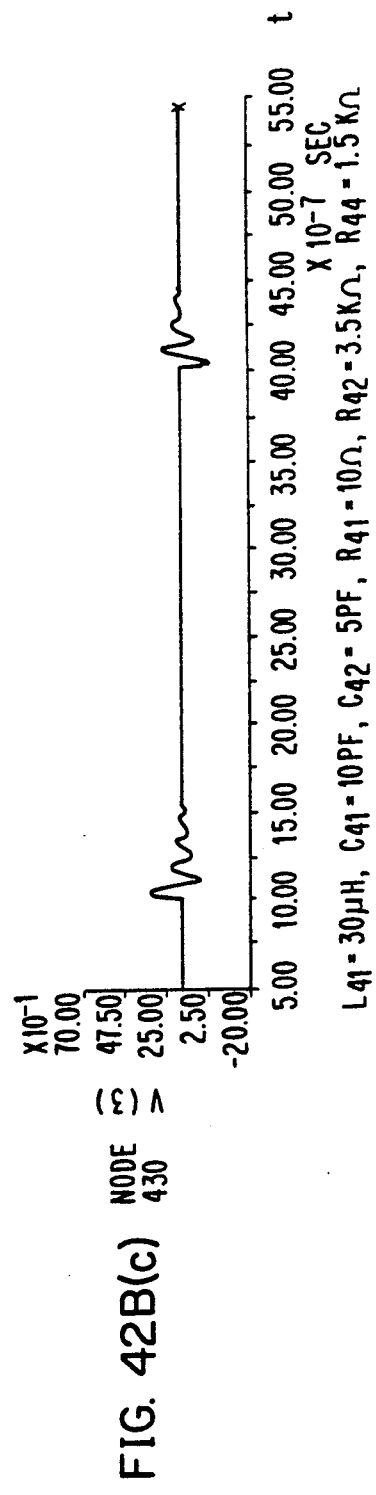
FIG. 42B(c) NODE 430

D - FF

DIAGONAL CHIP
REPRESENTING CHIP

NON-DIAGONAL PART
REPRESENTING CHIP

NEURAL NETWORK INTEGRATED CIRCUIT DEVICE HAVING SELF-ORGANIZING FUNCTION

BACKGROUND OF THE INVENTION

1. Field of the Invention

The present invention relates to a neural network, and more particularly, it relates to an integrated circuit device for implementing a Boltzmann machine which has a learning function (self-organizability).

2. Description of the Background Art

In recent years, various calculation processing techniques have been proposed on the models of vital cells (neurons). One of such processing techniques is a parallel information processing machine called a Boltzmann machine. The Boltzmann machine is a sort of a mathematical model representing a neural network, which was proposed in 1985 by D. H. Ackley, G. E. Hinton and T. J. Sejnowsky. The feature of the Boltzmann machine resides in stochastic state transition of neurons. The source of this naming is as follows: When a connection strength (hereinafter referred to as a synapse load) $W_{ij}$ between neurons is symmetrical ($W_{ij}=W_{ji}$) with no self coupling ($W_{ii}=0$), a state distribution p(z) of the system (neural network) is in the following Boltzmann distribution with a finite temperature representation parameter T of the system:

$$p(z) = C \cdot exp(-U(z)/T)$$

where U(z) represents the potential function of the system, z represents the state of the system of the neurons, and C represents a normalization coefficient.

Through introduction of the above probability with respect to state determination of each neuron, it is expected that the neural network system converges to a global minimum value without being captured by a local minimum value of state energy. In other words, it is expected that a more probable solution can be found. Such a Boltzmann machine is suitable for solution of a complicated cost problem, non-algorithmic problems in pattern recognition, associative storage and the like, in contrast to a Turing machine which requires algorithms for solving problems. Therefore, the Boltzmann machine requires no programs, which have been indispensable to a von Neumann computer. The Boltzmann machine shows behavior similar to sensible judgement of a man, such that it solves a problem simply through data. Thus, the Boltzmann machine is expected to greatly contribute to development of industry.

In general, the Boltzmann machine has been simulated through a von Neumann computer in accordance with programs. In such a case, probabilities have been expressed in pseudo-random numbers, and states of neurons have generally been provided in discrete time expression. This is because the von Neumann computer is restricted to a serial processing system, and it is necessary to repeat a number of operations until respective neurons reach thermal equilibrium states. Further, it is generally predicted in principle that a state convergence time of the overall system is increased in proportion to the square of the number of neurons when the system is in full connection. Thus, a neural network of a practical scale, including at least 1000 neurons, requires an impractical computation time, to cause difficulty in practical application.

To this end, there has been developed a relatively high-speed simulator by connecting a general computer with dedicated hardware, which can operate state transition of neurons at a high speed. However, it is inefficient in principle to apply a serial processing computer to simulation of a neural network, which originally operates in parallel. Hence, it is still difficult to implement a practically applicable simulator.

Thus, awaited is implementation of a device which can efficiently represent a Boltzmann machine of a practically applicable scale at a high speed. If such a device can represent a strong parallel processing system which simulates the operation of a neural network, it is expected that its miraculous convergence time enables practical application to a number of new fields such as that of a real time controller (substitute for a skilled pilot), for example, while its useful feature of structural stability is exhibited in a unit system including the parallel processing system, thereby providing a highly reliable unit.

In order to implement the Boltzmann machine of such a practical level, it is requisite to implement a strong parallel processing system. To this end, it is necessary to build a neural network by preparing and interconnecting/arranging a plurality of functional units representing neurons whose states are stochastically transitive, a plurality of functional units representing synapse loads between the neurons, and a plurality of functional units deciding or correcting the synapse loads arbitrarily or in accordance with learning rules as those of portions to operate in parallel, while setting an input/output unit in response to information to be processed with respect to the neural network.

Some attempts have been made to implement such types of Boltzmann machines by semiconductor integrated circuits. Before explaining the structures and operations of conventional integrated semiconductor neural networks, the principle of operation of the Boltzmann machine is now described in more detail.

FIG. 1 shows the structure and the principle of operation of a general neuron model. Referring to FIG. 1, a neuron unit i includes an input part A which receives output signals $S_k$, $S_j$ and $S_l$ from other units k, j and, a conversion part B which converts signals from the input part A in accordance with predetermined rules, and an output part C which outputs signals from the conversion part B. The input part A has weights (hereinafter referred to as synapse loads) indicating connection strengths with respect to the units k, j and l. For example, an output signal Sk from the unit k is converted to $W_{ik} \cdot S_k$ with a synapse load $W_{ij}$ in the input part A, and transferred to the conversion part B. When the total of input signals received from the input part A satisfies certain condition, the conversion part B is fired to output a signal. The input part A of this neuron unit model corresponds to a dendrite of a vital cell, while the conversion part B corresponds to the body of the nerve cell and the output part C corresponds to an axon.

In this neuron model, it is assumed that each neuron takes two states of $S_i = 0$ (non-fired state) and $S_i = 1$ (fired state). Each neuron unit updates its state in response to the total input thereof. The total input of the unit i is defined as follows:

$$U_i = \sum_j W_{ij} \cdot S_j + W_{ii}$$

Symmetrical synapse coupling of Wij=Wji is assumed here while −Wii corresponds to the threshold value of the unit i.

The state of the neuron unit is asynchronously and stochastically updated between the units. When the unit i updates its state, the new state is "1" in the following probability:

$$p(Si=1)=1/(1+exp(-Ui/T))$$

ps where T represents a parameter which serves as a temperature in a physical system. This parameter takes a positive value, and is generally called a "temperature".

FIG. 2 shows the relation between the total input Ui with respect to each temperature T and the probability p(Si=1). Each unit i takes the value of either "0" or "1" in a probability of ½ substantially at random when the temperature T is high, while it substantially decision-theoretically complies with such threshold logic that the state of the total input goes to "1" when the total input exceeds a certain threshold value if the temperature T approximates zero.

The state of the Boltzmann machine at a certain time instant is represented in combination of ONs (S=1) and OFFs (S=0) of all units. With respect to a certain state $\alpha$ energy E is defined as follows:

$$E = -\sum_{i<j} Wij \cdot Si \cdot Sj$$

In the above equation, it is assumed that the threshold value of each neuron unit is zero. This state can be realized by preparing each unit from that which is regularly in an ON state (S=1) and setting the same so that its connection strength is equal to its threshold value while its sign is reverse thereto.

When each neuron unit starts from an arbitrary initial state and continues its operation, the Boltzmann machine approaches a stochastic equilibrium state which is determined by the synapse loads W (hereinafter the synapse loads are simply denotes by W) of the respective units. In this case, as hereinabove described, the Boltzmann machine takes the state $\alpha$ in the following probability:

$$P(\alpha)=C \cdot exp(-E\alpha/T)$$

The Boltzmann machine uses a technique called simulated annealing, in order to reach a global minimum energy value. A relative probability of two global states $\alpha$ and $\beta$ is expressed as follows:

$$P(\alpha)/P(\beta)=exp(-E(\alpha-E\beta)/T)$$

The minimum energy state regularly has the highest probability at an arbitrary temperature. In general, it takes a long time to reach the thermal equilibrium state, and hence it is considered preferable to start the annealing from a high temperature and gradually reduce the annealing temperature. This state transition is similar to such a state that each crystal atom is transferred to a position for taking the minimum energy state at a given temperature in a crystal lattice.

A subject in the Boltzmann machine is to find such weights that the network itself can realize its distribution as correct as possible with no external supply of probability distribution of input/output data. Consider that units of a network K are divided into a set A of input/output units (hereinafter referred to as visible units) and a set B of other units (hereinafter referred to as hidden units).

It is assumed that the set A of the visible units enters a state $\alpha$ in a probability distribution $P^-(\alpha)$ when the network K is externally supplied with no probability distribution. Further, the state of the overall set (network) K is expressed as $\alpha+\beta$ when the set A is in the state $\alpha$ and the set B of the hidden units is in the state $\beta$. In this case, the following equation holds:

$$P^-(\alpha) = \sum_{\beta} P^-(\alpha + \beta) = c \cdot \sum_{\beta} EXP(-E\alpha\beta/t) \quad (1)$$

where $E\alpha\beta$ represents the energy of the network K in the state $\alpha+\beta$. Assuming that $Si(\alpha\beta)$ represents the state of a unit i in the state $\alpha+\beta$ of the network K, the energy of the network K is expressed as follows:

$$E\alpha\beta = -\sum_{i<j} Wij \cdot Si(\alpha\beta) \cdot Sj(\alpha\beta) \quad (2)$$

In the aforementioned network model, probability distributions of input units are not separated from those of output units. Such a network is called a self-associative Boltzmann machine. In a network called an inter-associative Boltzmann machine, on the other hand, it is necessary to separate the probability distributions of states of input units from those of states of output units originally supplying inputs.

When the network K is externally supplied with inputs/outputs, the set A of the visible units enters the state $\alpha$ in a probability distribution $P^+(\alpha)$. This probability distribution $P^+(\alpha)$ is independent of the synapse load Wij. The subject is to evaluate such a synapse load Wij that minimizes the difference between the probability distributions $P^+(\alpha)$ and $P^-(\alpha)$. That is, evaluated is such a synapse load Wij that minimizes the following Kullback information measure:

$$G = \sum_{\alpha} P^+(\alpha) \cdot n(P^+(\alpha)/P^-(\alpha)) \quad (3)$$

with respect to the probability distributions $P^+(\alpha)$ and $P^-(\alpha)$. The following equation results from the equation (3), to be used as a basic equation of the learning rules:

$$\partial G/\partial Wij = -(1/T)(p^+ij - p^-ij)$$

The above equation is generally provided in the following form:

$$\Delta Wij = \eta \cdot (p^+ij - p^-ij) \quad (4)$$

where $p^+ij$ represents such an expected value that both of the neuron units i and j enter states "1" when the network K is externally supplied with educator information and enter equilibrium states. On the other hands, $p^-ij$ corresponds to an expected value in such case that no educator information is externally supplied. In the above equation (4), the term $p^+ij$ means that the connection strength Wij between the adjacent units i and j is increased when both of the units are activated. This corresponds to a learning mechanism, called a Hebb's learning rule, for strengthening synapse coupling.

On the other hand, the term $p^-ij$ means that the connection strength Wij between the adjacent units i and j is reduced when both of the units are activated with no external supply of input/output. This is generally called Hebb's anti-learning.

A learning algorithm in the Boltzmann machine will now be briefly described.

The learning algorithm in the Boltzmann machine includes an operation 1 (plus (+) phase), an operation 2 (minus (−) phase) and an operation 3.

Operation 1 (plus (+) phase):

States of input units and output units (visible units) are clamped at specific patterns shown by input data and output data (educator data) in accordance with appearance probabilities of respective patterns. The operation 1 (plus phase) includes (1) an annealing process, (2) a data collecting process and (3) a process of evaluating $p^+ij$. In the annealing process (1), the state of each unit is changed for each temperature T in accordance with the following equations (5) and (6):

$$\Delta E_i = \sum_j W_{ij} \cdot S_j \qquad (5)$$

$$P_i = 1/(1 + \exp(-\Delta E_i/T)) \qquad (6)$$

The equation (5) expresses an energy gap between a state Si of "0" and a state Si of "1" of the unit i with respect to the energy E of the overall neural network. The equation (6) expresses such a probability that a new state Si of the unit i takes the value "1" when such an energy gap takes place. In the annealing process (1), the temperature T is successively converted from a high level to a low level. It is assumed that the network is relaxed to the minimum energy state and reaches a thermal equilibrium state when the temperature T is converted to a low level and a prescribed annealing procedure is terminated.

In the data collecting process (2), evaluated is such a number of times that both of respective states S of coupled units are "1" after the annealing process (1) is repeated by a prescribed number of times.

In the process (3) of evaluating $p^+ij$, an average value of data obtained in the process (2) is evaluated after the annealing process (1) and the data collecting process (2) are repeated by prescribed numbers of times in correspondence to received educator information, and this average value is assumed to be $p^+ij$.

The operation 2 (minus phase) similarly includes an annealing process (1), a data collecting process (2) and a process (3) of evaluating $p^-ij$. The processes (1), (2) and (3) are similar to those in the operation 1 (plus phase). In the operation 2 (minus phase), however, only the states of units corresponding to input data are clamped in accordance with the appearance probability of the educator data. In this operation 2, an average value evaluated in the process (3) after the processes (1) and (2) are repeated is assumed to be $p^-ij$, similarly to the operation 1.

In the operation 3, the synapse load Wij is varied in accordance with the following relational expression:

$$W_{ij} = \eta \cdot (p^+ij - p^-ij)$$

from the evaluated values $p^+ij$ and $p^-ij$. Symbol $\eta$ represents a positive constant which determines the degree of a single variation of the synapse load Wij. The variation process of the synapse load Wij is determined by only the states of the two units i and j which are coupled with each other, as clearly understood from the above equation. The final object of the learning is minimization of the value G in the equation (3), i.e., minimization of the above value $\Delta W_{ij}$ such that the same ideally converges to zero.

As to the aforementioned variation of the synapse load Wij, the following relational expression may be employed in an electronic circuit, in order to simplify its structure:

$$\begin{aligned}
\Delta W_{ij} &= 1 : p^+ij - p^-ij > 0 \\
&= 0 : p^+ij - p^-ij = 0 \\
&= -1 : p^+ij - p^-ij < 0
\end{aligned}$$

"A Neuromorphic VLSI Learning System" by J. Alspector et al., "Advanced Research in VLSI 1987" issued by MIT Press, p. 313 to 327, discloses an exemplary device which implements the aforementioned Boltzmann machine by an integrated circuit. The structure and operation of such a conventional semiconductor neural network device implementing the Boltzmann machine will now be described.

FIG. 3 shows an exemplary structure of the neural network. Referring to FIG. 3, the neural network includes complementary input data line pairs IN1 and $\overline{IN1}$ to INj and $\overline{INj}$, which are arrayed in the row direction, and complementary data output line pairs S1 and $\overline{S1}$ to Sj and $\overline{Sj}$, which are arrayed in the column direction. The neural network is further provided with differential amplifiers Z1 to Zj, which detect and amplify potential differences on the input line pairs INk and $\overline{INk}$ (k=1 to j) and transfer the same to the data output lines Sk and $\overline{Sk}$. The respective differential amplifiers Zk correspond to neurons, while the data input lines IN and $\overline{IN}$ correspond to dendrites and the data output lines S and $\overline{S}$ correspond to axons. Synapse loads W are supplied by resistive elements R, which are arranged on crosspoints between the data input lines IN and $\overline{IN}$ and the data output lines S and $\overline{S}$.

In the Boltzmann machine model, the synapse loads W have such a symmetric property that Wij=Wji. Thus, the differential amplifiers Zk are arranged on a diagonal line of a connection matrix formed by the data input lines, the data output lines and the resistive elements.

The differential amplifiers Zk have complementary outputs S and $\overline{S}$. When the neurons are in ON states, the S outputs of the differential amplifiers Zk are "1" (5 V). When the neurons are in OFF states, on the other hand, the S outputs are "0" (0 V). The outputs of the differential amplifiers Zk are fed back to the data input lines IN and $\overline{IN}$ through the resistive elements R, indicating the synapse loads, which are arrayed in the matrix. A resistive element R, which is arranged on the i-th row and j-th column in the connection matrix, connects the output of the differential amplifier (neuron) Zj to the input of the differential amplifier (neuron) Zi. When the synapse load Wij is positive, therefore, the data output line Sj is connected to the data input line INi, and the data output line $\overline{Sj}$ is connected to the data input line $\overline{INi}$. When the synapse load Wij is negative, on the other hand, the data output line Sj is connected to the data input line $\overline{INi}$, and the data output line $\overline{Sj}$ is connected to the data input line INi.

A differential amplifier Zt, which is provided in a region V of the connection matrix, is regularly in an ON state, while an output line Sv is regularly supplied with "1" and an output line $\overline{Sv}$ is regularly supplied with "0". Such a structure eliminates influence by a threshold value in each neuron unit, and each threshold value is equivalently set at zero.

This network is initialized by setting the weight (resistance value) of each resistive element R. Data of the synapse load Wij is transferable along arrows shown in FIG. 3 through a weight processing circuit which is provided in correspondence to each resistive element R, as hereinafter described.

FIG. 4 shows the structure of each synapse load part (resistive element). The synapse load part includes four transistor groups TR1, TR2, TR3 and TR4, in order to provide positive coupling (excitatory coupling) and negative coupling (inhibitory coupling). Each of the transistor groups TR1 to TR4, which are identical in structure to each other, includes n MOS (metal-oxide-semiconductor) transistors $T_0$ to $T_{n-1}$ and one pass transistor TG. ON resistances of the MOS transistors $T_0$ to $T_{n-1}$ are set as $1:2:\ldots:2^{n-1}$, in order to provide different resistance values. The pass transistors TG1 and TG4 receive a signal TSGN indicating the sign of the synapse load, while the pass transistors TG2 and TG3 receive a complementary signal $\overline{TSGN}$. The signals TSGN and $\overline{TSGN}$ are complementary signals, which determine whether the sign of the synapse load is positive or negative. When the synapse load Wij is positive, the signal TSGN is "1", and the transistor groups TR1 and TR2 provide the synapse load Wij. When the synapse load Wij is negative, on the other hand, the complementary signal $\overline{TSGN}$ is "1", and the transistor groups TR2 and TR3 provide the synapse load Wij. The synapse load is set by turning one or more MOS transistors in each transistor group TR on through an output from a weight processing circuit, as hereinafter described.

FIG. 5 shows the structure of each differential amplifier Z forming a neuron. The differential amplifier Z includes p-channel MOS transistors PT1 and PT2, and n-channel MOS transistors NT1, NT2, NT3 and NT4. The p-channel MOS transistors PT1 and PT2 provide a pair of differential outputs, and transfer complementary data to data output lines S and $\overline{S}$. The n-channel MOS transistors NT1 and NT2 provide a first differential input pair, while the n-channel MOS transistors NT3 and NT4 provide a second differential input pair. The first differential input pair differentially amplifies the potential difference on data input lines IN and $\overline{IN}$ to provide an energy gap $$\Delta E_k \left( = \sum_j W_{kj} \cdot S_j \right),$$

while the second differential input pair generates an annealing temperature T in the form of a noise. The second differential input pair receives a complementary output from an amplifier AZ, which receives a noise from a noise source NS. The level of a noise signal from the amplifier AZ is reduced with progress of a certain phase. Hence, such a process is realized that annealing is started at a high temperature and the annealing temperature is successively reduced so that the neural network is not captured by a pseudo optimum solution (local minima) but stabilized to a global minimum value. In general, the amplifier AZ is formed by an operational amplifier, whose gain is externally adjusted to set the annealing temperature.

In order to adjust input/output characteristics of the neuron (differential amplifier), a further n-channel MOS transistor NT5 is provided for receiving a prescribed bias potential $V_{bias}$ at its gate.

FIG. 6 shows an exemplary structure of the weight processing circuit. Referring to FIG. 6, the weight processing circuit includes a correlation logic CL, an up/down logic UDL, and flip-flops FF0 to FFn. In the Boltzmann model, the synapse loads have such a symmetrical property that Wij=Wji. Therefore, the weight processing circuit is commonly provided for the symmetrical synapse loads Wij and Wji. The flip-flops FF0 to FFn control ON and OFF states of the MOS transistors representing the synapse loads. The flip-flop FF0 stores information indicating the sign of the synapse loads, and controls on-off operations of the pass transistors TG. The flip-flops FF1 to FFn control on-off operations of the MOS transistors $T_0$ to $T_{n-1}$.

The correlation logic CL counts the numbers of a signal indicating the phase in operation and a signal COOC indicating such time when both of the outputs Si and Sj of the neuron units (differential amplifiers) Zi and Zj are "1", and evaluates a probability distribution Pij. When a weight adjusting signal ADW is received, the correlation logic CL supplies a signal indicating an increment, a decrement or holding (silent state) to the up/down logic UDL through the evaluated probability distribution Pij in accordance with the equation (4).

In response to the increment/decrement indication signal from the correlation logic CL, the up/down counter UDL increments, decrements or leaves intact the count value, and transfers the same to the flip-flops FF0 to FFn. The up/down logic UDL has the structure of a shift register, which can receive synapse load data W from an up/down logic included in an adjacent weight processing circuit in initialization, and can transfer the data to another up/down logic included in another adjacent weight processing circuit.

FIG. 7 shows an exemplary structure of the up/down logic UDL. In the structure shown in FIG. 7, a synapse load W is expressed in four bits (including one sign bit). FIG. 7 shows no path for setting weight data from the adjacent weight processing circuit as shown in FIG. 6. The up/down logic UDL is formed by an updown counter 100'. This updown counter 100' comprises a terminal U/D which receives a signal indicating incrementation/decrementation of the count value, a terminal T which receives a signal providing variation timing for the count value, a reset terminal R, and data output terminals Q0 to Q3. Outputs of the output terminals Q0 to Q2 provide the level of the synapse load W, and the output terminal Q3 outputs data defining the sign of the synapse load W. The output data from the output terminal Q3 is transferred through an inverter I1. Signal lines 103' to 106' are coupled to the flip-flops FF0 to FFn (n=3) respectively. In accordance with the incrementation/decrementation indication signal transferred through the signal line 102', the updown counter 100' increments, decrements or holds its count value when a timing signal is received through the signal line 101'. The synapse load is learned by this operation. A signal on a signal line 107' resets the updown counter 100'.

A threshold value processing operation of one neuron (differential amplifier) Zi is now described with reference to FIG. 8. Referring to FIG. 8, one transistor TC typically shows a conductance representing each synapse load W. When the synapse loads W are positive and the neurons are in ON states (differential amplifier outputs S are "1") or the synapse loads W are negative and the neurons are in OFF states, voltages $V_{on}$ and $V_{off}$ are transferred to the data input lines IN and $\overline{IN}$ through conductances on Ist and IVth rows. Conductances on IInd and IIIrd rows are those developed when the synapse loads W are negative and the neurons are in ON states or the synapse loads W are positive and the neurons are in OFF states (differential amplifier outputs S are "0").

The voltage $V_{off}$ is transferred to the data input line IN, and the voltage $V_{on}$ is transferred to the data input line $\overline{IN}$. The positive input of the differential amplifier Zi is coupled with a conductance which is pulled up to the voltage $V_{on}$ and a conductance which is pulled down to the voltage $V_{off}$. The conductance which is pulled up to the voltage $V_{on}$ is provided by the absolute value of the sum of positive synapse loads W from neurons which are in ON states. A conductance, which is provided by the absolute value of the total sum of positive synapse loads W from OFF-state neurons, pulls down the potential at the positive input of the differential amplifier Zi to $V_{off}$. The relation between conductances in a negative input ($-$) of the differential amplifier Zi is evaluated from the relation, which is reverse to the same, in a positive input of the differential amplifier Zi. Considering the aforementioned relations with the fact that the synapse loads in the region V of FIG. 3 are provided as $-\theta i$, the differential amplifier Zi simply performs the following comparison:

$$\sum_j W_{ij} \cdot S^*j > \theta i$$

$$S^*j = 1 : Sj = 1$$

$$S^*j = -1 : Sj = 0$$

The differential amplifier Zi performs threshold value processing in accordance with the above expressions, and outputs the data to the data output lines S and $\overline{S}$.

In the aforementioned structure, it is also possible to obtain desired output data by simply comparing the value of the positive input ($+$) of the differential amplifier Zi with a prescribed threshold value $(V_{on}+V_{off})/2$. FIG. 9 shows another structure.

The structure shown in FIG. 9 is described in "Electronic Implementation of Neuromorphic System" by Jack I. Ruffel, IEEE 1988 Custom Integrated Circuit Conference, pp. 10.1.1. to 10.1.7.

Referring to FIG. 9, a circuit part (hereinafter referred to as a synapse polarity converting circuit) for outputting the product of a load and Sj of a data output line includes a synapse load representing part representing a synapse load Wij in accordance with data stored in a register 200', and a constant current circuit 210'. The register 200' has unit registers B0 to B2 which determine the value of the synapse load Wij, and a unit register B3 which outputs data for setting the sign of the synapse load Wij. The register 200' corresponds in structure to the flip-flops FF0 to FFn shown in FIG. 6.

The synapse load representing part has n-channel MOS transistors 201'a to 201'd, 202'a to 202'd and 203'a to 203'd. Data of the registers B0 to B2 are transferred to the gates of the MOS transistors 201'a, 202'a and 203'a through signal lines 200'a to 200'c respectively. An output signal of the data output line (axon signal line) Sj is transferred to the gates of the MOS transistors 201'b, 202'b, 203'b, 201'c, 202'c and 203'c. Output data from the register B3 is transferred to the gates of the MOS transistors 201'd, 202'd and 203'd through a signal line 200'd. The MOS transistors 201', 202' and 203' are set in the transistor width (gate width) ratio 1:2:4, whereby the MOS transistors 201', 202' and 203' are set in the conductance ratio 1:2:4. The transistor 201' is the generic name for the MOS transistors 201'a to 201'd. This also applies to the transistors 202' and 203'.

The constant current circuit 210' includes n-channel MOS transistors NT10 and NT11 and p-channel MOS transistors PT11 and PT12. The MOS transistor NT10 includes a diode-connected n-channel MOS transistor NT10b, and an n-channel MOS transistor NT10a whose gate is connected to the gate of the MOS transistor NT10b. Similarly, the n-channel MOS transistor NT11 has a diode-connected MOS transistor NT11b, and a MOS transistor NT11a. The p-channel MOS transistor PT11 has a diode-connected p-channel MOS transistor PT11a, and a MOS transistor PT11b. The MOS transistor PT12 includes a diode-connected p-channel MOS transistor PT12a, and a p-channel MOS transistor PT12b. The MOS transistor pairs NT10, NT11, PT11 and PT12 form a current mirror type constant current circuit. Therefore, a current $I_0$ on a signal line 211'a, which is outputted from the constant current circuit 210', is equal to the sum of a current flowing on a signal line 211'b and that flowing on a signal line 212' (data input line IN). The signal line 211'a is connected to first conducting terminals of the MOS transistors 201'a, 202'a and 203'a, while the signal line 211'b is connected to first conducting terminals of the MOS transistors 201'd, 202'd and 203'd. The operation is now briefly described.

First, it is assumed that the potential signal Sj on the data output line is at a high level and the corresponding neuron is in an ON state.

When the synapse load Wij is positive, a low-level signal potential is transferred form the register B3 onto the signal line 200'd. Thus, all of the MOS transistors 201'd, 202'd and 203'd are in OFF states. In response to synapse load data from the registers B0 to B2, one of the MOS transistors 201'a, 202'a and 203'a enters an ON state. Thus, the current flowing on the signal line 211'a flows to the ground potential through the MOS transistor which is in an ON state. Consequently, the current $I_0$ flowing on the signal line 211'a is increased, while the current $I_i$ flowing on the signal line 211'b remains unchanged. Thus, a current $(I_0-I_i)$ appearing on the signal line 212' is increased in correspondence to the increase in the current flowing on the signal line 211'a, to indicate the degree $W_{ij}\cdot S_j$ of coupling between neurons j and i.

When the synapse load Wij is negative, on the other hand, the register B3 outputs a high level and all of the MOS transistors 201'd, 202'd and 203'd enter ON states, thereby opening a path for receiving the current from the signal line 211'b. In this state, the current is extracted from the signal line 211'b to the ground potential in an amount identical to that extracted when all of the MOS transistors 201'a, 202'a and 203'a are in ON states. The current $(I_0-I_i)$ on the signal line 212' is reduced by such increase of the current $I_i$ flowing on the signal line 211'. In this state, the synapse load is subjected to an offset in the negative direction by the absolute value of the maximum value of a state provided by the product of the load Wij and the output Sj of the neuron j. Thus, negative Wij can be represented.

When the output Sj of the neuron j is at a low level and the neuron j is in an OFF state, all of the MOS transistors 201'b, 201'c, 202'b, 202'c, 203'b and 203'c enter OFF states, and hence no path is opened to extract the currents from the signal lines 211'a and 211'b. Therefore, the currents $I_0$ and $I_i$ flowing on the signal lines 211'a and 211'b are equal to each other, and the current value $(I_0-I_i)$ appearing on the signal line 212' is zeroed to represent a state of $Wij \cdot Sj=0$.

Thus, the output state of the neuron unit i is determined by connecting a plurality of synapse representing circuits in parallel with the signal lines 211a and 211b and comparing the current flowing on the signal line 212' with the threshold value $\theta_i$.

In the aforementioned structure of the integrated semiconductor neural network, the number of neuron units is still extremely small, and the respective functional blocks are formed in single chips, which are interconnected to provide one neural network.

In order to arbitrarily represent both of excitatory and inhibitory coupling states in representation of synapse loads, the conventional Boltzmann machine provided with a learning function requires four signal lines S, $\overline{S}$, IN and $\overline{IN}$ as shown in FIG. 3, for each neuron as signal lines (axons) showing the state of the neuron and input lines (dendrites) transferring the data supplied to the neuron. Thus, the number of wires is so increased that interconnection in the neural network is complicated with difficulty and the area of interconnection is increased to cause difficulty in high integration.

In order to implement learning (self organization) of the neural network at a high speed, it is effective to correct the respective synapse loads in parallel in accordance with the aforementioned conversion expression (4):

$$\Delta Wij = \eta \cdot (p^+ ij - p^- ij)$$

Thus, it is necessary to provide a circuit for calculating $\Delta Wij$ and a synapse load control circuit for correcting synapse load information on the basis of the supplied $\Delta Wij$ in correspondence to a circuit for representing each synapse load (see FIG. 6), and hence the circuit scale is increased to cause difficulty in high integration. In the structure shown in FIG. 6, the synapse load Wij is symmetrical and the Wij calculating circuit and the synapse load control circuit are used in common. In a practical scale, however, at least 1000 to 1500 neuron units are required. Therefore, it is necessary to extend the neural network by interconnecting a plurality of semiconductor neural network chips. However, a single chip providing synapse load representation may be in a state not satisfying the relation Wij=Wji. In this case, it is impossible to simply use a Wij calculating circuit and a synapse load control circuit for representing two synapse loads in common, dissimilarly to the above. Thus, the semiconductor neural network cannot be easily extended.

Further, only six neuron units have been illustrated in relation to the conventional semiconductor neural network, and no consideration has been made on a structure for extending the semiconductor neural network.

In the learning algorithm, on the other hand, it is necessary to implement stochastic state transitions of neurons while implementing controlled simulated annealing. However, it has been difficult to freely electrically control representation of such stochastic state transitions of the neurons and simulated annealing from the exterior, due to a number of restrictions. In the conventional Boltzmann machine, stochastic state transitions of neurons are generally represented with pseudo-random numbers in simulation in a von Neumann computer. In an electronic circuit device employing operational amplifiers such as those shown in FIGS. 3 and 5, each operational amplifier is used as a comparator, whose first input terminal is connected with a load sum input signal (dendrite signal line) IN while its input terminal is connected with a noise signal from a noise source (NS, AZ). This structure exhibits such a tendency that a high voltage appears at the output terminal of the operational amplifier when the voltage value of the load sum input signal exceeds a time average of noise voltages while a low voltage appears in other case. When a noise potential supplied from the noise source deviates in terms of the time average at a speed of change which is sufficiently faster than the change of the total load input signals and the comparator can follow the said speed of the change, the variation of a threshold value on a time base can be expected in a range corresponding to the width of the noise. In this case, the output of the comparator (operational amplifier) represents a stochastic transition state.

However, this structure requires control for reducing the noise width as a function of time in order to implement efficient simulated annealing. Although such control is generally achieved by controlling the gain of the operational amplifier AZ, it is difficult to derive a desired attenuating noise signal by such gain control. Further, it is difficult to achieve such gain control by high and low voltage signals of binary levels from an exterior to the device, while it is also difficult to generate a noise signal having desired time-dependent attenuation through such logical binary voltages.

When a noise generation source generating a thermal noise is employed, it is necessary to selectively extract a component in a frequency domain providing a variation speed which meets the object. Thus, an additional circuit is required for this and hence the circuit scale for generating simulated annealing is increased to increase the scale of the neural network.

In learning (self organization) of the Boltzmann machine, it is necessary to increase or decrease synapse loads. The up/down counter shown in FIGS. 6 and 7 is employed for increasing or decreasing the synapse loads. However, since it is necessary to repeat learning by tens of times in such a simple up/down counter, the contents of the up/down counter may overflow in learning. When such an overflow occurs in the up/down counter for setting the synapse loads, erroneous learning is made since the counter outputs a signal which is absolutely different from the learning value. Thus, it is impossible to correctly set the synapse loads.

On the other hand, the synapse polarity converting circuit for calculating a degree W·S of coupling between neurons requires four pairs of MOS transistors for providing excitatory coupling and inhibitory coupling in the structure shown in FIG. 4. Thus, the structure of the synapse load representing part is complicated and the circuit scale thereof is increased. Further, the data input lines IN and $\overline{IN}$ and the data output lines S and $\overline{S}$ are required for operating the products/sums, and hence the semiconductor neural network is prevented from high integration, as a matter of course.

Further, the current mirror type constant current circuit shown in FIG. 9 requires two current output signal lines, and hence the neural network is prevented from high integration.

When the current mirror type constant current circuit is employed, further, the amount of its driving current or an output current derived from the constant current circuit is determined depending on the sizes of transistors forming the constant current circuit. Thus, it is impossible to achieve extended connection for a number of synapse load representing parts (circuits for calculating Wij·Sj) which are connected to a single constant current circuit. In other words, it is impossible to drive a number of synapse load representing circuit parts by one constant current circuit. Thus, the neural network is increased in scale, while it is impossible to easily extend the neural network.

In the conventional Boltzmann machine, the learning rules are achieved in accordance with:

$$\Delta Wij = \eta \cdot (P^+ij - P^-ij)$$

It is necessary to calculate P+ij and P−ij in this case, and such calculation is made in the correlation logic shown in FIG. 6. The correlation logic shown in FIG. 6 is required in order to calculate such P+ij and P−ij as well as to output the variation Wij. In this correlation logic, it may be necessary to count numbers at which both of the signals Sj and Si are "1" and to obtain an average value of the numbers over a number of repeated times of actually performed simulated annealing. In order to form the correlation logic, therefore, the amount of hardware is increased and the calculation time is also increased.

Further, multibit operation is required for evaluating P+ij−P−ij, and this multibit operation is performed through an up/down logic. Thus, the bit number of the counter circuit is increased and the circuit structure for calculating ΔWij is increased, to cause difficulty in high integration of the neural network.

In the conventional Boltzmann machine, it is necessary to perform the plus and minus phase operations respectively, in order to obtain the synapse load variation ΔWij. In the plus phase operation, an educator signal is supplied also to an output neuron, which is clamped in correspondence to the educator data. In the minus phase operation, on the other hand, the output neuron receives no educator data but remains in a free state. In learning of the neural network, therefore, it is necessary to make the educator signal valid/invalid in response to each phase, while definition of the attribute of each neuron (hidden neuron or visible (input/output) neuron) must be easily variable in extension of the neural network. Thus, the attribute of each neuron must be arbitrarily settable in the neural network, while a structure for easily transferring an educator signal to a set visible neuron is required in order to implement extended arrangement of the neural network.

SUMMARY OF THE INVENTION

An object of the present invention is to provide an improved semiconductor neural network which can be easily integrated at a high degree.

Another object of the present invention is to provide a semiconductor neural network having configuration or architecture directed to extended connection, which can easily extend the neural network.

Still another object of the present invention is to provide an improved semiconductor neural network suitable for high integration, which has a reduced occupied area of interconnection, and which can make correct learning at a high speed.

A further object of the present invention is to provide a synapse representing circuit for implementing architecture which is directed to extended connection.

A further object of the present invention is to provide an improved stochastic state transition representing circuit.

A further object of the present invention is to provide an improved annealing temperature generating circuit for achieving simulated annealing with excellent controllability.

A further object of the present invention is to provide a synapse load representing circuit which can correctly perform variations of synapse loads, i.e., learning.

A further object of the present invention is to provide an improved neuron connecting strength operating circuit.

A further object of the present invention is to provide a neuron connection strength operating circuit having a simple circuit structure and a reduced occupied area of interconnection.

A further object of the present invention is to provide an educator signal control circuit which can arbitrarily set attributes of neurons, and which can easily transfer educator data to the set visible neurons.

A further object of the present invention is to provide an improved learning method which can simplify the circuit structure and increase the learning speed.

A further object of the present invention is to provide a learning control circuit which implements the aforementioned improved learning method.

A further object of the present invention is to provide a semiconductor neural network chip comprising the structure of a neural network which can be easily integrated at a high degree and which can be easily extended/connected.

An integrated circuit device provided with a learning function according to the present invention comprises a synapse representing part which is formed by arranging a plurality of synapse representing circuits indicating connection strengths between axon signal lines and dendrite signal lines in the form of a right triangle, an axon signal control unit which is adjacent to a first side of the right triangle making the right-angle for driving the axon signal lines, and functional units which are aligned along a second side of the triangle of the synapse representing part, formed by the synapse representing circuits, for representing nerve cells.

When the synapse representing part represents an asymmetrical matrix part in a synapse load matrix, the synapse representing circuits are arrayed in rows and columns while the dendrite signal lines and the axon signal liens are arrayed in the directions of the rows and columns respectively.

The axon signal control unit includes buffers for transferring axon signals onto the axon signal lines in correspondence to the respective axon signals.

The nerve cell representing part is formed by a plurality of nerve cell circuits, i.e., comparators each having one input terminal coupled with a dendrite signal transfer line and another coupling terminal connected to the output of a probability representing circuit.

Each synapse representing circuit includes a synapse load representing circuit representing a synapse load which indicates the connection strength between an axon signal line and a dendrite signal line, a learning control circuit connected to first and second axon signals, which are different from each other, for processing the first and second axon signals in accordance with prescribed learning rules and outputting synapse load variation information for supplying the same to the synapse load representing circuit, a first synapse operation representing circuit for operating the product of the synapse load from the synapse load representing circuit and the first axon signal from the first axon signal line and transferring the product onto a first dendrite signal line, and a second synapse operation representing circuit for operating the product of the synapse load output from the synapse load representing circuit and the second axon signal from the second axon signal line and transferring the product onto a second dendrite signal line.

The probability representing circuit includes a circuit which is started in response to a logical binary voltage, which is applied from the exterior, for generating a voltage attenuated/vibrated around a reference bias potential at a prescribed time constant and a prescribed cycle.

The synapse load representing circuit comprises a counter for counting the synapse load variation information from the learning control circuit, a circuit for detecting whether or not the synapse load value outputted from the counter exceeds the limitation of a predetermined maximum or minimum value, and a limiter for holding the synapse load value at the threshold value of the maximum or minimum value when the detection circuit detects that the synapse load value exceeds the limitation. The counter includes a circuit which is countable beyond the limitation of the maximum and minimum values of the synapse load and invalidates synapse load variation information from the learning control circuit exceeding the threshold value of the counting operation.

Each synapse operation representing circuit includes a first gate voltage selection circuit which receives the synapse load output from the synapse load representing circuit and a nerve cell state signal on the axon signal line for selecting and outputting either a bias voltage or a gate-off voltage in response to the nerve cell state signal, a second gate voltage selection circuit which selects and outputs either the output from the first gate voltage selection circuit or the gate-off voltage in response to the output from the synapse load representing circuit indicating the value of the synapse load, a third gate voltage selection circuit which outputs the gate-off voltage only when the nerve cell state signal exhibits an excitatory state and a signal indicating the sign of the synapse load from the synapse load representing circuit shows a negative state while outputting the bias voltage in other case, a first current supply circuit which transfers a current responsive to the value of the synapse load from the synapse load representing circuit onto the dendrite signal line in response to the output from the second gate voltage selection circuit, and a second current supply circuit which transfers a current responsive to the signal from the synapse load representing circuit, indicating the sign of the synapse load, in response to the output from the third gate voltage selection circuit.

The learning control circuit comprises a functional unit which operates the product of a first nerve cell state signal on the first axon signal line and a second nerve cell unit state signal on the second axon signal line, two state holding functional units for holding and outputting the result of the product operation, and an operation functional unit for operating and outputting an increase/decrease value of the synapse load through the respective outputs of the two state holding functional units on the basis of predetermined learning rules. Operations of the two state holding functional units and the operation functional unit outputting the increase/decrease value of the synapse load are controlled in response to control signals which are received from the exterior. The learning control circuit complies with the following learning rule:

$$\Delta Wij = \eta \cdot (S^+ i \cdot S^+ j - S^- i \cdot S^- j)$$

or $$\Delta Wij = \eta \cdot Si \cdot Sj$$

where the superior plus sign indicates state signals in a plus phase operation, and the superior minus sign indicates state signals in a minus phase operation. In the case of the second learning rule, the synapse load is varied independently in the respective ones of the plus phase and the minus phase, and increase/decrease of the synapse load is determined by the plus phase or the minus phase.

A self-organized synapse representing circuit according to another aspect of the present invention includes a learning control circuit which receives a first axon signal Si and a second axon signal Sj and outputs a pulsing signal representing an amount of a synapse load variation in accordance with predetermined learning rules, synapse load value storage means including a first capacitor for storing an excitatory synapse load value and a second capacitor for storing an inhibitory synapse load value, means for changing the synapse load value stored in the synapse load value storage means in response to the pulsing signal from the learning control circuit, and means for transferring a received axon signal onto a corresponding dendrite signal line in the form of a current signal with a weight represented by the stored load value.

The synapse load change means includes charge pump circuits which are provided in correspondence to the first and second capacitors for changing the amounts of charges stored in the corresponding capacitors in response to the pulsing signal from the learning control circuit.

The learning control circuit includes means which operates the product of the first and second axon signals Si and Sj, and selection means which supplies a pulsing signal to the synapse load value change means to increase either the excitatory synapse load value or the inhibitory synapse load value in response to the output of the product operating means and a learning mode designating signal received from the exterior.

The selection means includes means which generates a pulsing signal for controlling an amount of synapse load variation expressed as:

$$\Delta Wij = \eta \cdot Si \cdot Sj$$

in the case of a plus phase, or as:

$$\Delta Wij = -\eta \cdot Si \cdot Sj$$

in the case of a minus phase.

A synapse load representing circuit according to still another aspect of the present invention includes synapse load value storage means which stores a specific synapse load value in the form of charges, means for changing the synapse load value stored in the synapse load value storage means in response to a pulsing signal from the aforementioned learning control circuit, and means for transferring a received axon signal onto a corresponding dendrite signal line in the form of a current signal with a weight represented by the stored synapse load value.

The synapse load change means includes a charge pump circuit for increasing/decreasing the amount of charges stored in the synapse load value storage means in response to a pulsing signal from the learning control circuit. This charge pump circuit includes a series body of first and second diodes implemented by one insulated gate field effect transistor, and a capacitor for capacitively coupling the pulsing signal from the learning control circuit to the series body of the diodes.

An educator signal circuit is provided in correspondence to each nerve cell. Each educator signal control circuit at least includes a first storage element which holds and outputs data defining the attribute of the corresponding nerve cell in an operation mode for defining the attribute of the nerve cell, i.e., a hidden nerve cell or an input/output nerve cell while holding and outputting supplied educator data in response to a first control signal in an operation mode for setting an educator signal and a learning operation mode of the integrated circuit device, a second storage element which is coupled to the output of the first storage element to hold and output the data defining the attribute of the nerve cell in the operation mode for defining the attribute of the nerve cell, that for setting the educator signal and the learning operation mode, a third storage element which is coupled to the output of the first storage element for holding and outputting the data defining the attribute of the corresponding nerve cell in the operation mode for defining the attribute of the nerve cell while holding and outputting the educator data in response to a third control signal in the operation mode for setting the educator signal and the learning mode, and a selection circuit for selecting and outputting one of the educator data held and outputted by the third storage element, predetermined first fixed data and state signal data representing the state of the corresponding neuron in response to a selective control signal and the nerve cell attribute defining data held and outputted by the second storage element. This educator signal control circuit can serially shift the educator data and the nerve cell attribute defining data to an adjacent educator signal control circuit.

According to the arrangement/structure of the inventive integrated circuit, a plurality of synapse representing circuits are systematically arrayed in the form of a right triangle, while a plurality of axon control circuits and a plurality of nerve cell circuits are aligned along respective two sides of the right triangle. Thus, respective functions are processed in parallel to enable a high-speed operation, while various neural network structures can be represented by freely connecting output terminals of the respective nerve cell circuits with input terminals of the respective axon control circuits in the exterior of the integrated circuit device. Further, it is possible to easily structure a global neural network of a larger scale by interconnecting a plurality of integrated circuit devices.

Since the synapse representing circuits are provided in the form of a structure at least having a right-triangular configuration, one rectangular integrated circuit device is implemented by symmetrically folding the right-triangular structure along its hypotenuse, whereby it is possible to obtain two types of synapse representing parts or two synapse load minor matrices. Thus, an integrated circuit device for representing a diagonal part and another integrated circuit device for representing synapse loads of a non-diagonal part can be structured in similar chip layout, in an extended synapse load matrix, whereby it is easy to design the integrated circuit devices while efficiently enabling high integration.

In the synapse load representing circuit according to the present invention, the counter representing the synapse load has a prescribed threshold value to hold and output this threshold value against a counting request exceeding the threshold value while the counter itself is countable in excess of this threshold value, whereby it is possible to correctly learn the synapse load with no overflow of the counter in calculation of the synapse load.

The synapse operation representing circuit according to the present invention requires only one axon signal line and one dendrite signal line, whereby the area of interconnection can be reduced to implement higher integration.

Since an externally supplied bias voltage is applied to the gate of the current supply element which outputs a current corresponding to the product of the synapse load and the state signal, the level of the current flowing on the dendrite signal line can be adjusted by controlling the bias voltage in the exterior. Thus, it is possible to easily accommodate an increased number of the synapse representing circuits which are connected to one dendrite signal line.

The learning control circuit according to the present invention corrects the synapse load Wij in accordance with:

$$\Delta Wij = \eta \cdot (S^+ i \cdot S^+ j - S^- i \cdot S^- j)$$

or $$\Delta Wij = \eta \cdot Si \cdot Sj$$

Therefore, the structure of the learning control circuit is simplified while the synapse load variation can be evaluated at a higher speed, whereby it is possible to reduce the time required for the learning mode.

According to the inventive self-organized synapse representing circuit, the synapse load value is represented by the excitatory and/or inhibitory capacitor(s). Therefore, the number of used elements can be greatly reduced as compared with a structure of representing the synapse load value with a digital circuit, while the synapse load value can be easily controlled by a pulse signal by providing the charge pump circuitry for controlling the charges stored in the capacitor(s), whereby the learning control circuit can be implemented in a simple circuit structure. Consequently, it is possible to implement a self-organizable synapse representing circuit in a smaller occupied area.

According to the inventive probability representing circuit, it is possible to set an arbitrary time temperature reducing schedule by appropriately selecting parameters of the elements forming the circuits, while simulated annealing can be easily repeated by a logical binary voltage applied from the exterior of the device.

According to the inventive educator signal control circuit, the data (attribute defining data) defining whether the neuron is a hidden neuron or an input/output neuron is shifted in each educator signal control circuit through the first and third storage elements, and thereafter the data held in the first storage element is set in the second storage element by an externally supplied control signal. Then the educator data is shifted in each educator signal control circuit through the same input terminal through the first and third storage elements. This educator data is held in the third storage element. When the attribute defining data set in the second storage element defines a hidden neuron, data (state signal or axon signal) representing the state of the corresponding nerve cell is selectively outputted from the selection circuit and transferred onto the corresponding axon signal line, while educator data held in the third storage element is selected by the selection circuit as data (state signal or axon signal) representing the state of the nerve cell and transferred onto the corresponding axon signal line when the attribute defining data defines an input-/output neuron. Thus, it is possible to arbitrarily define the attribute of each nerve cell from the exterior, while an educator signal can be easily and arbitrarily set from the exterior for a neuron which is defined as an input-/output neuron.

These and other objects, features, aspects and advantages of the present invention will become more apparent from the following detailed description of the present invention when taken in conjunction with the accompanying drawings.

BRIEF DESCRIPTION OF THE DRAWINGS

FIG. 31A shows the results of simulation and FIGS. 31B(a) and 31B(b) show respective parameters for providing the results of simulation;

FIGS. 35A and 35B illustrate effects of the learning rules attained by simulation in accordance with FIG. 34, with respect to the relation between the number of hidden neurons and learning capacity;

FIGS. 42A($a$)-42A($c$) and 42B($a$)-42B($c$) illustrate waveforms obtained by simulating operations for setting parameters of respective elements of the probability representing circuit shown in FIG. 39;

DESCRIPTION OF THE PREFERRED EMBODIMENTS

Embodiments of the present invention are now described with reference to the drawings.

Figures 1, 2:
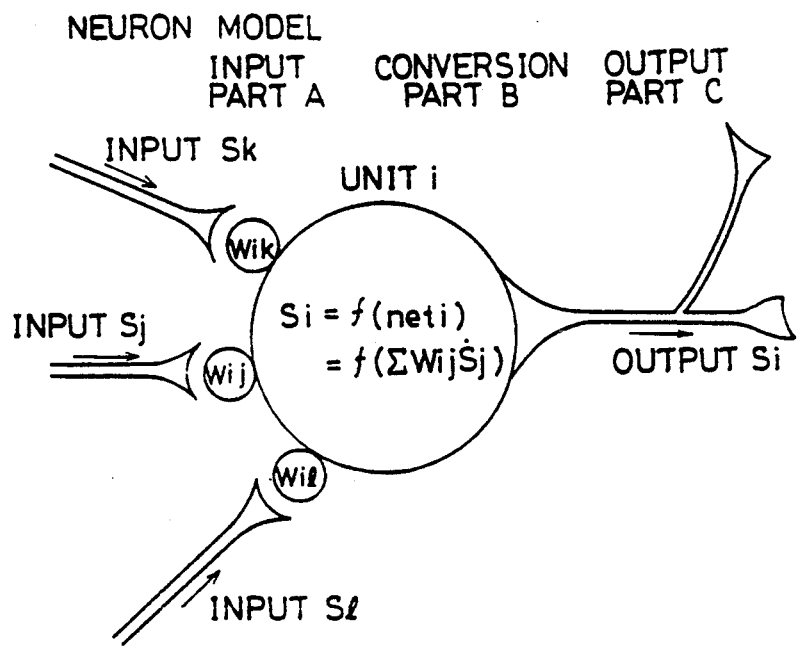
FIG. 1 is a diagram for illustrating the model of a neuron employed in a neural network.
FIG. 2 illustrates state transition probabilities in a Boltzmann model.
Figure 3:
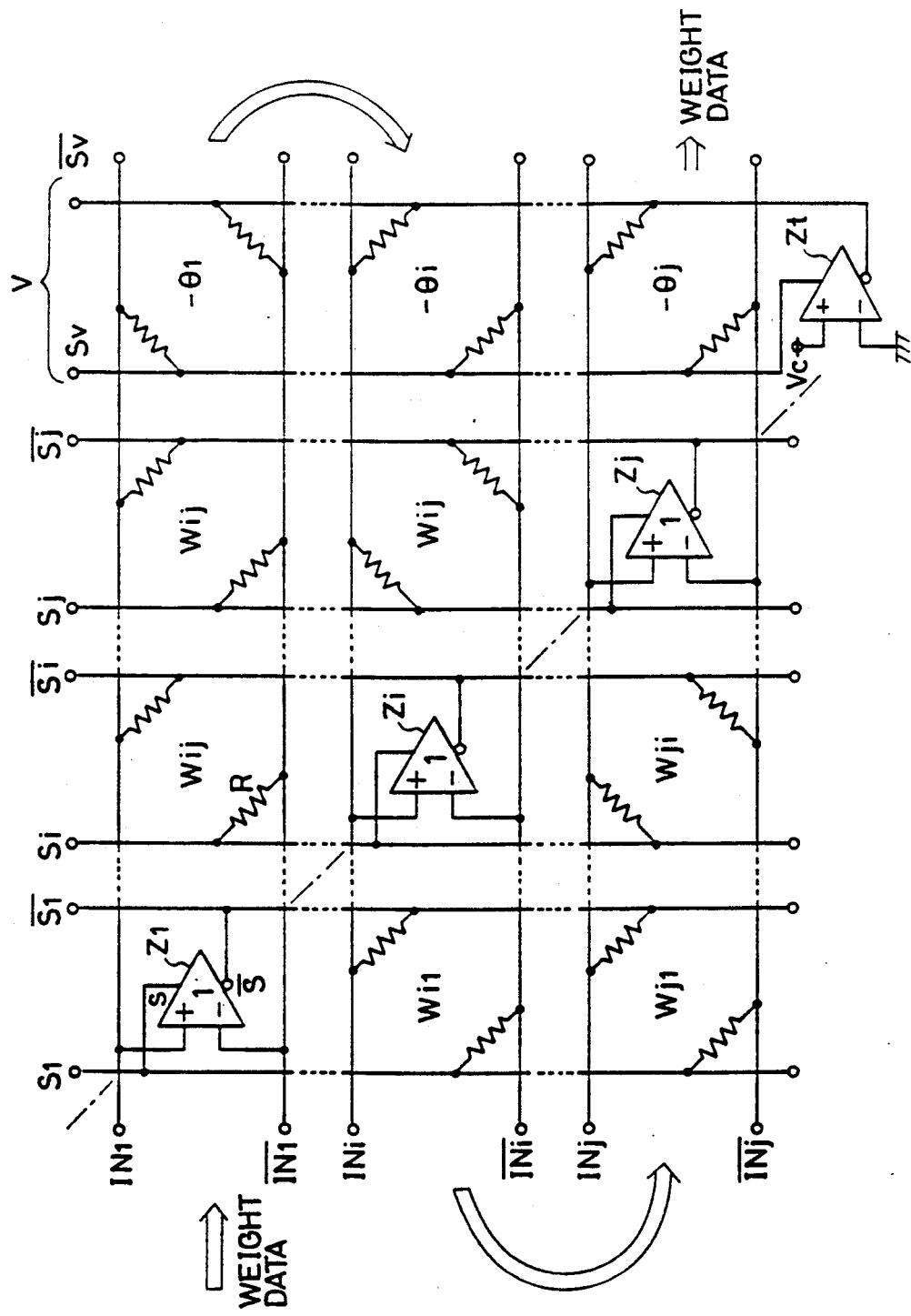
FIG. 3 illustrates the chip layout of a synapse representing part in a conventional neural network according to a Boltzmann model.
Figure 4:
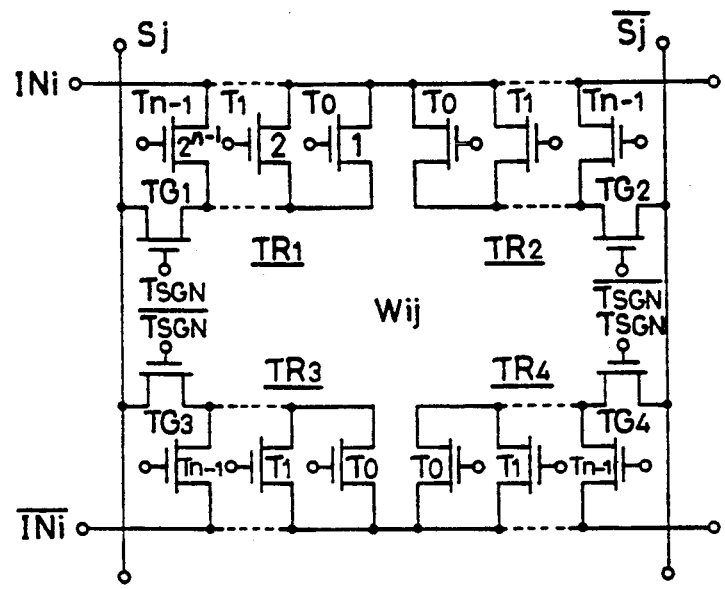
FIG. 4 illustrates an exemplary concrete structure of the synapse load representing part shown in FIG. 3.
Figure 5:
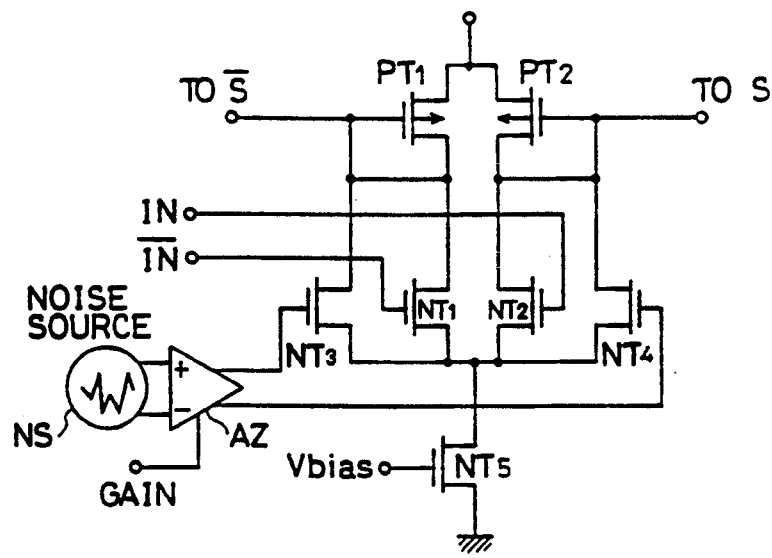
FIG. 5 illustrates a circuit structure for providing stochastic state transition in a conventional neural network.
Figure 6:
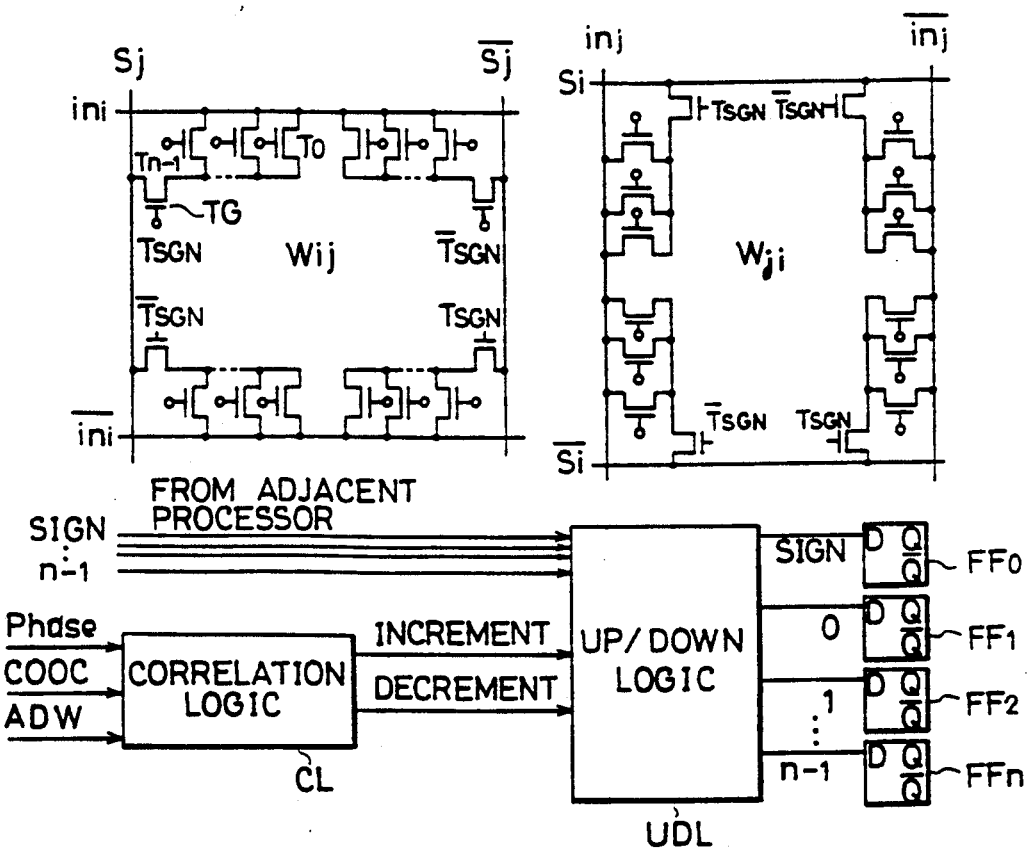
FIG. 6 illustrates the structure of a learning control circuit and a synapse load representing part for conventional synapse load learning.
Figure 7:
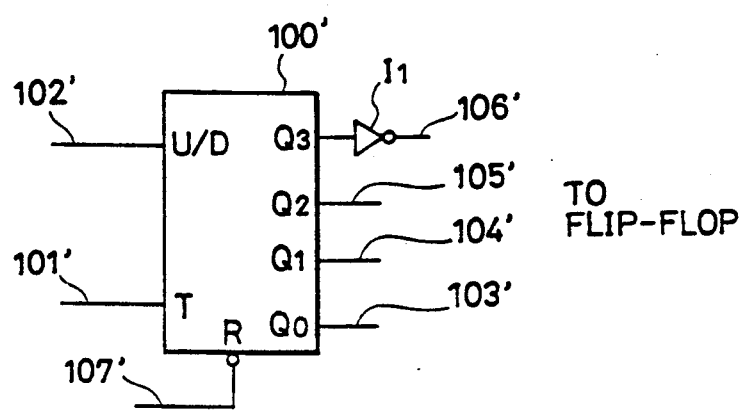
FIG. 7 illustrates the structure of a conventional synapse load representing circuit.
Figure 8:
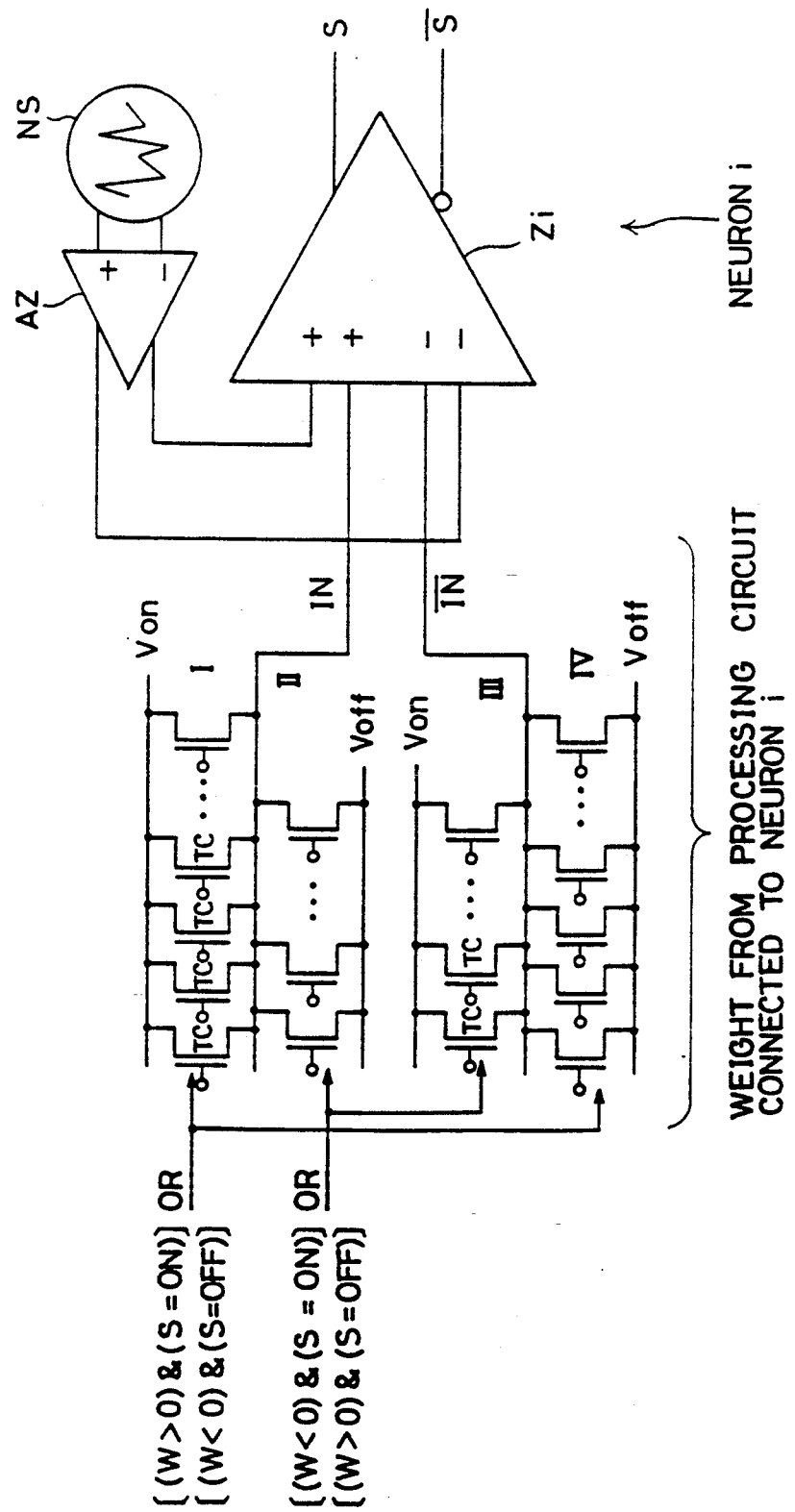
FIG. 8 is a diagram for illustrating stochastic state transition of a neuron in a conventional Boltzmann model.
Figure 9:
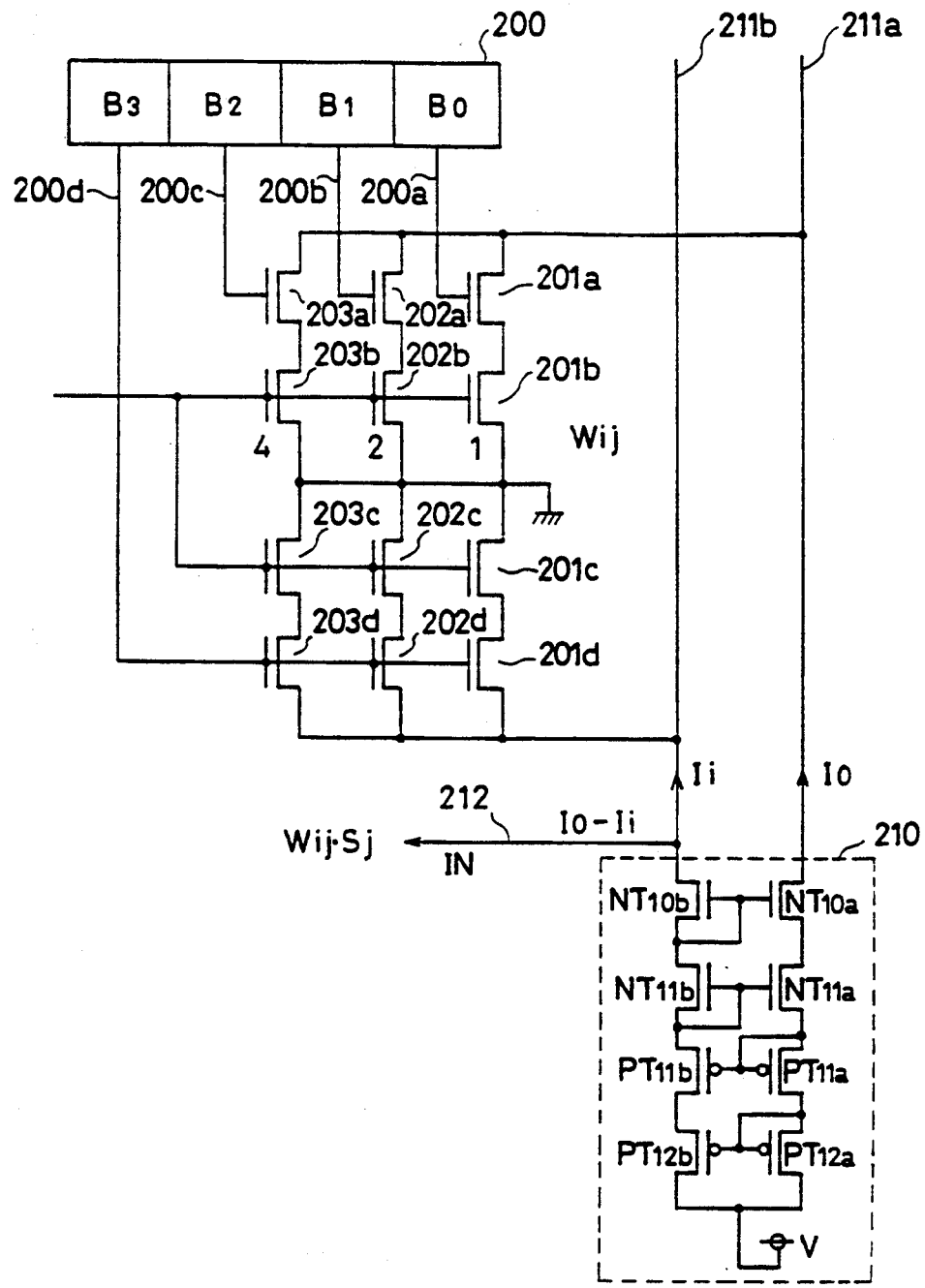
FIG. 9 illustrates the structure of a conventional synapse polarity converting circuit and a current decoder.
Figure 10:
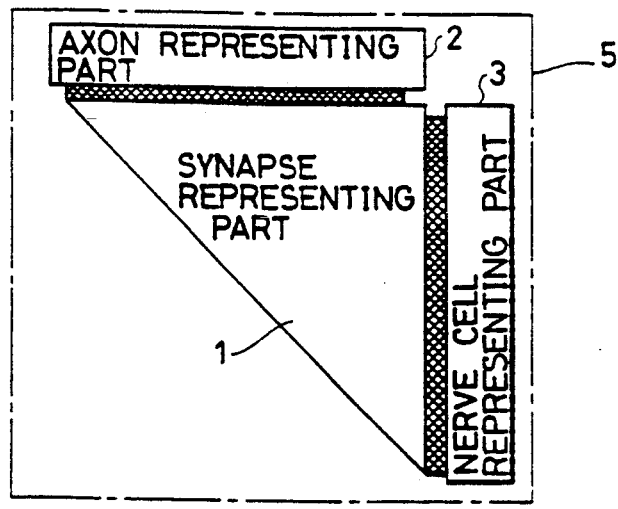
FIG. 10 illustrates the chip layout of an integrated circuit device provided with a learning function according to an embodiment of the present invention.

FIG. 10 shows the layout of a semiconductor neural network according to an embodiment of the present invention on a semiconductor chip. Referring to FIG. 10, the semiconductor neural network includes a synapse representing part 1 for performing arithmetic processing in correspondence to synapses for respective neurons, an axon representing part 2 for performing arithmetic processing corresponding to axons transferring signals indicating the states of the respective neurons, and a nerve cell representing part 3 for performing arithmetic processing in correspondence to the respective neurons. The synapse representing part 1, which is arranged substantially in the form of a right triangle, has first and second sides making the right-angle. The axon representing part 2 is arranged along the first side of the synapse representing part 1, while the nerve cell representing part 3 is arranged along the second side of the synapse representing part 1. The synapse representing part 1, the axon representing part 2 and the nerve cell representing part 3 are provided on a semiconductor chip 5.

Figure 11:
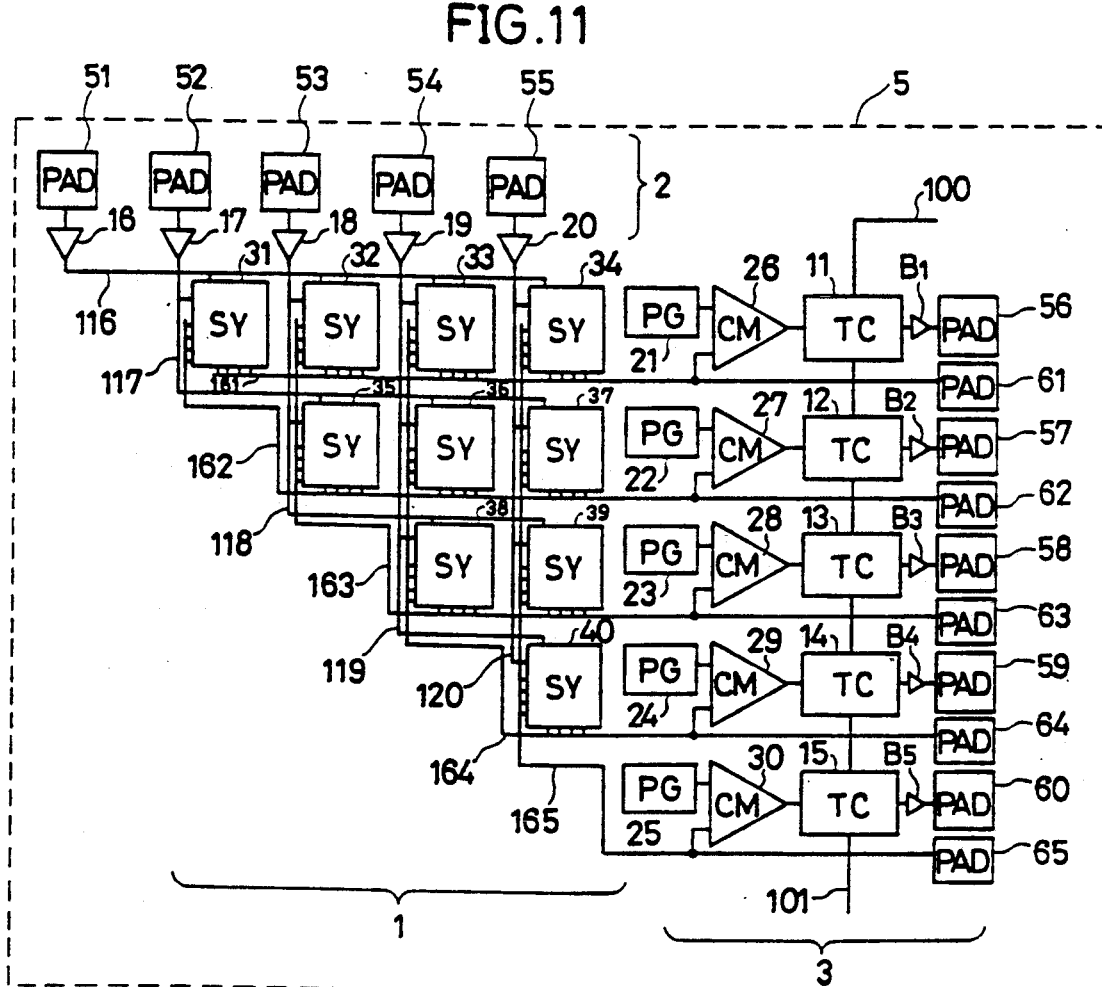
FIG. 11 illustrates the circuit arrangement shown in FIG. 10 in more detail.

FIG. 11 illustrates an example of a more specific structure of the semiconductor neural network shown in FIG. 10. The structure shown in FIG. 11 has five neurons (comparators), for example. However, the number of the neurons is not restricted to five but a larger number of neurons may be arranged in a similar manner to FIG. 10.

Referring to FIG. 11, the axon representing part 2 comprises axon signal line drivers 16 to 20, which are connected to respective ones of pads 51 to 55 for connection with the exterior of the device. The respective axon signal line drivers 16 to 20 buffer signals which are received through the pads 51 to 55, and transfer the same onto axon signal lines 116 to 120. The output from each of the axon signal line drivers 16 to 20 provides a state signal Si.

The synapse representing part 1 is formed by synapse representing circuits 31 to 40. These synapse representing circuits 31 to 40 are arranged to substantially form a right triangle. As hereinafter described in detail, each of the synapse representing circuits 31 to 40 receives a state signal Sj from the corresponding axon signal line, and transfers a signal with a synapse load Wij onto a corresponding one of dendrite signal lines 161 to 165. In a Boltzmann machine which is the model of this semiconductor neural network, synapse loads are symmetrical such that Wij=Wji. Therefore, one synapse representing circuit provides two synapse loads. The axon signal line 116 is connected to first axon signal input terminals of the synapse representing circuits 31, 32, 33 and 34. The axon signal line 117 is connected to a second axon signal input terminal of the synapse representing circuit 31 and first axon signal input terminals of the synapse representing circuits 35, 36 and 37. The axon signal line 118 is connected to second axon signal input terminals of the synapse representing circuits 32 and 35 and first axon signal input terminals of the synapse representing circuits 38 and 39. The axon signal line 119 is connected to second axon signal input terminals of the synapse representing circuits 33, 36 and 38 and a first axon signal input terminal of the synapse representing circuit 40. The axon signal line 120 is connected to second axon signal input terminals of the synapse representing circuits 34, 37, 39 and 40. The dendrite signal lines 161 to 165 transfer signals indicating the sums of the state signals joined with the synapse loads. Each of the synapse representing circuits 31 to 40 has first and second output parts. The dendrite signal line 161 transfers first output signals of the synapse representing circuits 31 to 34. The dendrite signal line 162 transfers a second output signal of the synapse representing circuit 31 and first output signals of the synapse representing circuits 35, 36 and 37. The dendrite signal line 163 transfers second output signals of the synapse representing circuits 32 and 35 and first output signals of the synapse representing circuits 38 and 39. The dendrite signal line 164 transfers second output signals of the synapse representing circuits 33, 36 and 38 and a first output signal of the synapse representing circuit 40. The dendrite signal line 165 transfers second output signals of the synapse representing circuits 34, 37, 39 and 40. Neuron functional units are provided in correspondence to the respective dendrite signal lines 161 to 165.

The nerve cell representing part 3 includes probability representing parts 21, 22, 23, 24 and 25 for providing stochastic state transitions of the neurons, and comparators 26 to 30. The comparators 26 to 30 are generally structured by operational amplifiers, for example, which compare annealing information generated from the probability representing parts 21 to 25 with load sum signals on corresponding dendrite signal lines and generate signals corresponding to ON or OFF states of the neurons on the basis of the results of comparison.

In order to simplify the chip layout, educator signal control circuits 11 to 15 are provided in parallel with the nerve cell representing part 3.

Each of the educator signal control circuits 11 to 15 defines the attribute of each neuron (input, output or hidden neuron) in response to a control signal received through a signal line 100, while selectively supplying educator data to the defined input/output neuron in accordance with the phase in learning. Outputs from the educator signal control circuits 11 to 15 are transferred through buffers B1 to B5 to bonding pads 56, 57, 58, 59 and 60 for connection with an external device. In a similar manner, the respective dendrite signal lines 161 to 165 are also connected to the respective bonding pads 61 to 65 so that the scale of the integrated semiconductor neural network can be easily extended.

Figure 12:
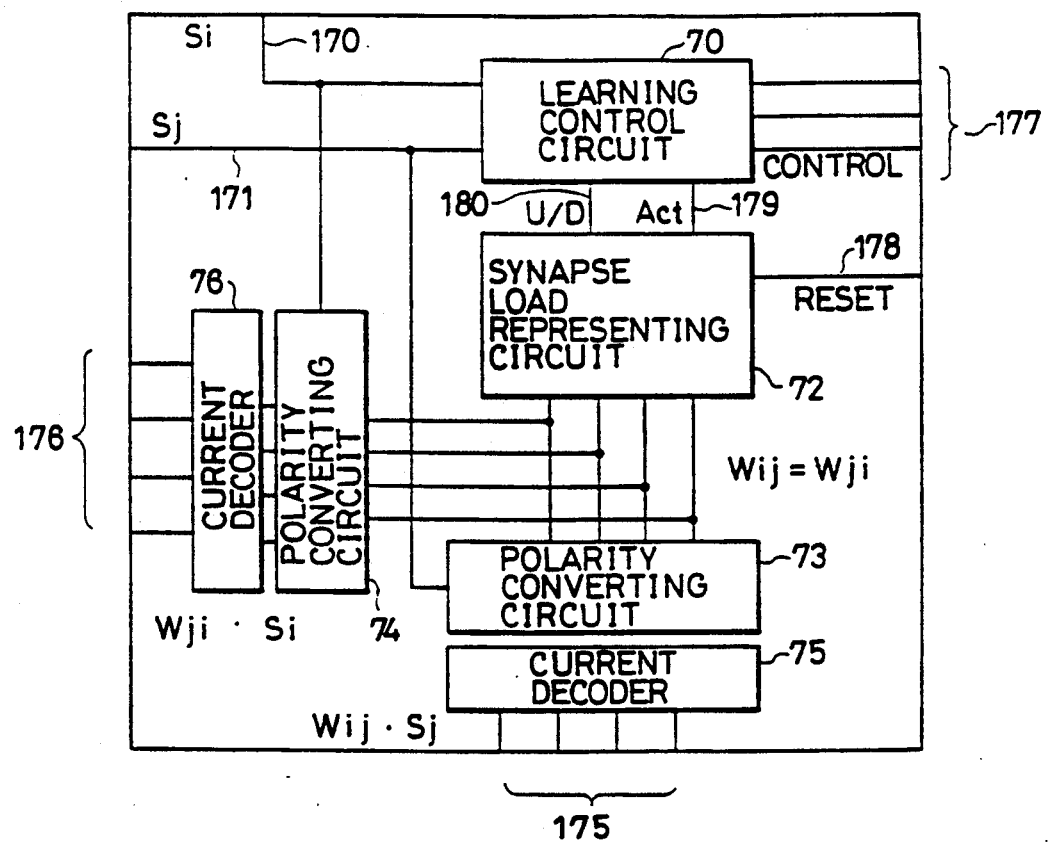
FIG. 12 illustrates the structure of a synapse representing circuit.

FIG. 12 shows a more specific structure of each synapse representing circuit. Referring to FIG. 12, the synapse representing circuit includes a learning control circuit 70 for controlling learning of the neural network, a synapse load representing circuit 72 representing the synapse load Wij (=Wji), polarity converting circuits 73 and 74 for loading with the synapse load from the synapse load representing circuit 72 the state signals Si and Sj and outputting the results, and current decoders 75 and 76 for converting the outputs Wij·Sj and Wji·Si from the polarity converting circuits 73 and 74 to current signals and outputting the same respectively.

In response to a control signal received from a control signal line 177, the learning control circuit 70 calculates variation $\Delta Wij$ of the synapse load in accordance with prescribed learning rules (described below) in response to the state signals Si and Sj on input lines 170 and 171.

The synapse load representing part 72 represents the learned synapse load Wij in response to a control signal received from the learning control signal circuit 70 through control signal lines 179 and 180. The signal line 180 transfers a signal indicating increase/decrease of the synapse load. The signal line 179 transfers a clock signal for activating the synapse load representing circuit 72. The synapse load of the synapse load representing circuit 72 is reset in response to a reset signal which is transferred through a signal line 178.

The polarity converting circuit 73 operates the product of the synapse load Wij from the synapse load representing circuit 72 and the state signal Sj transferred through the axon signal input line 171, and outputs the result. The polarity converting circuit 74 operates the product of the state signal Si from the axon signal input line 170 and the synapse load Wji from the synapse load representing circuit 72 and outputs the result. The current decoder 75 outputs a current signal indicating the product Wij·Sj to a corresponding dendrite signal line through a terminal 175. On the other hand, the current decoder 76 transfers current information indicating the product Wji·Si to a corresponding dendrite signal line through a terminal 176.

Thus, the synapse representing circuit shown in FIG. 12 simultaneously derives two product signals through the fact that the synapse load Wij is symmetrical in the Boltzmann machine model.

Figure 13:
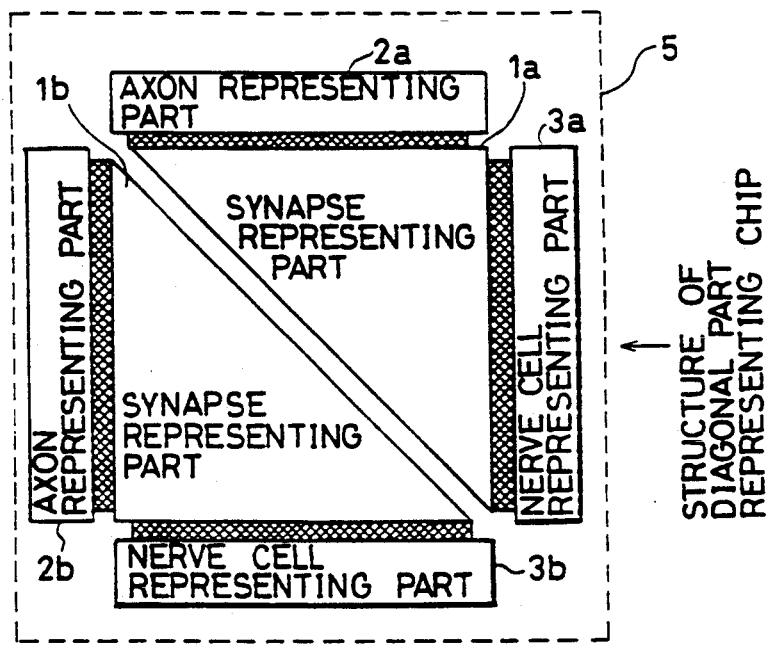
FIG. 13 illustrates another example of the chip layout of the integrated circuit device provided with a learning function according to the present invention, in relation to chip layout for representing a minor matrix of a diagonal part in a synapse load matrix.

When the synapse representing part 1 is arranged simply in the form of a right triangle as hereinabove described, the semiconductor chip 5 is inferior in utilization efficiency. In order to improve the chip utilization efficiency, two neural networks are arranged on the semiconductor chip 5 in such a manner that the right-triangular circuit part shown in FIG. 10 is symmetrically folded along the hypotenuse of the right triangle, as shown in FIG. 13. Thus, two neural networks are arranged on one semiconductor chip 5, thereby improving its working efficiency. In the structure shown in FIG. 13, an axon representing part 2a is located opposite to a nerve cell representing part 3b, while another axon representing part 2b is located opposite to another nerve cell representing part 3a.

Figure 14:
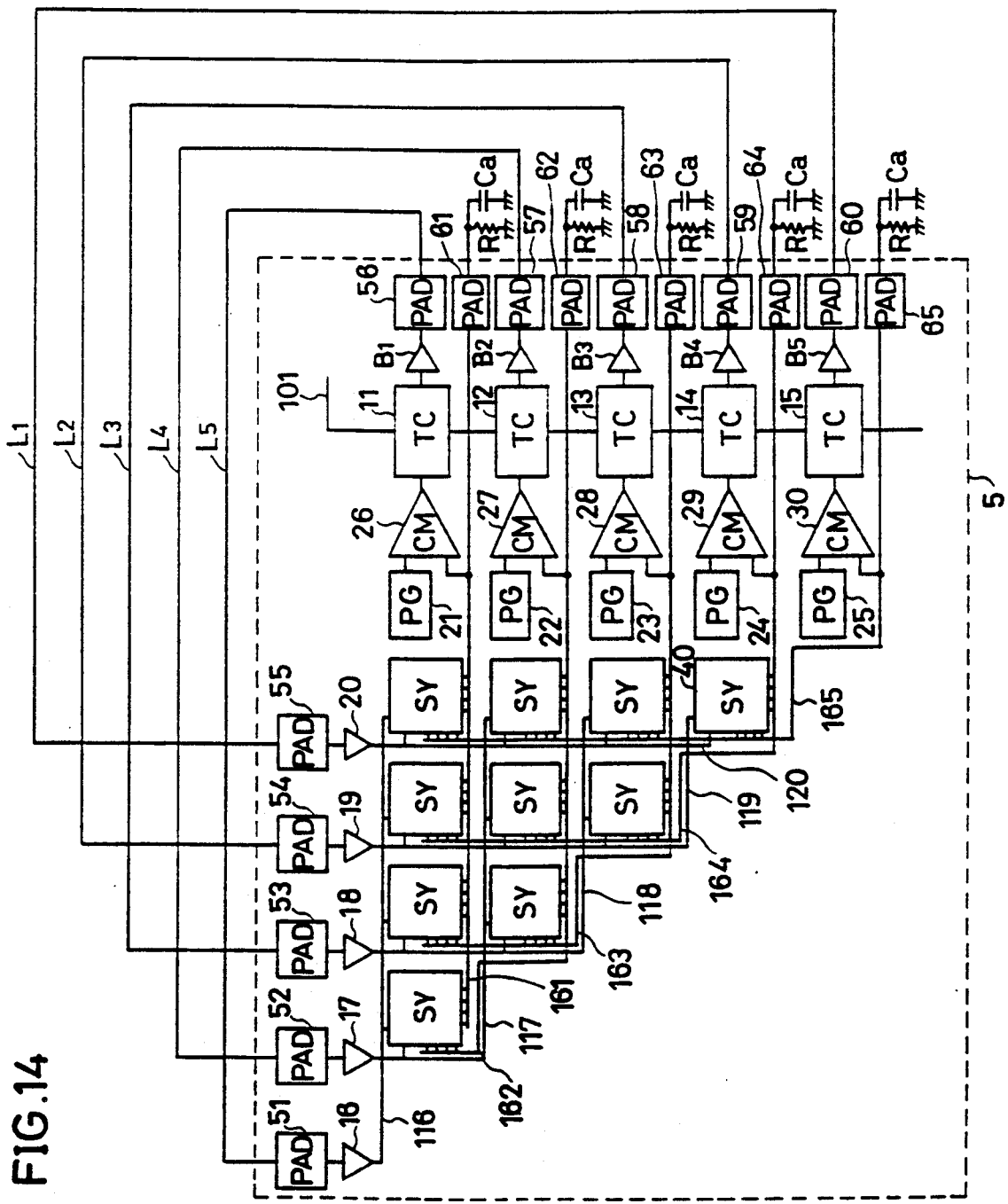
FIG. 14 illustrates an exemplary structure of a neural network according to the integrated circuit device shown in FIG. 11.

FIG. 14 illustrates exemplary connection of a neural network formed through the semiconductor integrated circuit devices arranged as shown in FIG. 13. Referring to FIG. 14, bonding pads 51 to 55 for transferring axon signals are connected through signal lines L1 to L5 to bonding pads 56 to 60 for transferring state signals from respective neurons. Each of the bonding pads 61 to 65 is connected with a resistor R for converting a load sum input current flowing on each of dendrite signal lines 161 to 165 to a voltage, and a capacitor Ca for adjusting the time constant of each of the dendrite signal lines 161 to 165. The structure shown in FIG. 14 implements a full connection neural network, which interconnects five neurons (comparators 26 to 30). The resistors R and the capacitors Ca, which are denoted by the same symbols for the bonding pads 61 to 65, are adjustable every pad, depending on characteristics of the dendrite signal lines 161 to 165 such as resistance, parasitic capacitance and the like.

Figure 16:
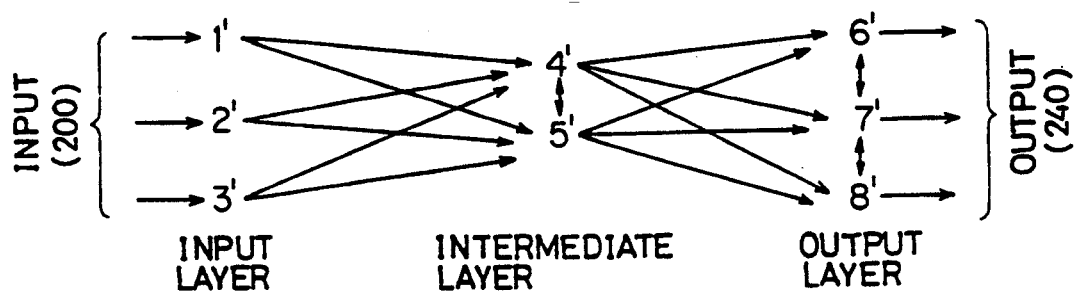
FIG. 16 schematically illustrates the structure of the neural network shown in FIG. 15.
Figure 15:
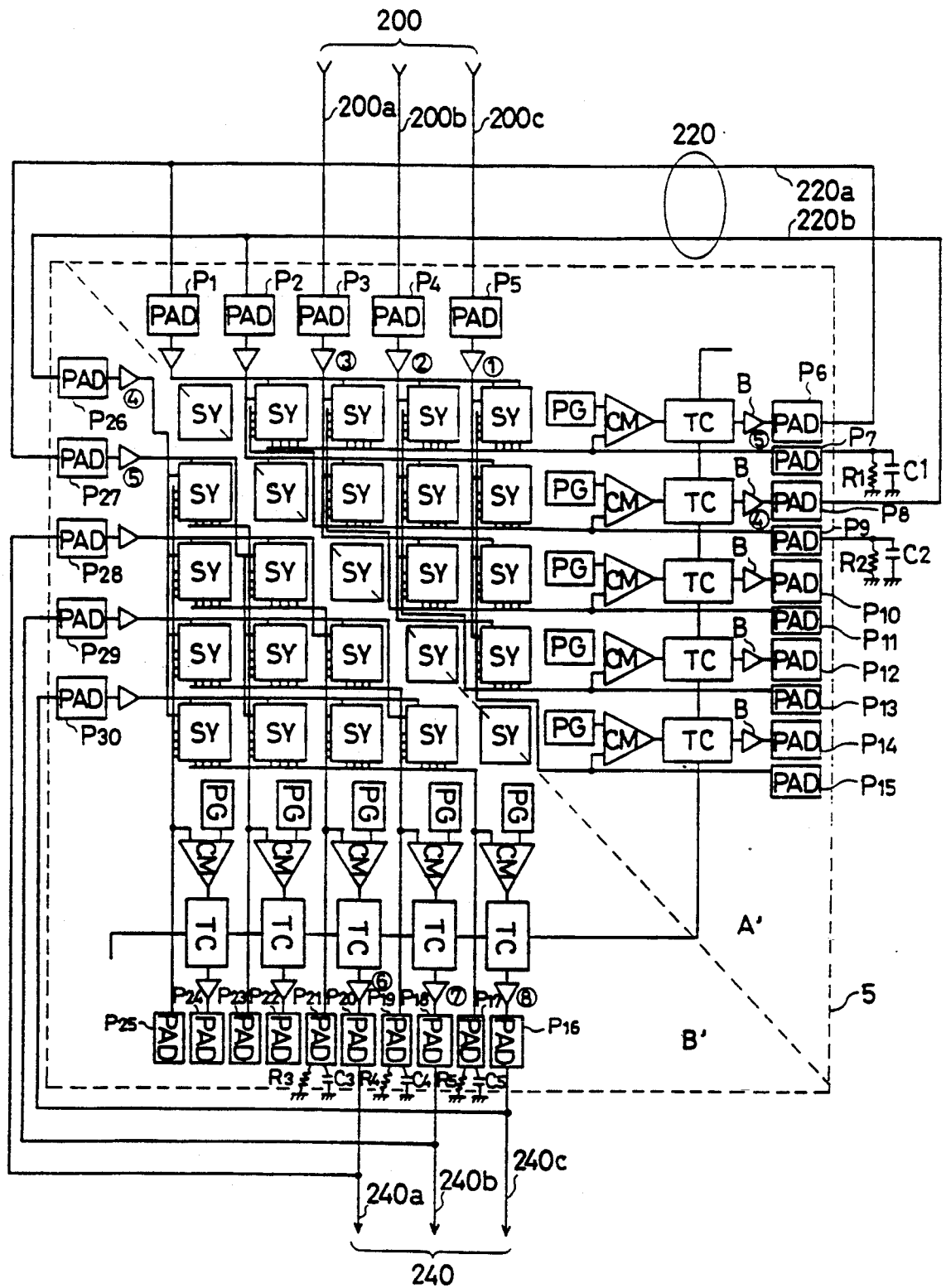
FIG. 15 illustrates a connection mode for forming a generalized perceptron through an integrated circuit device having the chip layout shown in FIG. 13.

FIG. 15 illustrates an exemplary structure of a hierarchical (generalized perceptron type) neural network which is built through the semiconductor integrated circuit devices shown in FIG. 13. Referring to FIG. 15, a semiconductor chip 5 includes regions A' and B'. Each of the regions A' and B' forms a neural network. Input data are transferred to bonding pads P3, P4 and P5 through signal lines 200a, 200b and 200c. Bonding pads P6 and P7 are connected to other bonding pads P1 and P2 as well as P27 and P26 through signal lines 220a and 220b respectively. Bonding pads P20, P18 and P16 are connected to other bonding pads P28, P29 and P30 through signal lines 240a, 240b and 240c respectively. Output data are derived from the bonding pads P16, P18 and P20 through the output signal lines 240. Each of the bonding pads P7, P9, P17, P19 and P21 are connected with a resistor R and a capacitor Ca. FIG. 16 illustrates the hierarchical structure of this hierarchical neural network, in which buffers 1', 2' and 3' derive signals transferred to an input layer and the signal lines 220 indicate signal lines of an intermediate layer (hidden layer), while the signal lines 240 indicate data output lines from an output layer. Referring to FIG. 15, therefore, 1', 2' and 3' denote input layer neurons, 4' and 5' denote neurons of the hidden layer, and 6', 7' and 8' denote neurons of the output layer. This structure is capable of carrying out such Hebb's learning rule that the connection strength is increased when both of states Sj and Si of coupled neurons are "1".

Referring again to FIG. 15, SY denotes synapse representing circuits, PG denotes probability representing circuits, CM denotes comparators, TC denotes educator signal control circuits, and B denotes buffers. The respective signal lines (dendrite signal lines and axon signal lines) in the regions A' and B' are connected with the synapse representing circuits SY similarly to FIG. 11.

In the aforementioned structure, the neural network is formed simply through a single semiconductor chip. However, it is possible to further extend the synapse loads by utilizing integrated circuit devices having the inventive arrangement.

Figure 17:
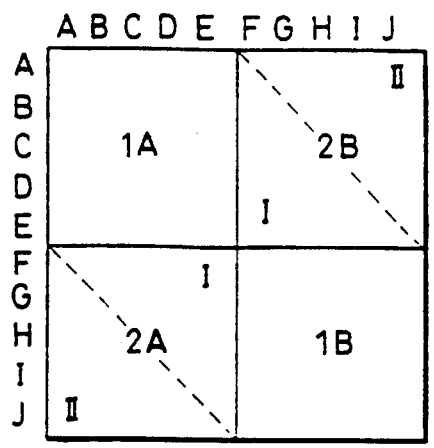
FIG. 17 illustrates the structure of an extended synapse load matrix.

If the scale of the neural network is simply extended, the following problem arises: Consider a neural network having 10 neurons, in which synapse loads form a 10 by 10 matrix, as shown in FIG. 17. In this case, the synapse load matrix comprises four minor matrix regions 1A, 1B, 2A and 2B, each having a 5 by 5 synapse load matrix. The minor matrix regions 1A and 1B in the synapse load matrix form symmetrical matrices. Therefore, the minor matrix regions 1A and 1B can be represented through a single semiconductor chip having the arrangement shown in FIG. 13.

However, although the minor matrices 2A and 2B are symmetrical to each other, the minor matrices 2A and 2B themselves are not symmetrical matrices. Therefore, it is impossible to represent the minor matrices 2A and 2B through a single semiconductor chip having the arrangement/structure shown in FIG. 13. Thus, it is necessary to separately prepare a semiconductor neural network chip having arrangement/structure for representing non-diagonal parts (minor matrices 2A and 2B) in this synapse load matrix.

Figure 18:
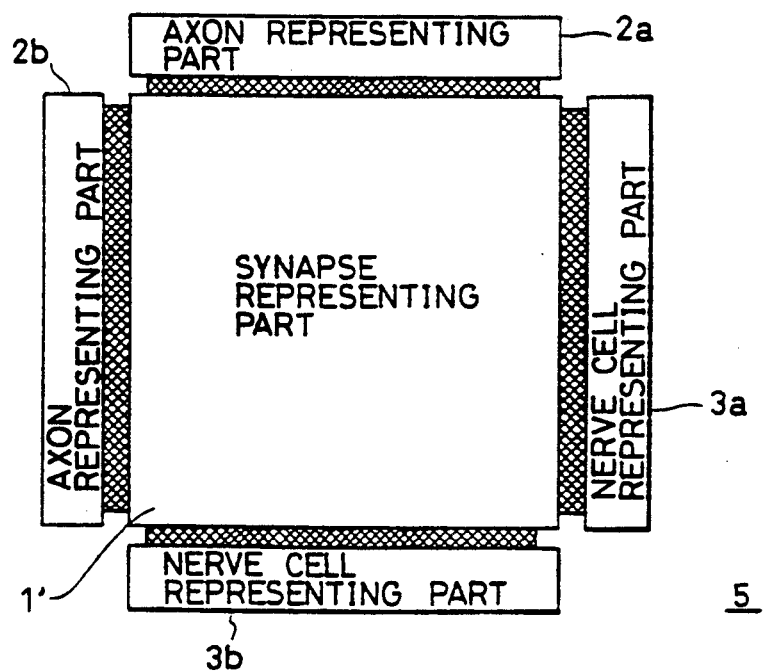
FIG. 18 illustrates the chip layout of an integrated circuit device provided with a learning function according to another embodiment of the present invention, in relation to chip layout for representing a minor matrix of a non-diagonal part in the synapse load matrix shown in FIG. 17.
Figure 19:
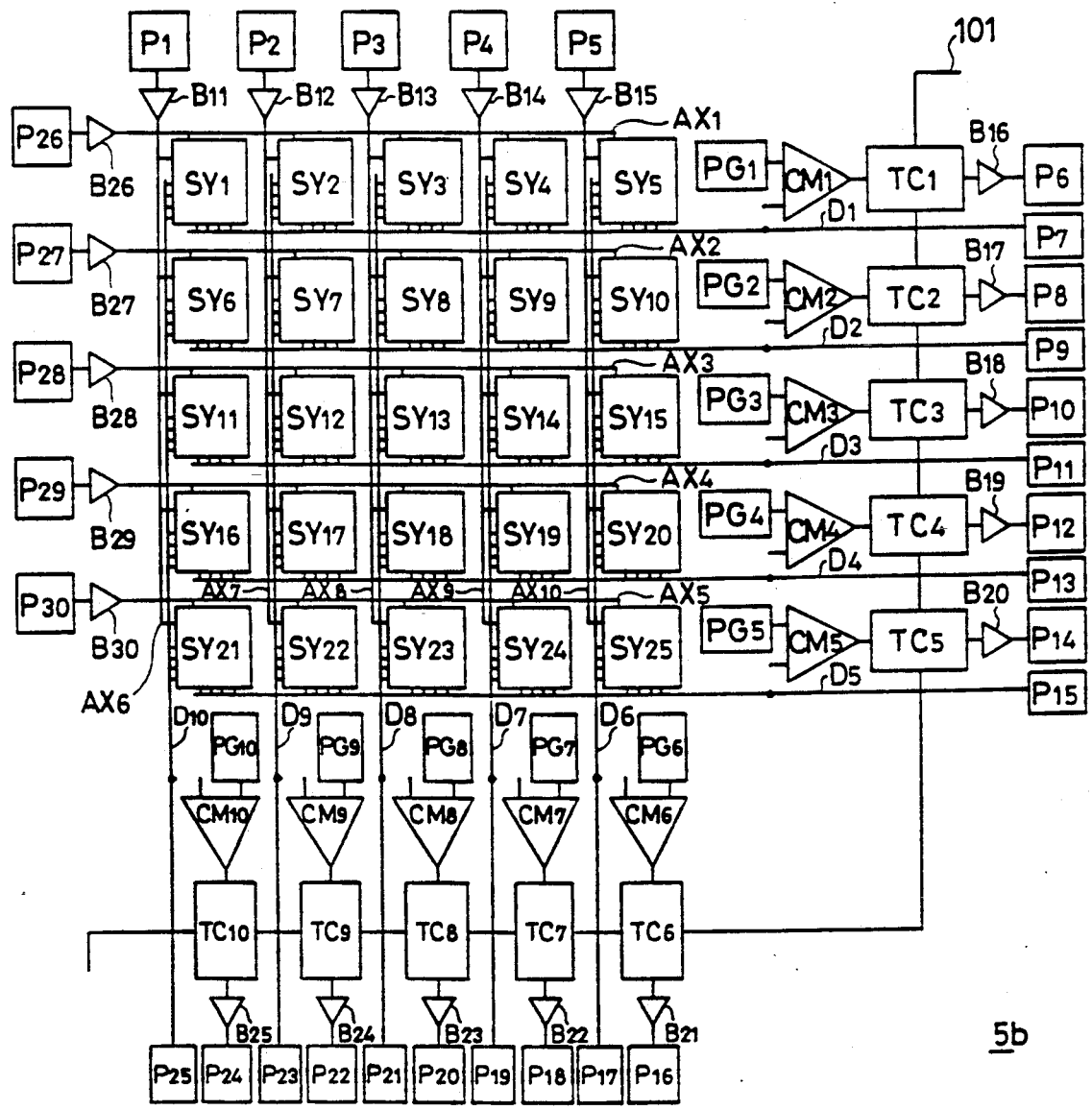
FIG. 19 illustrates the structure of the chip layout shown in FIG. 18 in more detail.

FIG. 18 schematically illustrates layout/structure for representing a synapse load matrix of such a non-diagonal part. Referring to FIG. 18, an integrated circuit device having the layout/structure for representing the non-diagonal part ("part" means a minor matrix) has axon representing parts 2a and 2b and nerve cell representing parts 3a and 3b, similarly to the layout shown in FIG. 13. However, a synapse representing part 1' is not formed by two minor regions which are arranged in the form of right triangles, but has a single region, which is substantially formed by combining two right triangles with a common hypotenuse. FIG. 19 illustrates a specific structure of the synapse representing part 1'. Referring to FIG. 19, the synapse representing part 1' includes 25 synapse representing circuits SY1 to SY25 which are arrayed in rows and columns. Bonding pads P1 to P5 for connection with the exterior of the device transfer axon signals onto axon signal lines AX6 to AX10 through axon signal line drivers B11 to B15. Dissimilarly to the structure of FIG. 13, all of the axon signal lines AX6 to AX10 are arranged along the column direction. The axon signal line AX6 transfers a state signal to the synapse representing circuits SY1, SY6, SY1, SY16 and SY21. Similarly, the axon signal lines AX7, AX8, AX9 and AX10 transfer axon signals (state signals) to the synapse representing circuits which are arranged along the column direction respectively. Bonding pads P26 to P30 transfer state signals onto axon signal lines AX1 to AX5 through axon signal line drivers B26 to B30. The axon signal lines AX1 to AX5, which are arranged along the row direction, transfer axon signals to the synapse representing circuits which are arranged along the row direction. For example, the axon signal line AX1 transfers an axon signal to the synapse representing circuits SY1, SY2, SY3, SY4 and SY5.

Dendrite signal lines are arrayed along the row and column directions for transferring synapse load sum signals from the synapse representing circuits SY. For example, a dendrite signal line D1 transfers synapse load sum signals from the synapse representing circuits SY1 to SY5. Similarly, dendrite signal lines D2, D3, D4 and D5 transfer synapse load sum signals from the synapse representing circuits which are arranged along the row direction respectively. Dendrite signal lines D6 to D10, which are arranged along the column direction, transfer synapse load sum signals from the synapse representing circuits which are arranged along the column direction respectively. For example, the dendrite signal line D10 transfers synapse load sum signals from the synapse representing circuits SY1, SY6, SY11, SY16 and SY21, which are arranged along the column direction. The dendrite signal lines D1 to D5 are connected to bonding pads P7, P9, P11, P13 and P15 respectively. The dendrite signal lines D6 to D10 are connected to bonding pads P17, P19, P21, P23 and P25 respectively. In the synapse representing part forming the non-diagonal part, it is not necessary to transfer outputs from comparators forming neurons. In this case, therefore, the bonding pads P6, P8, P10, P12, P14, P16, P18, P20, P22 and P24 for transferring the outputs from comparators (corresponding to neurons) are not employed in the chip connection structure shown in FIG. 17, and it is not necessary to provide these bonding pads in particular. When the connection structure shown in FIG. 19 is provided, the synapse representing part differs from the diagonal part shown in FIG. 13 such that respective ones of state signals, such as A to E, for example, supplied onto the bonding pads P1 to P5 are transferred in this order onto the bonding pads P25 to P16. Each synapse representing circuit SY, the specific structure of which is shown in FIG. 12, receives a state signal Si from an upper side in the figure and joins a corresponding synapse load Wji to the signal to output the result from the left side in the figure. When a state signal Sj is applied from the left side in the figure, the synapse representing circuit SY similarly outputs a signal Wij·Sj from the bottom side in the figure. When a state signal for a neuron unit A is supplied to the pad P1, therefore, a synapse load sum signal for the neuron unit A is supplied onto the dendrite signal line D10 which is connected to the pad P25. This relation also applies to connection relations of other pads, such that the pad P7 receives a synapse load sum signal for a neuron unit corresponding to a state signal supplied to the pad P26 in FIG. 19, for example. As shown in FIG. 19, it is not necessary to process the threshold value of each neuron in the non-diagonal part. Therefore, the comparators CM1 to CM10 forming neurons are not connected with the dendrite signal lines D1 to D10.

Figure 20:
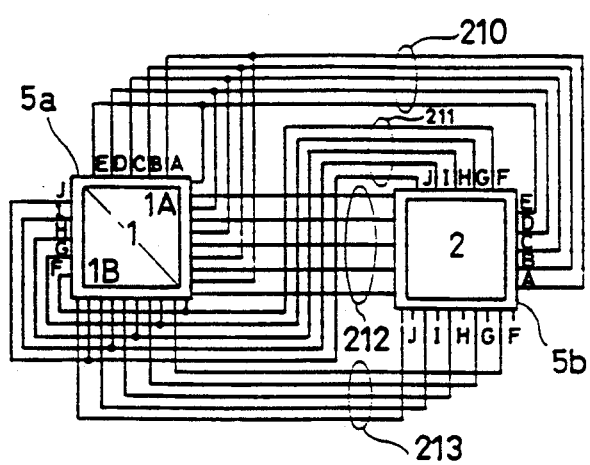
FIG. 20 illustrates a chip connection mode for implementing the synapse load matrix shown in FIG. 17.

In the neural network chip forming a diagonal part, on the other hand, the bonding pad 61 receives a synapse load sum signal for a neuron unit corresponding to a state signal (neuron output) supplied to the bonding pad 51, as shown in FIG. 11. FIG. 20 illustrates a connection arrangement in interconnecting a chip 5a forming the aforementioned diagonal part with a semiconductor chip 5b representing synapse loads of a non-diagonal part for providing the synapse load matrix shown in FIG. 17.

Referring to FIG. 20, the semiconductor integrated circuit chips 5a and 5b for implementing an extended neural network are interconnected through signal lines 210, 211, 212 and 213. The semiconductor chip 5a represents the synapse loads of the minor matrix regions 1A and 1B shown in FIG. 17, while the semiconductor chip 5b represents the synapse loads of the minor matrix regions 2A and 2B shown in FIG. 17. Symbols A to J in FIG. 20 correspond to the alphabetic symbols along the rows and columns in the synapse load matrix shown in FIG. 17. Neurons for this synapse load matrix are denoted by A to J respectively. The signal lines 210 connect axon signal representing parts corresponding to the neurons A, B, C, D and E. The signal lines 211 connect axon signal lines of the neuron units F, G, H, I and J. The signal lines 212 interconnect dendrite signal lines for the neuron units A, B, C, D and E. The signal lines 213 connect dendrite signal lines corresponding to the neuron units F, G, H, I and J. Through such connection structure shown in FIG. 20, it is possible to form a full connection neural network whose scale is doubled as compared with a neural network which can be represented by a single semiconductor integrated circuit chip.

Figure 21A:
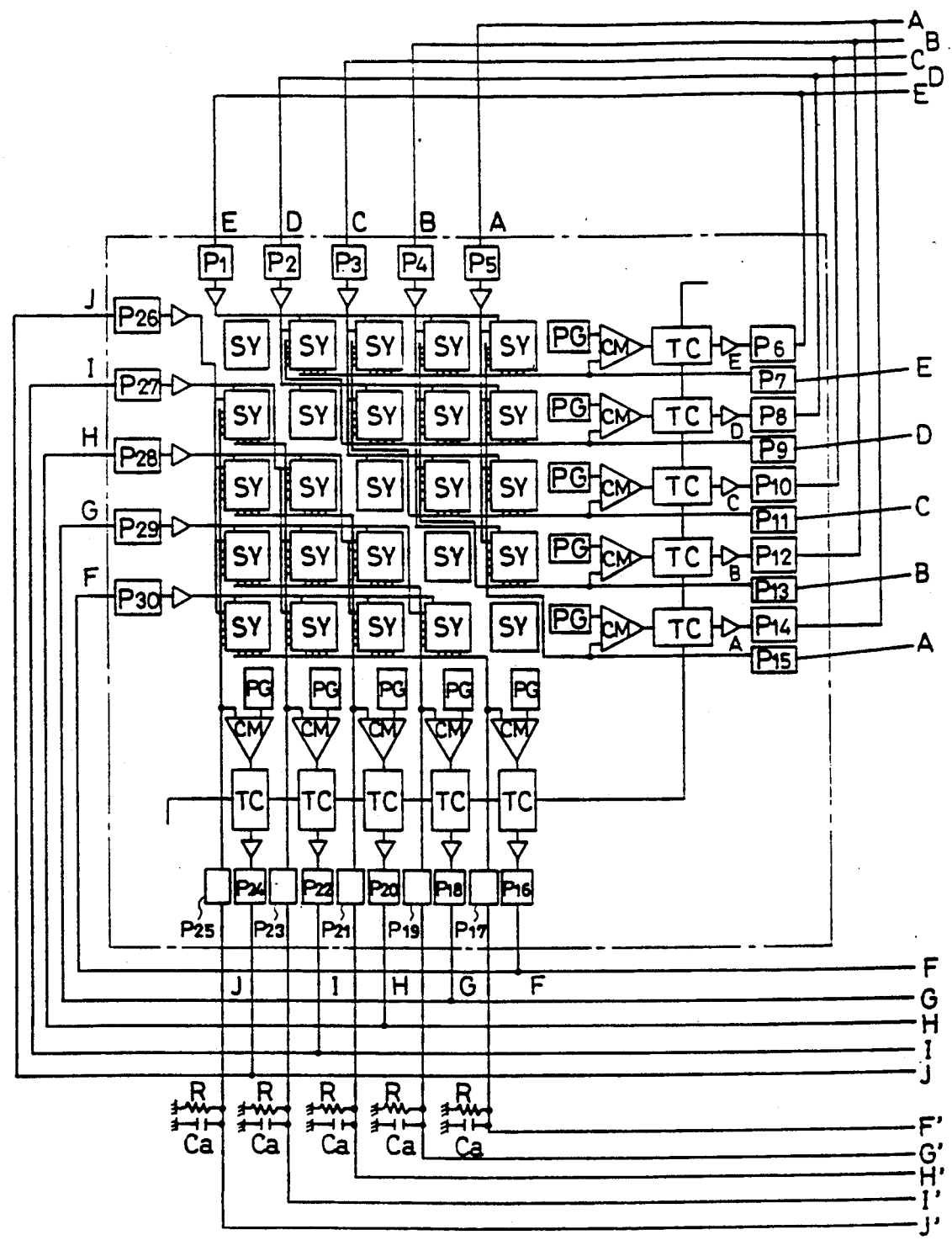
FIGS. 21A and 21B illustrate the chip connection shown in FIG. 20 in more detail.
Figure 21B:
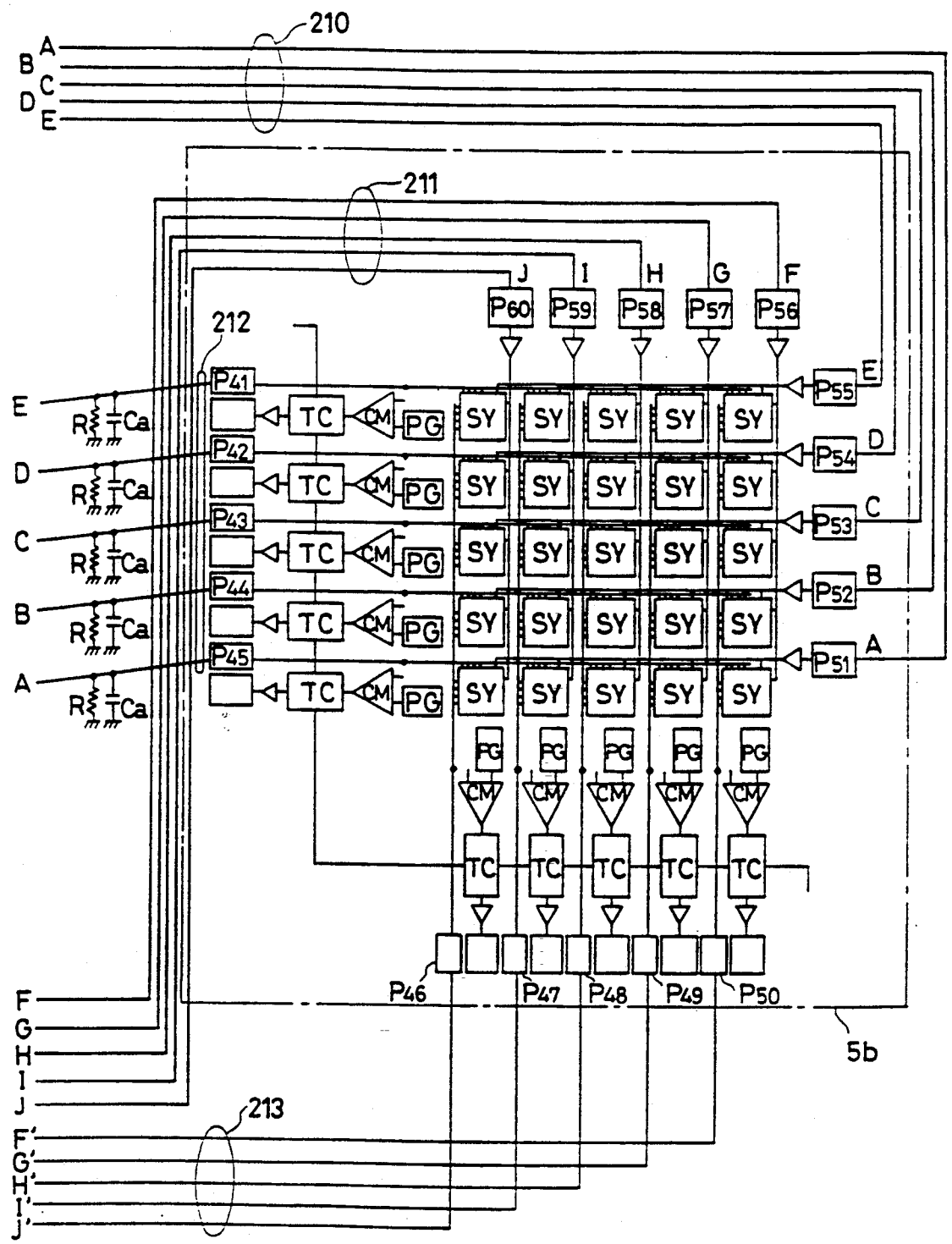

FIGS. 21A and 21B illustrate a more concrete structure of the chip connection shown in FIG. 20. Referring to FIGS. 21A and 21B, pads P1 to P5 of the semiconductor chip 5a are connected to pads P6, P8, P10, P12 and P14 respectively. Similarly, the pads P6, P8, P10, P12 and P14 are connected to bonding pads P55, P54, P53, P52 and P51 of the semiconductor chip 5b. The signal lines 210 provide paths for transferring axon signals for the neuron units A, B, C, D and E. Similarly, bonding pads P7, P9, P11, P13 and P15 are connected to bonding pads P41, P42, P43, P44 and P45 respectively through the signal lines 212. The signal lines 212 provide extended paths for dendrite signal lines. The five signal lines 212 are provided with resistors R and capacitors Ca for converting current signals on the dendrite signal lines to voltage signals and adjusting the time constants of the dendrite signal lines respectively. The resistors R and the capacitors Ca may have the same values over the signal lines, or the value thereof may be varied with the signal lines. In order to simplify the illustration, the resistors and the capacitors are simply denoted by R and Ca in these figures.

In order to provide connection/extension paths for the neurons F to J, bonding pads P26, P27, P28, P29 and P30 are connected to bonding pads P60, P59, P58, P57 and P56 through the signal lines 211. Pads P16, P18, P20, P22 and P24 are interconnected through the signal lines 211 respectively in order to transfer state signals of the neurons F to J. Thus, the pads P16, P18, P20, P22 and P24 are connected to the bonding pads P30, P29, P28, P27 and P26 respectively. In order to extend dendrite signal lines for the respective neuron units F to J, bonding pads P17, P19, P21, P23 and P25 are connected to bonding pads P50, P49, P48, P47 and P46 through the signal lines 213 respectively. The signal lines 213 for extending the dendrite signal lines are also provided with resistors R for converting current signals on the dendrite signal lines to voltage values and capacitors Ca for adjusting the time constants of the dendrite signal lines. The capacitors Ca and the resistors R are connected in the exterior of the semiconductor chips 5a and 5b respectively, so that optimum resistance and capacitance values can be easily set in response to the scale of the neural network.

According to the above structure, it is possible to easily form a full connection neural network, the scale of which is doubled as compared with a neural network formed by a single semiconductor chip.

Figure 22:
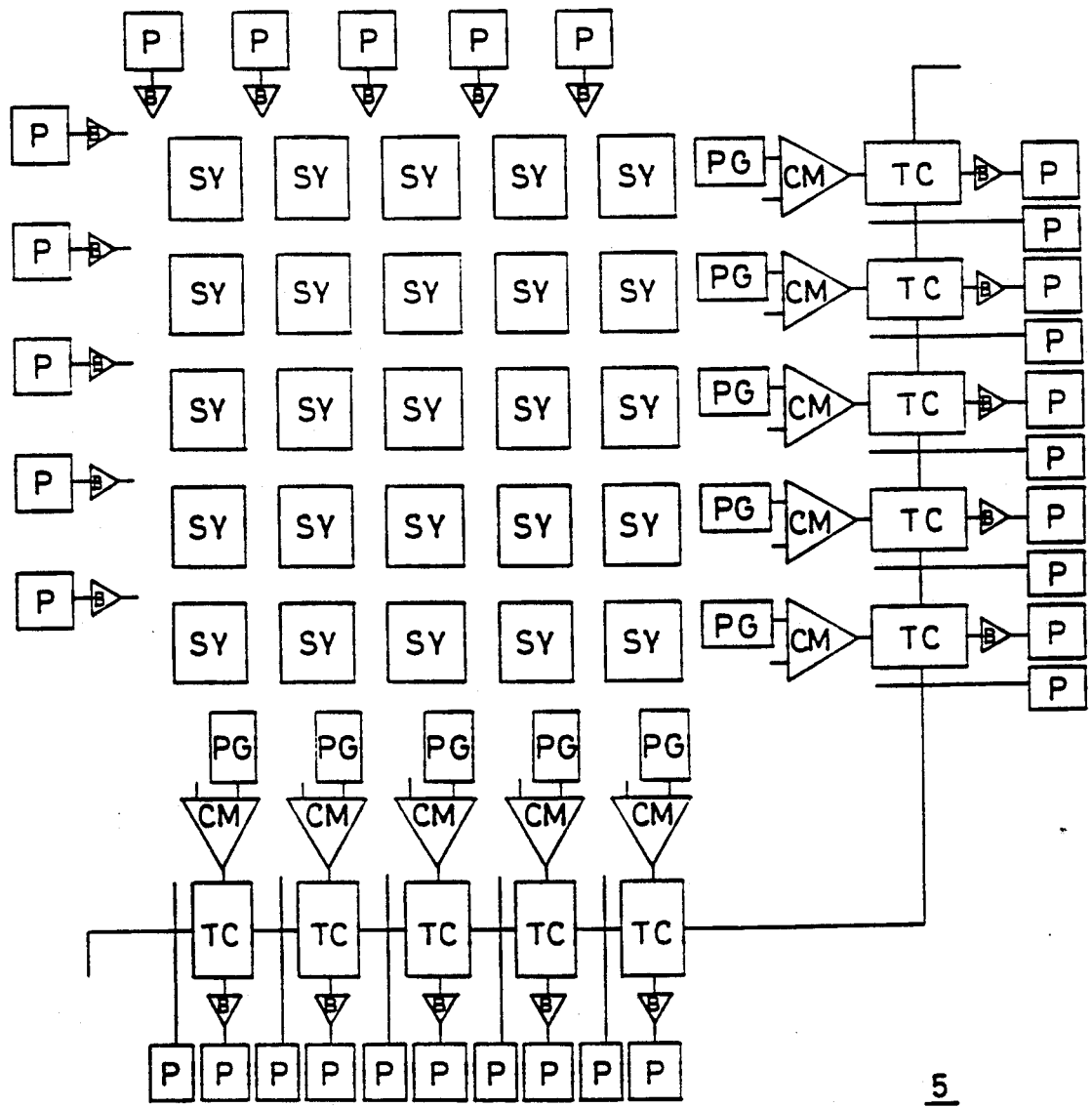
FIG. 22 illustrates master structure chip layout for separately forming a chip for representing a diagonal part and that for representing a non-diagonal part in a master slice structure.
Figure 23:
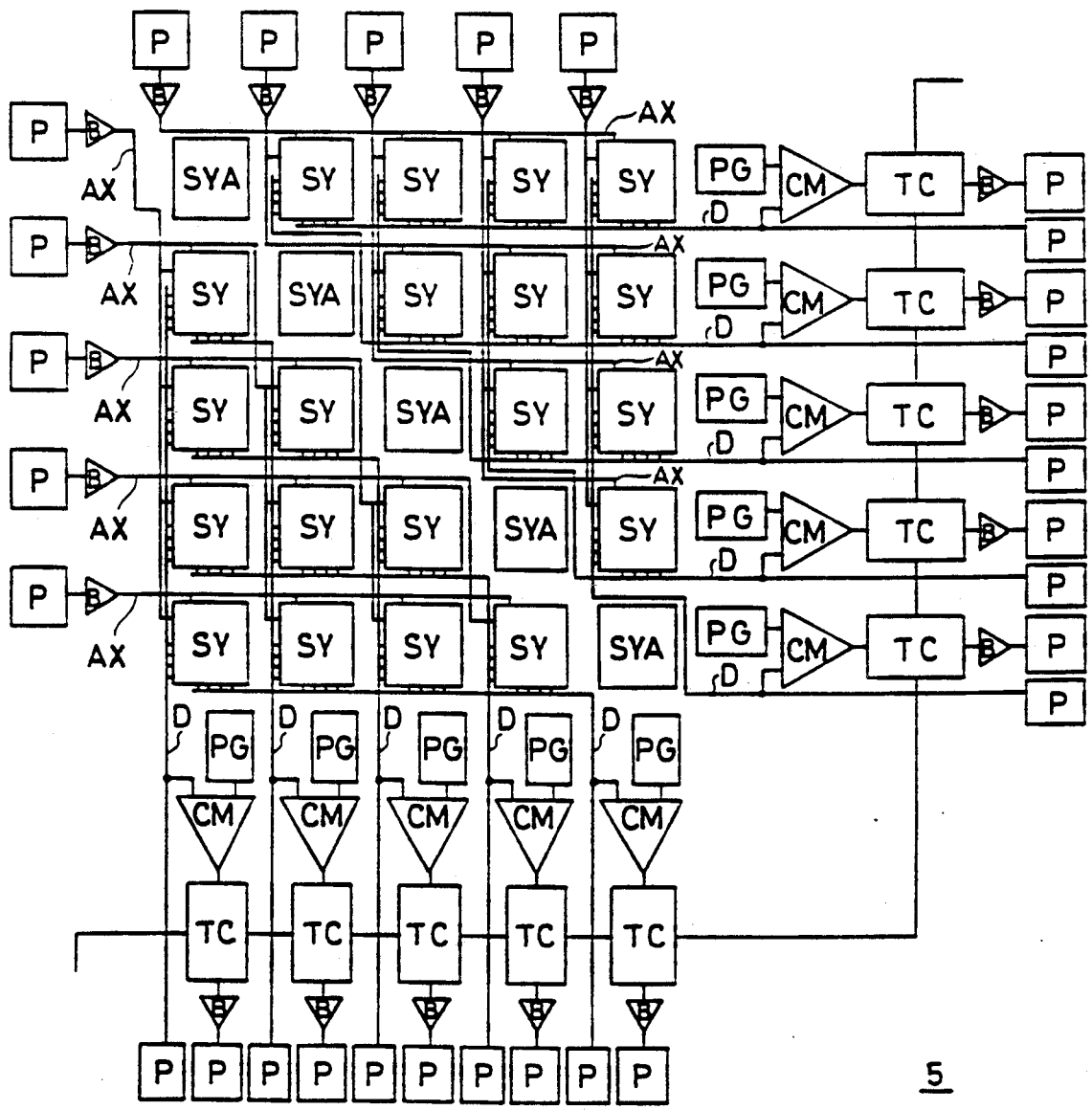
FIG. 23 concretely illustrates the layout of a chip for representing a diagonal part, which is customized in a slice step.

A method of forming a chip for representing synapse loads of a diagonal part and a semiconductor chip for representing synapse loads of a non-diagonal part is now described. The semiconductor chip for representing the diagonal part is merely different in wiring/connection of internal synapse representing circuits from the semiconductor chip for representing the non-diagonal part, while the chips are identical in structure of internal circuit elements to each other. As shown in FIG. 22, therefore, pads P around the chips, a matrix of synapse representing circuits SY, probability representing parts PG around the synapse representing part, comparators CM, educator signal control circuits TC and buffers B are arranged as described above in the master structure, thereby forming a common part of the semiconductor chips for the diagonal and non-diagonal parts. In this master chip, all circuit elements are formed except for axon signal lines and dendrite signal lines. The synapse representing circuits SY are arrayed in the matrix, and axon representing parts and nerve cell representing parts are arranged along the respective sides of the synapse representing circuits SY. In order to obtain the semiconductor chip for representing the synapse loads of the diagonal part, axon signal lines and dendrite signal lines may simply be formed in prescribed geometrical layout (see FIG. 11). As shown in FIG. 23, axon signal lines AX and dendrite signal lines D are stepwisely and symmetrically arranged so that the semiconductor chip represents two diagonal parts, thereby obtaining a desired semiconductor neural network integrated circuit device. In the part representing the diagonal part, there is no need to use synapse representing circuits SYA of diagonal elements, which are not connected with the axon signal lines AX and the dendrite signal lines D. Other connection paths are identical in structure to those shown in FIGS. 14 and 15, whereby it is possible to easily obtain the semiconductor chip for representing the diagonal part through application of a slice step.

In order to obtain the semiconductor chip for representing the non-diagonal part, on the other hand, the axon signal lines AX and the dendrite signal lines D are arranged along the row and column directions respectively for the semiconductor chip of the master structure shown in FIG. 22, thereby obtaining a neural network chip having the connection structure shown in FIG. 19. In this case, the synapse representing circuits SYA of diagonal elements are also connected with the axon signal lines AX and the dendrite signal lines D respectively, dissimilarly to the semiconductor chip for representing the diagonal part shown in FIG. 23.

In the semiconductor chip for representing the non-diagonal part, there is no need to transfer outputs from the comparators forming neurons to other chips, but only outputs from the dendrite signal lines may be transferred to other chips. Therefore, it is not necessary to provide the pads P6, P8, P10, P12, P14, P16, P18, P20, P22 and P24 shown in FIG. 19 in the master step, but only those for representing the diagonal part may be simply provided in the slice step.

Figure 24:
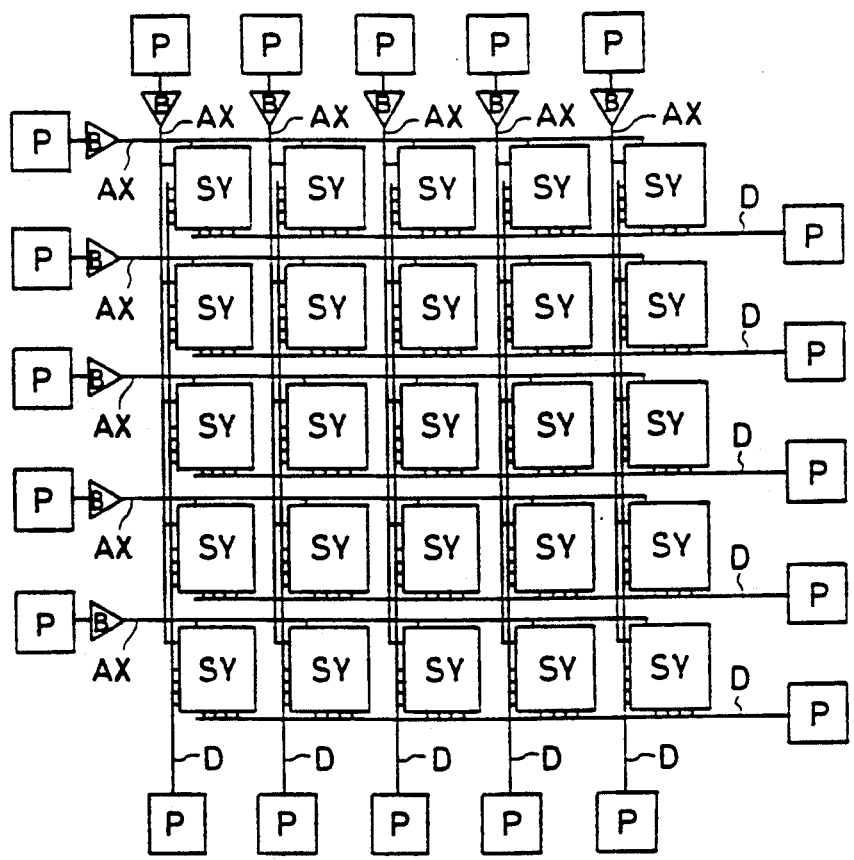
FIG. 24 illustrates the layout of a dedicated chip for representing a non-diagonal part in a synapse load matrix.

Further, the chip for representing the non-diagonal part requires no comparators forming neuron units, probability representing parts and educator signal control circuits TC. In other words, the semiconductor chip representing the non-diagonal part may simply derive signals representing synapse load sums. Therefore, it is not necessary to employ the master slice system but a semiconductor chip for dedicatedly representing a non-diagonal part may be formed as shown in FIG. 24, for example. Referring to FIG. 24, the semiconductor chip dedicated for representation of a non-diagonal part comprises synapse representing circuits SY, which are arrayed in rows and columns, and pads P and buffers B, which are arranged along the periphery of the matrix of the synapse representing circuits SY. The buffers B are provided for only axon signal lines AX. In other words, the semiconductor chip for representing the non-diagonal part is provided with only drivers for driving the axon signal lines AX. The axon signal lines AX and dendrite signal lines D are straightly arranged along the row and column directions respectively. In such a semiconductor chip for representing synapse loads of the non-diagonal part, there is no need to provide probability representing parts, comparators and educator signal control circuits forming a neuron nerve cell representing part. Thus, it is possible to obtain a semiconductor chip for representing a non-diagonal part, which has a higher degree of integration.

Figures 25A, 25B:
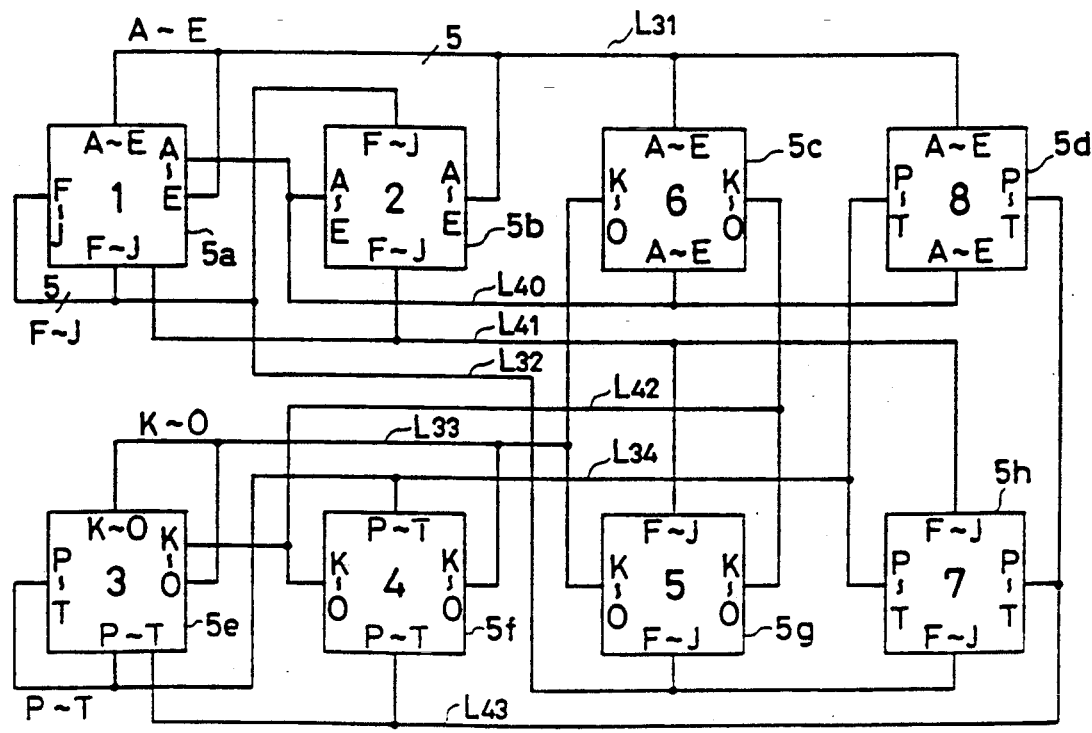
FIGS. 25A and 25B illustrate an extended synapse load matrix for forming a large-scale neural network through chips for representing non-diagonal and diagonal parts and chip connection representing the extended synapse load matrix.

The above embodiment has been described with reference to chip connection for representing full connection of 10 neurons through two chips. However, the inventive structure is easily extensible to a larger neural network scale. Consider a full connection neural network of 20 neurons, which has a 20 by 20 synapse load matrix, as shown in FIG. 25A. Referring to FIG. 25A, minor matrix regions denoted by the same reference numerals, which are symmetrical with respect to the diagonal lines of the synapse load matrix, can be represented by the same semiconductor chips. Namely, the minor matrix regions 1 and 3 shown in FIG. 25A can be formed by semiconductor chips for representing diagonal parts (see FIG. 23) respectively, while the remaining minor matrix regions denoted by the same reference numerals can be represented by single semiconductor chips for representing non-diagonal parts shown in FIGS. 19 and 24, respectively. Therefore, the neural network forming the full connection of the 20 by 20 synapse load matrix shown in FIG. 25A can be formed by eight semiconductor chips in total. FIG. 25B shows the chip connection structure. Referring to FIG. 25B, the minor matrix regions 1 and 3 are formed by semiconductor chips 5a and 5e. A semiconductor chip 5b represents the minor matrix regions 2 and a semiconductor chip 5c represents the minor matrix regions 6, while a semiconductor chip 5d represents the minor matrix regions 8. Similarly, semiconductor chips 5f, 5g and 5h represent the minor matrix regions 4, 5 and 6 respectively. Each chip forms two minor matrix regions. Assuming that symbols A to T denote neurons in the neural network, axon signals of the neurons A to E are transferred through a signal line L31. The signal line L31 interconnects the axon signal lines of the semiconductor chips 5a, 5b, 5c and 5d. The axon signals of the neurons F to J are transferred through interconnection by a signal line L32. The signal line L32 interconnects the axon signal lines of the semiconductor chips 5a, 5b, 5g and 5h. The axon signals of the neurons K to O are transferred through a signal line L33. The signal line L33 interconnects corresponding axon signal lines of the semiconductor chips 5e, 5f, 5g and 5c. Axon signals of the neurons P to T are transferred through a signal line L34. The signal line L34 interconnects the semiconductor chips 5e, 5f, 5d and 5h. Signal lines L40, L41, L42 and L43 for transferring dendrite signals are provided in order to extend the scale of the neural network. The dendrite signal transfer line L40 connects dendrite signal lines of the semiconductor chips 5a, 5b, 5c and 5d. This signal line L40 transfers corresponding dendrite signals to the respective ones of the neurons A to E. The signal line L41 connects dendrite signal lines of the semiconductor chips 5a, 5b, 5g and 5h. This signal line L41 transfers dendrite signals for the neurons F to J respectively. The signal line L42 interconnects dendrite signal lines of the semiconductor chips 5e, 5f, 5g and 5c. This signal line L42 transfers dendrite signals for the neurons K to O. The signal line L43 interconnects dendrite signal lines of the semiconductor chips 5e, 5f, 5h and 5d. This signal line L43 transfers dendrite signals for the neurons P to T. In order to simplify the illustration, FIG. 25B does not show resistors for converting current signals on the dendrite signal lines to voltage and capacitors for adjusting the time constants of the dendrite signal lines, which are provided in actual circuit connection. Each of the signal lines L31 to L34 and L40 to L43 transfers five state signals, since five neurons are formed in each chip.

Figure 26:
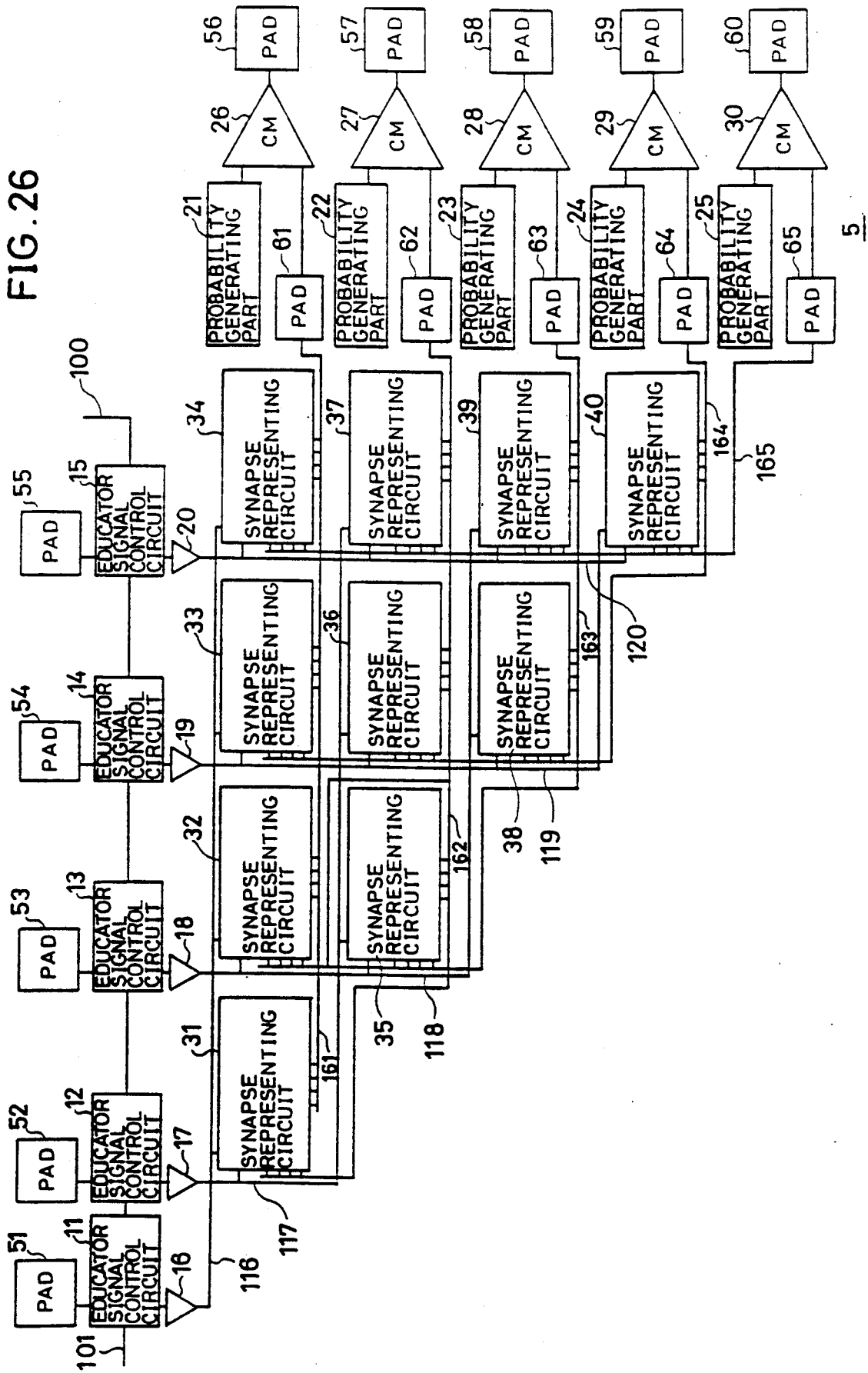
FIG. 26 illustrates the chip layout of an integrated circuit device provided with a learning function according to still another embodiment of the present invention.

In the layout of the semiconductor chip(s) of the aforementioned embodiment, the educator signal control circuits TC are arranged between the comparators CM and the bonding pads P. However, such educator signal control circuits may alternatively be arranged between pads P for inputting axon signals and buffers B for driving the axon signals as shown in FIG. 26, in order to obtain a semiconductor neural network chip which is suitable for high integration. In the structure shown in FIG. 26, educator signal control circuits 11 to 15 are arranged between pads 51 to 55 and axon signal drivers 16 to 20. An effect similar to that of the above embodiment can also be attained by this structure.

According to the inventive semiconductor neural network as described above, the synapse representing part is provided in the form of a right triangle and an axon control part and a nerve cell representing part are arranged along two sides of the triangle communicating with the right-angled part while axon signal input lines, dendrite signal lines and nerve cell output lines are connected with pads for connection with the exterior of the device. Therefore, it is possible to easily process functions in respective neural networks in parallel to implement a high-speed operation and to represent a desired neural network structure by free connection in the exterior of the device, i.e., by a desired interconnection of pads in the single chip, while the neural network is readily extensible to easily form a large-scale neural network by extendedly connecting a plurality of such neural networks. Thus, a Boltzmann machine having a practical scale can be implemented with a practical operating speed in a small space at a low cost.

The structure and operation of each circuit for implementing the integrated circuit device for high integration and extended arrangement are now described.

Figure 27:
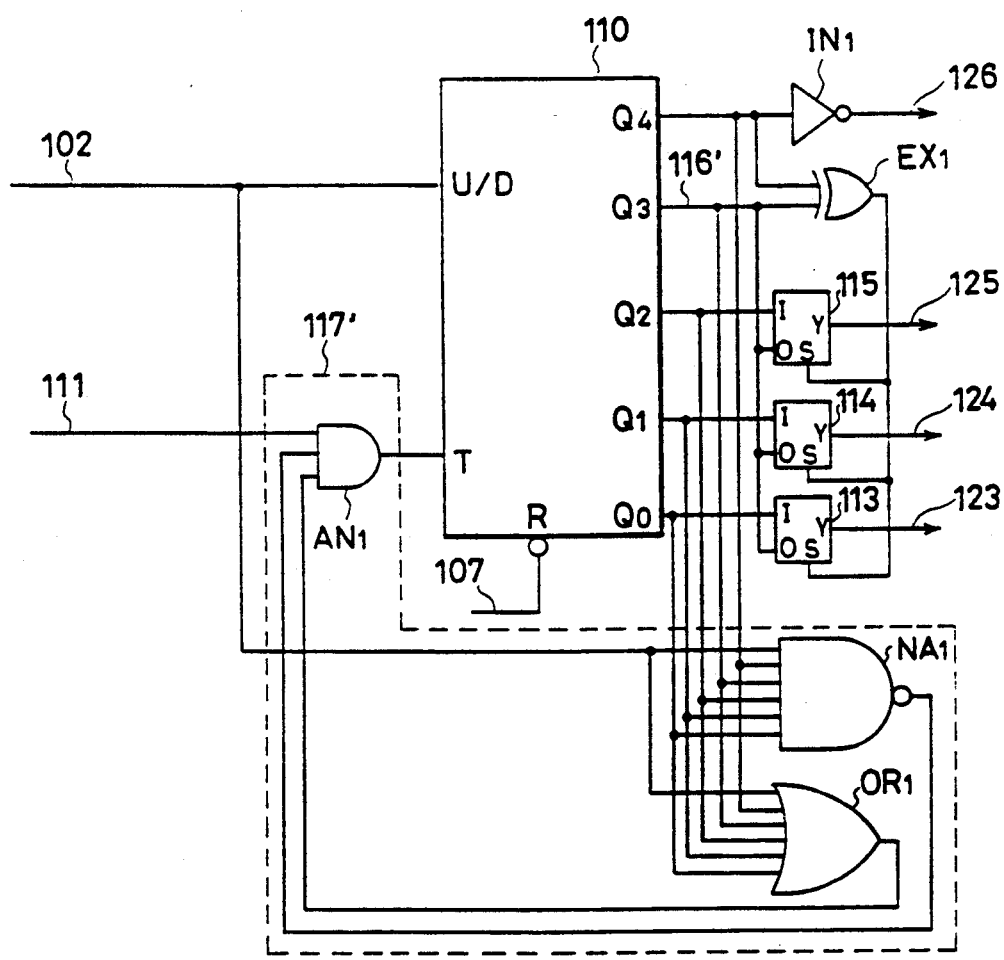
FIG. 27 illustrates the structure of a synapse load representing circuit according to the embodiment of the present invention.

With reference to FIG. 27, the structure and operation of a synapse load representing circuit 72 will be described. The synapse load representing circuit 72 is adapted to generate data which define synapse loads indicating connection strengths between neurons. Referring to FIG. 27, the synapse load representing circuit 72 comprises an updown counter 110, selectors 113, 114 and 115, and a gate circuit 117'. The updown counter 110 comprises a terminal U/D which receives an up/-down indication signal supplied through a signal line 102, an input T which receives a clock signal supplied through a signal line 111 through the gate circuit 117', output terminals Q0 to Q4, and a reset terminal R. In response to an indication signal supplied to the terminal U/D, the updown counter 110 increments or decrements its count value by the number of pulses received in the input terminal T. The output terminal Q4 outputs a signal indicating the sign of the synapse loads. Negative synapse loads are defined when the output potential of the output terminal Q4 is at a low level, while positive synapse loads are defined when it is at a high level. The sign data from the output terminal Q4 of the counter 110 is transferred to a signal line 126 through an inverter IN1. Therefore, positive synapse loads a indicated when the potential on the signal line 126 is at a low level, while negative synapse loads are indicated when the potential is at a high level.

The selectors 113 to 115 are adapted to define the maximum values of the absolute values of the synapse loads. An EXOR gate EX1 is provided in order to control the selecting operations of the selectors 113 to 115. The EXOR gate EX1 receives a signal data output Q4 and a redundant bit output Q3 from the counter 110. The selector 113 receives the Q0 output of the counter 110 at its first input I, while receiving the redundant bit output Q3 at its second input O. The selector 114 receives the output Q1 of the counter 110 at its first input, while receiving the output Q3 of the counter 110 at its second input. The selector 115 receives the output Q2 of the counter 110 at its first input, while receiving the output Q3 of the counter 110 at its second input. The selectors 113 to 115 receive the output of the EXOR gate EX1 in selection inputs S thereof. When the EXOR gate EX1 outputs a high-level signal indicating a mismatch of inputs, each of the selectors 113 to 115 outputs the redundant bit output Q3, which is received at its second input O, from its output terminal Y. When the EXOR gate EX1 outputs a low-level signal indicating a match of the outputs Q3 and Q4, the selectors 113 to 115 output the outputs Q0 to Q2, which are received at the first inputs I thereof, to provide the absolute values of synapse loads of signal data on signal lines 123 to 125.

The gate circuit 117' is provided in order to inhibit an overflow of the updown counter 110. The gate circuit 117' includes an AND gate AN1, a NAND gate NA1 and an OR gate OR1. The NAND gate NA1 receives the up/down indication signal supplied through the signal line 102 and the outputs from the output terminals Q0 to Q4 of the counter 110. The OR gate OR1 receives the up/down indication signal and the five-bit output data Q0 to Q4 of the counter 110. The AND gate AN1 receives the clock signal supplied through the signal line 111 and outputs from the NAND gate NA1 and the OR gate OR1. The NAND gate NA1 outputs a low-level signal only when all of its six inputs are at high levels. On the other hand, the OR gate OR1 outputs a low-level signal only when all of its six inputs are at low levels. The AND gate AN1 passes the clock signal supplied through the signal line 111 only when both of the outputs from the NAND gate NA1 and the OR gate OR1 are at high levels, and supplies the same to the clock input T of the counter 110. The operation is now described.

The counter 110 has a countable range of LLLLL (00000) to HHHHH (11111). Within this range, LLLLL to LHHHH indicate negative synapse loads, while positive synapse loads are indicated when the outputs Q4 to Q0 are HLLLL to HHHHH. The levels of the synapse loads are expressed in three bits Q0 to Q2. Therefore, the absolute values of the synapse loads are within a range of HHH to LLL. In the following description, the outputs of the counter 110 are denoted by the same reference numerals as its output terminals. In an initial state, the counter 110 is reset by a reset signal which is supplied through a signal line 107, and all of its outputs Q0 to Q4 are at low levels. In learning of the neural network, a synapse load for initialization is set in the counter 110, as hereinafter described.

Consider that the outputs Q4 to Q0 of the counter 110 are within a range of "HLHHH" to "LHLLL". In this case, the outputs Q3 and Q4 regularly mismatch each other, and the EXOR gate EX1 outputs a high-level signal indicating the mismatch. Therefore, the selectors 113 to 115 select and output the outputs Q0 to Q2 which are received in the input terminals I respectively. Consequently, signal potentials responsive to the counting operation of the counter 110 are transferred onto the signal lines 123 to 125. Within this range, further, at least one of the outputs Q0 to Q4 is at a high level, while at least another one is at a low level. Therefore, the NAND gate NA1 outputs a high-level signal, and the OR gate OR1 also outputs a high-level signal. Thus, the AND gate AN1 is so enabled that the gate circuit 117' passes the clock signal received through the signal line 111 and supplies the same to the clock input T of the counter 110. In the range of "HLHHH" to "LHLLL", therefore, the counter 110 carries out a counting operation corresponding to the clock signal, and supplies its count values to the signal lines 123 to 125.

Consider that a count-up command is supplied in relation to "HLHHH". In this case, the outputs Q4 to Q0 of the counter 110 are "HHLLL". However, the output of the EXOR gate EX1 goes low. The selectors 113 to 115 responsively select the output Q3 received in the inputs O thereof, and transfer the same onto the signal lines 123 to 125. Since the output Q3 is currently at a high level, all of the potentials of the signal lines 123 to 125 go high. Even if a count-up command is further received in this state, all values on the signal lines 123 to 125 are fixed at high levels although the count value of the counter 110 is incremented.

In other words, the levels on the signal lines 123 to 125 are set at the limit value of "HHH" level, to hold the maximum limit value of the synapse loads. When count-up commands are received five times after the limit value is reached and the counter 110 counts up five times and thereafter counts down three times, the counter 110 correctly stores the count value, while the limit value of "HHH" is held as the levels of the synapse loads supplied onto the signal lines 123 to 125.

When the counter 110 is simply limited to carry out no count operation after the count value reaches the limit value, it is impossible to obtain a correct count value since the counter output in the case of only the limit structure becomes smaller by "3" than the limit value if the counter counts up five times and then counts down three times after the count value reaches the limit value as described above. In the structure shown in FIG. 27, however, the counter 110 can still carry out its count operation after the counter value reaches the limit, whereby it is possible to regularly store a correct count value.

Suppose that a further count-up command is received after the outputs Q4 to Q0 of the counter 110 previously supplied with a count-up command reach "HHHHH". In this case, the output of the NAND gate NA1 goes low and the AND gate AN1 is disabled. Therefore, the counter 110 carries out no further count operation when the count value reaches the maximum value "HHHHH". Namely, when the outputs Q4 to Q0 of the counter 110 go "HHHHH", the output of the NAND gate NA1 goes low and the AND gate AN1 is disabled. Thus, the clock signal supplied through the clock signal line 111 cannot pass through the gate circuit 117, and the counter 110 receives no clock and carries out no count operation.

Similarly in a count-down operation, the outputs Q4 to Q0 of the counter 110 go "LLHHH" when a count-down command is received in the case of "LHLLL". IN this case, the output of the EXOR gate EX1 goes low, and the selectors 113 to 115 pass the output Q3 of the counter 110 and transfer the same onto the signal lines 123 to 125. Therefore, the signal levels on the signal lines 123 to 125, i.e., the synapse loads, are held at "LLL". The potentials on the signal lines 123 to 125 remain unchanged even if a count-down command is further received. Even if a further count-down command is received when the count value of the counter 110 reaches "LLLLL", the AND gate AN1 is disabled since the output of the OR gate OR1 in the gate circuit 117' goes low, and hence no clock signal is supplied to the counter 110.

As hereinabove described, this synapse representing circuit detects whether or not a synapse load setting bit reaches a limit value, to hold and output the limit value as synapse load set data when a count command in excess of the limit value is received after the limit value is reached. Thus, it is possible to correctly learn the synapse loads with no overflow of the synapse load set counter. Further, the counter having the redundant bit carries out a correct counting function even if the synapse load setting bit reaches a value which is out of the limitation range. Thus, it is possible to regularly carry out a correct counting function within the entire countable range of the counter.

Each of the selectors 123 to 125 is adapted to select a signal received in either input I or O in response to the signal received at its selection input S, and can be formed by a general two-to-one selection multiplexer. The updown counter 110 can be formed by a counter which can perform general count-up and count-down operations. For example, a single-stage counter may be formed by a T-FF (T-type flip-flop), and AND gate which receives a complementary signal of an up/down indication signal at its one input and a Q output of the T-FF at its other input, another AND gate which receives the up/down indication signal at its one input and a $\overline{Q}$ output of the T-FF at its other input, and an OR gate which receives gate outputs of the two AND gates and supplies an output signal to a clock input T of a next stage T-FF. The up/down counter 110 can be formed by cascade-connecting a prescribed number of such counters.

The structure and operation of the polarity converting circuit and the current decoder shown in FIG. 12 are how described.

Figure 28:
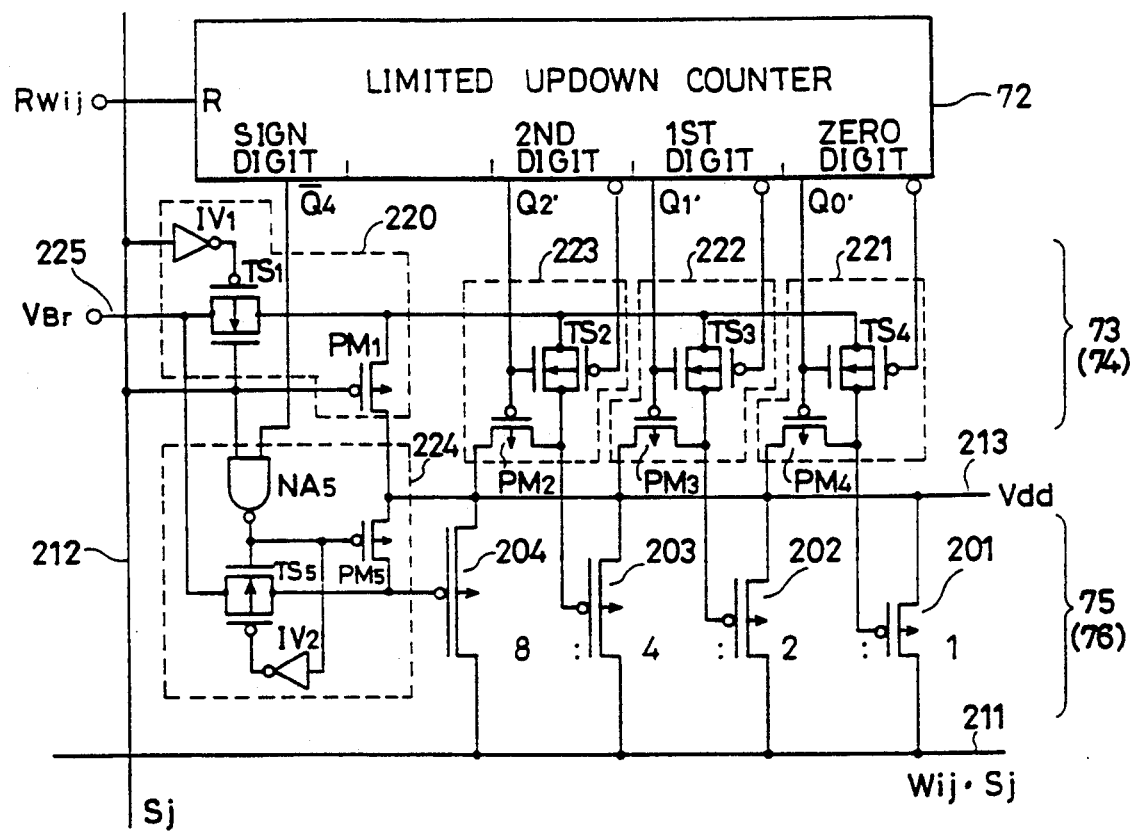
FIG. 28 illustrates exemplary structures of a synapse polarity converting circuit and a current decoder according to the embodiment of the present invention.

Referring to FIG. 28, a synapse polarity converting circuit part includes a gate bias applying circuit 220 and gate bias switching circuits 221 to 224.

The gate bias applying circuit 220 includes a transfer switch TS1 which selectively passes a bias voltage $V_{\beta r}$ externally received through a signal line 225 in response to a state signal Sj on an axon signal line 212, and a p-channel MOS (insulated gate type semiconductor) transistor PM1 which transfers a bias voltage $V_{dd}$ in response to the state signal Sj on the signal line 212. The transfer switch TS1 is formed by a CMOS transmission gate obtained by connecting a p-channel MOS transistor and an n-channel MOS transistor in parallel with each other. The state signal Sj on the signal line 212 and a signal obtained by inverting the signal Sj on the signal line 212 through an inverter IV1 are transferred to gate electrodes of the MOS transistors.

The gate bias switching circuit 221 includes a transfer switch TS4 and a p-channel MOS transistor PM4. The transfer switch TS4 transfers the bias voltage $V_{\beta r}$ in response to a zeroth-digit output Q0' (corresponding to the signal on the signal line 123 in FIG. 27) from a limited updown counter 72 (having the same structure as the limited updown counter circuit shown in FIG. 27).

The gate bias switching circuit 222 includes a transfer switch TS3 and a p-channel MOS transistor PM3. The transfer switch TS3 transfers the bias potential $V_{\beta r}$ in response to a first-digit output Q1' from the limited updown counter 72.

The gate bias switching circuit 223 includes a transfer switch TS2 and a p-channel MOS transistor PM2. The transfer switch TS2 enters an ON or OFF state in response to a second-digit output Q2' from the limited updown counter 72, and transfers the bias potential $V_{\beta r}$.

The gate bias switching circuit 224 includes a NAND gate NA5 which receives the state signal Sj on the signal line 212 and a sign output $\overline{Q4}$ from the limited updown counter 72, a transfer switch TS5 which passes the bias potential $V_{\beta r}$ in response to the output of the NAND gate NA5, and a p-channel MOS transistor PM5 which enters an ON or OFF state in response to the output of the NAND gate NA5.

A current decoder circuit part includes p-channel MOS transistors 201, 202, 203 and 204.

The p-channel MOS transistor 201 enters an ON state in response to the output of the transfer switch TS4, and electrically connects the signal line 213 with the signal line 211. The p-channel MOS transistor 202 enters an ON state in response to the output of the transfer switch TS3, and provides a current path between the signal line 213 and the signal line 211. The p-channel MOS transistor 203 enters an ON state in response to the output of the transfer switch TS2, and electrically connects the signal line 213 with the signal line 211. The p-channel MOS transistor 204 enters an ON state in response to the output of the transfer switch TS5, and electrically connects the signal line 213 with the signal line 211. The p-channel MOS transistors 201, 202, 203 and 204 are set in the ratio of 1:2:4:8 in width (transistor size or gate width), whereby conductance ratio of the transistors 201 to 204 are also set at 1:2:4:8.

The signal line 213 transfers a reference bias voltage (gate-off voltage) $V_{dd}$ from the exterior. The signal line 211 is a dendrite signal line. Therefore, a current signal indicating Wij·Sj is outputted on the signal line 211. The operation is now described.

Consider that the state signal Sj on the signal line 212 is at a high level. In this case, the transfer switch TS1 enters a conducting state, and the p-channel MOS transistor PM1 enters an OFF state. Thus, the bias voltage $V_{\beta r}$ is transferred to the gate bias switching circuits 221 to 223 through the gate bias applying circuit 220.

Consider that the counter 72 outputs a positive synapse load Wij. In this case, the sign output $\overline{Q4}$ of the counter 72 is at a low level. The output of the NAND gate NA5 is at a high level, while the transistor PM5 enters an OFF state and the transfer switch TS5 enters a conducting state. Thus, the gate bias switching circuit 224 outputs the bias potential $V_{\beta r}$, and the transistor 204 for current addition enters an ON state. The current adding transistor 204 converts the bias voltage $V_{dd}$ to current information in accordance with its conductance, and supplies the same to the signal line 211. Thus, this transistor 204 transfers the current for the sign. On the other hand, the transfer switch TS2 enters a conducting state in the gate bias applying circuit 220, and transfers the bias potential $V_{\beta r}$ to the gate bias switching circuits 221 to 223. The MOS transistor PM1 is in an OFF state at this time. The gate bias switching circuits 221 to 223 pass the bias potential $V_{\beta r}$ transferred from the gate bias applying circuit 220 when corresponding output data of the counter 72 are at high levels, while applying the bias potential $V_{dd}$ to gate electrodes of corresponding current adding transistors when the corresponding outputs of the counter 72 are at low levels. In other words, each gate bias switching circuit transfers the bias potential $V_{\beta r}$ to the gate of the corresponding current adding transistor through the transfer switch TS when the corresponding output of the counter 72 is at a high level, while transferring the bias potential $V_{dd}$ to the gate of the corresponding current adding transistor through the MOS transistor PM when the corresponding output data of the counter 72 is at a low level.

The current adding transistors 201 to 203 enter ON states when the bias voltage $V_{\beta r}$ is transferred from the gate bias switching circuits 221 to 223 respectively, and supply amounts of currents responsive to conductances thereof. When the bias voltage $V_{dd}$ is transferred from the corresponding gate bias switching circuits, on the other hand, the current adding transistors 201 to 203 enter OFF states and derive no currents. Thus, a signal current responsive to the synapse load designated by the limited updown counter 72 flows on the signal line 211.

When the synapse load Wij is negative, the sign output $\overline{Q4}$ from the counter 72 goes high. Thus, the gate bias switching circuit 224 transfers the bias potential $V_{dd}$ to the gate of the transistor 204, to bring the transistor 204 into an OFF state. Thus, no current for the sign flows but the positive synapse load is subjected to an offset by this current.

When the state signal Sj on the signal line 212 is at a low level, on the other hand, the gate bias applying circuit 220 transfers the bias potential $V_{dd}$ to the gate bias switching circuits 221 to 223 through the MOS transistor PM1. Therefore, the gate bias switching circuits 221 to 223 regularly output high level signals of the voltage $V_{dd}$ level regardless of the values of the outputs Q0' to Q2' from the counter 72, whereby all of the transistors 201 to 203 enter OFF states. In the gate bias switching circuit 224, on the other hand, the NAND gate NA5 goes high and the transfer switch TS5 enters a conducting state, while the MOS transistor PM5 enters an OFF state. Thus, when the state signal Sj on the signal line 212 is at a low level, the transistor 204 enters an ON state. Namely, only an amount of current indicating the sign flows on the signal line 211 when the state signal Sj is at a low level.

As hereinabove described, the MOS transistor 204 enters an OFF state only when the sign of the synapse load Wij is negative and the $\overline{Q4}$ output of the counter 72 is at a high level while the state signal Sj is at a high level.

Figure 29:
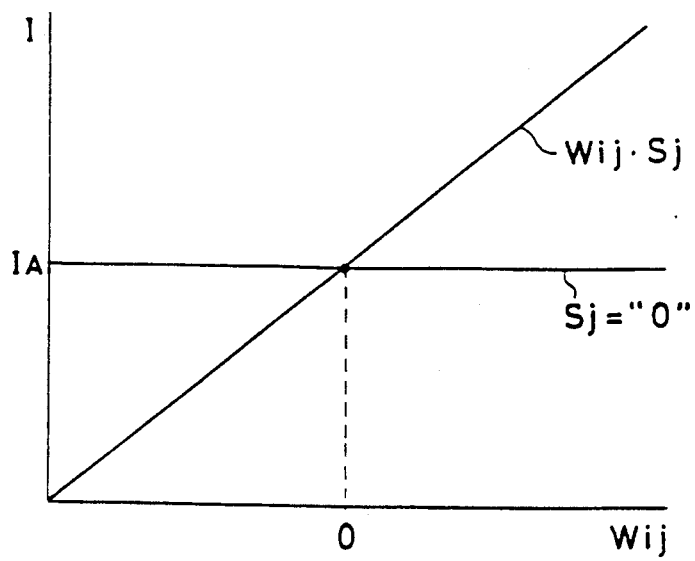
FIG. 29 illustrates the relation between current value outputted from the current decoder shown in FIG. 28 and synapse load.

FIG. 29 illustrates the relation between the synapse load Wij and the current flowing on the signal line 211. Referring to FIG. 29, a current value $I_A$ shows a dendrite signal flowing on the signal line 211 when the state signal Sj on the signal line 212 is "0", i.e., the value of current flowing when Wij·Sj=0. The inclined straight line shows a current flowing on the signal line 211 when the state signal Sj is "1" ("H"). As understood from FIG. 29, the product signal Wij·Sj is subjected to an offset by the reference current value $I_A$ when the state signal Sj is "1" in the case of positive and negative synapse loads Wij.

Figure 30:
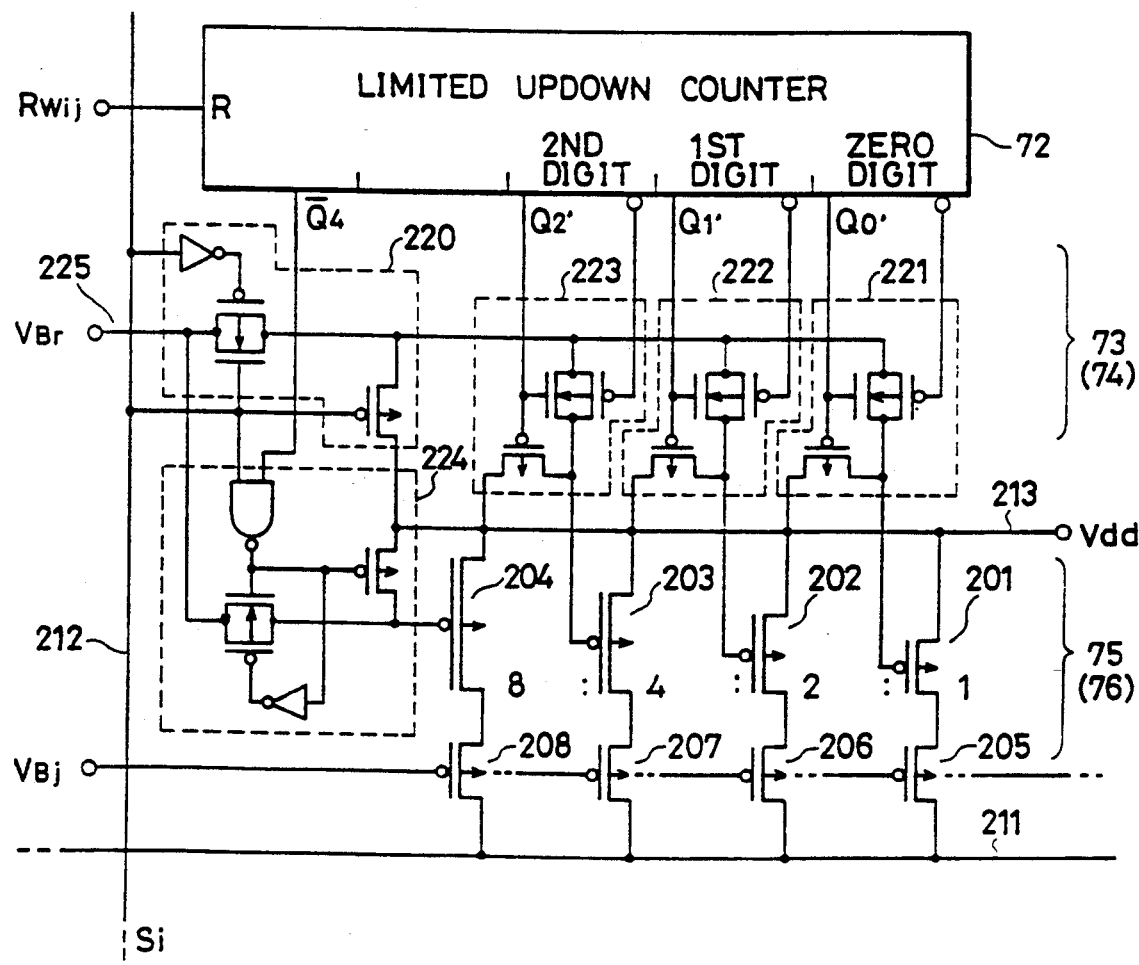
FIG. 30 illustrates another structure of the current decoder circuit.

FIG. 30 shows the structure of a current decoder according to a further embodiment of the present invention. In the current decoder part shown in FIG. 30, p-channel MOS transistors 205 to 208 are connected between the respective ones of current adding transistors 201 to 204 and a signal line 211. The MOS transistors 205 to 208 are adapted to maintain currents flowing in corresponding ones of the current adding transistors 201 to 204 at constant values. In other words, the MOS transistors 205 to 208 normally maintain currents transferred from the current adding MOS transistors 201 to 204 onto the signal line 211 at constant values even if the potential on the signal line 211 is varied. A prescribed bias voltage $V_{\beta j}$ is applied to the respective gates of the MOS transistors 205 to 208. FIGS. 31A, 31B, 32A and 32B illustrate the functions of the MOS transistors for maintaining constant currents evaluated by simulation.

Figure 31A:
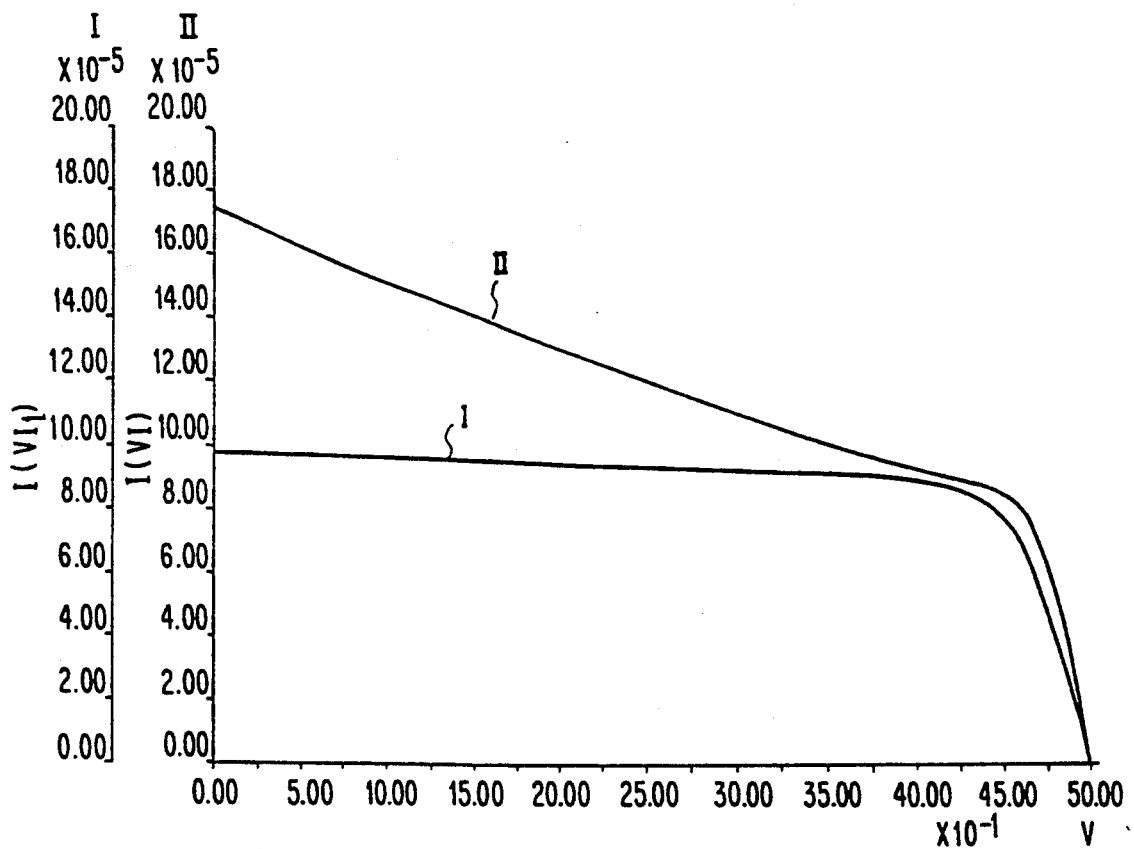
FIGS. 31A, 31B(a) and 31B(b) illustrate effects of constant current transistors in the current decoder circuit shown in FIG. 30.
Figure 31B:
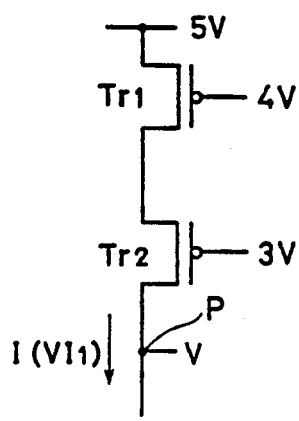
Figure 31B:
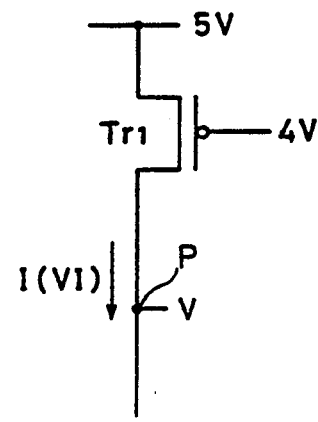

FIG. 13A shows voltage and current characteristics on the signal line 211 in relation to a bias potential $V_{dd}$ of 4 V. Referring to FIG. 31A, the horizontal line represents the voltage on the signal line 211, and the vertical line represents the current on the signal line 211. The curve I shows current/voltage characteristics attained when the constant current transistors are provided, while the curve II shows those attained when no current transistors are provided. In more concrete terms, the curve I shows changes of the voltage and the current appearing at a node P when a voltage of 4 V is applied to the gate of a current adding transistor Tr1 and a voltage of 3 V is applied to the gate of a constant current transistor Tr2, which is connected in series with the transistor Tr1, as shown in FIG. 31B(a). The curve II shows voltage-current characteristics appearing at a node P when a bias potential of 4 V is applied to the gate of a current adding transistor Tr while no constant current transistor is provided, as shown in FIG. 31B(b). When the constant current transistor Tr2 is provided, the current remains constant at the node P even if the voltage at the node P, i.e., the potential on the signal line 211 is varied within a range of 0 V to 4 V as obvious from FIG. 31A, and a current which is responsive to the output of a counter 72 is transferred onto the signal line 211 with no influence by potential variation of a dendrite signal line.

Figure 32A:
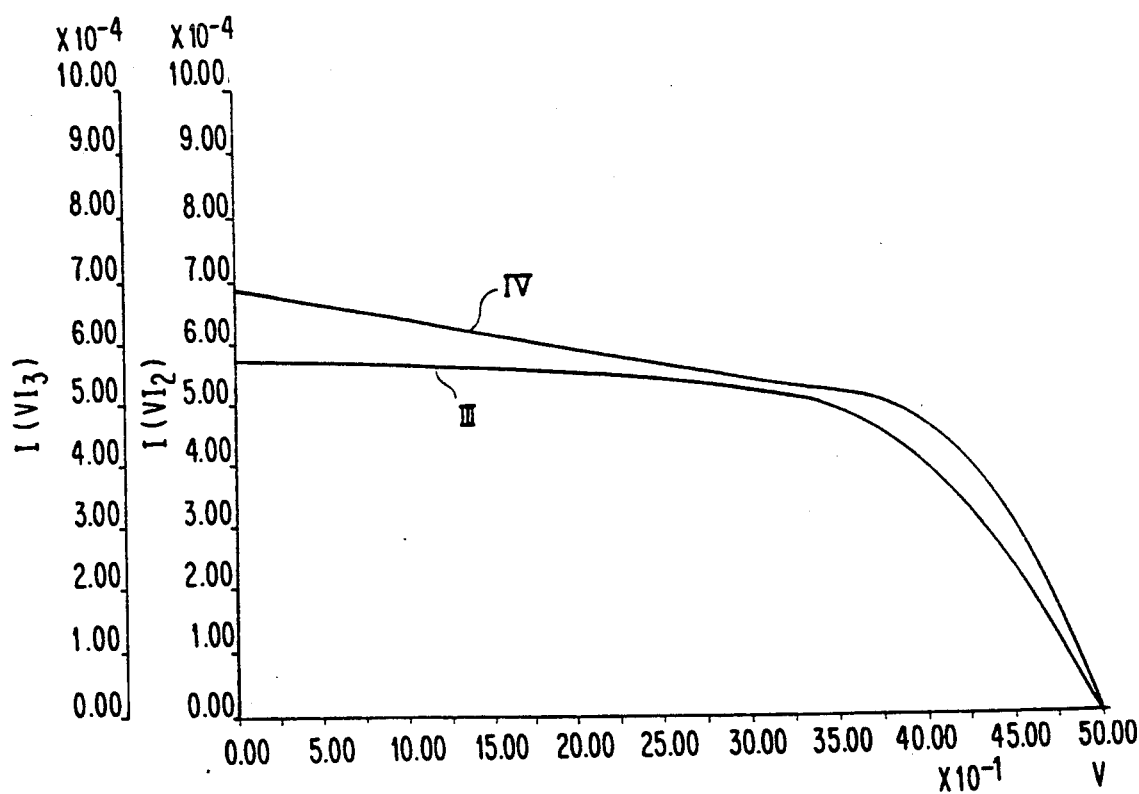
FIGS. 32A, 32B(a) and 32B(b) illustrate other results of simulation indicating effects of the constant current transistors shown in FIG. 30 and respective parameters respectively.
Figure 32B:
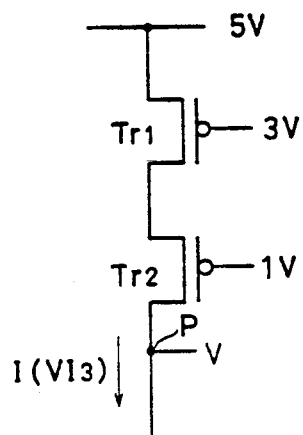
Figure 32B:
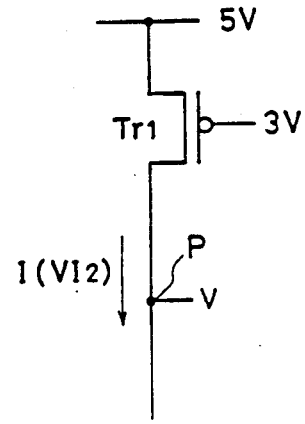

FIG. 32A shows voltage-current characteristics appearing at the node P in relation to a bias voltage $V_{\beta r}$ of 3 V and a bias potential $V_{dd}$ of 5 V. Referring to FIG. 32A, the curve III shows current-voltage characteristics appearing at the node P when a voltage of 1 V is applied to the gate of a constant current transistor Tr2. The curve IV shows current-voltage characteristics appearing at the node P when no constant current transistor is provided. Connection modes for providing the current-voltage characteristics of the curves III and IV are shown in FIGS. 32B(a) and 32B(b). Also in this case, a constant current is regularly derived when the constant current transistor Tr2 is provided and the constant bias potential $V_{\beta r}$ (1 V) is applied to its gate, even if the potential on the dendrite signal line is varied within a range of 0 V to 3 V.

The constant current transistors, which may have current suppliability capable of passing overall currents flowing from corresponding transistors, are set in the same sizes as the corresponding current adding transistors. Alternatively, the constant current transistors may be formed in the same size as the largest one of the current adding transistors 201 to 204. In the simulation of FIGS. 31A to 32B(b), the transistors Tr1 and Tr2 are identical in size to each other. In any case, it is possible to form a current path which can regularly supply a constant current onto the signal line 211 even if the potential on the signal line 211 is varied.

Due to the above structure, only one signal line may be prepared for transferring dendrite signals while only one axon signal line may be prepared for transferring axon signals, to represent excitatory coupling and inhibitory coupling between the neurons by the axon signal line and the dendrite signal transfer line. Thus, the area of interconnection can be reduced and the manufacturing steps can be simplified.

The bias potential $V_{\beta r}$ is applied to the gates of the current adding transistors. When the bias potential $V_{\beta r}$ is applied from the exterior, therefore, the values of ON currents flowing in the current adding transistors when the same are in ON states can be adjusted by controlling the bias potential $V_{\beta r}$. Thus, even if the term number of Wij·Sj, i.e., the number of neurons coupled to one dendrite signal line is increased, it is possible to reduce the values of signal currents outputted from the respective synapse representing circuits by reducing the values of the ON currents flowing in the respective current adding transistors, thereby to cope with increase in the term number of sums of products. Even if the neural network is extended in scale, therefore, it is possible to suppress saturation of signal currents flowing on the dendrite signal line, so that the neurons correctly carry out thresholding operations.

Further, since only one axon signal line 212 is required, it is possible to suppress increase in number of elements such as the current adding transistors as compared with the conventional structure requiring two axon signal lines, whereby the occupied area of the elements can be reduced.

In the structures shown in FIGS. 28 and 30, it is possible to analogously change the state signal Sj by adding appropriate electrostatic capacitance to the signal line 211 to which Wij·Sj is transferred and sufficiently increasing the time constant of the dendrite signal transfer line 211 as compared with that of the axon signal line 212. This is because it is possible to deliver a current which corresponds to the ratio of a high level to a low level in the case of changing the state signal Sj between the high level and the low level at a short cycle. Due to such characteristics, it is possible to operate analogous Wij·Sj for the state signal Sj of digital data through one signal line for transferring the state signal Sj having digital values of "1" and "0", thereby enabling implementation of a neural network of an analog model.

Although the p-channel MOS transistors are employed in the current decoder and the constant current transistors, the conductivity type of the transistors can be changed by changing the employed voltage polarity. In other words, n-channel MOS transistors may alternatively be employed. Further, it is also possible to change the conductivity type of the MOS transistors forming the synapse polarity converting circuit by changing the employed voltage polarity.

Figure 33:
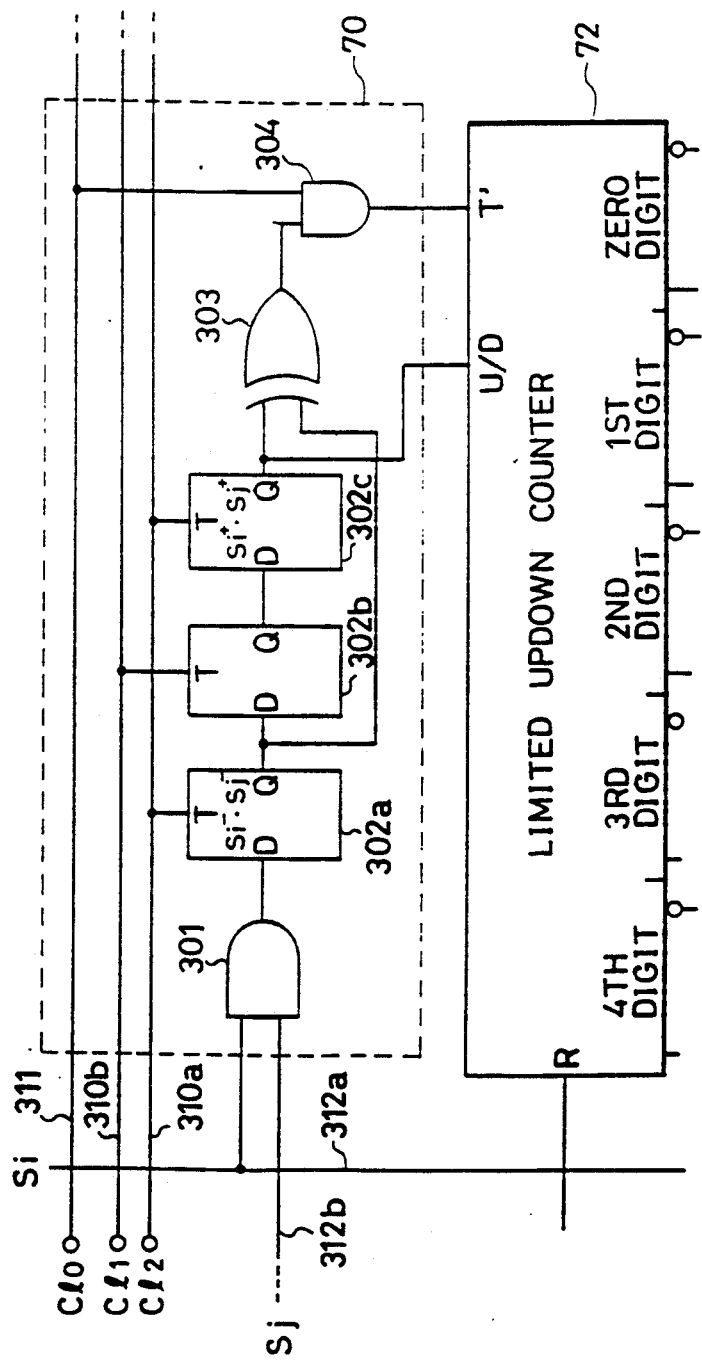
FIG. 33 illustrates the structure of a learning control circuit according to the embodiment of the present invention.

FIG. 33 illustrates an exemplary structure of the learning control circuit 70 shown in FIG. 12. Referring to FIG. 33, the learning control circuit 70 includes AND gates 301 and 304, shift registers (D-latches) 302a, 302b and 302c, and a mismatch detecting circuit (EXOR gate) 303. The AND gate 301 receives state signals Si and Sj on signal lines 312a and 312b. The shift register 302 has a D-input which receives the output of the AND gate 301, a clock input T which receives a clock signal C12 transferred through a signal line 310a, and a Q-output. The shift register 302b has a D-input which receives the Q output of the shift register 302, a clock input terminal T which receives a clock signal C11 transferred through a signal line 310b, and a Q-output. The shift register 302c has a D-input which receives the Q output of the shift register 302b, a clock input terminal T which receives a clock signal C12 transferred through the signal line 310a, and a Q-output. The mismatch detecting circuit 303 receives the Q outputs from the shift registers 302a and 302c. The AND gate 304 receives the output from the mismatch detecting circuit 303 and a clock signal C10 transferred through a signal line 311. The Q output of the shift register 302c is supplied to an up/down input terminal U/D of a limited updown counter 72. The output of the AND gate 304 is coupled to a clock input terminal T' of the updown counter 72. The clock input terminal T' of the counter 72, which corresponds to the input of the gate circuit 117 shown in FIG. 27, is connected to a clock input terminal T of a counter through the gate circuit 117.

The clock signals C10, C11 and C12 are externally supplied control signals. The clock signal C10 provides a count indication in the counter 72. The clock signals C11 and C12, which are non-overlapping two-phase signals, provide shift timings in the shift registers 302a to 302c. The operation is now described.

The AND gate 301 receives the state signals Si and Sj through the signal lines 312a and 312b. The logical product of the state signals Si and Sj is transferred to the input D of the shift register 302a. First, the states of input and output neurons are fixed in correspondence to educator information (pattern to be learned). After simulated annealing is carried out in this state, the clock signal C12 is supplied onto the signal line 310a in defined states of the state signals Si and Sj which are supplied onto the signal lines 312a and 312b. Thus, the output from the AND gate 301 is latched by the shift register 302a. In other words, the product $S^+i \cdot S^+j$ of the state signals in a plus phase is latched by the shift register 302a.

Then, a minus phase operation is performed. First, only input neurons are clamped at a value corresponding to a pattern to be learned. The output neurons are in free states at this time. Simulated annealing is carried out in this state. After the values of the state signals Si and Sj on the signal lines 312a and 312b are defined, the clock signal C11 is first supplied onto the signal line 310b, the data of the shift register 302a is then shifted to the shift register 302b, and thereafter the clock signal C12 is supplied. Thus, the shift register 302c latches $S^+i \cdot S^+j$, and the shift register 302a latches $S^-i \cdot S^-j$, where $S^-i$ and $S^-j$ represent state signals in the minus phase. The mismatch detecting circuit 303 receives the Q outputs from the shift registers 302a and 302c. Therefore, the mismatch detecting circuit 303 outputs a low level when $S^+i \cdot S^+j$ matches $S^-i \cdot S^-j$, while outputting a high level when the products mismatch. The AND gate 304 receives the output from the mismatch detecting circuits 303. Therefore, the AND gate 304 passes the clock signal C10, which is transferred through the signal line 311, and transfers the same to the clock input terminal T' of the counter 72 only when $S^+i \cdot S^+j$ mismatches $S^-i \cdot S^-j$. The counter 72 increments or decrements its count value by the number of supply of the clock signal C10 in response to the value of $S^+i \cdot S^+j$ latched by the shift register 302c.

In the above structure, therefore, the synapse load learning rule is expressed as follows:

$$\Delta Wij = \eta \cdot (S^+i \cdot S^+j - S^-i \cdot S^-j)$$

The coefficient $\eta$ is represented by the number of clocks supplied to the clock signal line 311. Therefore, the counter 72 increments its count value when its updown indication input terminal U/D receives a high-level signal, and decrements its count value when the terminal U/D receives a low-level signal, for example. This learning rule means that Pij is simplified to the digital value of Si·Sj. It has been confirmed by simulation by the inventors that no problem is caused in the learning function even if the learning rule is simplified in such a manner. This result of simulation is now described.

Figure 34:
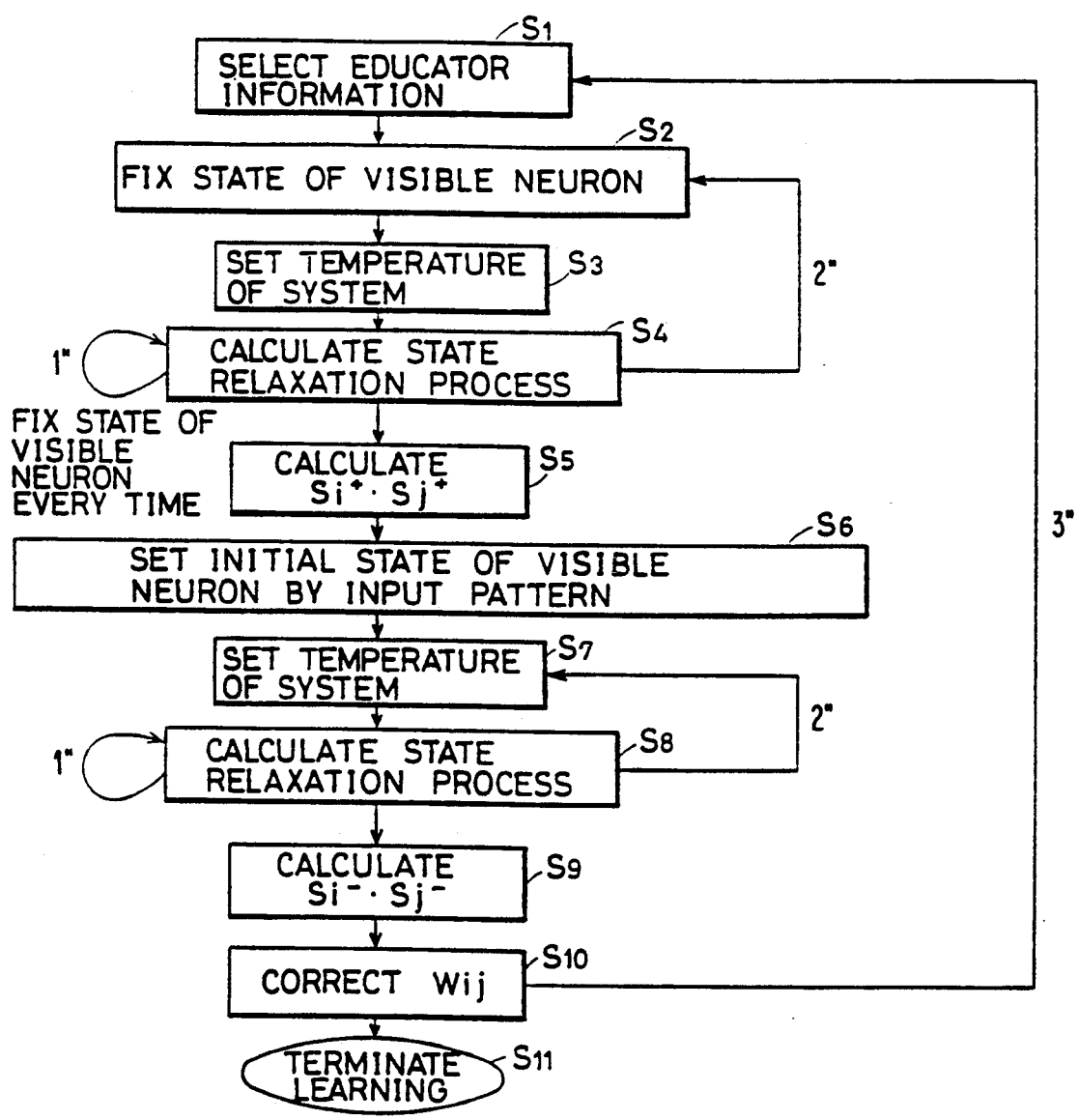
FIG. 34 is a flow chart showing a learning program employed for simulating effects of learning rules carried out by the learning control circuit shown in FIG. 33.

FIG. 34 is a flow chart showing program steps for carrying out simulation of the above learning rule. The program steps of this simulation are now described. First, educator information is selected (step S1). Namely, input data to be learned and output data are selected in accordance with the probability distribution of the educator information at the step S1. Then, respective states of visible neurons (input and output neurons) are fixed in accordance with the selected educator information (step S2). Thereafter the temperature of the neural network system is set (step S3). A state relaxation process (process for reaching a thermal equilibrium state) of the neural network is calculated with respect to the set temperature (step S4). This step S4 is repeated by a prescribed number of times. The states of the visible neurons are fixed every time in accordance with the educator information. The operation returns to the step S2 through the step S4, and the temperature of the system is set at another level (the temperature of the system is gradually reduced), to calculate the state relaxation process. The steps S2, S3 and S4 form a simulated annealing schedule loop 2", which is repeated by a prescribed number of times. After the loop 2" is repeated by the prescribed number of times, $S^+i \cdot S^+j$ is calculated (step S5). A plus phase operation is completed at the step S5. Then, a minus phase operation is performed. First, initial boundary states of only visible neurons forming input neurons are set in accordance with the educator information. Then, the temperature of the system is set at a step S7 and the state relaxation process is calculated at a step S8, similarly to the plus phase operation. The step S8 is repeated by a required number of times. After the step S8 is repeated by the required number of times, the operation returns to the step S7, to set the system at another temperature. This loop 2" in the minus phase operation is repeated by a prescribed number of times, and thereafter $S^-i \cdot S^-j$ is calculated (step S9). Thereafter the synapse load Wij is corrected through the values of $S^+i \cdot S^+j$ calculated at the step S5 and $S^-i \cdot S^-j$ calculated at the step S9. Thus, single learning is completed. Then, another or the same educator information is selected at the step S1, to repeat the plus phase and the minus phase operations. General learning is terminated when all synapse loads Wij are learned with respect to all educator data complying with probability distributions (step S11). The steps shown in the flow chart of FIG. 34 correspond to the operation of the learning control circuit shown in FIG. 33 as follows: The step S5 corresponds to data latching in the shift register 302a. The step S9 corresponds to transfer and latching of $S^+i \cdot S^+j$ to and in the shift register 302c and latching of $S^-i \cdot S^-j$ in the shift register 302a. The step S10 corresponds to variation of the count value of the counter 72 on the basis of the data latched in the shift registers 302a and 302c.

FIGS. 35A and 35B show relations between learning capacities and numbers of hidden neurons in the case of fixing the numbers of visible neurons. The learning capacity shows the number of learning patterns which can achieve a degree of learning (described below) of at least 96% in the case of inputting patterns having Hamming distances of 4, which are generated at random. The Hamming distance of each educator pattern is at least 8. FIG. 35A shows the relations between the numbers of hidden neurons and the learning capacities in the case of 25 visible neurons, and FIG. 35B shows the relations between the numbers of hidden neurons and learning capacities in the case of 30 visible neurons. Referring to FIGS. 35A and 35B, mark x shows the relations in the case of synapse loads represented in two-bit widths, mark Δ shows the relations in the case of synapse loads represented in three-bit widths, mark ○ shows the relations in the case of synapse loads represented in four-bit widths, and mark □ shows the relations in the case of synapse loads represented in five-bit widths. As understood from FIGS. 35A and 35B, a sufficient learning function can be realized by setting the synapse load widths and the numbers of hidden neurons at appropriate values.

Figure 36:
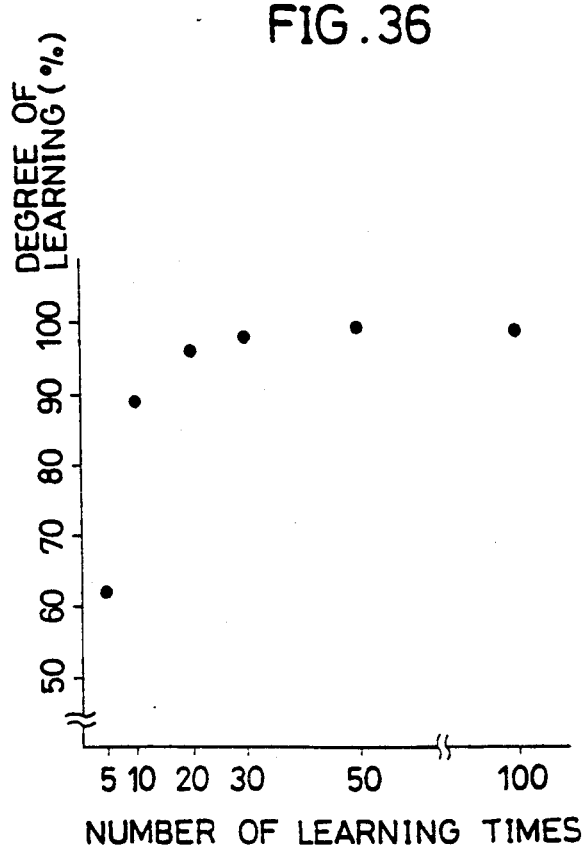
FIG. 36 illustrates effects of learning of a neural network in accordance with learning rules according to the embodiment of the present invention, with respect to the relation between the number of learning times and the degree of learning.

FIG. 36 shows the relation between the number of learning times and the degree of learning. The degree of learning means a statistic (%) of a difference between a Hamming distance between a learned pattern and a recall pattern and the maximum Hamming distance of a space formed by the patterns. Learning conditions are four-bit synapse load representation, 25 visible neurons, three educator patterns and a Hamming distance of each educator pattern of at least 8. The term "Hamming distance" indicates the number of digits having different values in two binary codes of the same word length which are compared with each other.

It is understood from FIG. 36 that a sufficient degree of learning is achieved when the number of learning times reaches an appropriate value.

Figure 37:
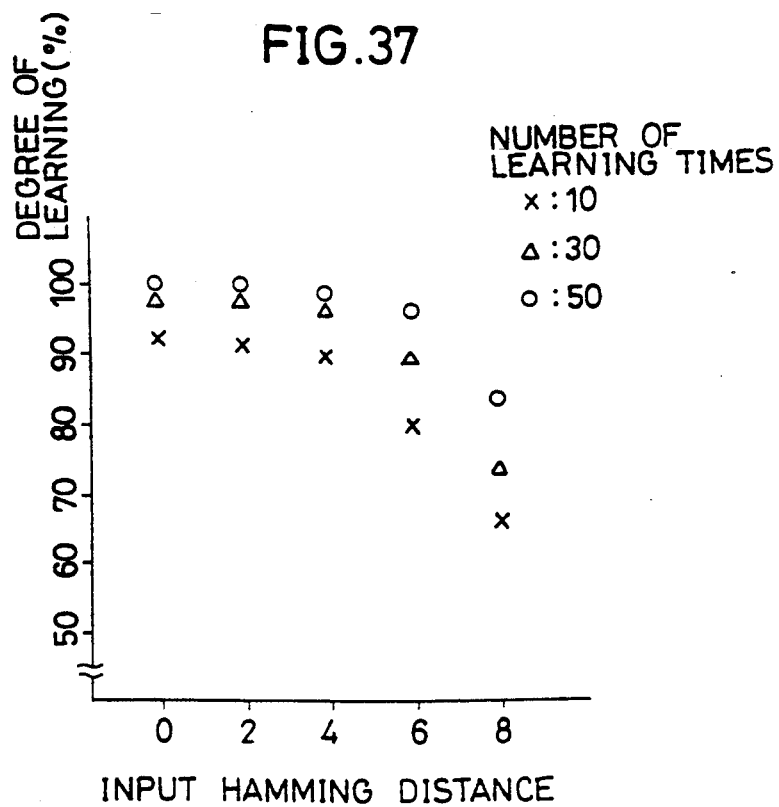
FIG. 37 illustrates the results of effects of learning rules according to the embodiment of the present invention attained by simulation, with respect to the relation between Hamming distances of input data and the degree of learning.

FIG. 37 shows the relation between Hamming distance of input patterns and the degree of learning. The numbers of learning times are 10 (mark x), 30 (mark Δ) and 50 mark ○) times. It is understood that sufficient degrees of learning are achieved when the Hamming distances of the input patterns are at appropriate values.

As described above, Pij is approximated by Si·Sj so that no processor is required to calculate Pij and the structure of the learning control circuit is greatly simplified. Further, the calculation time can be reduced since there is no need to operate Pij, which is in a multi-bit representation, whereby it is possible to obtain a learning control circuit capable of learning at a high speed.

Figure 38:
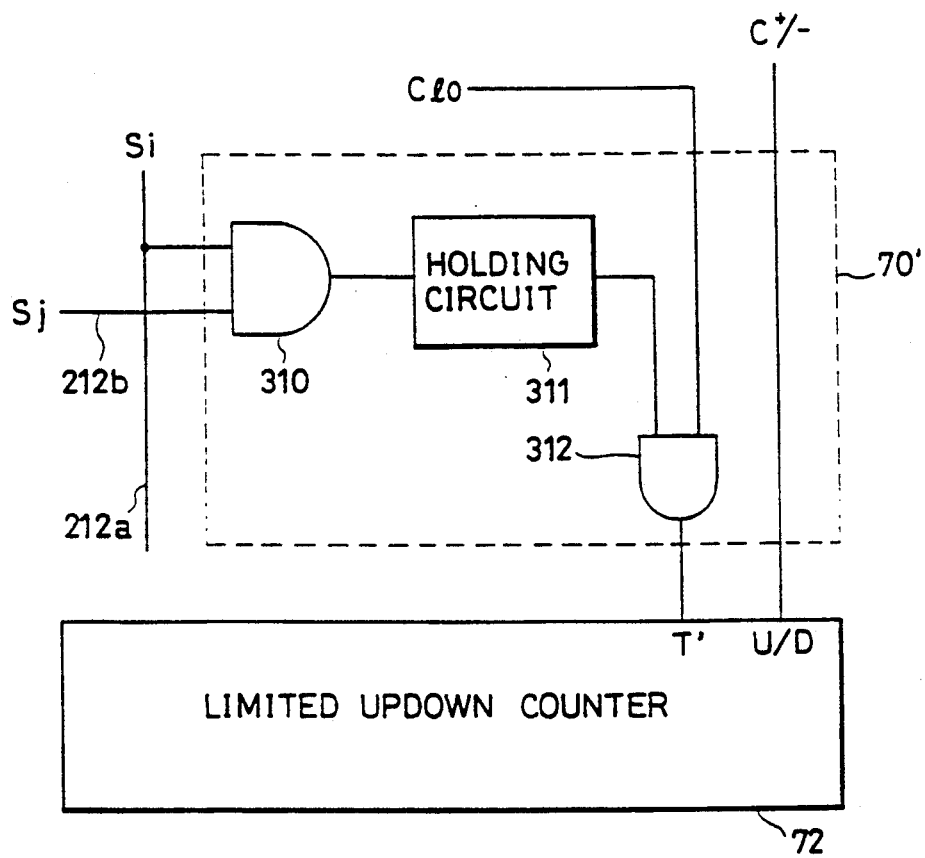
FIG. 38 illustrates a circuit structure for implementing a learning control circuit and learning rules according to a further embodiment of the present invention.

The aforementioned learning rule employs both of the product of state signals in the plus phase operation and that in the minus phase operation. Alternatively, the product of state signals in the plus phase or minus phase operation may be independently employed for changing the synapse loads. FIG. 38 shows such a structure.

Referring to FIG. 38, a learning control circuit 70' includes an AND gate 310 which receives state signals Si and Sj on axon signal lines 212a and 212b, a holding circuit 311 which holds the output of the AND gate 310, and an AND gate 312 which receives the output of the holding circuit 311 and a learning control signal C10. The output of the AND gate 312 is transferred to a clock input terminal T' of a limited updown counter 72. A control signal C± indicating the operation phase is transferred to a terminal U/D, which receives a signal indicating incrementation/decrementation of the limited updown counter 72. In this circuit structure, synapse loads are corrected in accordance with the following relational expression:

$$\Delta W^+ ij = \eta \cdot S^+ i \cdot S^+ j$$

in a plus phase operation. In a minus phase operation, on the other hand, the synapse loads are learned in accordance with the following relational expression:

$$\Delta W^- ij = -\eta \cdot S^- i \cdot S^- j$$

The operation is now briefly described. The AND gate 310 obtains and outputs the logical product of the state signals Si and Sj. Thus, the AND gate 310 outputs Si·Sj. The holding circuit 311 holds the output of the AND gate 310. When the data held in the holding circuit 311 is at a high level, the AND gate 312 is enabled and passes the clock signal C10 to supply the same to the clock input T' of the limited updown counter 72. Thus, the count value of the updown counter 72 is incremented by the number of the clock signals C10 when Si·Sj is at a high level in the plus phase operation, while the counter 72 is decremented by the number of the clock signals C10 in the minus phase operation.

The holding circuit 311 may be prepared by an element having a data holding function, such as a flip-flop, a capacitor, a memory element or the like. According to this structure, the learning control circuit can be formed by one product operating functional unit (AND gate) and at least one data holding functional unit, and the circuit structure can be further simplified as compared with that shown in FIG. 33. In synapse load variation, the synapse loads are not learned after both of the plus and minus phase operations are performed but it is possible to learn the synapse loads independently in the plus phase operation and the minus phase operation. Thus, the synapse loads can be learned at a high speed by the learning control circuit having simple circuit structure.

In the learning control circuit shown in FIG. 38, the plus phase and minus phase operations may be alternately carried out for single educator information. Alternatively, the synapse loads may be learned by carrying out only the plus phase operation by a prescribed number of times to vary the synapse loads, followed by learning in the minus phase operation which is carried out by a prescribed number of times.

The structure of a probability representing circuit generating an annealing temperature for making stochastic state transitions of neurons in accordance with the Boltzmann statistic rule is now described with reference to FIG. 39.

Figure 39:
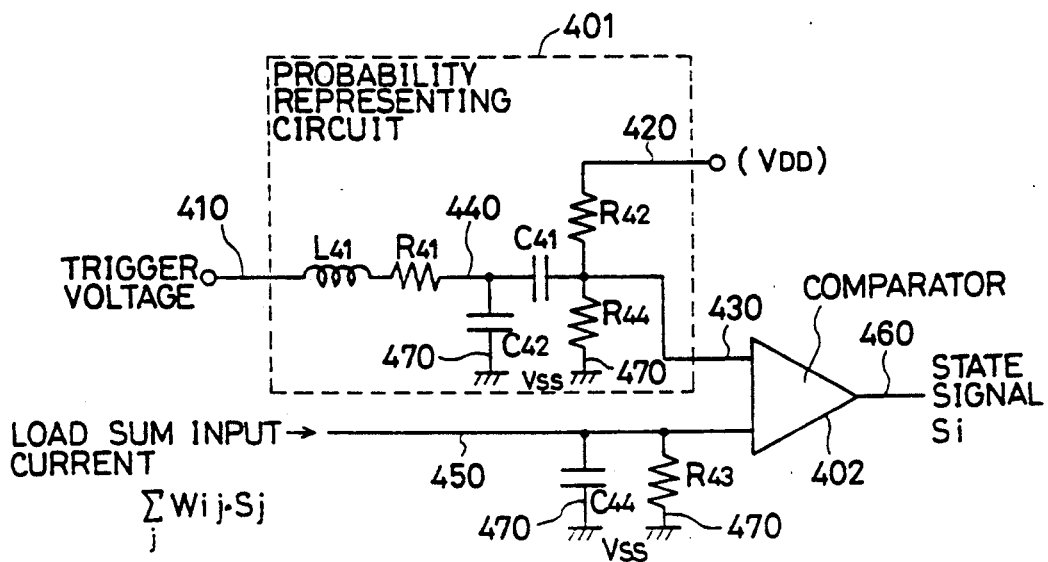
FIG. 39 illustrates the structure of a probability representing circuit according to the embodiment of the present invention.

Referring to FIG. 39, a probability representing circuit 401 includes an inductance L41, resistors R41, R42 and R44, and capacitors C41 and C42. The inductance L41 and the resistor R41 are connected in series between a terminal 410 and a node 440. The capacitor C42 is provided between the node 440 and a node 470. The resistors R42 and R44 are connected in series between nodes 420 and 470. The capacitor C41 is provided between the node 440 and the junction between the resistors R42 and R44. A trigger voltage supplied to the terminal 410 is a logical binary voltage, i.e., a voltage whose voltage level is either high or low. A first reference potential $V_{DD}$ is applied to the node 420. A second reference potential $V_{SS}$ is applied to the node 470.

A comparator 402 forming a neuron is formed by an operational amplifier, for example, and has one input which receives the output of the probability representing circuit 401 through a signal line 430, and another input which is connected with a dendrite signal line 450 carrying a load sum input current. A capacitor C44 and the resistor R44 are connected in parallel between the dendrite signal line 450 and the node 470. The capacitor C44 is adapted to adjust the time constant of the dendrite signal line 450. The resistor R44 is adapted to supply a voltage, which is proportionate to the load sum input current flowing in the dendrite signal line 450, to the comparator 402. The comparator 402 outputs a state signal Si representing the state of the neuron onto an axon signal line 460. The comparator 402 compares the output voltage from the probability representing circuit 401 with the voltage on the dendrite signal line 450, and outputs a state signal which is responsive to the result of the comparison.

Figure 40A:
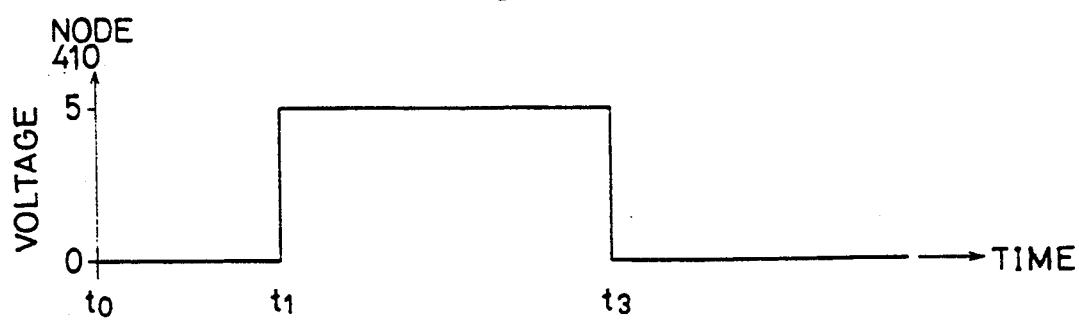
FIGS. 40A to 40D are signal waveform diagrams showing operations of the probability representing circuit shown in FIG. 39 and ambiguity width of an output state of a comparator forming a neuron.
Figure 40B:
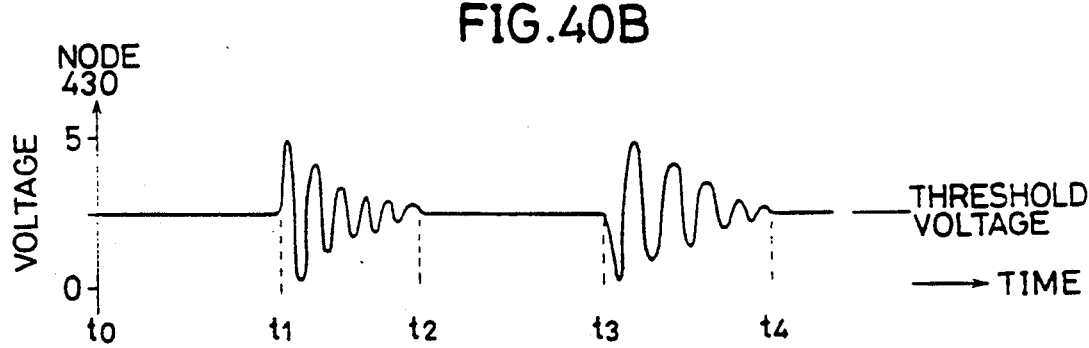
Figure 40C:
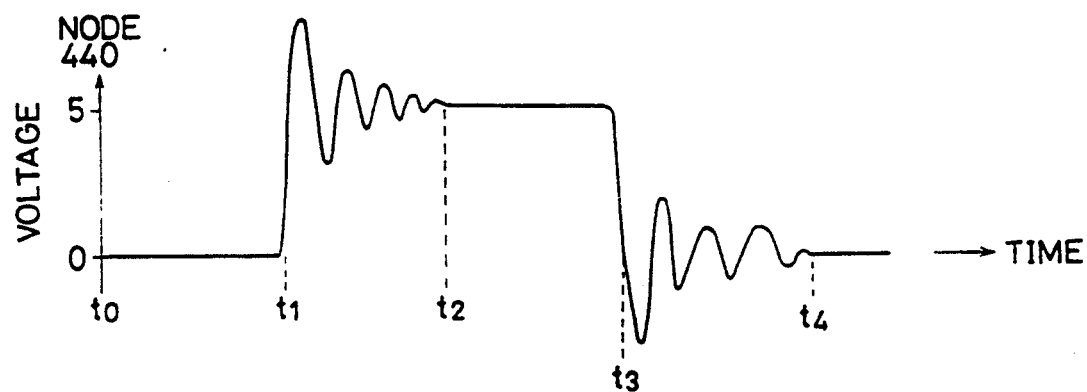
Figure 40D:
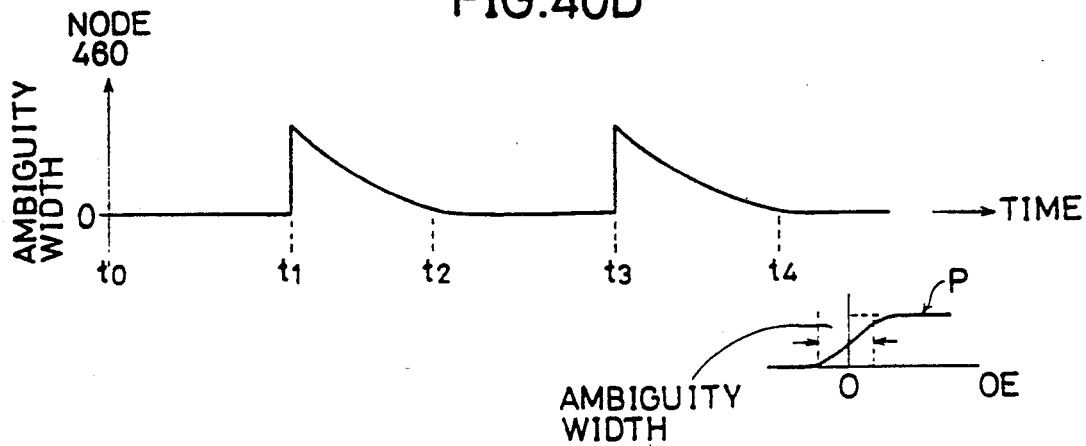

In a stationary state, the signal line 430 develops a voltage which is obtained by dividing resistivity the difference between the potentials $V_{DD}$ and $V_{SS}$ by the resistors R42 and R44, to provide the threshold value of the neuron. The operation of the probability representing circuit is now described with reference to FIGS. 40A to 40D, which are waveform diagrams thereof. FIG. 40A shows a voltage change at the node 410, FIG. 40B shows a voltage change at the node 430, and FIG. 40C shows a voltage change at the node 440. FIG. 40D shows an ambiguity width at the node 460. The ambiguity width indicates the width of an inclined portion in a probability function (Boltzmann distribution) at a certain annealing temperature. When the annealing temperature is high, the probability distribution function is a sigmoid function which has a large ambiguity width, while the probability distribution function substantially approaches the form of a unit step function and the ambiguity width is zero when the annealing temperature is low.

Consider that the reference potential $V_{DD}$ is applied to the node 420, the second reference potential $V_{SS}$ is supplied to the node 470, and a sufficient time elapses before a time t1. In this case, a value resulting from resistive division of the reference potential $V_{DD}$ and the second reference potential $V_{SS}$ by the resistors R42 and R44 appears as a threshold voltage at the output node 430 of the probability representing circuit 401. The comparator 402 compares the load sum input signal voltage appearing on the dendrite signal line 450 with the voltage on the node 430. If the load sum input signal voltage is larger than the voltage value on the node 430, the comparator 402 outputs a high-level signal voltage.

If the summed load input signal voltage on the signal line 450 is smaller, on the other hand, a low-level voltage appears on the signal line 460. In this static stable state, the signal voltage on the node 430, serving as the threshold value of the neuron implemented by the comparator 402, is compared with the summed load input current flowing on the dendrite signal line 450, so that a signal voltage based on the result of this comparison appears on the signal line 460. The ambiguity width is zero in this case.

At the time t1, the level of a trigger voltage which is supplied to the input terminal 410 is raised up to a high level. Consequently, the potential at the node 440 starts damping oscillation at a time constant ($\sim$t2−t1) which is determined by the elements L41, R41, C41 and C42 and the resistor R44 included in the probability representing circuit 401, so that the voltage at the node 440 is converged to the high-level potential of the trigger voltage supplied to the input terminal 410 at a time t2. Since the node 430 is capacitively coupled with the node 440 through the capacitor C41, a similar damping oscillation voltage with respect to the reference voltage supplied through the resistor R42 and R44 appears therein.

Therefore, the comparator 402 outputs a signal voltage, which is responsive to the result of comparison of the damping oscillation voltage generated on the node 430 and the signal voltage on the signal line 450, as a state signal Si. Thus, the ambiguity width of the output from the comparator 402 is gradually reduced from the time t1 toward the time t2, so that a state signal in the case of reaching the lowest temperature is outputted at the time t2.

At a time t3, the trigger voltage supplied to the terminal 410 is reduced to a low level. In response to this, a damping oscillation voltage is again generated at the node 440, and a similar damping oscillation voltage is responsive generated at the node 430. Similarly at the times t3 and t4, therefore, the node 460 outputs a state signal whose ambiguity width is gradually reduced in time.

The period of generation of the damping oscillation voltage corresponds to such a process that a certain annealing temperature is gradually converted to a low annealing temperature so that the neural network finally reaches a thermal equilibrium state having the minimum global energy. Therefore, every time the trigger voltage supplied to the input terminal 410 is changed, the probability representing circuit 401 outputs a comparative voltage which makes damping oscillation at a prescribed time constant, and supplies the same to one input of the comparator 402 as a comparative reference voltage thereof. The trigger voltage level provides an annealing start temperature. Every time the trigger voltage applied to the input terminal 410 in learning is changed, therefore, the state transition of the comparator 402 can be stochastically represented so that desired simulated annealing can be easily carried out by externally applying a logical binary voltage.

While the trigger voltage is changed as "L"→"H"→"L" in the aforementioned structure, a similar damping oscillation voltage can be obtained by changing the same as "H"→"L"→"H".

The order of each element of the probability representing circuit 401 is now studied.

Figure 41A:
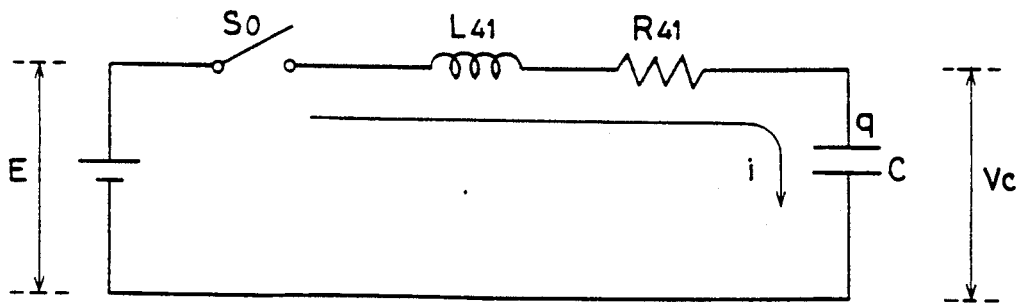
FIGS. 41A and 41B illustrate circuit models for simulating the operation of the probability representing circuit shown in FIG. 39.

The probability representing circuit 401 is divided into two circuit parts. Referring to FIG. 41A, consider a circuit part which is formed by the inductance L41, the resistor R41 and the capacitor C42. FIG. 41A shows an equivalent circuit of this circuit part, i.e., a series circuit of an inductance L41, a resistor R41 and a capacitor C. The value of the capacitor C is regarded as substantially identical to that of the capacitor C42. When a switch S0 is turned on at a time t0, the following differential equations hold at a time $t \geq 0$:

$$E - L41 \cdot di/dt - R41 \cdot i - q/C = 0$$

$$L41 \cdot d^2i/dt^2 + R41 \cdot di/dt + i/C = 0$$

where i represents a current flowing in this series circuit, and q represents the amount of charges stored in the capacitor C.

The current i makes damping oscillation in the following condition:

$$R41^2 < 4 \cdot L41/C$$

The initial condition set for i=0 and q=0 at a time t=0 is:

$$i = \{E \sin\gamma t \cdot \exp(-\alpha t)\}/\gamma L41$$

where $$\alpha = R41/2 \cdot L41$$
$$\gamma = \sqrt{1/C \cdot L41 - R41^2/4 \cdot L41^2}$$

Thus, a voltage $V_c$ appearing at the capacitor C, i.e., a voltage appearing at the node 440 in FIG. 39 is expressed as follows:

$$V_c = E \cdot (1 - (\alpha/\gamma) \cdot \sin\gamma t \cdot \exp(-\alpha t) - \cos\gamma t \cdot \exp(-\alpha t))$$

Therefore, the cycle is expressed as follows:

$$\text{cycle} \sim 2\pi / \sqrt{1/C \cdot L41 - R41^2/4 \cdot L41^2}$$

and the time constant is expressed as follows:

$$\text{time constant} \sim 2 \cdot L41/R41$$

Figure 41B:
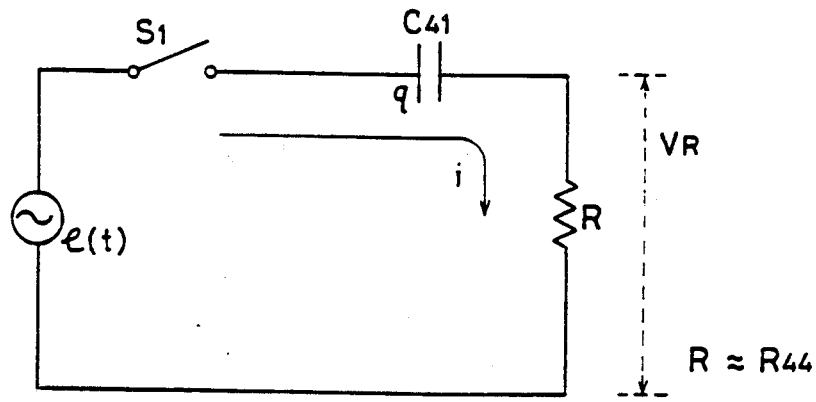

With reference to FIG. 41B, the damping oscillation voltage transferred to the node 430 is now described. A circuit in which an alternating voltage e(t) is transferred to a series circuit of a capacitor C41 and a resistor R through a switch S1 can be regarded as an equivalent circuit of this case. The resistor R is substantially identical to the resistor R44. When the switch S1 is turned on at a time t=0, the following equation holds at a time t≧0:

$$Em \cdot \sin(\omega t + \phi) = R \cdot i + (1/C41) \times \int i \, dt$$

Assuming that the amount q1 of charges at the capacitor C41 is equal to Q1 and a current i=0 at the time t=0, the following relational expressions are obtained:

$$i = (Em/Z) \cdot \sin(\omega t + \phi + \theta) - (1/R \cdot C41) \{Q1 + (Em/\omega Z) \cos(\phi + \theta)\} \cdot \exp(-t/R \cdot C41)$$

$$Z = \sqrt{R^2 + 1/\omega^2 C41^2}$$

$$\theta = \tan^{-1}(1/R \cdot \omega \cdot C41)$$

$$V_R = R \cdot i$$

Therefore, the amplitude of the voltage $V_R$ at the node 430 is expressed as follows:

$$Em/\sqrt{1 + 1/\omega^2 \cdot C41^2 R^2}$$

and a phase shift is expressed as follows:

$$\tan^{-1}(1/R \cdot \omega \cdot C41)$$

From the aforementioned results of analysis, therefore, simulated annealing can be sufficiently implemented if the speed of response of an operational amplifier forming the comparator 402 is faster than the cycle of the damping oscillation voltage. FIGS. 42A(a)-42A(c) and 42B(a)-42B(c) show the results of simulation based on the aforementioned study results. FIGS. 42A(a)-42A(c) show voltage changes at the nodes 410, 440 and 430 in the case of L41=10 μH, C41=C42=10 pF, R41= 10 Ω, R42=3.5 KΩ and R44=1.5 KΩ. The vertical lines represent voltage values, and the horizontal lines represent times.

FIGS. 42B(a)-42B(c) show voltage changes at the nodes 410, 440 and 430 in the case of L41=30 μH, C41=10 pF, C42=5 pF, R41=10 Ω, R42=3.5 KΩ and R44=1.5 KΩ. As understood from FIGS. 43A and 43B, the time constant of damping oscillation are an order of microseconds, and the annealing is performed at high speeds.

Figure 43A:
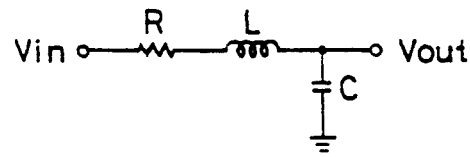
FIGS. 43A and 43B illustrate exemplary circuit structures of the probability representing circuit shown in FIG. 39 directed to an integrated circuit device.
Figure 43B:
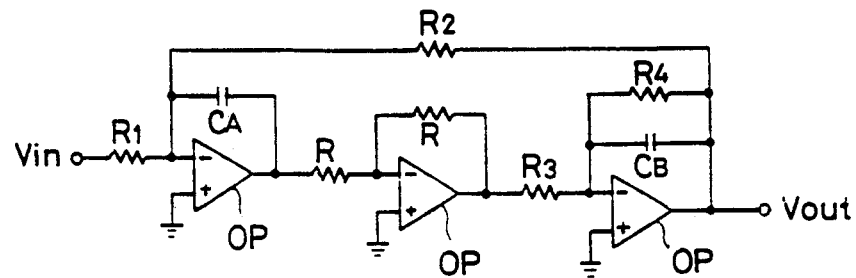

The aforementioned structure requires the inductances, which occupy large areas in the integrated circuit device to significantly hinder high integration. In place of employing an inductor as shown in FIG. 43A, an active RC circuit may be employed as shown in FIG. 43B to form a damping oscillation voltage generating circuit. FIG. 43A shows a passive RLC filter circuit, and FIG. 43B shows a circuit having the same signal transfer characteristics. Since this structure is well known in the art, no particular description is made here. According to this structure, a damping oscillation voltage generating circuit can be implemented in a small area without employing inductors occupying large areas in a semiconductor integrated circuit, by employing operational amplifiers OP as shown in FIG. 43B.

The parameters of respective elements forming probability representing circuits are varied with neuron units. Thus, it is possible to generate noises for the respective neuron units, while simultaneously setting various desired threshold values for the respective neurons.

According to the aforementioned structure, a comparative voltage which makes damping oscillation around a threshold voltage is generated by externally supplying a logical binary voltage so that the damping oscillation voltage can be employed as a comparative reference voltage for a dendrite signal, whereby it is possible to easily repeat stochastic state transition of neurons and simulated annealing by an arbitrary attenuation time.

Figure 44:
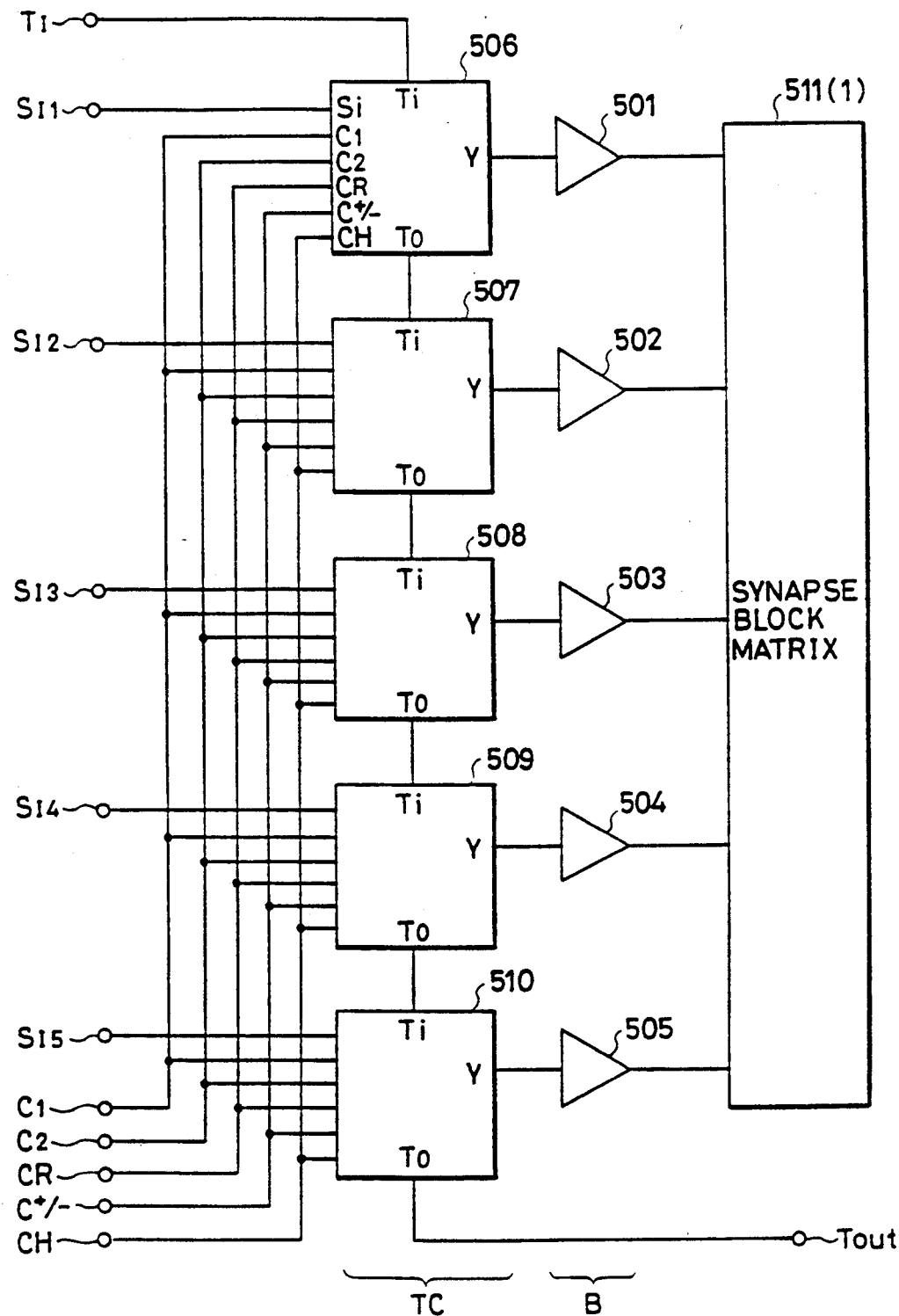
FIG. 44 schematically shows the structure of an educator signal control circuit according to the embodiment of the present invention.

FIG. 44 shows the structure of educator signal control circuits for five neurons. Each of educator signal control circuits 506 to 510 (corresponding to numerals 11 to 15 in FIG. 11 or symbol TC in FIG. 15) has an input terminal Si which receives an axon signal from each neuron, a data input terminal Ti which serially receives educator data or attribute defining data, an output terminal Y which outputs the data received in either terminal Si or Ti or fixed data, a terminal To which outputs the data received at the input terminal Ti, input terminals C1 and C2 which receive operation timing signals for outputting the data received in the input terminal Ti from the output terminal To, an input terminal CR which receives a control signal for setting the output data from the output terminal Y at a first fixed value, an input terminal C± which receives a signal designating the phase in learning, and an input terminal CH which receives a control signal for defining the attribute of the corresponding neuron. In the following description, the input and output terminals of the educator signal control circuits, the control signals supplied to the input and output terminals and the output data are denoted by the same reference numerals.

The output terminals To of the educator signal control circuits 506 to 510 are connected to the input terminals Ti of the next stage educator signal control circuits. Axon signal line drivers 501 to 505 are provided for the respective educator signal control circuits 506 to 510. These axon signal line drivers 501 to 505 receive the Y outputs of the corresponding educator signal control circuits 506 to 510. Thus, the axon signal line drivers 501 to 505 transfer data representing the states of the neurons, i.e., state representing data or state signals, onto corresponding axon signal lines of a synapse block matrix 511. The synapse block matrix 511 corresponds to the synapse representing part 1 or 1' shown in FIG. 10 or 18. The educator signal control circuits 506 to 510 are identical in structure to each other, as concretely shown in FIG. 45.

Figure 45:
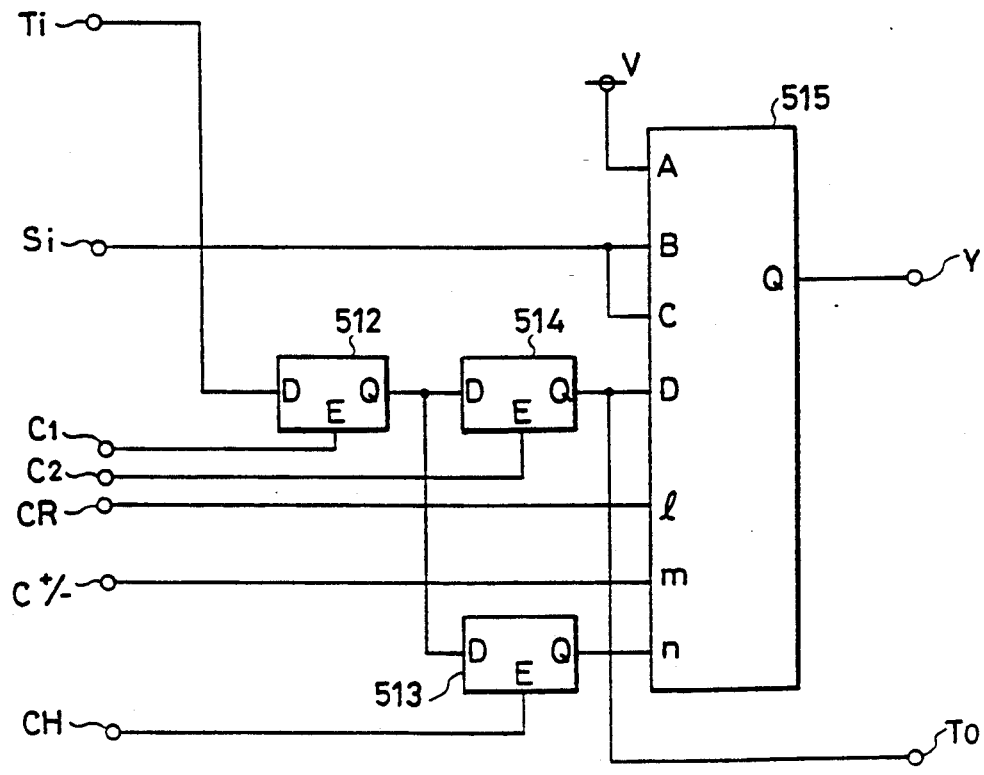
FIG. 45 illustrates an exemplary structure of the educator signal control circuit shown in FIG. 44.

Referring to FIG. 45, each of the educator signal control circuits 506 to 510 includes shift registers 512, 513 and 514, and a selection circuit 515.

The shift register 512 has an input terminal D which is connected to the terminal Ti, a clock input E which receives a control signal C1, and an output Q. The shift register 513 has an input terminal D which receives the Q output of the shift register 512, a clock input terminal E which receives a control signal CH, and an output terminal Q. The shift register 514 has an input terminal D which receives the Q output of the shift register 512, a clock input terminal E which receives a control signal C2, and an output terminal Q. Each of the shift registers 512 to 514 directly propagates the data received at the input terminal D to the output Q and outputs the same when the control signal received in the clock input E goes high, while the same holds the supplied content in the output Q and outputs the same when the input E is at a low level.

The selection circuit 515 has an input terminal A which is connected to a prescribed source potential V, terminals B and C which are connected to the data input terminal Si, an input terminal D which is connected to the output Q of the shift register 514, a terminal l which receives a control signal CR, an input terminal m which receives a control signal C±, and a terminal n which receives the output Q from the shift register 513. The selection circuit 515 forms the so-called four-to-one selection circuit, and selects the data applied to the input terminal A from those supplied to the input terminals A and B when the control signal CR received in the input terminal l is at a low level. When the control signal CR is at a high level, on the other hand, the data supplied to the input terminal B is selected. When the control signal C± supplied to the input terminal m is at a low level, the data supplied to the input terminal C is selected from those supplied to the input terminals C and D. When the control signal C± is at a high level, on the other hand, the data supplied to the input terminal D is selected. When the signal applied to the input terminal n is at a low level, the data selected by the input terminal l from those supplied to the input terminals A to D is outputted from the output terminal Q. When the signal potential applied to the input terminal n is at a high level, on the other hand, the data selected by the input terminal m is derived at the output terminal Q.

Figure 46:
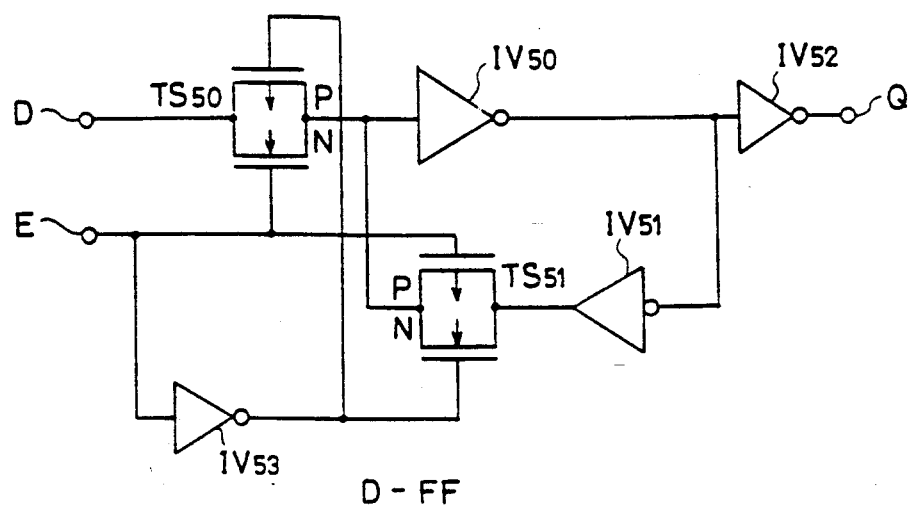
FIG. 46 illustrates exemplary structures of shift registers shown in FIG. 45.

FIG. 46 shows an exemplary structure of each shift register. Referring to FIG. 46, the shift register includes a bidirectional transmission gate TS50 which enters a conducting state in response to the clock signal received in the input terminal E for passing the data received at the input terminal D, an inverter IV50 which inverts and outputs the output of the transmission gate TS50, and another inverter IV52 which inverts the output from the inverter IV50 and outputs the same from the output terminal Q.

In order to provide a data latch function, the shift register further comprises an inverter IV51 which receives the output from the inverter IV50, and a transmission gate TS51 which enters a conducting state in response to the control signal supplied to the clock input E and transfers the output of the inverter IV51 to an input part of the inverter IV50. Each of the transmission gates TS50 and TS51 is formed by a p-channel MOS transistor and an n-channel MOS transistor which are connected in parallel with each other. A further inverter IV53 is provided in order to control on-off operations of the transmission gates TS50 and TS51. When one of the transmission gates TS50 and TS51 is in a conducting state, the other one is cut off. Namely, when the input terminal E is supplied with a high-level signal potential, the transmission gate TS50 enters a conducting state, so that the data received in the input terminal D is derived from the output Q through the inverters IV50 and IV52. When the signal potential received in the input terminal E goes low, on the other hand, the transmission gate TS51 enters a conducting state so that the output of the inverter IV50 is fed back to the input part thereof through the inverter IV51 and the transmission gate TS51. A data holding function is implemented in the shift register since the transmission gate TS50 is in an OFF state at this time.

Figure 47:
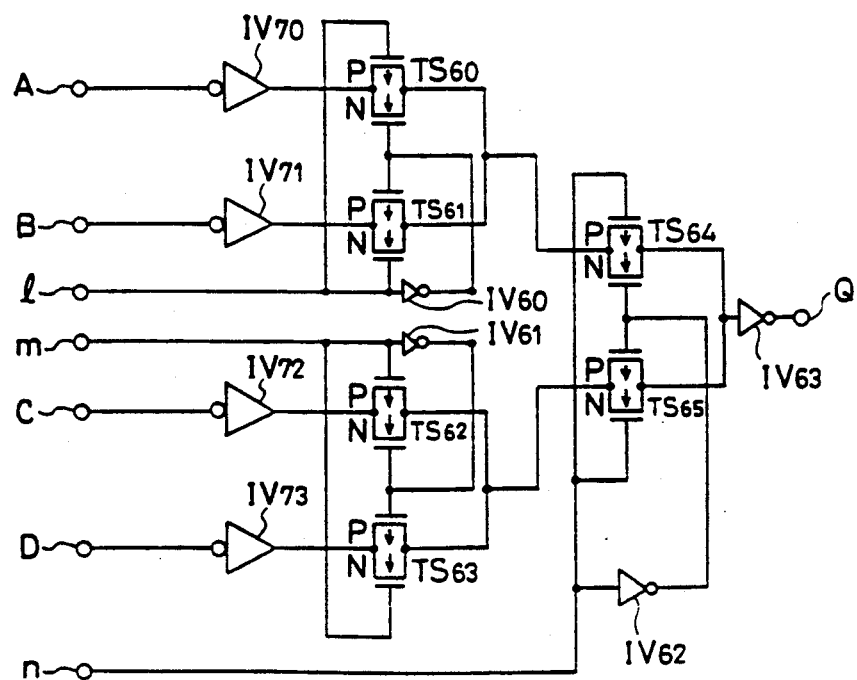
FIG. 47 illustrates an exemplary structure of a selection circuit shown in FIG. 45.

FIG. 47 shows an exemplary structure of the selection circuit 515. Referring to FIG. 47, the selection circuit 515 includes transmission gates TS60 and TS61, conduction states of which are controlled by the control signal received in the input terminal l, transmission gates TS62 and TS63, conduction states of which are controlled by the control signal received in the input terminal m, and transmission gates TS64 and TS65, conduction states of which are controlled by the control signal applied to the input terminal n. Each of the transmission gates TS60 to TS65 is formed by a p-channel MOS transistor and an n-channel MOS transistor which are connected in parallel with each other. An inverter IV60 is provided in order to control on-off operations of the transmission gates TS60 and TS61. An inverter IV61 is provided in order to control on-off operations of the transmission gates TS62 and TS63.

An inverter IV62 is provided in order to control on-off operations of the transmission gates TS64 and TS65. The data received at the input terminal A is transferred to the transmission gates TS60 through an inverter IV70. The data received at the input terminal B is transferred to the transmission gate TS61 through an inverter IV71. The data received at the input terminal C is transferred to the transmission gate TS62 through an inverter IV72. The data applied to the input terminal D is transferred to the transmission gate TS63 through an inverter IV73. The transmission gate TS64 receives the data from either transmission gate TS60 or TS61. The transmission gate TS65 receives the data from either transmission gate TS62 or TS63. Output parts of the transmission gates TS64 and TS65 are coupled to an input part of an inverter IV63. The output of the inverter IV63 is coupled to the output terminal Y through the output terminal Q. The respective pairs of transmission gates TS60 and TS61, TS62 and TS63, and TS64 and TS65 complementarily perform on-off operations. Namely, when one of the pair is in an ON state, the other one enters an OFF state. The operation is now described.

Figure 48:
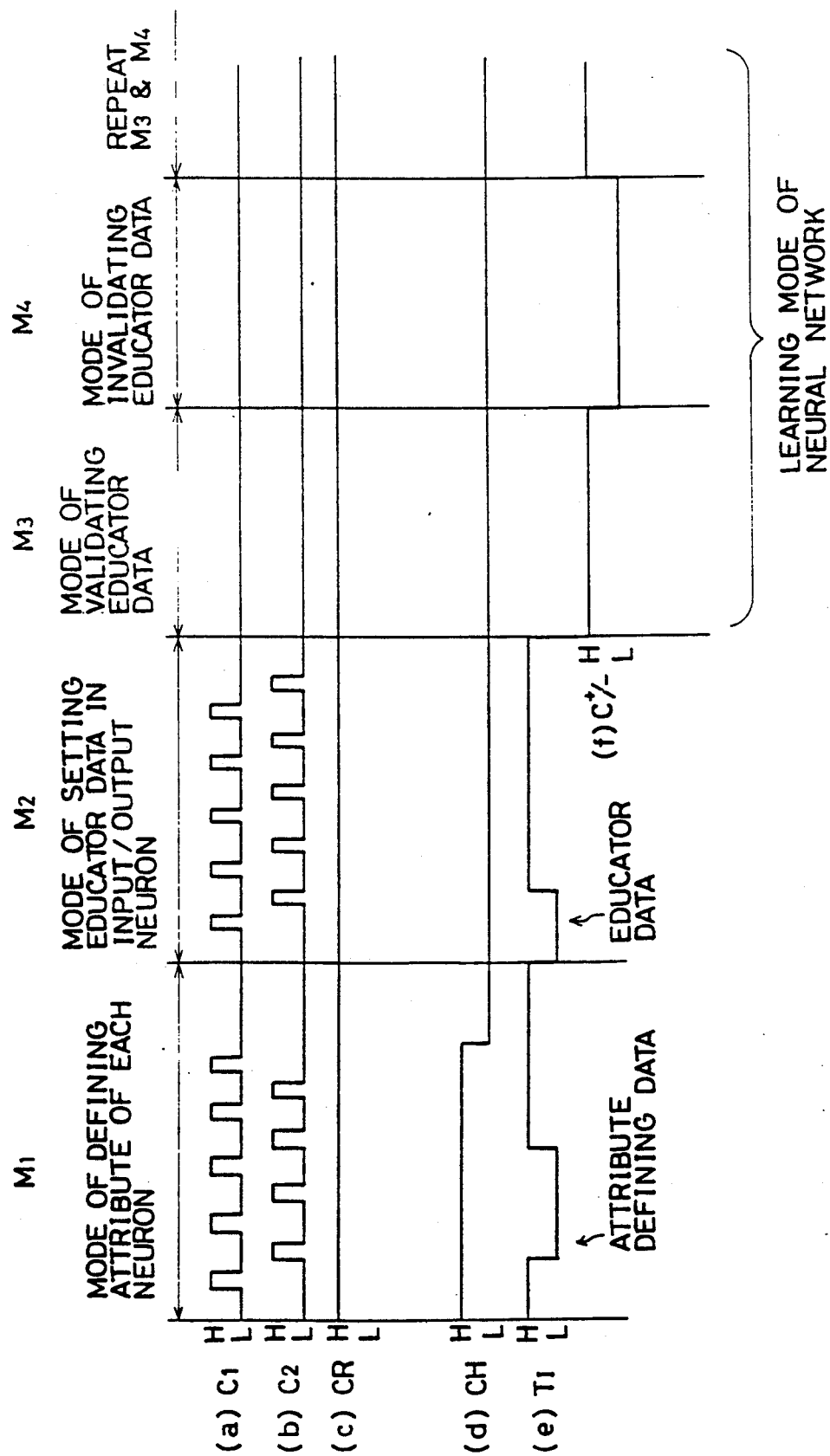
FIG. 48 is a timing chart showing the operation of the educator signal control circuit shown in FIG. 44.

The operation for defining the attributes of the neurons is now described. This operation is adapted to define whether the neurons forming the neural network are input neurons, output neurons or hidden neurons. FIG. 48 is a timing chart showing the operation for defining the attributes of the neurons. In a mode M1 for defining the attribute of each neuron, the control signals supplied to the control signal input terminals CR and CH are set at high levels. Then, the control signals C1 and C2 are alternately generated to serially shift in data defining a desired attribute of the neuron from an input terminal TI and successively transfer the same to the educator signal control circuits 506 to 510. Namely, the attribute defining data are successively shifted from the input terminal Ti to the output terminal To in response to the control signals C1 and C2 through the shift registers 512 and 514 in FIG. 45. In order to set inputs/outputs of the axon signal line drivers 503 and 504 shown in FIG. 44 in states of hidden neurons and to set inputs-/outputs of the drivers 501, 502 and 505 in states of either input or output neurons, for example, the data are set as follows. External attribute defining data TI are so set that the Q outputs of the shift registers 512 included in the educator signal control circuits 508 and 509 are set at low levels and the Q outputs of the shift registers 512 included in the educator signal control circuits 506, 507 and 510 are set at high levels, and are successively shifted in. In order to implement this, the data supplied to the data input terminal TI are changed in accordance with timings of the control signals C1 and C2 as shown in FIG. 48, so that desired attribute defining data can be held in and outputted from the shift registers 512 included in the respective educator signal control circuits.

Then, the control signal CH is brought into a low level so that the data outputted by the shift registers 512 included in the educator signal control circuits 506 to 510 are held in the shift registers 513 included in the educator signal control circuits. Thus, the data held in/outputted from the shift registers 512 are applied to selection signal input terminals n of the selection circuits 515. Consequently, inputs B, i.e., axon signals SI, are selected in the educator signal control circuits corresponding to hidden neurons, while inputs C and D enter selectable states in the educator signal control circuits corresponding to visible neurons. Namely, when a low-level signal is applied to the input n, the selection circuit 515 outputs data supplied to the input A or B from its output terminal Y, while it selects data supplied to the input terminal C or D and transfers the same to the output terminal Y when a high-level signal is applied to its input n. Thus, the input terminals n of the selection circuits 515 included in the educator signal control circuits 508 and 509 are supplied with low-level attribute defining data which are shifted therein while high-level signals are applied to the input terminals l of the selection circuits 515 since the control signal input terminals CR are set at high levels at this time, and hence the drivers 503 and 504 shown in FIG. 44 select and output only data supplied to the input terminals B of the selection circuits 515, i.e., data SI3 and SI4 from the input terminals Si. Therefore, the data supplied from the educator signal control circuits 508 and 509 shown in FIG. 44 to the drivers 503 and 504 can be regarded as state representing data (state signals) for hidden neurons since state representing data (state signals) supplied from the respective neuron representing circuits are directly outputted.

High-level attribute defining data, which are shifted in, are applied to the input terminals n of the selection circuits 515 included in the educator signal control circuits 506, 507 and 510 which are set for visible neurons. Therefore, the educator signal control circuits 506, 507 and 510 transfer/output either the data supplied to the inputs C or D of the selection circuits 515, i.e., data SI1, SI2 and SI5 transferred from the input terminals Si, or the data held in and outputted from the shift registers 514 included in the educator signal control circuits 506, 507 and 510 to the drivers 501, 502 and 505. The data outputted from the educator signal control circuits 506, 507 and 510 are selected in response to signal potentials of the signals which are supplied to the input terminals m, i.e., the control signals $C\pm$. When the control signals $C\pm$ are at low levels, the data SI1, SI2 and SI5 from the input terminals Si are transferred to the corresponding drivers. When the control signals $C\pm$ are at high levels, on the other hand, the data held in and outputted from the shift registers 514 included in the control circuits are transferred to the corresponding drivers.

Assuming that the shift register 514 included in each educator signal control circuit holds educator data, therefore, the data supplied to each driver in response to the signal potential supplied to the control signal input terminal $C\pm$ can be switched between state representing data for an input/output neuron with supply of no educator data and state representing data for an input-/output neuron with supply of educator data. In other words, the data outputted from the drivers 501, 502 and 505 correspond to the state representing data for input-/output neurons, whereby the attributes of the respective neurons are defined.

An operation mode M2 for setting educator data is now described.

After the data for defining the attributes of the neurons are set in the corresponding educator signal control circuits, the control signals CR and CH are held at high and low levels respectively to supply the clock control signals C1 and C2 and serially shift desired educator data in from the data input terminals TI. The data applied to the data input terminals TI can be changed in accordance with the timings of the control signals C1 and C2, so that desired educator data are held in and outputted from the shift registers 514 included in the educator signal control circuits (506, 507 and 510 in the above case holding visible neuron defining data in the shift registers 513. FIG. 48 shows the case of setting high, high and low levels at the shift registers 514 which are included in the educator signal control circuits 506, 507 and 510 respectively. The educator data held in and outputted from the shift registers 514 are outputted from the output terminals Y of the educator signal control circuits 506, 507 and 510 in response to the signal levels of the control signals $C\pm$, as hereinabove described. Thus, the educator data are completely set for the visible neurons.

The operation in a learning mode of the neural network is now described. In the learning mode of the neural network, the attribute defining data and the educator data are set in the respective educator signal control circuits, and then the clock signals C1 and C2 are fixed at low levels while holding the control signals CR and CH at high and low levels respectively.

As hereinabove described, the data supplied to the input terminals Si are regularly transferred to the outputs Y of the educator signal control circuits (508 and 509 in this embodiment) holding the data defining hidden neurons, regardless of the signal potentials of the control signals C±.

On the other hand, the data supplied to the input terminals D, i.e., the educator data held in/outputted from the shift registers 514 are transferred to the outputs Y of the educator signal control circuits (506, 507 and 510 in this embodiment) holding the data defining visible neurons since high-level signals are applied to the input terminals m and n of the selection circuits 515 shown in FIG. 45 when the control signals C± are at high levels.

When the control signals C± are at low levels, low-level signals are applied to the selection signal input terminals m of the selection circuits 515 and high-level signals are applied to the input terminals l and n, the data applied to the input terminals C, i.e., state representing data applied to the input terminals Si are outputted at the output terminals Y. The input terminals Si of the input neurons are regularly fixed at the educator data in the exterior.

In an actual learning mode of the neural network, the signal potentials applied to the control signal input terminals C± are alternately switched between high and low levels to alternately repeat a mode M3 (plus phase for clamping states of input/output neurons at educator data) of validating the educator data and a mode M4 (minus phase for clamping only input neurons at values of the same input pattern as educator data and bringing output neurons into free states) of invalidating the educator data, whereby the respective synapse loads are corrected in learning control circuits (70 in FIG. 12 and FIG. 33) in a next-stage synapse matrix 511.

In order to set new educator data, the operation is again performed from the above described educator data setting mode M2.

A system reset operation of the neural network by the educator signal control circuits is now described. When the potentials of the control signal input terminals CR are set at low levels and the control signal input terminals CH, C1 and C2 are set at high levels while the data input terminals Ti are set at low levels, low-level signal potentials are applied to the selection signal input terminals l and n of the selection circuits 515 included in all educator signal control circuits 506 to 510. Therefore, fixed data V which are applied to the data input terminals A of the selection circuits 515 are outputted at the output terminals Y of all educator signal control circuits 506 to 510. Thus, the system can be reset by the fixed data V.

Although the shift registers are employed as storage elements for storing the educator data and the attribute defining data in the above embodiment, an effect similar to that of this embodiment can also be attained through other storage elements such as flip-flops or latch circuits.

The fixed data employed for resetting the system may be at either high or low levels.

The aforementioned embodiment employs one shift path as a path for shifting in the educator data identically to the path for shifting in the attribute defining data. However, when a plurality of shift paths are provided for shifting in the educator data so that outputs from a plurality of storage elements having functions corresponding to the shift registers 514 are selected by selection circuits and employed as educator data, it is possible to simultaneously shift in a plurality of educator data, thereby to reduce the time required for shifting in the educator data.

Figure 49:
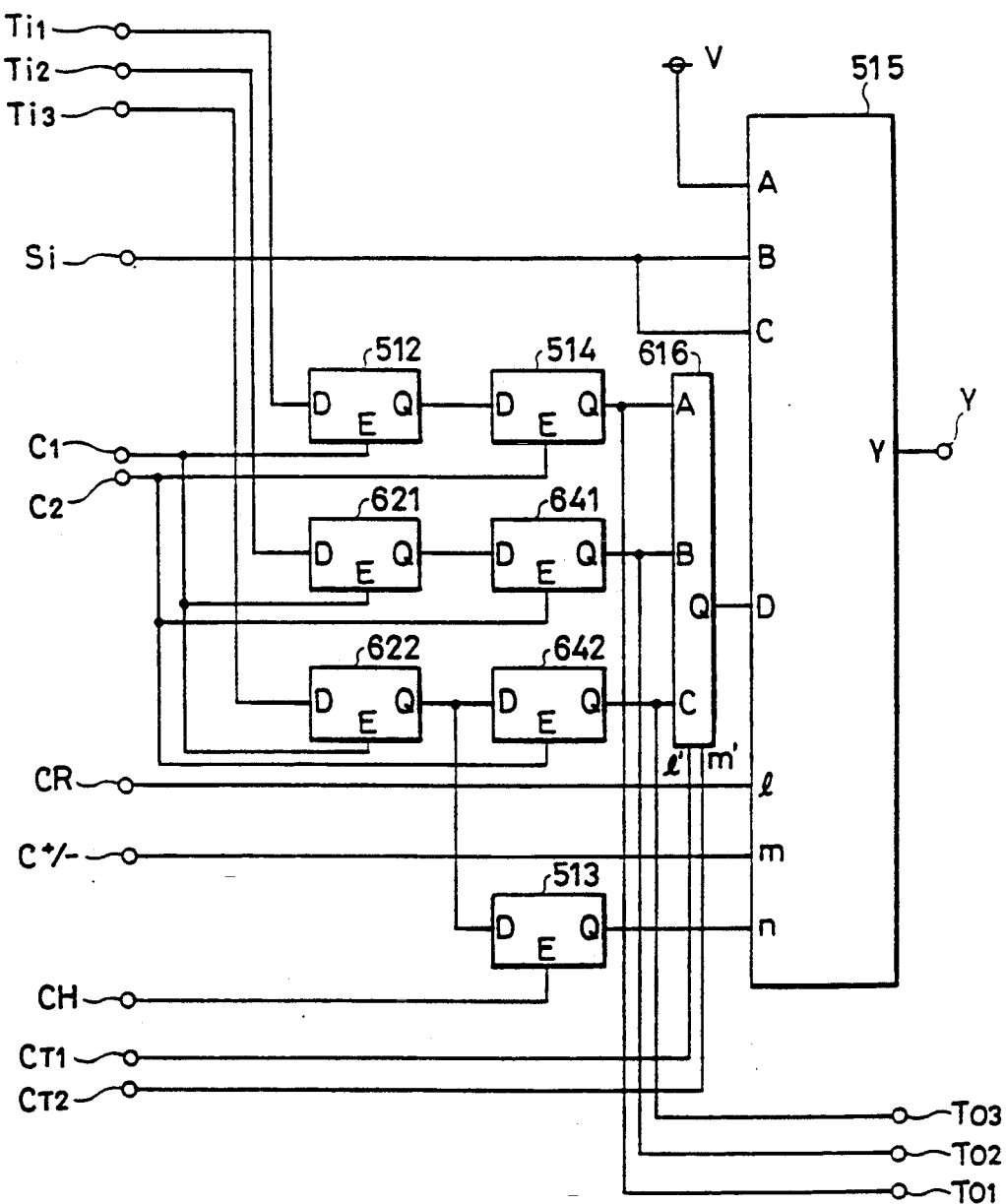
FIG. 49 illustrates the structure of an educator signal control circuit according to a further embodiment of the present invention.

FIG. 49 shows the structure of an educator signal control circuit which can simultaneously shift in a plurality of educator data. Referring to FIG. 49, parts corresponding to those of the structure shown in FIG. 45 are denoted by the same reference numerals. In order to simultaneously latch a plurality of educator data, this circuit is provided with shift registers 621 and 622 having the same function as the shift register 512 shown in FIG. 45 and shift registers 641 and 642 having the same function as the shift register 514. A storage path formed by shift registers 512 and 514 hold and output educator data supplied through an input terminal Ti1. A latch path formed by the shift registers 621 and 641 hold and output educator data supplied through an input terminal Ti2. A latch path formed by the shift registers 622 and 642 hold and output educator data supplied from an input terminal Ti3.

A selection circuit 616 is provided in order to select a plurality of educator data. The selection circuit 616 is a three-to-one selection circuit, which selects and outputs data supplied to input terminals A, B and C in response to signal potentials received through control signals CT1 and CT2. An output Q of the selection circuit 616 is supplied to a D-input of a selection circuit 515.

A plurality of output terminals To1, To2 and To3 are provided in order to transfer the plurality of educator data to a next stage educator signal control circuit. The output terminal To1 receives a Q output from the shift register 514. The output terminal To2 receives a Q output of the shift register 641. The output terminal To3 receives a Q output of the shift register 642.

The selection circuit 616 may have any structure so far as it selects one of a non-conducting state, a state of selecting the input A, a state of selecting the input B and a state of selecting the input C in response to signal levels of four combinations "HH", "HL", "LH" and "LL" of the control signals CT1 and CT2 which are applied to control signal input terminals l' and m'. For example, the circuit 616 may be formed by buffers outputting complementary signal pairs from the control signals CT1 and CT2, AND gates provided in correspondence to the inputs A, B and C for receiving two of four buffer output signal lines, and switches which have an on or off state controlled by the outputs of the AND gates for selecting corresponding inputs. Alternatively, this circuit may be simply adapted to select one of the inputs A, B and C through switches by outputs of shift registers receiving CT1 and CT2 as shift clocks. The operation of the circuit shown in FIG. 49 is now described with reference to FIG. 50 showing a timing chart thereof.

In a mode M1 for defining the attribute of each neuron, control signals CR and CH are set at high levels. The clock control signals C1 and C2 are supplied to terminals C1 and C2, thereby shifting data defining a desired attribute of the neuron in from a serial data input terminal Ti3 and making the same held in the shift register 622. Then the control signal CH is set at a low level so that the data defining the attribute of the neuron held in/outputted from the shift register 622 is held in the shift register 513. Thus, the attribute of each neuron is completely defined. The state of the attribute defining data may be defined before the clock control signal C2 falls to a low level and then the clock control signal C1 rises to a high level. Namely, it is not necessary to particularly synchronize the clock signals C1 and C2 with the output timing for the attribute defining data.

In a mode M2 of setting educator data in a visible neuron, the control signals C1 and C2 are changed by prescribed numbers of times while holding the control signals CR and CH at high and low levels with respect to the educator data of three patterns, similarly to the above embodiment. Thus, the educator data of three patterns are simultaneously shifted in from the serial data in put terminals Ti1, Ti2 and Ti3, and held in the shift registers 514, 641 and 642 respectively. Thus, the educator signal control circuits 506 to 510 hold the educator data of three patterns. In order to change the educator data which are supplied to the neural network, the signal potentials of the control signals CT1 and CT2 supplied to the selection circuit 616 may be simply changed so as to change the educator data selected and outputted by the selection circuit 616. FIG. 50 shows such an example that first educator data is selected when the control signals CT1 and CT2 of the selection circuits 616 are at high and low levels while second educator data is selected when the control signals CT1 and CT2 are at low and high levels respectively. Due to such structure, there is no need to again shift new educator data in from the exterior, whereby the time required for setting the educator data can be reduced.

Figure 50:
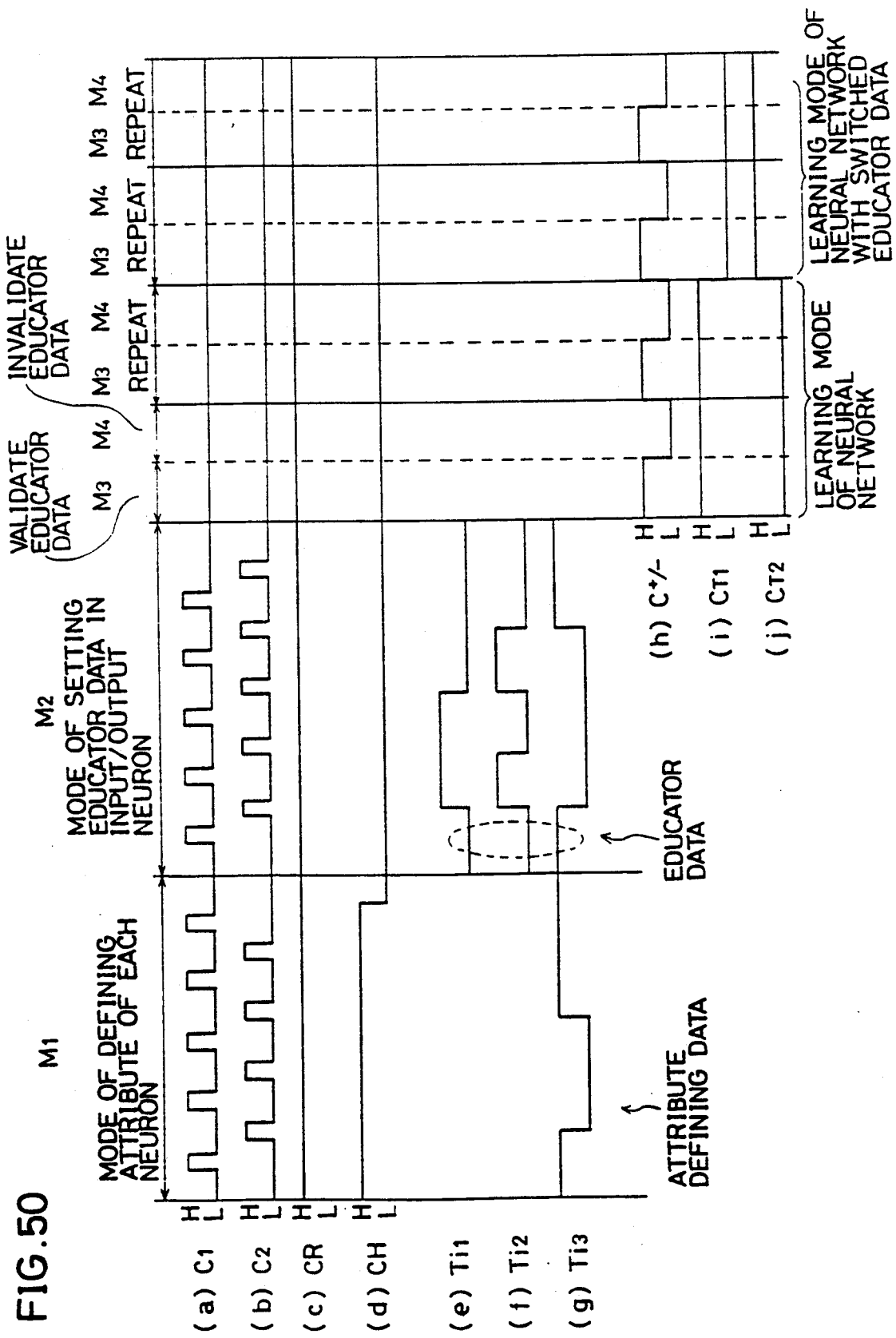
FIG. 50 is a timing chart showing the operation of the educator signal control circuit shown in FIG. 49.

After the educator data is selected by the input control signals CT1 and CT2, the learning mode may be performed to alternately carry out plus and minus phase operations, as shown in FIG. 50.

Figure 51:
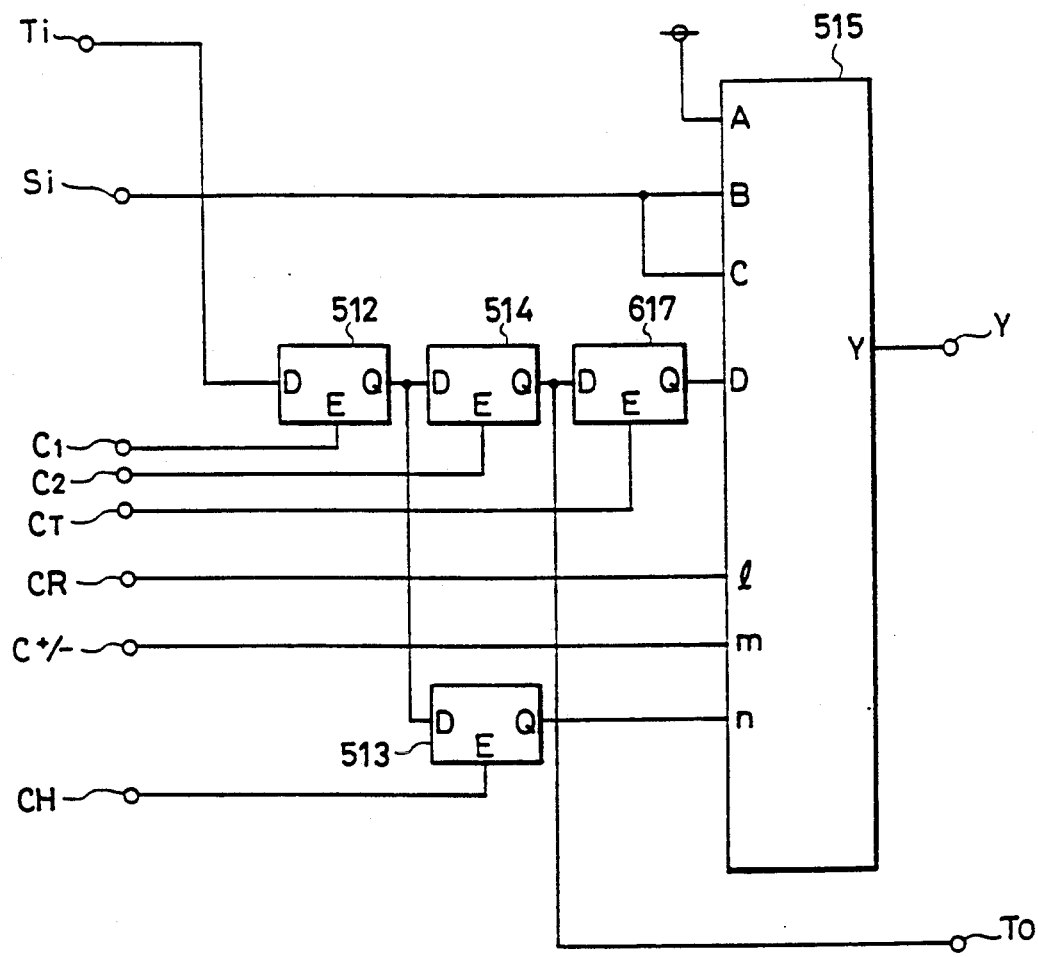
FIG. 51 illustrates the structure of an educator signal control circuit according to a further embodiment of the present invention.
Figure 52:
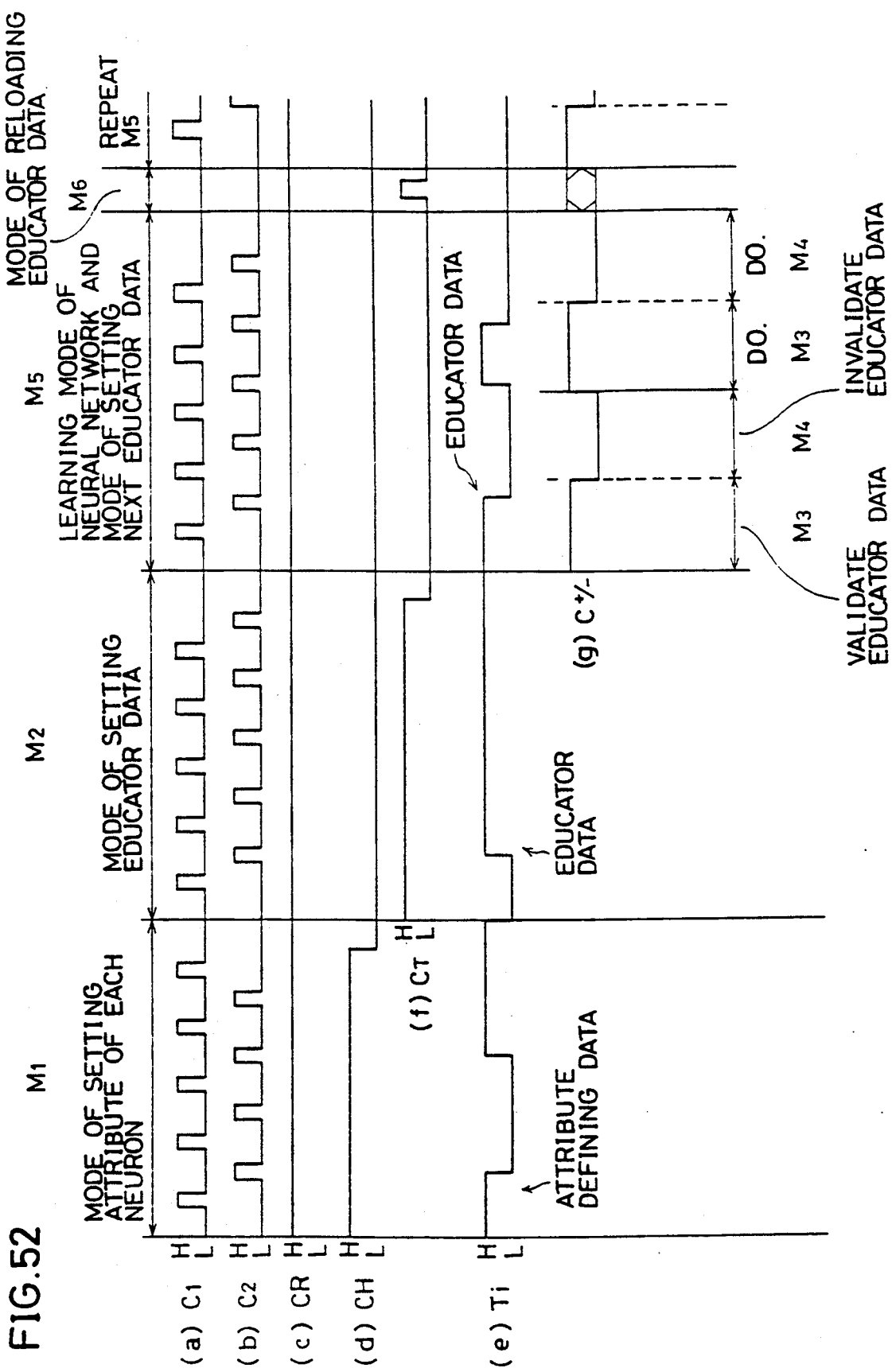
FIG. 52 is a timing chart showing the operation of the educator signal control circuit shown in FIG. 51.

In the above educator signal control circuit, the setting the educator data and the learning of the neural network are separately and sequentially carried out. Alternatively, it is also possible to employ a circuit structure for simultaneously carrying out the learning of the neural network and the setting of educator data. A circuit structure which can simultaneously carry out learning modes M3 and M4 and a mode M2 of setting educator data through one shift path is now described with reference to FIG. 51. Referring to FIG. 51, parts corresponding to those of the educator signal control circuit shown in FIG. 45 are denoted by the same reference numerals. In the structure shown in FIG. 51, an additional shift register 617 is provided between a shift register 514 and an input D of a selection circuit 515. A control signal CT is applied to a clock input E of the shift register 617. The operation of the educator signal control circuit shown in FIG. 51 is now described with reference to FIG. 52 showing a timing chart thereof.

In a mode M1 of defining the attribute of each neuron, both of control signals CR and CH are set at high levels and the control input CT of the shift register 617 is set at a low level. Clock signals C1 and C2 are supplied by prescribed numbers of times in this state, so that data defining a desired attribute of the neuron is shifted in through a serial data input terminal Ti and held in a shift register 512. Then, the control signal CH is set at a low level, so that the attribute defining data for the neuron held in and outputted from the shift register 512 is held in a shift register 513.

In the mode M2 of setting the educator data, the control signal CT is set at a high level while the control signals CR and CH are set at high and low levels respectively, and the clock control signals C1 and C2 are supplied by prescribed numbers of times, so that educator data is shifted in the shift register 512 from the serial data input terminal Ti. Then, the control signal CT is set at a low level, so that the educator data held in and outputted from the shift register 514 is held in the shift register 617.

Figure 53:
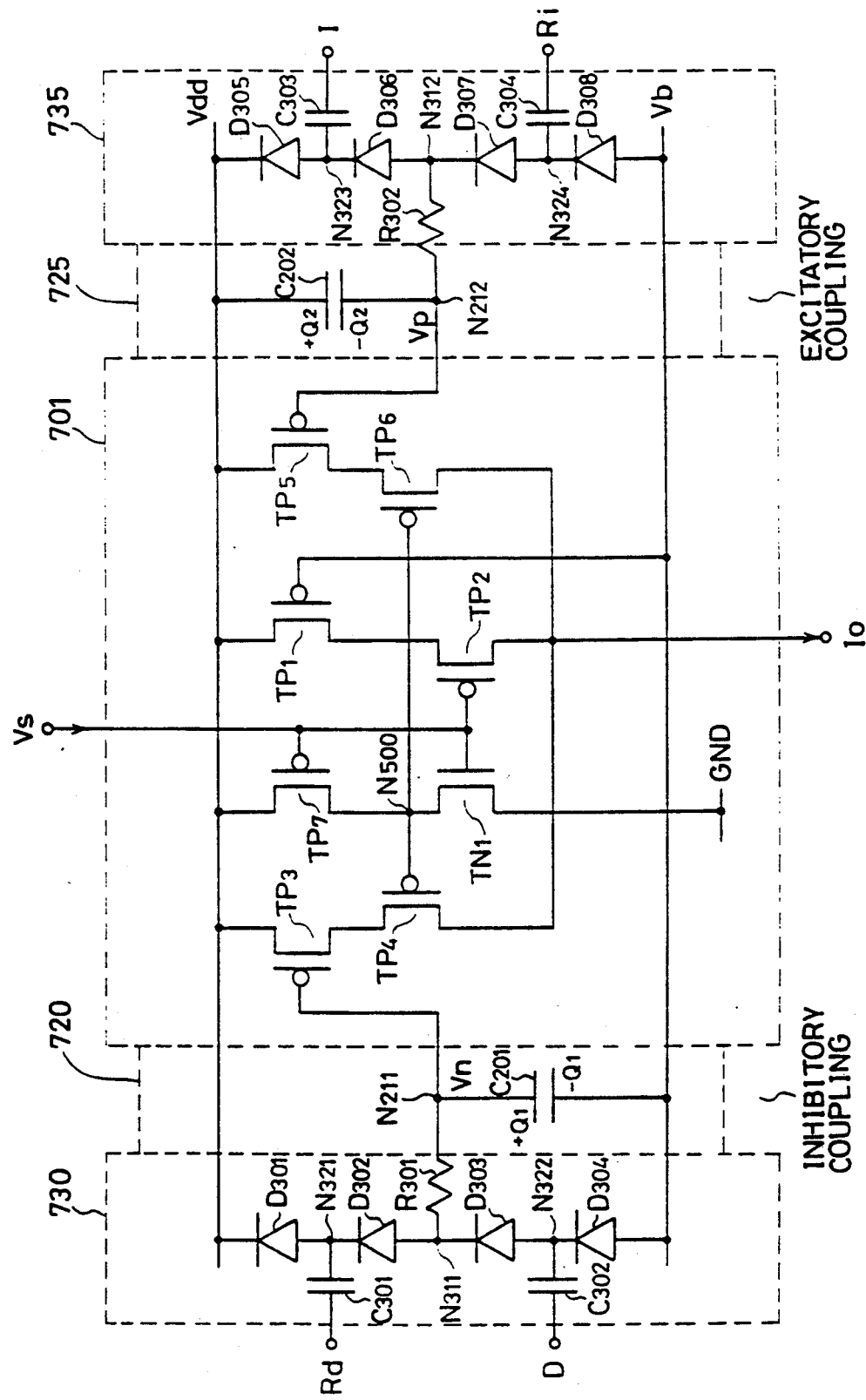
FIG. 53 illustrates the structure of a synapse representing circuit according to a further embodiment of the present invention.

The educator data held in the shift register 617 remains unchanged until the control signal CT is set at a high level. When the control signal CT is set at a low level, therefore, educator data to be subsequently set can be held in the shift register 514 by the clock signals C1 and C2 while supplying educator data to the neural network, as shown in FIG. 53. Thus, it is possible to alternately convert a control signal C± to high and low levels for learning in the learning mode of the neural network, while simultaneously latching the educator data in the shift register 514. In order to change the educator data supplied to the neural network, the control signal CT may be raised up to a high level once so that the educator data latched in the shift register 514 is transferred to and held in the shift register 617. When the control signal CT is again lowered to a low level, the educator data is supplied from the shift register 617 to a D-input of the selection circuit 515, so that learning of the neural network is made in response to the control signal C±.

According to the above structure, educator data can be shifted in with no bad influence to the neural network during learning since the shift register 617 holds previous educator data when new educator data is shifted in. Thus, it is possible to carry out the mode of setting the educator data and the learning mode of the neural network in parallel as shown in the timing chart of FIG. 52.

According to any one of the educator signal control circuits having the aforementioned structures, the attribute of each neuron can be arbitrarily defined as a hidden or visible neuron so that educator data can be arbitrarily set for the neuron defined as a visible neuron, while it is possible to implement a structure of arbitrarily switching an outputted state of the visible neuron between a state with supply of an educator signal and that with supply of no educator signal by a control signal input which is applied to a selection circuit, through a simple circuit structure. Thus, it is possible to integrate educator signal control circuits, which have been generally provided in the exterior of a chip, into a semiconductor chip to singularize a chip for an integrated circuit device which is provided with a learning function.

The aforementioned various control signals may be applied from the exterior through pin terminals which are provided on the chip, or may alternatively be generated by control signals from a processor which is separately provided in the interior.

In each of the above embodiments, the synapse load values in the synapse load representing circuits are digitally stored through a counter as shown in FIG. 27, for example. Alternatively, it is also possible to store synapse load value information in a capacitor in the form of charges, as shown in FIG. 53.

Referring to FIG. 53, a synapse load representing circuit includes synapse load storage circuits 720 and 725 which store synapse load values, a synapse coupling representing circuit 701 which joins the synapse loads stored in the synapse load storage circuits 720 and 725 to a supplied axon signal (state signal voltage) $V_s$ and transfers the results onto dendrite signal lines in the form of current signals, and synapse load correcting circuits 730 and 735 which correct the synapse load values stored in the synapse load storage circuits 720 and 725 in response to pulse signals from a learning control circuit (described below).

The synapse coupling representing circuit 701 includes p-channel MOS transistors TP1 to TP7 and an n-channel MOS transistor TN1. The p-channel MOS transistors TP1 and TP2 provide a first current pass circuit and the p-channel MOS transistors TP3 and TP4 form a second current pass circuit, while the p-channel MOS transistors TP5 and TP6 form a third current pass circuit. The p-channel MOS transistor TP7 and the n-channel MOS transistor TN1 are complementarily connected with each other to form an inverter.

The p-channel MOS transistor TP1 has a source which is connected to a source voltage node $V_{dd}$, a gate which is connected to a bias voltage node $V_b$, and a drain which is connected to the source of the p-channel MOS transistor TP2. The p-channel MOS transistor TP2 has a gate which is coupled to a state signal input node $V_s$, and a drain which is connected to a synapse coupling current output node Io.

The p-channel MOS transistor TP3 has a source which is connected to the source voltage node $V_{dd}$, a gate which is coupled to the output of the synapse load storage circuit 720 storing an inhibitory synapse load value, and a drain which is connected to the source of the p-channel MOS transistor TP4. The p-channel MOS transistor TP4 has a gate which is connected to an output node N500 of the inverter, and a drain which is connected to the synapse coupling current output node Io.

The p-channel MOS transistor TP5 has a source which is connected to the source voltage node $V_{dd}$, a gate which is coupled to the output of the synapse load storage circuit 725 storing an excitatory synapse load value, and a drain which is connected to the source of the p-channel MOS transistor TP6. The p-channel MOS transistor TP6 has a gate which is connected to the output node N500 of the inverter, and a drain which is connected to the synapse coupling current output node Io.

The p-channel MOS transistor TP7 has a source which is connected to the source voltage node $V_{dd}$, a gate which is coupled to the state signal input node $V_s$, and a drain which is connected to the source of the n-channel MOS transistor TN1. The n-channel MOS transistor TN1 has a gate which is coupled to the state signal input node $V_s$, and a source which is connected to the ground potential GND. The p-channel MOS transistors forming each current pass circuit are identical in channel width and current suppliability to each other. Namely, the p-channel MOS transistors TP1, TP3 and TP5 are identical in channel width to each other, while the p-channel MOS transistors TP2, TP4 and TP6 are identical in channel width to each other.

The synapse load storage circuit 720 for storing an inhibitory synapse load value is formed by a capacitor C201. The capacitor C201 has a first electrode which is connected to a node N211, and a second electrode which is connected to the bias voltage node $V_b$. The first electrode of the capacitor C201 is connected to the gate of the p-channel transistor TP3 through the node N211.

The synapse load storage circuit 725 for storing an excitatory synapse load value is formed by a capacitor C202. The capacitor C202 has a first electrode which is connected to the source voltage node $V_{dd}$, and a second electrode which is connected to a node N212. The node N212 is connected to the gate of the p-channel MOS transistor TP5.

The synapse load correcting circuit 730 corrects the synapse load value stored in the synapse load storage circuit 720 in response to the pulse signal from the learning control circuit. The synapse load correcting circuit 730 includes diodes D301, D302, D303 and D304, capacitors C301 and C302, and a resistor R301. The diodes D302 and D301 are connected in series between a node N311 and the source voltage node $V_{dd}$ forwardly from the node N311. The diodes D303 and D304 are connected in series between the node N311 and the bias voltage node $V_d$ reversely from the node N311. The capacitor C301 is interposed between a node N321 (junction between the diodes D301 and D302) and a learning control terminal Rd. The capacitor C302 is interposed between a node N322 and a learning control terminal D. The resistor R301 is connected in series between the node N311 and a first electrode of the capacitor C201.

The capacitor C301 and the diodes D301 and D302 provide a path for extracting positive charges stored in the capacitor C201 in response to a control signal which is supplied to the learning control terminal Rd. The diodes D303 and D304 and the capacitor C302 provide a path for injecting positive charges in to the capacitor C201 in response to a control signal which is supplied to the learning control terminal D.

The excitatory synapse load correcting circuit 735 corrects the synapse load value stored in the synapse load storage circuit 725 for storing an excitatory synapse load value. The synapse load correcting circuit 735 includes diodes D305, D306, D307 and D308, capacitors C303 and C304, and a resistor R302. The diodes D306 and D305 are connected in series between a node N312 and the source voltage node $V_{dd}$ forwardly from the node N312. The diodes D307 and D308 are connected in series between the node N312 and the bias voltage node $V_b$ reversely from the node N312. The capacitor C303 is interposed between a node N323 (junction between the diodes D305 and D306) and a learning control terminal I. The capacitor C304 is interposed between a node N324 (junction between the diodes D307 and D308) and a learning control terminal Ri. The resistor R302 is interposed in series between the nodes N312 and N212. The diodes D306 and D305 provide a path for injecting negative charges into the capacitor C202, while the diodes D307 and D308 provide a path for extracting negative charges from the capacitor C202.

In general, the bias voltage $V_b$ and the source voltage $V_{dd}$ satisfy the following relation:

$$V_{GND} \leq V_b < V_{dd}$$

The operation is now described. In the following description, signal input terminals and signals supplied to the respective input terminals are denoted by the same reference numerals.

The operation of the synapse coupling representing circuit 701 is first described. When a state signal voltage $V_s$ (state "1" is represented by a high level and state "0" is represented by a low level) supplied to the gate of the p-channel MOS transistor TP2 is at a high level in the current pass circuit formed by the p-channel MOS transistors TP1 and TP2, the p-channel MOS transistor TP2 is in an OFF state. Therefore, no current flows from the source voltage node $V_{dd}$ to the signal current output node Io. In general, a voltage $V_{io}$ applied to the output node Io is as follows:

$$VGND \leq V_{io} \leq V_b$$

When the state signal voltage $V_s$ is at a low level, on the other hand, the p-channel MOS transistor TP2 enters an ON state. In this case, therefore, a constant current, which is defined by the bias voltage $V_b$ supplied to the gate of the p-channel MOS transistor TP1, flows form the source voltage node $V_{dd}$ through the transistors TP1 and TP2.

In the current pass circuit formed by the p-channel MOS transistors TP3 and TP4 and that formed by the p-channel MOS transistors TP5 and TP6, an inverted signal of the state signal voltage $V_s$ is supplied to the gates of the transistors TP4 and TP6 through an inverter (formed by the transistors TP7 and TN1). When the state signal voltage $V_s$ is at a high level, therefore, a constant current, which is defined by the gate voltages of the transistors TP3 and TP5, flows from the source voltage node $V_{dd}$ to the signal current output node Io. When the state signal voltage $V_s$ is at a low level, on the other hand, both of the p-channel MOS transistors TP4 and TP6 enter OFF states and hence no currents flow to the current pass circuits.

Thus, the current pass circuit which is formed by the transistors TP1 and TP2 and the two current pass circuits which are formed by the p-channel MOS transistors TP3 and TP4 and the p-channel MOS transistors TP5 and TP6 complementarily operate in response to the state signal voltage $V_s$, to carry the current from the source voltage node $V_{dd}$ to the signal current output node Io.

The gate voltages of the p-channel MOS transistors TP3 and TP5, which define the current flowing to the signal output node Io when the state signal voltage $V_s$ is at a high level, are set by the amounts of charges stored in the capacitors C201 and C202 respectively. Namely, the following voltage is generated at the node N212 which is connected to the gate of the p-channel MOS transistor TP5:

$$V_p = V_{dd} = Q2 \cdot C2$$

where C2 represents the capacitance of the capacitor C202, and $-Q2$ represents the amount of charges stored in the electrode of the capacitor C202 which is connected to the node N212.

On the other hand, the following voltage $V_n$ is generated at the node N211 which is connected to the gate of the p-channel MOS transistor TP3:

$$V_n = V_b + Q1 \cdot C1$$

where C1 represents the capacitance of the capacitor C201, and Q1 represents the amount of charges stored in the electrode of the capacitor C201 which is connected to the node N211.

When the state signal voltage $V_s$ is at a high level, therefore, no current flows in the current pass circuit which is formed by the transistors TP5 and TP6 in the case of $-Q2=0$, while the transistor TP deeply enters an ON state as the absolute value of $-Q2$ is increased, so that the current is increased.

In the case of $Q1=0$, on the other hand, a current flows in the current pass circuit which is formed by the transistors TP3 and TP4 in the same amount as that provided by the current pass circuit which is formed by the transistors TP1 and TP2 in the case of $V_s=$"L" since the bias voltage $V_b$ is applied to the gate of the transistor TP3, while the current is reduced as Q1 is increased. Thus, the amount Q1 of charges stored in the capacitor C201 represents an inhibitory synapse load value, while the amount Q2 of charges stored in the capacitor C202 represents an excitatory synapse load value.

The operations of the synapse load correcting circuits 730 and 735 are now described. Since the synapse load correcting circuits 730 and 735 are formed by charge pump circuits, charge pump operations are described with reference to FIGS. 54A and 54B.

Figure 54A:
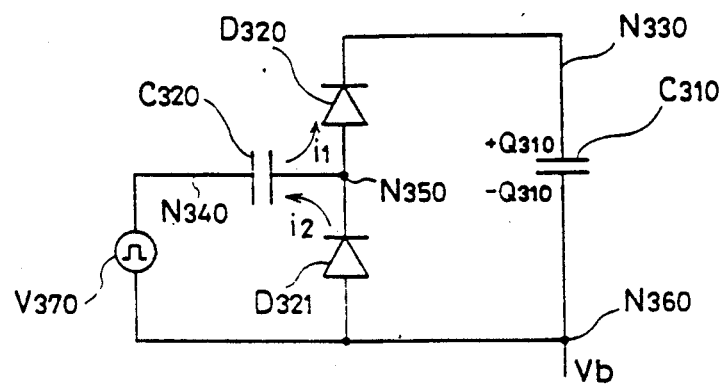
FIGS. 54A and 54B are diagrams for illustrating the operation of a synapse load value storage circuit and a synapse load correcting circuit shown in FIG. 53.

Referring to FIG. 54A, a charge pump operation for injecting charges into a capacitor C310 is implemented by diodes D320 and D321, a capacitor C320, and a pulsing signal generator V370. The diode D320 has an anode which is connected to a node N350, and a cathode which is connected to a first electrode (node N330) of the capacitor C310. The diode D321 has a cathode which is connected to the node N350, and an anode which is connected to a second electrode (node N360) of the capacitor C310. The capacitor C320 has a first electrode which is connected to the pulsing signal generator V370 through a node N340, and a second electrode which is connected to the node N350. A bias voltage $V_b$ is applied to the node N360. The operation is now described.

Consider that the pulsing signal generator V370 generates a pulsing signal. This pulsing signal is supplied between the nodes N360 and N340. When the pulsing signal rises from a low level to a high level, the potential of the node N350 is increased through the capacitor C320, so that the diode D320 enters an ON state. Thus, a current i1 flows from the node N350 to the node N335. When the pulsing signal falls from a high level to a low level, the potential of the node N350 falls in the negative direction, so that the diode D321 enters an ON state. Thus, a current i2 flows from the node N360 to the node N350. That is, a current flows into the node N330 every cycle of the pulsing signal to charge the capacitor C310, thereby increasing the charges stored in the capacitor C310. The values of the currents i1 and i2 are determined by capacitances of the capacitors C310 and C320, the amount Q310 of charges stored in the capacitor C310, and forward I-V (current-voltage) characteristics of the diodes D320 and D321.

Figure 54B:
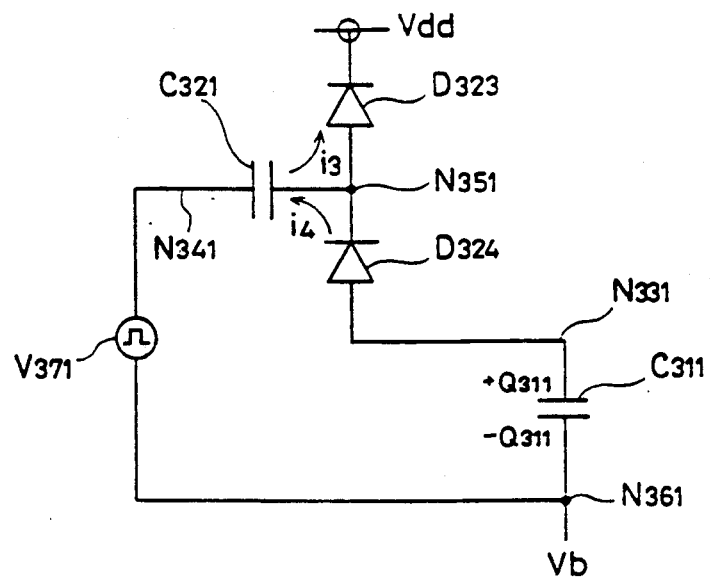

With reference to FIG. 54B, a charge pump operation for extracting charges from a capacitor is now described. The charge pump operation is implemented by diodes D323 and D324 and a capacitor C321 in FIG. 54B. The diode D323 has a cathode which is connected to a source voltage node $V_{dd}$, and an anode which is connected to a node N351. The diode D324 has a cathode which is connected to the node N351, and an anode which is connected to a first electrode of a capacitor C311 through a node N331. The capacitor C321 has a first electrode which is connected to a pulsing signal generator V371 through a node N341, and a second electrode which is connected to the node N351. A second electrode of the capacitor C311 is connected to a bias voltage node $V_b$ through a node N361. The operation is now described.

The signal generator V371 is activated to supply a pulsing signal between the nodes N341 and N361. When the pulsing signal rises from a low level to a high level, charges are supplied to the node N351 so that the diode D323 enters an ON state and a current i3 flows from the node N351 to the source voltage node $V_{dd}$. When the pulsing signal falls from a high level to a low level, on the other hand, the potential of the node N351 falls so that the diode D324 enters an ON state and a current i4 flows from the node N331 to the node N351. That is, a current flows to the node $V_{dd}$ from the node N331 through the node N351 every cycle of the pulsing signal, to reduce the amount Q311 of charges stored in the capacitor C311. The values of the currents i3 and i4 are determined by the amount Q311 of the charges stored in the capacitor C311 and forward I-V characteristics of the diodes D323 and D324.

The synapse load correcting circuit 730 shown in FIG. 53 is obtained by connecting the two charge pump circuits shown in FIGS. 54A and 54B so that the capacitors C310 and C311 are in common. That is, the node N331 shown in FIG. 54B is in common with the node N330 shown in FIG. 54A, while the node N360 is in common with the node N361. The capacitors C311 and C310 correspond to the capacitor C201 shown in FIG. 53. In the structure shown in FIG. 53, the resistor R301 is interposed between the nodes N211 and N311. However, this resistor R301 is provided to adjust the time for correcting the amount of charges of the capacitor C201, and no significant difference is caused in the charge pump operation even if the resistance value is zero.

Correspondence between the synapse load correcting circuit 730 shown in FIG. 53 and the respective elements shown in FIGS. 54A and 54B is as follows: A common capacitor formed by the capacitor C310 (FIG. 54A) and the capacitor C311 (FIG. 54B) corresponds to the capacitor C210 (FIG. 53), and the diodes D320, D321, D323 and D324 (FIGS. 53A and 53B) correspond to the diodes D303, D304, D301 and D302 (FIG. 53) respectively. The capacitor C320 shown in FIG. 54A and the capacitor C321 shown in FIG. 54B correspond to the capacitors C302 and C301 shown in FIG. 53 respectively, while the node N340 shown in FIG. 54A and the node N341 shown in FIG. 54B correspond to the nodes D and Rd respectively. When a pulsing signal is supplied to the node Rd, therefore, the amount of charges stored in the capacitor C201 is reduced by the diodes D302 and D301, while the amount of charges stored in the capacitor C201 is increased when a pulsing signal is supplied to the node D.

Similarly, as to the other synapse load correcting circuit 735, a common capacitor of the capacitors C310 and C311 shown in FIGS. 54A and 54B corresponds to the capacitor C202. In this case, however, the first electrode of the capacitor C202 is connected not to the bias voltage $V_b$ but to the source voltage $V_{dd}$. The diodes D320, D321, D323 and D324 shown in FIGS. 54A and 54B correspond to the diodes D307, D308, D305 and D306 of the correcting circuit 735 respectively. The capacitor C320 shown in FIG. 54A and the capacitor C321 shown in FIG. 54B correspond to the capacitors C304 and C303 of the correcting circuit 735 respectively, while the node N340 (FIG. 54A) and the node N341 (FIG. 54B) correspond to the nodes Ri and I respectively.

When a pulsing signal is supplied to the node Ri, therefore, the amount of negative charges stored in the electrode of the capacitor C202, which is connected to the node N212, is reduced to increase the voltage $V_p$, while the amount $-Q2$ of negative charges in the capacitor C202 is increased by injection of negative charges/extraction of positive charges through the diode D306 to reduce the voltage $V_p$ at the node N212 when a pulsing signal is supplied to the node I.

Due to the aforementioned structure, increase/decrease of the amounts of charges stored in the capacitors C201 and C202 can be controlled in response to the numbers of pulse signals supplied to the nodes Rd, D, I and Ri, whereby the voltages $V_n$ and $V_p$ at the nodes N211 and N212 for determining the current value flowing out from the output terminal Io can be controlled when the state signal voltage $V_s$ is at a high level.

In the case of the synapse coupling correcting circuit shown in FIG. 53, the current pass circuits are formed by series-connected p-channel MOS transistors respectively. In this case, a constant current corresponding to the synapse load value can be regularly derived at the output terminal Io regardless of an outputted load and a potential variation thereof similarly to the current decoder circuit structures shown in FIGS. 28 and 30, whereby correct synapse coupling can be represented. Description is now made on the structure and operation of a learning control circuit 850, which supplies control pulse signals to the learning control terminals Rd, D, I and Ri in order to correct the synapse load value of the synapse representing circuit shown in FIG. 53 in accordance with learning rules (described below).

Figure 55:
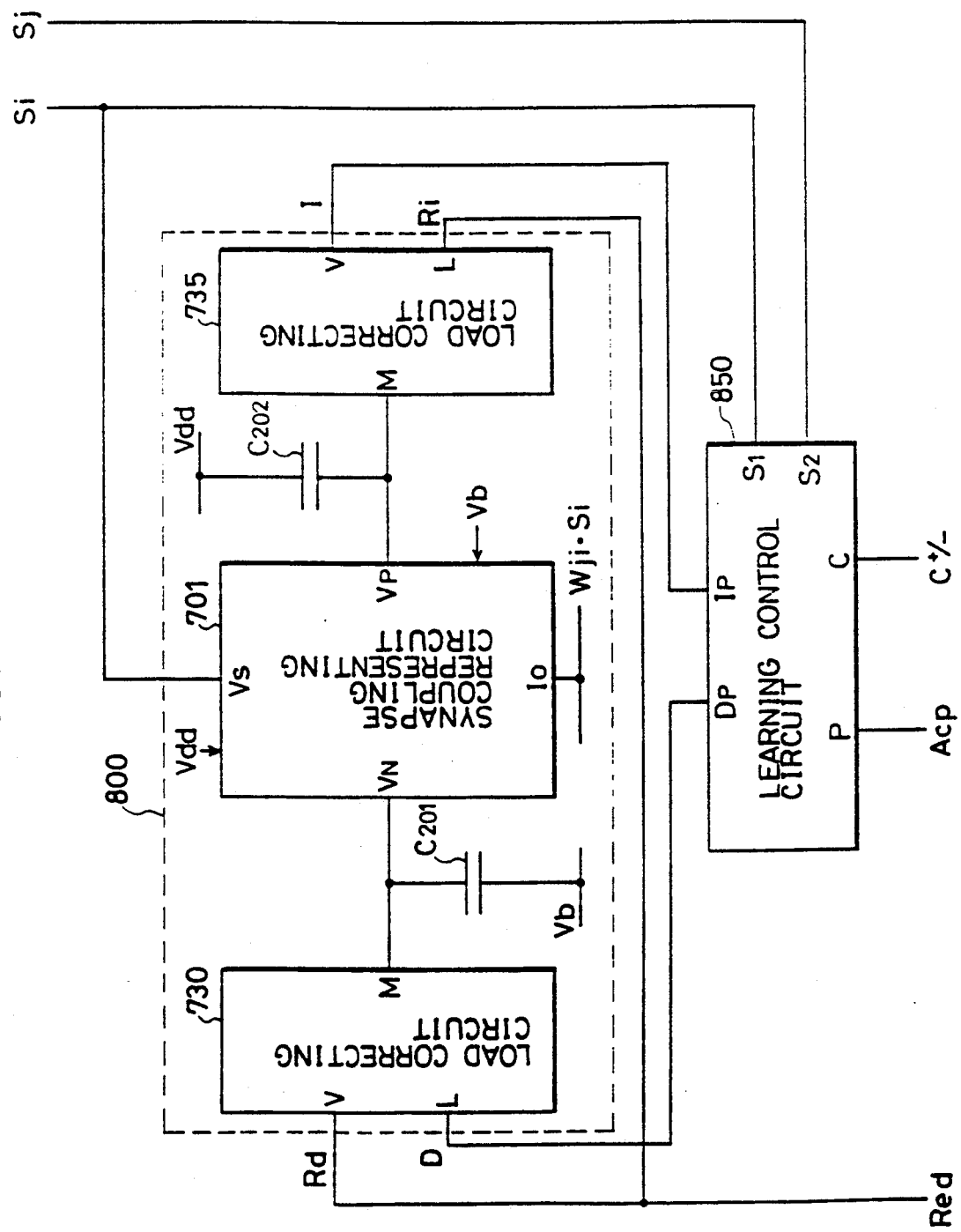
FIG. 55 illustrates the structure of a self-organizable synapse representing circuit which is obtained through the synapse representing circuit shown in FIG. 53.

Referring to FIG. 55, the learning control circuit 850 includes a terminal P which receives a control signal Acp indicating presence/absence of learning, a terminal C which receives a signal C± indicating a learning phase, a terminal Ip which generates a variation control signal for an excitatory synapse load value in a plus phase, a control terminal Dp which derives a variation control signal for an inhibitory synapse load value in a minus phase, and terminals S1 and S2 which receive state signals Si and Sj respectively. The terminal Dp is connected to the D-input terminal of the correcting circuit 730, and the terminal Ip is connected to the I-input terminal of the correcting circuit 735. Control signals Red are supplied to the terminals Rd and Ri of the correcting circuits 730 and 735 respectively. The operation is now briefly described. The control signal Acp is fixed at a high level in non-learning, while a pulse signal is supplied to the terminal P in learning.

In non-learning, outputs of the terminals Dp and Ip are fixed at low levels regardless of the states of signals which are applied to the terminals S1, S2 and C, and no learning control pulse signal is supplied to a synapse load representing circuit 800. Therefore, no synapse load value is corrected.

In learning, on the other hand, the outputs of the terminals Dp and Ip are changed in accordance with the learning phase signal C± which is supplied to the learning control common terminal C. The learning phase signal C± goes high in a plus phase, while the same goes low in a minus phase. In the plus phase, the terminal Dp is fixed to a low level, while an inverted signal of the pulse signal Acp is outputted at the terminal Ip only when both state signals Si and Sj are at high levels, and applied to the terminal I of the correcting circuit 735. Thus, the synapse load value is corrected.

When the learning phase signal C± applied to the learning control common terminal C goes low, on the other hand, the terminal Ip is fixed to a low level this time. The terminal Dp outputs an inverted signal of the pulse signal Acp only when both of the state signals Si and Sj are at high levels. Thus, the correcting circuit 730 changes the synapse load value. Thus, an excitatory synapse load value is increased (Wij>0) in response to the number of pulse signals outputted at the terminal Ip, while an inhibitory synapse load value is increased (Wji<0) in response to the number of pulse signals outputted at the terminal Dp. Namely, the following learning rules are implemented by the learning control circuit 850:

$$\Delta W^+{ji} = \eta \cdot Si \cdot Sj$$

$$\Delta W^-{ji} = -\eta \cdot Si \cdot Sj$$

where corresponds to the number of pulses supplied to the terminal P and ± corresponds to the learning phase.

Figure 56:
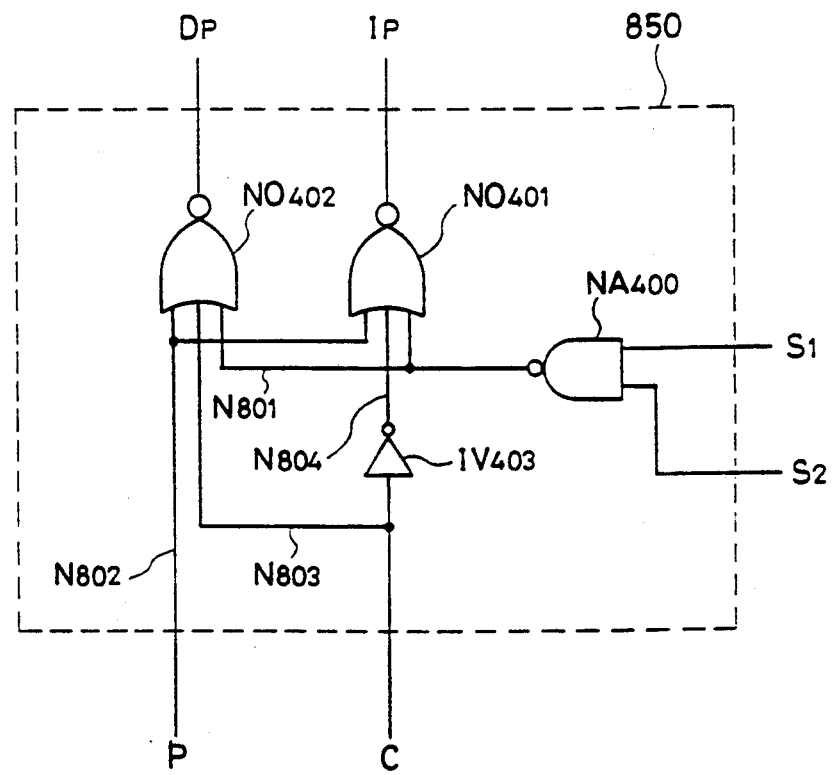
FIG. 56 illustrates an exemplary structure of a learning control circuit shown in FIG. 55.

FIG. 56 shows an exemplary concrete structure of the learning control circuit 850. Referring to FIG. 56, the learning control circuit 850 includes a NAND gate NA400, NOR gates NO401 and NO402, and an inverter IV403. The NAND gates NA400 receives the state signals S1 and S2. The inverter IV403 receives the learning phase signal C± which is supplied to the terminal C. The NOR gate NO401 receives the outputs of the NAND gate NA400 and the inverter IV403, and the learning control signal Acp, which is applied to the terminal P, through the terminal P. The NOR gate NO402 receives the learning phase signal C± through the terminal C and receives the learning control signal Acp through the terminal P, while receiving the output of the NAND gate NA400. The NOR gate NO401 supplies a signal for controlling an excitatory synapse load value to the terminal Ip. The NOR gate NO402 derives a control signal for correcting an inhibitory synapse load value through the terminal Dp. The operation is now briefly described.

It is assumed that this learning control circuit must control a synapse load Wji. The state signals Si and Sj of neurons i and j are supplied to inputs S1 and S2 respectively. $\overline{Si \cdot Sj}$ appears at an output node N801 of the NAND gate NA400. The learning control signal Acp is transferred to a node N802 through the terminal P. The terminal P is supplied with a pulse signal in learning, while the same is fixed at a high level in non-learning. Therefore, both of outputs from the NOR gates NO401 and NO402 are fixed at low levels in non-learning, regardless of signal states of the input terminals S1, S2 and C. Thus, no learning control pulse signal is generated and no synapse load value is corrected.

In learning, a high-level signal is supplied to the terminal C in a plus phase. In this case, an input node N803 of the NOR gate NO402 is at a high level, and an input node N804 of the NOR gate NO401 is at a low level. Therefore, the output Dp of the NOR gate NO402 is fixed at a low level. An inverted pulse signal of the signal supplied to the terminal P is outputted at the output Ip of the NOR gate NO401 since the node N801 goes low only when both of the state signals Si and Sj are at high levels.

In a minus phase, a low-level signal is supplied to the terminal C. Thus, the output Ip of the NOR gate NO401 is fixed at a low level. On the other hand, an inverted pulse signal of the signal supplied to the terminal P is outputted at the terminal Dp only when both of the state signals Si and Sj are at high levels. A pulse signal appearing at the terminal Ip is supplied to the terminal I of the synapse load representing circuit 800, and the pulse signal appearing at the terminal Dp is supplied to the terminal D of the synapse load representing circuit 800. A learning control circuit satisfying the aforementioned learning rules can be obtained by such structure.

The learning control common signal Red is commonly supplied to the learning control terminals Rd and Ri of the synapse load representing circuit 800 shown in FIG. 55. This is adapted to avoid zeroing of the synapse load value (reset of the synapse load value) and a saturated state (described below) of the synapse load by providing an appropriate number of pulse signals. It is also possible to reduce both excitatory and inhibitory synapse load values by supplying pulse signals in learning at need by the signal Red. The learning control common signal Red may be supplied at appropriate timing in learning, or may be generated upon completion of one cycle of the educator pattern in learning.

The saturated state of the synapse load value indicates such a state that the amounts of charges stored in the capacitors C201 and C202 reach the limits and the charges are no longer increased even if the terminals D and I receive pulse signals. In this state, correction is made only in a direction for reducing the charges stored in the capacitors C201 and C202 (i.e., correction is made only by the pulse signals supplied to the terminals Rd and Ri).

Figure 57:
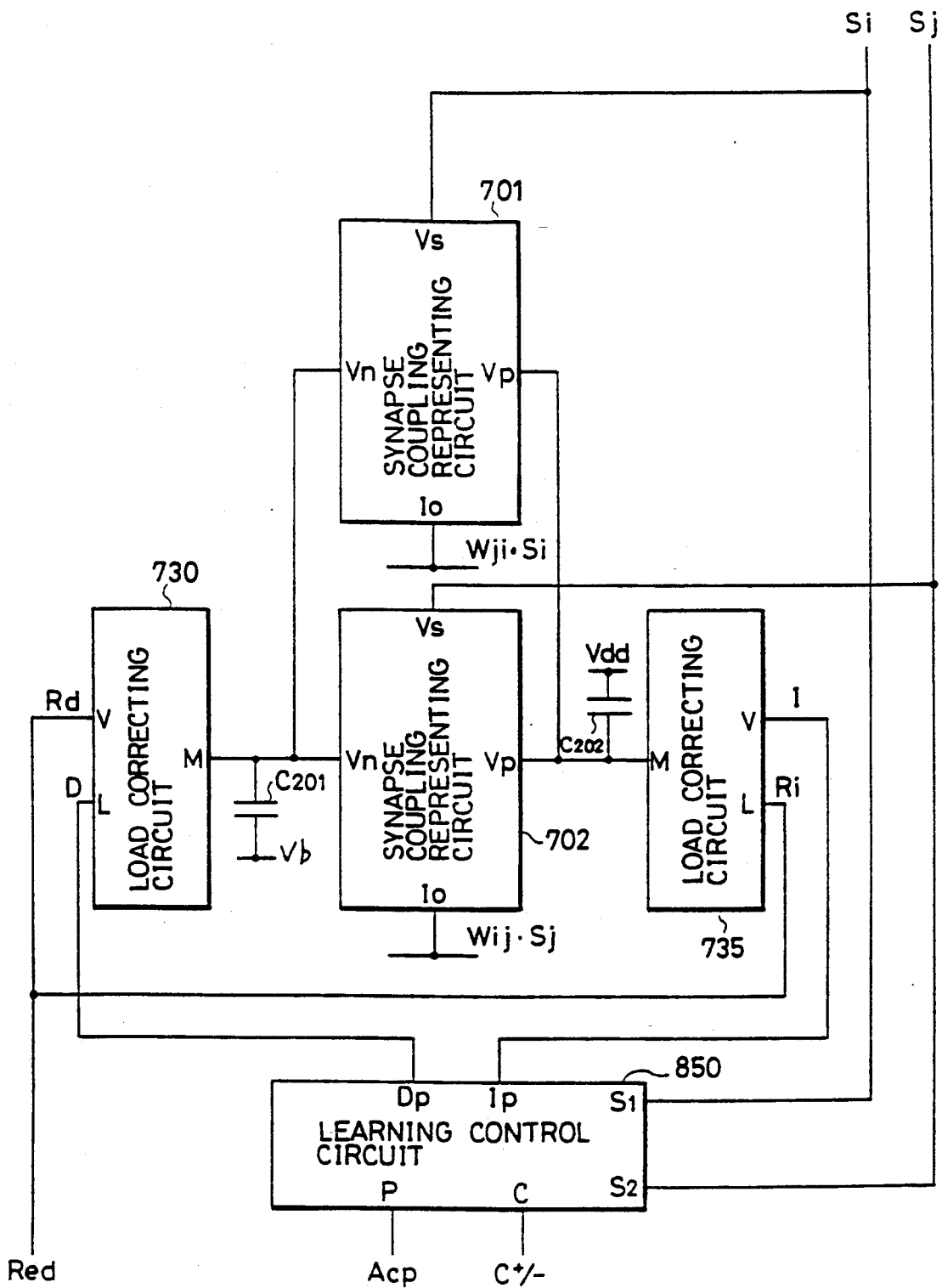
FIG. 57 illustrates the structure of a synapse representing circuit which has a structure suitable for a neural network having symmetrical synapse loads.

In the synapse representing circuit shown in FIGS. 53 and 55, the synapse loads have general forms which are also applicable to a neural network having asymmetrical synapse loads (Wij≠Wji). FIG. 57 shows an exemplary structure of a synapse representing circuit which is suitable for a neural network having symmetrical synapse loads (Wij=Wji). The synapse representing circuit shown in FIG. 57 is prepared by extending the structure(s) of the synapse representing circuit(s) shown in FIG. 53 and/or FIG. 55.

Referring to FIG. 57, a self-organizable synapse representing circuit includes a first synapse coupling representing circuit 701, a second synapse coupling representing circuit 702, a first synapse load correcting circuit 730, a second synapse load correcting circuit 735 and a learning control circuit 850. The first and second synapse coupling representing circuits 701 and 702 are identical in structure to the synapse coupling representing circuit 701 shown in FIG. 53. The synapse load correcting circuits 730 and 735 are also identical in structure to the synapse load correcting circuits 730 and 735 shown in FIG. 53.

The first synapse coupling representing circuit 701 comprises an input terminal Vs which receives a state signal Si, a terminal Vn which receives synapse load value information from a capacitor C201 (inhibitory synapse load value storage circuit 720), a terminal Vp which receives synapse load value information from a capacitor C202 for storing an excitatory synapse load value, and a terminal Io which outputs a converted signal. The first synapse coupling representing circuit 701 transfers a current signal of Wji·Si onto a corresponding dendrite signal line.

The second synapse coupling representing circuit 702 has a terminal Vs which receives a state signal Sj, a terminal Vn which receives a voltage stored in the capacitor C201, a terminal Vp which receives a voltage stored in the capacitor C202, and a signal output terminal Io. The second synapse coupling representing circuit 702 transfers a signal of Wij·Sj onto a corresponding dendrite signal line.

The load correcting circuit 730 has a terminal V which receives a signal Rd (Red), a terminal L which receives a signal D from the learning control circuit 850, and a terminal M which outputs a synapse load value change signal. Similarly, the load correcting circuit 735 has a terminal V which receives a signal I from the learning control circuit 850, a terminal L which receives a signal Red, and a terminal M which outputs a synapse load value change signal.

The learning control circuit 850 is identical in structure to that shown in FIG. 55 or 56.

In the structure shown in FIG. 57, only the synapse coupling representing circuits 701 and 702 are provided in a pair, while the remaining synapse load representing parts, i.e., the load correcting circuits 730 and 735 and the learning control circuit 850 are provided in common for the pair of synapse coupling representing circuits 701 and 702. Thus, the synapse loads can be efficiently represented.

Most of the areas in the synapse representing circuits shown in FIGS. 53 to 57 are occupied by capacitors. Therefore, synapse representing circuits which are excellent in area utilization efficiency can be obtained by minimizing the occupied areas of such capacitors. In this case, the capacitors may have any structure such as stacked, trench or ordinary two-layer structure.

In each of the synapse representing circuits shown in FIGS. 53 to 57, the amount of the current flowing on the dendrite signal line through the synapse representing circuit can be controlled by appropriately adjusting the value of the bias voltage $V_b$. Even if the neural network is increased in scale, the amount of the current transferred onto the dendrite signal line can be controlled by appropriately adjusting the bias voltage $V_b$, whereby a large-scale neural network can be easily extended while the amount of power consumption can also be adjusted by the bias voltage, to obtain a synapse representing circuit having low power consumption.

Figure 58A:
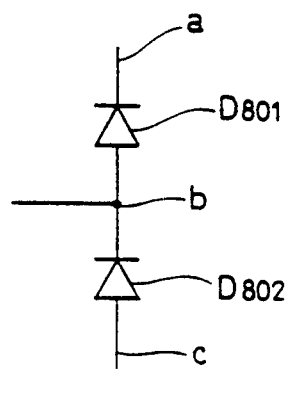
FIGS. 58A to 58C illustrate exemplary structures of charge pump diodes employed in the synapse load correcting circuit shown in FIG. 53.
Figure 58B:
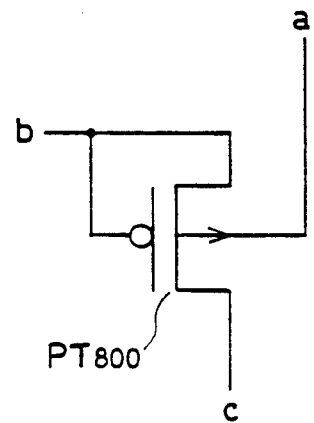
Figure 58C:
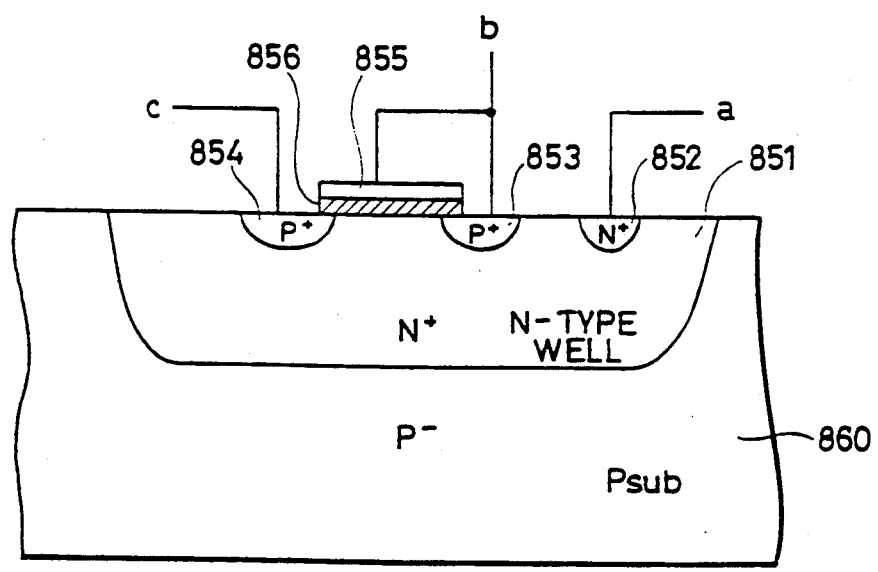

FIGS. 58A to 58C show an exemplary structure of diodes included in a charge pump circuit forming a synapse load correcting circuit. In the structure shown in FIGS. 58A to 58C, diodes are represented through a MOS transistor having a well structure. In the structure shown in FIGS. 58A to 58C, a series body of two diodes is represented through one p-channel MOS transistor. Nodes a, b and c shown in FIG. 58A correspond to the nodes N330, N350 and N360 shown in FIG. 54A or the nodes $V_{dd}$, N351 and N331 shown in FIG. 54B respectively. A diode D801 has a cathode which is connected to the node a, and an anode which is connected to the node b. Another diode D802 has a cathode which is connected to the node b, and an anode which is connected to the node c.

Referring to FIG. 58B, a series body of the two diodes D801 and D802 is represented by one p-channel MOS transistor PT800. The p-channel MOS transistor PT800 shown in FIG. 58B has a substrate which is connected to the node a, a first electrode and a gate electrode which are connected to the node b, and a second conduction terminal which is connected to the node c.

FIG. 58C is a sectional view of the p-channel MOS transistor PT800 shown in FIG. 58B. Referring to FIG. 58C, the p-channel MOS transistor is formed in an N-type well 851 which is provided on the surface of a P-type semiconductor substrate 860. The p-channel MOS transistor includes an N+-type region 852 of high impurity concentration which is connected to the node a, a P+-type region 853 of high impurity concentration which is connected to the node b, and a P+-type region 854 of high impurity concentration which is connected to the node c. A gate electrode 855 is formed on a channel region between the P+-type region s 853 and 854 through an insulating film (oxide film) 856. The gate electrode 855 is connected to the node b. The N-type well 851 is connected to the node a through the N+-type region 852. The diode D801 is formed by the P+-type region 853, the N-type well 851 and the N+-type region 852. The diode D802 is formed by the P+-type region 853, the channel region (surface region of the N-type well 851) and the P+-type region 854.

In the structure shown in FIG. 58C, still another diode is formed through the node a, the N+-type region 852, the N-type well 851 and the P+-type region 854. However, this diode exerts no influence on the operation of the charge pump circuit since the same is formed between the nodes a and c.

In the structure shown in FIGS. 58B and 58C, it is possible to increase the degree of integration of the synapse representing circuit since two diodes can be represented by one MOS transistor. Further, one diode D801 is represented by a P-N junction diode, whereby a reversely flowing discharge current (leakage current flowing from the node a to the node c) can be reduced while stray capacitance accompanying the node b can be reduced thereby to attain a charge pump circuit which is excellent in driving ability.

namely, it is possible to reduce leakage currents in the capacitors C201 and C202 by forming the charge pump circuit through the transistor having the structure shown in FIG. 58C, to improve its driving ability.

Although the MOS (metal-oxide-semiconductor) transistor is employed in the aforementioned embodiment, an effect similar to the above can also be attained by employing a MIS (metal-insulating film-semiconductor) transistor.

In the aforementioned learning control circuit, the learning rules in the plus and minus phases are $\eta \cdot Si \cdot Sj$ and $-\eta \cdot Si \cdot Sj$ respectively. As to convergence of the synapse load values, it may be determined that the synapse load values are converged to terminate learning when a prescribed time is reached, or a difference between synapse load variations $\Delta Wij^+$ and $\Delta Wij^-$ of synapse load values obtained in the plus and minus phases may be taken to make a determination as to convergence of the synapse load values.

Figure 59:
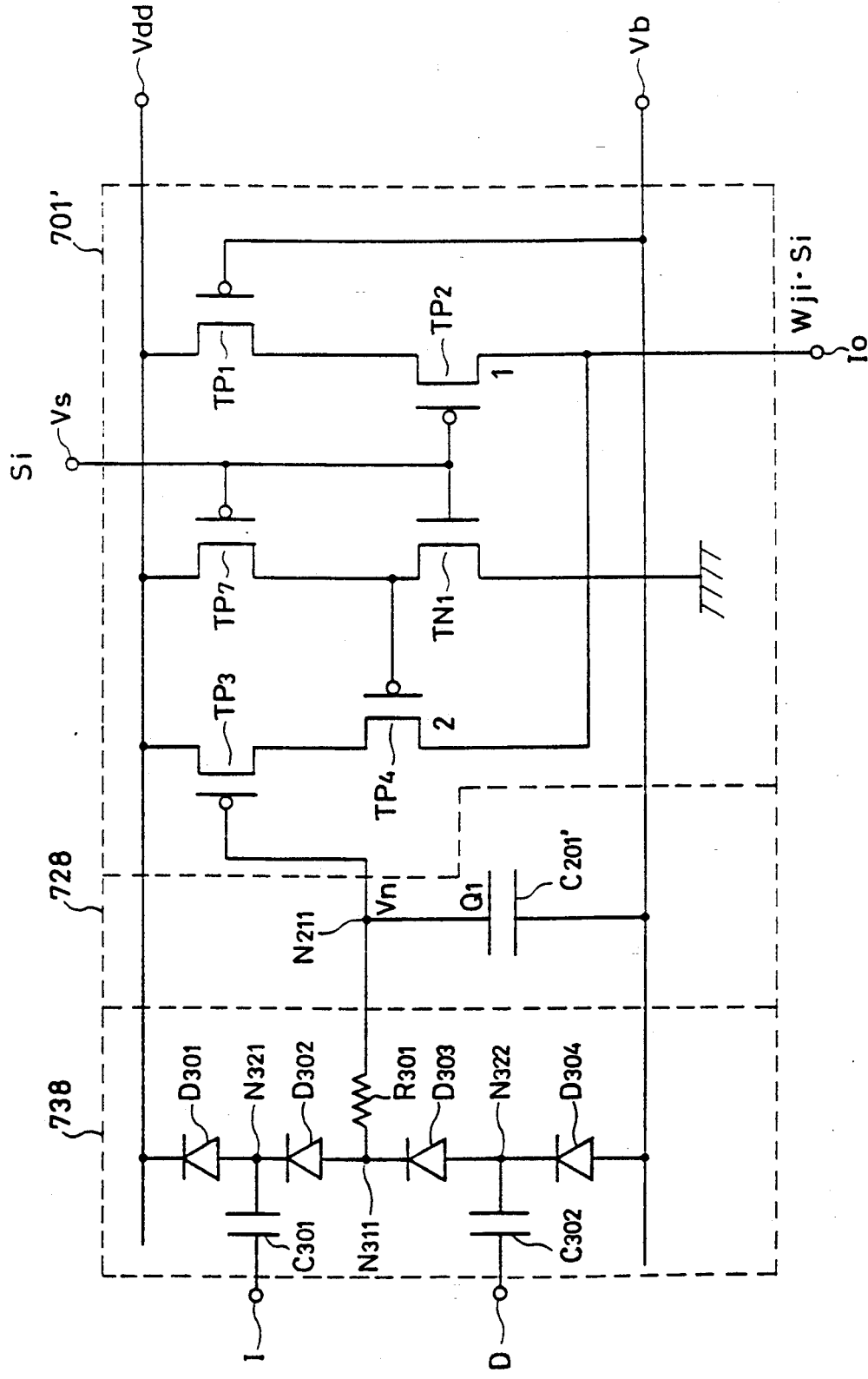
FIG. 59 illustrates the structure of a synapse load representing circuit according to a further embodiment of the present invention.

In the structure shown in FIG. 53, the synapse load representing circuit has two circuit parts of representing inhibitory coupling and excitatory coupling. It is also possible to represent the synapse loads by one circuit part, to implement a synapse load representing circuit having a higher degree of integration. FIG. 59 shows such an exemplary structure.

A synapse representing circuit shown in FIG. 59 comprises a synapse coupling representing circuit 701', a synapse load value storage circuit 728, and a synapse load correcting circuit 738.

The synapse coupling representing circuit 701' is identical in circuit structure to that shown in FIG. 53 except for that no p-channel MOS transistors TP5 and TP6 are provided and that p-channel MOS transistors TP3 and TP4 are different in gate width, i.e., conductance, from p-channel MOS transistors TP1 and TP2, and corresponding parts are denoted by the same reference numerals. The transistors TP3 and TP4 are larger in gate width than the transistors TP1 and TP2 such that the former are twice the latter, for example. Thus, a current path formed by the transistors TP3 and TP4 can carry a larger current as compared with a current path formed by the transistors TP1 and TP2.

The synapse load storage circuit 728 is formed by one capacitor C201'. The capacitor C201' has a first electrode which is connected to a node N211, and a second electrode which is connected to a bias potential $V_b$.

The synapse load correcting circuit 738 is identical in structure to the synapse load correcting circuit 730 shown in FIG. 51 except for that a control signal I for increasing the synapse load is supplied to a first electrode of a capacitor C301, and corresponding parts are denoted by the same reference numerals.

As understood from the above description with reference to FIGS. 53, 54A and 54B, positive charges are extracted from the capacitor C201' to reduce the potential at the node N211 when a pulsing control signal I is supplied to the capacitor C301. On the other hand, positive charges are injected into the capacitor C201' to increase the potential at the node N211 every time a pulsing control signal D is supplied to a capacitor C302. Due to such structure, excitatory coupling and inhibitory coupling are represented by the single capacitor C201'. The operation is now briefly described.

(i) When a state signal (axon signal) Vs is at a low level:

In this case, the transistor TP2 enters an ON state, while the transistor TP4 and a transistor TN1 enter OFF states. Therefore, a constant current, which corresponds to the bias potential $V_b$ applied to the gate of the transistor TP1, flows out from an output terminal Io.

(ii) When the state signal (axon signal) Vs is at a high level:

In this case, the transistor TP2 enters an OFF state, while both of the transistors TP4 and TN1 enter ON states. Therefore, a current which is responsive to the gate potential of the transistor TP3, i.e., which is responsive to a charging potential $V_n$ of the capacitor C201', flows from the output terminal Io.

If an amount Q1 of charges stored in a node N211 of the capacitor C201' is zero, the potential $V_n$ at the node N211 is equal to the bias voltage $V_b$, and a current which is responsive to the bias potential $V_b$ flows from a reference potential $V_{dd}$ to the output terminal Io through the transistor TP3 and a transistor TN4.

When the amount Q1 of charges stored in the capacitor C201' is positive, the potential $V_n$ at the node N211 becomes greater than $V_b$ and the p-channel MOS transistor TP3 enters a shallower ON state, whereby the amount of the flowing current is reduced. Thus, inhibitory coupling is represented.

The amount of the current flowing to the output terminal Io is increased every time the control signal I is received since positive charges are extracted from the capacitor C201', while the amount Q1 of charges stored in the capacitor C201' is increased every time the control signal D is received, so that the amount of the current flowing to the output terminal Io is reduced. Thus, both of excitatory coupling and inhibitory coupling can be represented through the single capacitor C201 by controlling the amount of charges stored in the capacitor C201' by the control signals I and D.

The transistors TP3 and TP4, which are twice the transistors TP1 and TP2 in gate width, for example, have large current suppliability. Thus, it is possible to stably supply large currents in representation of excitatory coupling.

In order to represent both of excitatory coupling and inhibitory coupling, the circuit structure shown in FIG. 59 employs one capacitor C201', which performs charging and discharging operations in learning (it is stochastically unusual that only charging or discharging takes place in learning). Thus, the capacitor C201' will not be saturated and it is possible to reliably perform learning. Since the capacitor C201' will not be saturated, further, there is no need to generate reset signals Rd and Ri dissimilarly to the circuit structure shown in FIG. 53. Thus, wires required for such reset signals Rd and Ri can be omitted to simplify the circuit structure, thereby implementing a synapse representing circuit which is integrated at a higher degree.

Figure 60:
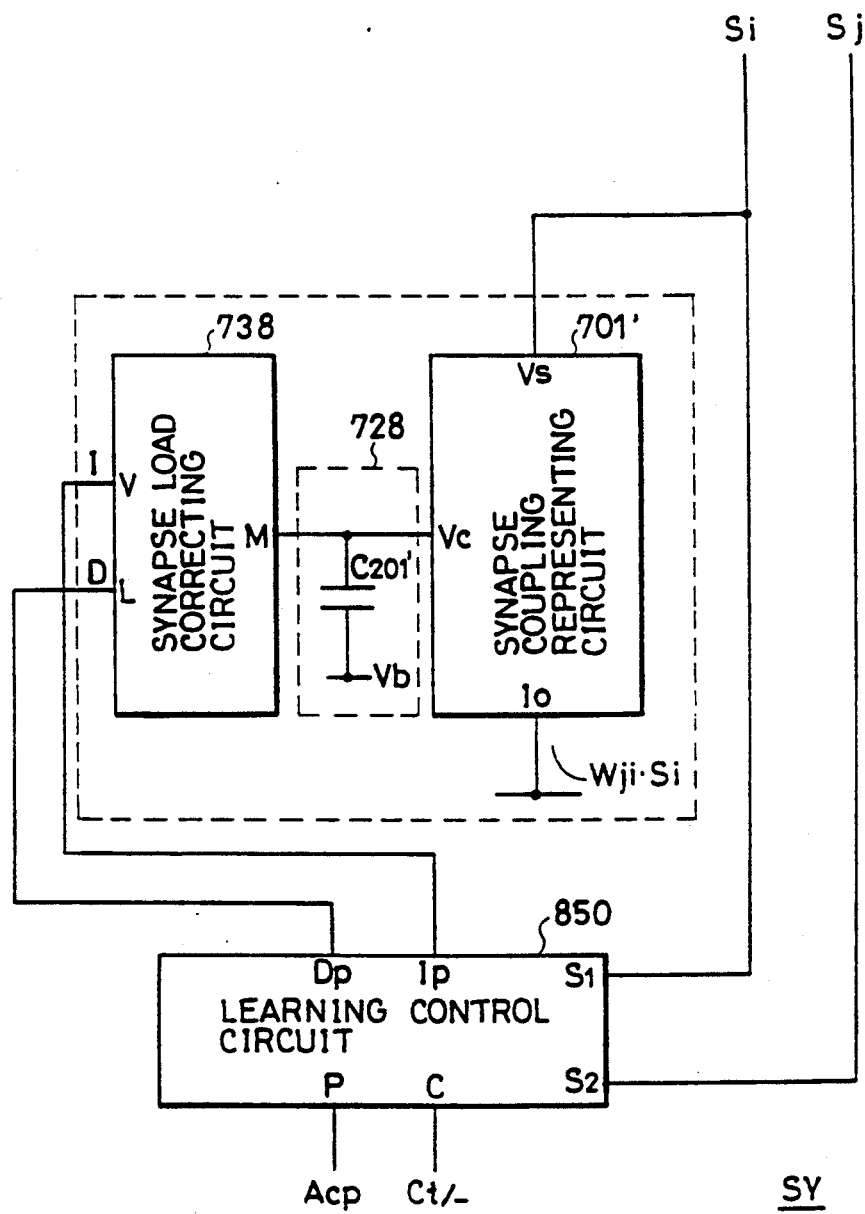
FIG. 60 illustrates the structure of a self-organizable synapse representing circuit employing the synapse load representing circuit shown in FIG. 59.

FIG. 60 shows the structure of a synapse representing circuit which employs the synapse load representing circuit shown in FIG. 59. In the structure shown in FIG. 60, a synapse load correcting circuit 738 has a node V which receives a learning control signal I providing excitatory coupling, a node L which receives a learning control signal D providing inhibitory coupling, and a node M which outputs a synapse load value. A synapse coupling representing circuit 701' has a node Vs which receives a state signal (axon signal) Si, a node Vc which receives a signal indicating a synapse load value, and a node Io which outputs a converted signal Wji·Si.

A learning control circuit 850 is identical in structure to that shown in FIG. 55.

As understood from FIG. 60 in comparison with FIG. 55, the synapse load representing circuit shown in FIG. 60 requires no learning control signal Rd (Ri) for resetting. Further, this circuit structure requires only a single synapse load correcting circuit and a single synapse load value storage circuit, whereby the circuit scale can be reduced to implement a synapse representing circuit which is suitable for higher integration.

Figure 61:
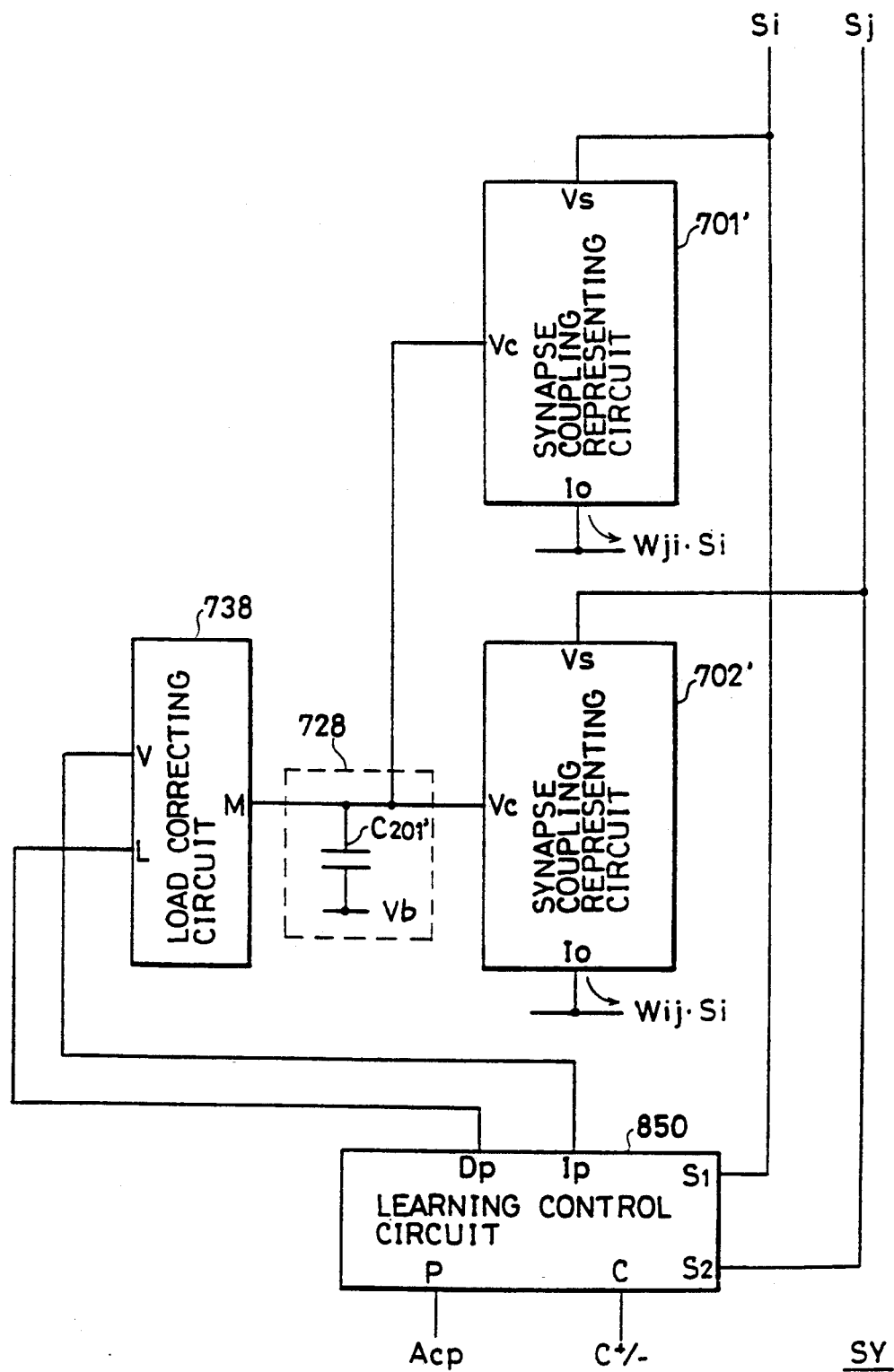
FIG. 61 illustrates the structure of a self-organizable synapse representing circuit for representing symmetrical synapse loads, employing the synapse load representing circuit shown in FIG. 59.

FIG. 61 shows the structure of a synapse representing circuit, in which the synapse representing circuit shown in FIG. 59 is applied to a circuit (corresponding to FIG. 57, for example) for representing symmetrical synapse loads (Wij=Wji).

A synapse coupling representing circuit 701' receives a state signal (axon signal) Si at its input node Vs, and outputs a converted signal Wji·Si from its output node Io. A synapse coupling representing circuit 702' receives a state signal (axon signal) Sj at its input node Vs, and outputs a converted signal Wij·Sj from its output node Io.

A synapse load correcting circuit 738 and a capacitor C201' (synapse load value storage circuit 728) for representing synapse loads are employed in common for the synapse coupling representing circuits 701' and 702', since the synapse loads are symmetrical such that Wij=Wji.

As understood from FIG. 61 in comparison with FIG. 57, the synapse representing circuit shown in FIG. 61 is simplified in structure to be further suitable for high integration.

The structure and chip layout of a neuron unit for facilitating extended connection of a semiconductor chip forming a neural network are now described. In the arrangement shown in FIG. 11, for example, axon signals are inputted from the pads provided along the first side (upper side) of the chip and outputted from the second side (right side) of the chip. In the structure of the neural network shown in FIG. 11, 14 or 15, therefore, the input buffers, i.e., the axon driving unit transfers signals, which are supplied from the exterior of the chip through the bonding pads PA, to the axon signal lines provided in the interior of the chip. Output signals from the neuron unit, i.e., the axon signals, are transferred to the exterior of the chip through the pads PA.

In the case of this structure, interconnection between the chips may be complicated in extending connection of the chips as shown in FIGS. 20, 21 etc., for example. Description is now made on chip layout for greatly reducing the number of wires required for extending chip connection thereby enabling easy interconnection of a plurality of chips. In the following description, synapse representing circuits SY may be prepared from any of the above embodiments.

The structure of a neuron unit serving as a cell body is first described.

Figure 62:
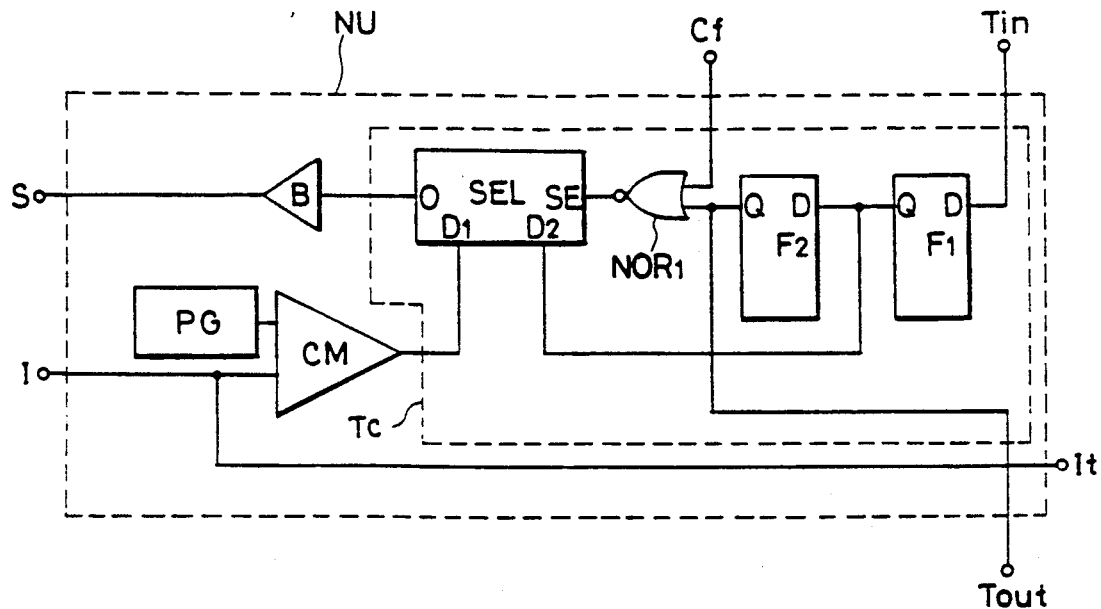
FIG. 62 illustrates a first modification of the structure of a neuron unit serving as a cell body according to a further embodiment of the present invention.

FIG. 62 shows a first exemplary structure of a neuron unit NU. Referring to FIG. 62, the neuron unit NU includes a probability representing circuit PG, a comparator CM and an educator signal control circuit TC. The comparator CM compares a dendrite signal I, which is received through a dendrite signal input node I (nodes and signals received in the nodes are hereinafter denoted by the same symbols), with a signal from the probability representing circuit PG, and derives the result of the comparison as an axon signal.

The dendrite signal I is also transferred to an extension node $I_T$.

The educator signal control circuit TC includes shift registers F1 and F2, a NOR circuit NOR1 and a selector SEL. This educator signal control circuit TC is equivalent in function to that shown in FIG. 45. The shift registers F1 and F2 are adapted to latch and transfer received signals in response to a clock signal. The shift registers F1 and F2 receive a clock signal which is similar to that shown in FIG. 45, although the path for the clock signal is omitted in order to simplify the illustration. The shift register F1 is adapted to latch educator information which is shifted in from an input node Tin, while the shift register F2 latches attribute information of the neuron unit NU and shifts out the educator information and/or the attribute information to a next-stage neuron unit through a node Tout. When the shift register F2 latches information "1" (i.e., high level), for example, the neuron unit NU is defined as a hidden unit. When the latched information is "0" (low level), on the other hand, the neuron unit NU is defined as a visible neuron (output neuron).

The NOR circuit NOR1 receives a learning phase control signal Cf and a Q output of the shift register F2. An output signal from the NOR circuit NOR1 is supplied to a selection input SE of the selector SEL. The learning phase control signal Cf indicates a minus phase when the same is at a high level, and indicates a plus phase when the same is at a low level.

The selector SEL receives an output signal from the comparator CM at its input node D1, while receiving the educator information latched by the shift register F1 at its input node D2. This selector SEL selects and outputs the signal received at its input node D1, i.e., the output signal from the comparator CM when a low-level signal is received at its selection input SE, while selecting and outputting the signal received at the input node D2, i.e., the educator information, when a high-level signal is received at the selection input SE.

When the shift register F2 latches information indicating a high-level hidden neuron, the NOR circuit NOR1 regularly outputs a low-level signal. Thus, the selector SEL selects and outputs the signal received at the input node D1, i.e., the output signal from the comparator CM. When the shift register F2 latches information indicating a low-level visible neuron (output neuron), on the other hand, the NOR circuit NOR1 functions as an inverter. Therefore, when the learning phase control signal Cf is at a high level to indicate a minus phase, the selector SEL selects and outputs the output signal from the comparator CM, which is received at its input node D1. When the learning control signal Cf indicates a low-level plus phase, on the other hand, the output signal from the NOR circuit NOR1 goes high and the selector SEL selects and outputs the educator information latched by the shift register F1.

The output signal from the selector SEL is supplied form an output node O to a buffer B. The buffer B derives an axon signal S through a node S.

As understood from FIG. 62 in comparison with FIG. 11, for example, the dendrite signal I and the axon signal S are propagated in opposite directions in the structure of the neuron unit shown in FIG. 62. That is, the neuron unit NU sends back the axon signal S in the direction supplied with the dendrite signal I. In other words, the neuron unit NU receives the dendrite signal I from a synapse representing circuit provided in the chip and sends back the axon signal S to the synapse representing circuit part provided in the chip.

Figure 63:
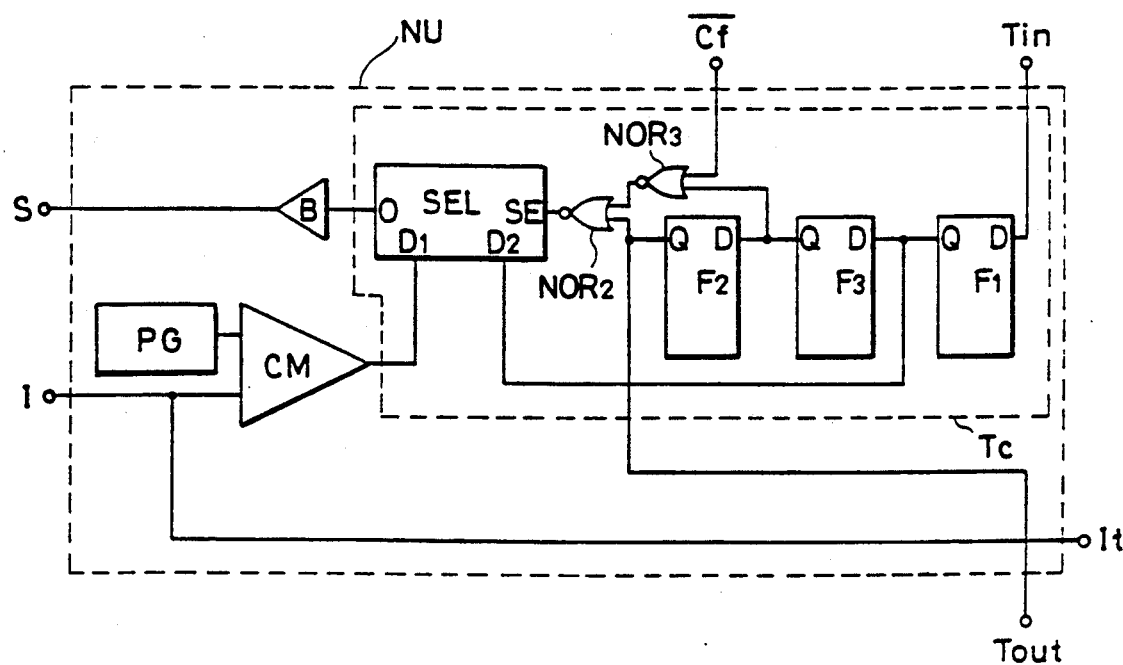
FIG. 63 illustrates a second modification of the neuron unit according to the present invention.

FIG. 63 shows a modification of the neuron unit NU. In the neuron unit NU shown in FIG. 63, an educator signal control circuit TC includes shift registers F1, F2 and F3 which are cascade-connected in three stages, and NOR circuits NOR2 and NOR3, so that it can define an attribute of an input neuron, an output neuron or a hidden neuron. The shift registers F1, F3 an F2 are cascade-connected in this order. Educator information and attribute defining information are shifted in from an input node Tin, and shifted out from an output node Tout to a next stage neuron unit through the shift registers F1, F3 and F2. The shift register F1 latches the educator information, while the shift registers F2 and F3 latch the attribute information of the neuron unit NU.

When the shift register F2 latches a high level, the neuron unit NU is defined as a hidden neuron regardless of information latched by the shift register F3. When the shift register F2 latches a low level and the shift register F3 latches a high level, the neuron unit NU is defined as an input neuron. When both of the shift registers F2 and F2 latch low levels, the neuron unit NU is defined as an output neuron.

The NOR circuit NOR3 receives a learning phase control signal $\overline{Cf}$ and latched information (Q output) of the shift register F3. The NOR circuit NOR2 receives the output from the NOR circuit NOR3 and the latched information (Q output) of the shift register F2. The output from the NOR circuit NOR2 is supplied to a selection input SE of a selector SEL.

The learning phase control signal $\overline{Cf}$ is an inverted signal of the learning phase control signal Cf shown in FIG. 62, and indicates a plus phase when the same is at a high level, while indicating a minus phase when the same is at a low level.

Other structure of FIG. 63 is similar to that shown in FIG. 62, and corresponding parts are denoted by the same reference numerals. The operation is now briefly described.

(i) When the learning phase control signal $\overline{Cf}$ is at a high-level indicating plus phase:

The output of the NOR circuit NOR3 regularly goes low and the NOR circuit NOR2 functions as an inverter. If the shift register F2 latches a high level, the selector SEL selects and passes a signal received in its input node D1. If the shift register F2 latches a low level, on the other hand, the selector SEL selects and outputs educator information received in its input node D2.

(ii) When the learning phase control signal $\overline{Cf}$ is at a low-level indicating minus phase:

The NOR circuit NOR3 functions as an inverter. If the shift register F2 latches high-level information, the output signal from the NOR circuit NOR3 goes low and the NOR circuit NOR2 functions as an inverter. If the shift register F2 latches high-level information, therefore, the selector SEL selects the output signal from the comparator CM, which is received at its input node D1. If the shift register F2 latches a low level, on the other hand, the selector SEL selects the educator information from the shift register F1, which is received at its input node D2.

If the shift register F3 latches low-level information, on the other hand, the output signal of the NOR circuit NOR3 goes high and the output signal of the NOR circuit NOR2 regularly goes low regardless of information latched by the shift register F2. In this case, the selector SEL selects the output signal from the comparator CM.

As described above, the attribute of the neuron unit NU is represented in two bits so that the neuron unit NU can be defined as a hidden neuron, an output neuron or an input neuron.

Figure 64:
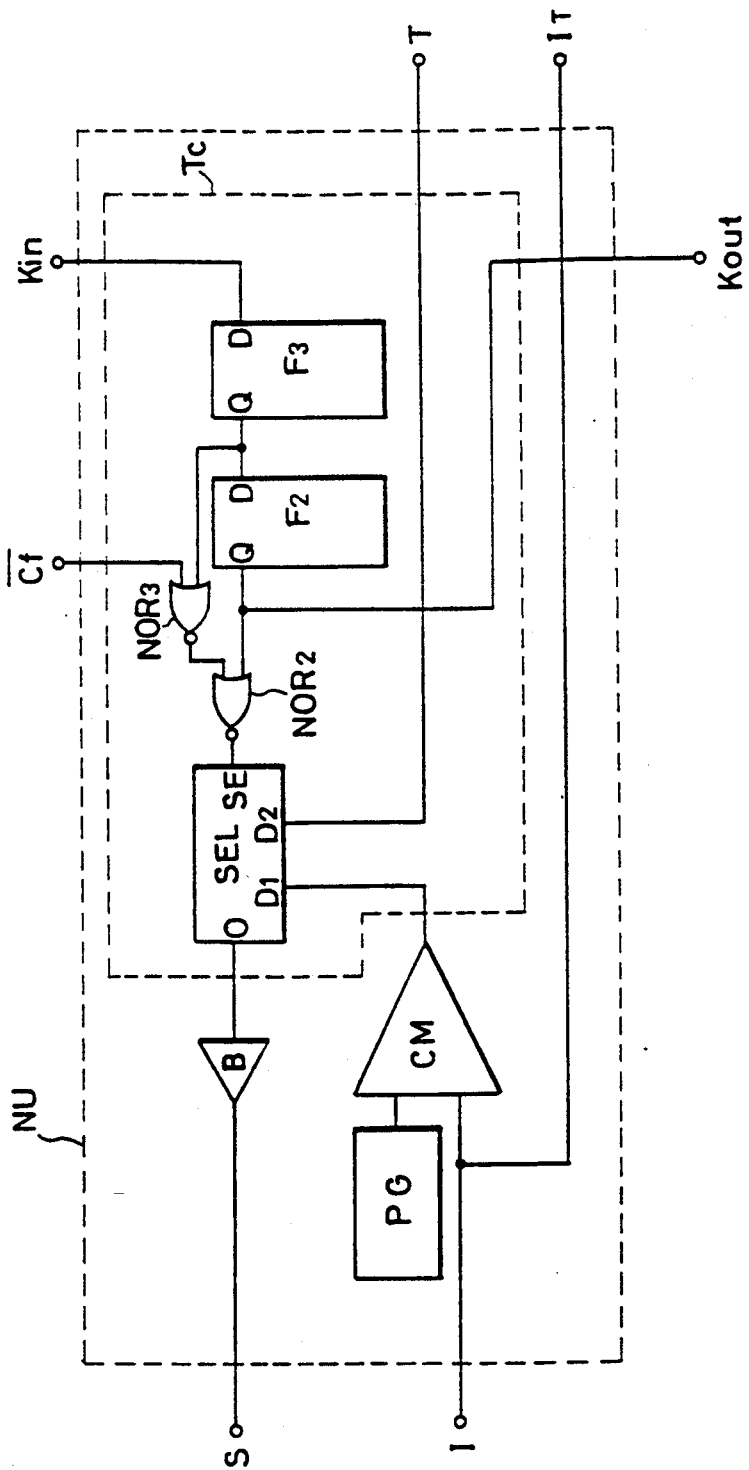
FIG. 64 illustrates a third modification of the neuron unit according to the present invention.

In general, the attribute of each neuron unit remains unchanged throughout a learning cycle, while only educator information is changed every learning cycle. Therefore, the speed of learning can be increased by making only attribute information latched in the educator signal control circuit TC, storing only educator information in a memory device which is provided in the exterior of the neuron unit NU and transferring the educator information from the memory device to visible neurons in parallel for learning. FIG. 64 shows such an exemplary structure.

Referring to FIG. 64, attribute defining information Kin is shifted in through a node Kin, and shifted out from a node Kout through shift registers F3 and F2. Educator information is supplied to an input node D2 of a selector SEL from a memory device which is provided in the exterior, for example, through a node T. Other structure is similar to that shown in FIG. 62, and corresponding parts are denoted by the same reference numerals.

The educator signal control circuit TC shown in FIG. 64 is different from that shown in FIG. 63 only in a point that the shift register F1 is removed and in a point that educator information is directly supplied to the input node D2 of the selector SEL from the exterior. Thus, the operation of the educator signal control circuit shown in FIG. 64 is similar to that of the circuit shown in FIG. 63, such that the circuit can define the attribute of a neuron unit NU and drive the neuron unit NU in accordance with this definition. In the structure shown in FIG. 64, the educator information is supplied from the exterior not to be shifted in and out through shift registers, whereby it is not necessary to successively shift educator information in the neuron unit NU every learning cycle, and hence learning can be executed at a higher speed.

In the above description, the logic of a signal SE defining the selecting operation of the selector SE and correspondence between the information latched in the shift registers F2 and F3 and attribute definition are mere examples. The attribute of the neuron unit may alternatively be defined by combination of other signal levels, while the logic of the signal SE is changed accordingly.

The function of the educator signal control circuit in the neuron unit NU shown in FIG. 62 or 64 is equivalent to that of the unit shown in FIG. 44 or 47, and the selector SEL selects the output of the comparator CM in an actual calculating operation upon completion of a learning operation. This structure is clearly understood from the structures shown in FIGS. 45 and 47, for example.

Chip layout of a semiconductor neural network employing the neuron unit shown in FIG. 62 or 64 is now described. In the following description it is assumed that synapse loads Wij represented by synapse representing circuits SY are so symmetrical as to satisfy the relation of Wij=Wji. A master structure forming a common part of a non-diagonal part representing chip and a diagonal part representing chip is first described with reference to FIG. 65.

Figure 65:
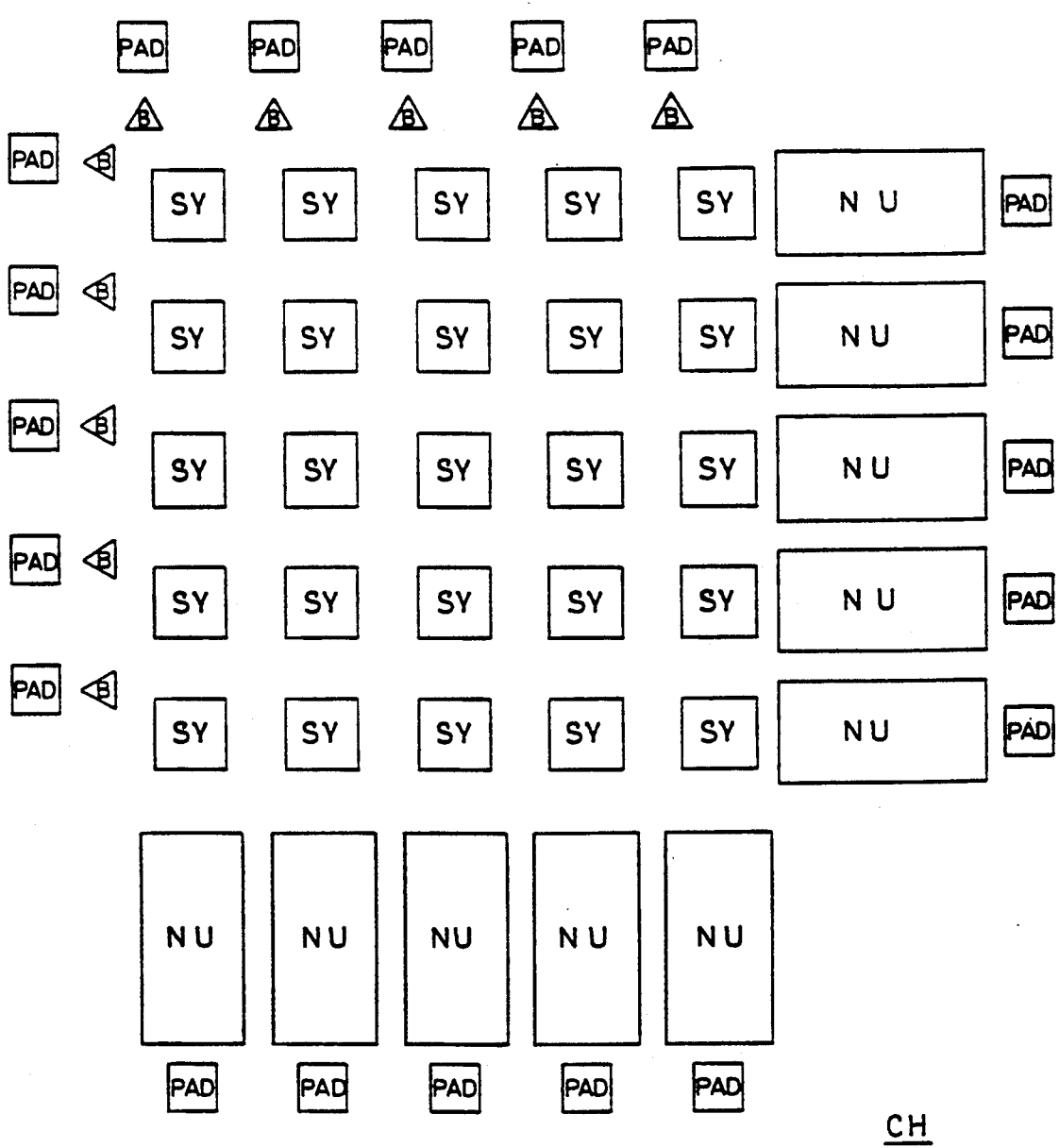
FIG. 65 illustrates chip layout in a master structure of a semiconductor neural network chip employing the neuron units shown in FIGS. 62 and 64.

Referring to FIG. 65, synapse representing circuits SY are arrayed on a semiconductor chip CH in the form of a matrix (5 by 5 in FIG. 65). Neuron units NU are aligned along the right and bottom sides of the matrix of the synapse representing circuits SY respectively.

Figure 66:
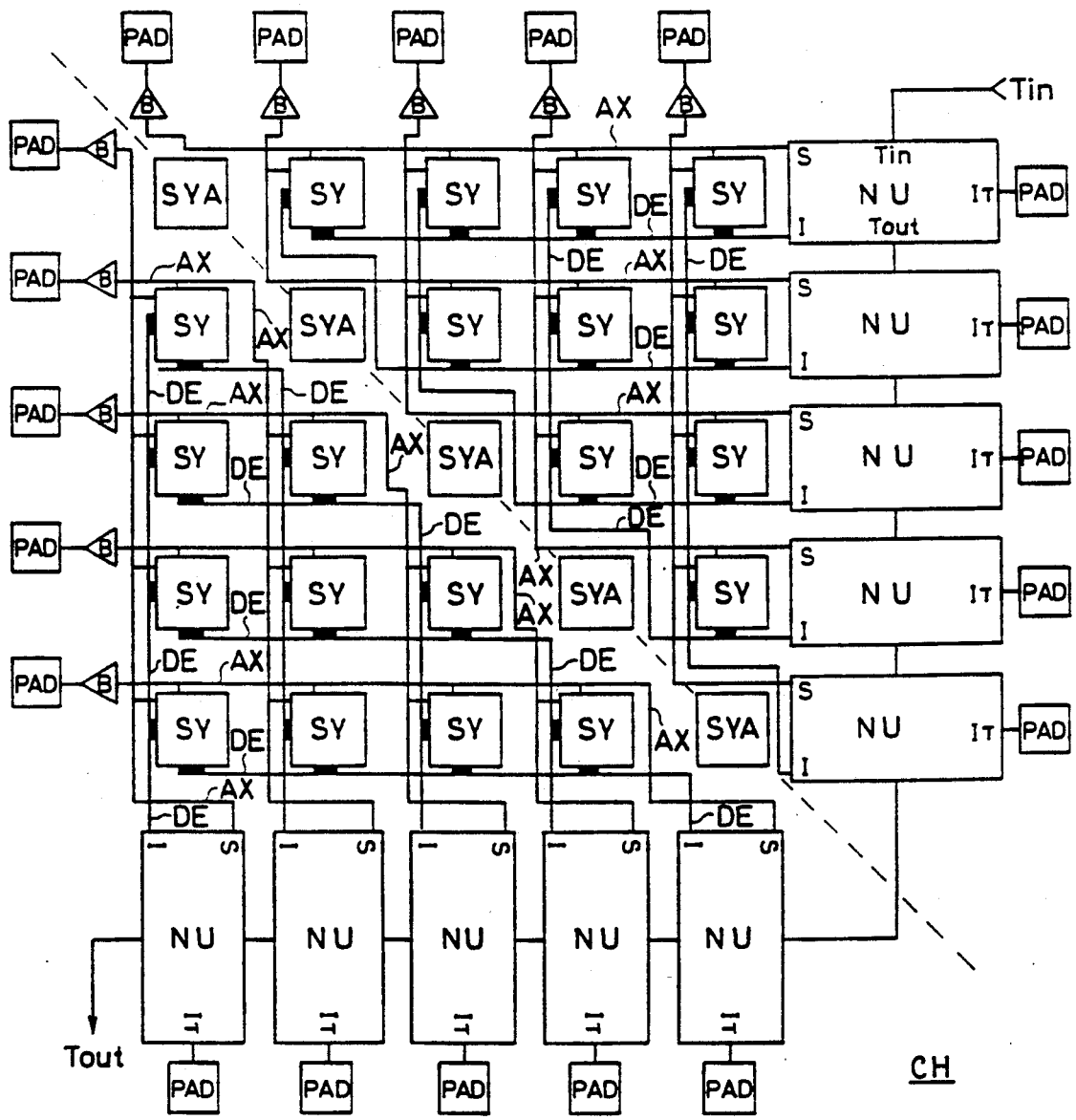
FIG. 66 illustrates layout and connection of a semiconductor neural network chip for representing a diagonal part which is customized in a slice step.

Pads PAD are provided along the periphery of the chip CH in order to transfer signals with the exterior. Buffers B are provided between the pads PAD which are arranged along the upper and left sides of the semiconductor chip CH and the synapse load representing circuits SY. The buffers B are so arranged as to transfer signals to the pads PAD. With reference to FIG. 66, description is now made on the case of providing wires through a slice step to form a diagonal part representing chip from the semiconductor chip of the master structure.

The diagonal part representing chip shown in FIG. 66 corresponds to the layout of the diagonal part representing chip shown in FIG. 23. In the structure shown in FIG. 66, however, the buffers B provided along the upper and left sides of the chip are arranged to receive axon signals from axon signal lines AX and transfer the same to the exterior through the pads PAD. In this structure, the signals transferred from the buffers B to the pads PAD are simply used as those for monitoring the operation of this network. Each neuron unit NU has an input node I which is coupled with a dendrite signal line DE, and an output node i.e., an axon signal output node S, which transfers an axon signal onto the corresponding axon signal line AX. The connection structure of the synapse representing circuits is similar to that shown in FIG. 23, such that synapse representing circuits SYA provided along a diagonal line are out of connection while remaining synapse representing circuits SY receive axon signals from input nodes which are provided on first and second sides respectively and transfer converted signals from output nodes which are provided on second and third sides onto corresponding dendrite signal lines DE.

Each neuron unit NU further has an extension node $I_T$, which is connected to a corresponding pad PAD. Further, a shifting signal line for transferring educator information and attribute defining information is provided for each neuron unit NU.

The layout of a non-diagonal part representing chip is now described with reference to FIG. 67. The chip layout shown in FIG. 67, which is customized in a slice step, corresponds to the layout shown in FIG. 19. In this non-diagonal part representing chip, axon signal lines AX are arrayed in rows and columns, while dendrite signal lines DE are also arrayed in rows and columns. The dendrite signal lines DE and axon signal lines AX extend straightly, and axon signals outputted from neuron units NU are transferred to pads PAD through oppositely provided buffers B. The dendrite signals to the respective neuron units NU are transferred to corresponding pads PAD through extension nodes $I_T$ respectively.

Figure 67:
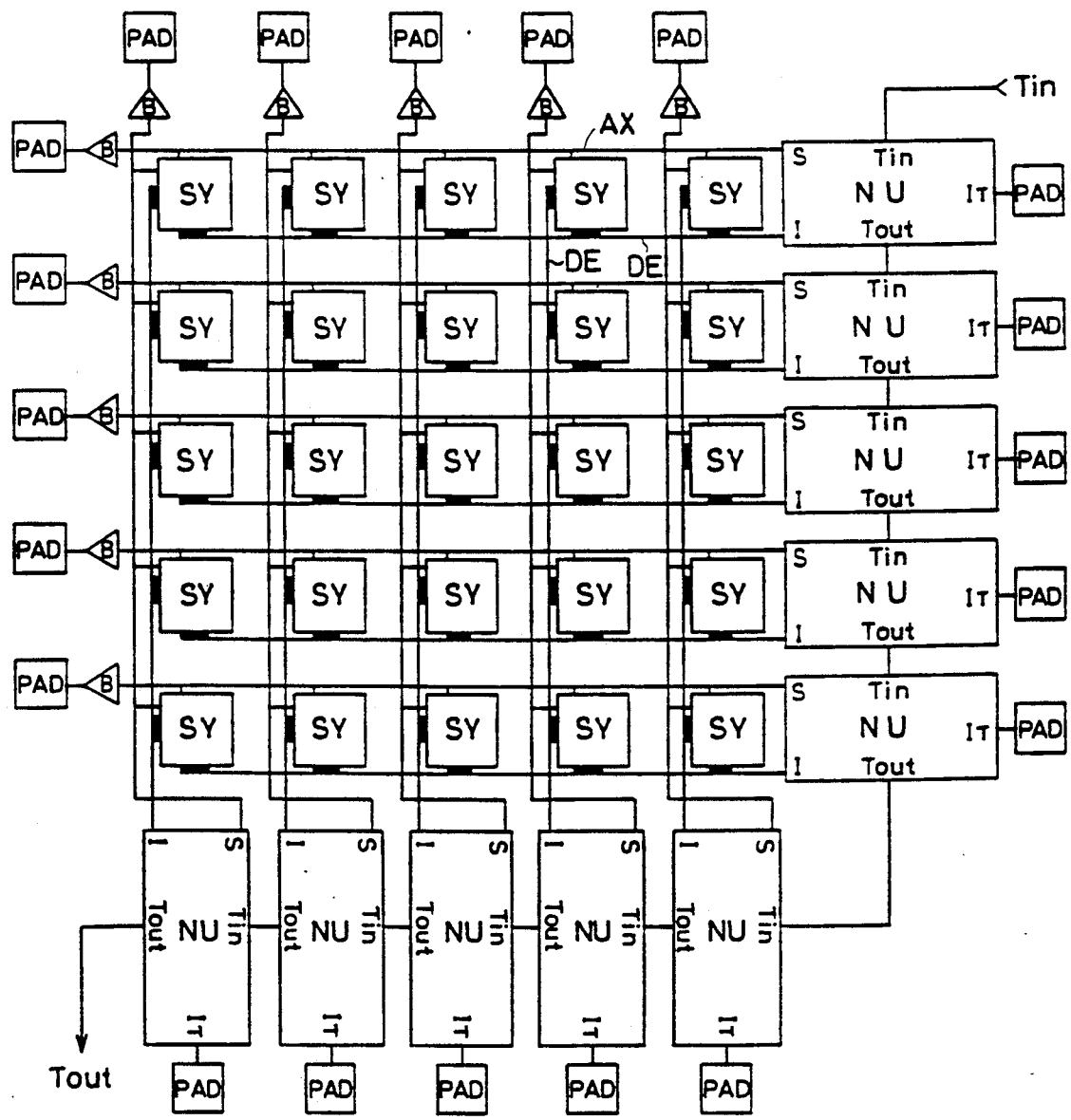
FIG. 67 illustrates layout and connection of a chip for representing a non-diagonal part obtained by customizing the master structure of FIG. 65 in the slice step.
Figure 68:
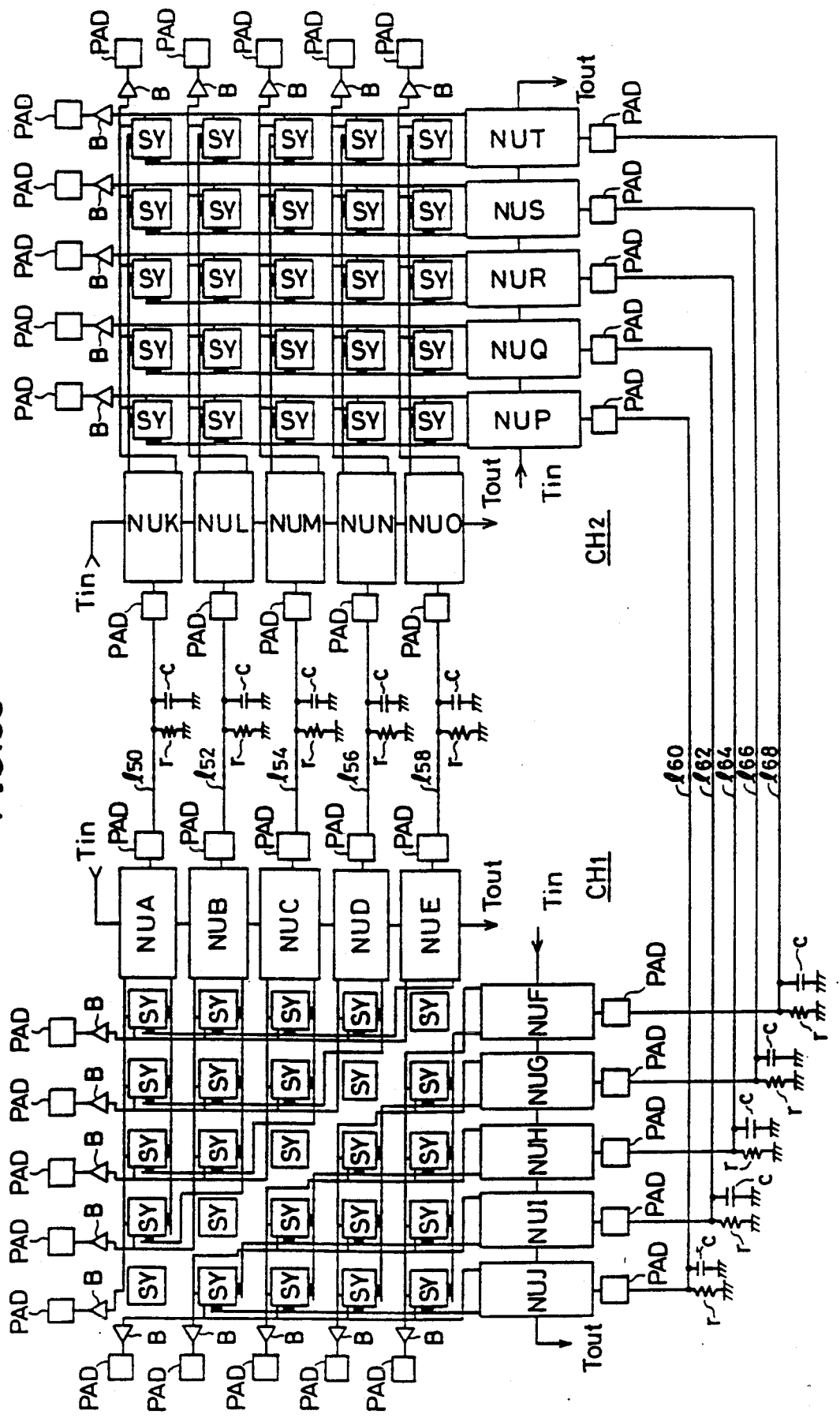
FIG. 68 illustrates arrangement for connecting the diagonal part representing chip and the non-diagonal part representing chip shown in FIGS. 66 and 67.

The structure shown in FIG. 67 is similar to that shown in FIG. 19 except for a point that the axon signals are outputted from the neuron units NU in different directions and in a point that the buffers B are different in direction. FIG. 68 shows an exemplary structure obtained by interconnecting the chips shown in FIGS. 66 and 67.

The chip interconnection shown in FIG. 68 corresponds to the structure shown in FIG. 21.

Referring to FIG. 68, a chip CH1 is adapted to represent a diagonal part, and a semiconductor chip CH2 is adapted to represent a non-diagonal part. A neuron unit NUA is connected to a neuron unit NUK through a wire 50, and a neuron unit NUB is connected to a neuron unit NUL through a wire 152. Similarly, neuron units NUC, NUD, NUE, NUF, NUG, NUH, NUI and NUJ are connected to neuron units NUM, NUN, NUO, NUT, NUS, NUR, NUQ and NUP through wires 154, 156, 158, 168, 166, 164, 162 and 160 respectively. Resistors r, capacitors c and the like are connected to the wires 150 to 168 respectively in order to adjust time constants, current values and the like. In the structure shown in FIG. 68, a pair of interconnected neuron units, such as NUA and NUK, for example, represent one neuron unit.

Educator data and/or attribute defining data are shifted in the respective neuron units through shift input nodes Tin. In this case, the same attribute defining data and/or educator data must be transferred to corresponding neuron units. On the other hand, the chip CH2 is obtained by clockwisely rotating the chip CH1 by 90° except for the internal wires. Thus, the shift-in terminals Tin and shift-out terminals Tout of the chip CH1 correspond to the shift-out terminals Tout and shift-in terminals Tin of the chip CH2 respectively. Therefore, it is necessary to set the shifting direction for the educator data and/or attribute defining data in the neuron units on the diagonal part representing chip CH1 to be opposite to the shift direction for the educator data and/or attribute defining data in the neuron units included in the non-diagonal part representing chip CH2. It is possible to cope with this in a slice step.

As clearly understood from the chip connection shown in FIG. 68 in comparison with that shown in FIG. 21, the number of wires is greatly reduced and the interconnection arrangement is greatly simplified in the chip interconnection shown in FIG. 68. Thus, the neural network chips can be easily extended/connected, to readily implement a large-scale neural network.

In the aforementioned structure, a common part of the diagonal part representing chip and the non-diagonal part representing chip is formed in the master step to be customized into the non-diagonal part representing chip and the diagonal part representing chip in the slice step. Thus, respective neural networks are formed on separate semiconductor chips. In this case, it is also possible to build a neural network of the so-called wafer scale device in which each chip region is formed on a wafer, while the chips (chip regions in the wafer scale device) can be easily interconnected through the neuron units shown in any of FIGS. 62 to 68, thereby readily implementing a semiconductor neural network employing a wafer scale device.

According to the present invention, as hereinabove described, a synapse representing part is provided in the form of a right triangle while an axon control part and a nerve cell representing part are arranged along two sides making the right angle, whereby the operating speed can be increased by parallel processing of respective functions while it is possible to freely connect output terminals of respective nerve cell circuits with input terminals of respective axon control circuits in the exterior of the semiconductor chip, thereby enabling representation of various neural network modes. Due to the aforementioned configuration, a plurality of integrated circuit devices can be interconnected to readily form a neural network in a large scale. Further, two right-triangular structures may be symmetrically arranged with respect to the hypotenuse to form a rectangular integrated circuit device, whereby areas of semiconductor chips can be more efficiently used for diagonal and non-diagonal part representing chips, for enabling high integration.

Each neuron unit may receive a dendrite signal and transmit an axon signal in opposite directions, in order to reduce the number of wires for extended connection and facilitate extended interconnection, thereby enabling extension of the neural network scale, in order to readily obtain a large-scale semiconductor neural network.

Even if a count value exceeding the limit value of a synapse load is required, the synapse load representing circuit holds the limit value and sustains the counting operation, whereby no overflow takes place and a correct counting function can be maintained to regularly enable learning of a correct synapse load.

The synapse polarity converting circuit and the current decoder circuit apply one of prescribed bias potentials (first and second prescribed bias potentials) to the gate of a transfer gate having a prescribed conductance ratio in response to the output of the synapse load representing circuit and the axon signal, whereby it is possible to derive a signal which provides the product of the synapse load and the axon signal in a simple circuit structure. Thus, only a single axon signal line and a single dendrite signal line may be prepared to reduce the occupied area of interconnection, while the manufacturing steps can be greatly simplified.

The learning rule for the synapse load is so structured as to change the synapse load in accordance with the following equation:

$$\Delta W_{ij} + \eta \cdot (S^+ i \cdot S^+ j - S^- i \cdot S^- j)$$

whereby the circuit structure is simplified and the synapse load can be learned at a high speed.

Further, the structure of the learning control circuit can be more simplified and the learning of the neural network can be made at a higher speed when the synapse load is changed for the respective ones of plus and minus phases with the following learning rule:

$$\Delta W_{ij} = \eta \cdot S_i \cdot S_j$$

In the case of a synapse representing circuit representing an excitatory synapse load value and an inhibitory synapse load value by the amount(s) of charges stored in separate capacitors or one capacitor and increasing/decreasing the amount(s) of stored changes by pulsing signal(s), the synapse load representing circuit and the learning control circuit are more simplified in structure, and it is possible to implement a self-organizable synapse representing circuit having a reduced occupied area. Thus, it is possible to obtain an integrated circuit device which is provided with a learning function with a higher degree of integration.

Further, a circuit generating a damping oscillation voltage with a prescribed time constant in response to an externally supplied logical binary voltage is employed as a probability representing circuit, whereby it is possible to easily repeat stochastic state transition of a neuron and simulated annealing by an arbitrary attenuation time.

According to the inventive educator signal control circuit, further, it is possible to arbitrarily define the attribute of each neuron as a hidden neuron or a visible neuron (input or output neuron), whereby it is possible to arbitrarily set educator data for a neuron defined as a hidden neuron while it is possible to arbitrarily switch a state with supply of an educator signal and a state with supply of no educator signal as the state of a visible neuron (input or output neuron) by a control signal, whereby the circuit structure is simplified with reduction in area. Thus, it is possible to easily integrate the circuit device onto a semiconductor chip, thereby implementing an integrated circuit device which is provided with a learning function on one chip.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An integrated circuit device having a learning function, being modelled on nerve cells, comprising:
   a plurality of nerve cell representing units simulating functions of nerve cell bodies;
   a plurality of axon representing signal lines each receiving a signal indicating a state of an associated nerve cell representing unit;
   a plurality of dendrite representing signal lines provided in correspondence to respective ones of said plurality of nerve cell representing units for transferring signals to corresponding nerve cell representing units; and
   a plurality of synapse representing units provided on respective ones of crosspoints between said plurality of axon representing signal lines and said plurality of dendrite representing signal lines for coupling related axon representing signal lines with related dendrite representing signal lines with specific synapse representing loads, said specific synapse representing loads of respective synapse representing units being set at optimum values in learning of said integrated circuit device,
   said plurality of synapse representing units being arrayed to be at lest substantially in the form of a first right triangle, said right triangle having first and second sides other than its hypotenuse,
   said plurality of nerve cell representing units being arranged in the form of a column along said first side of said first right triangle.

2. An integrated circuit device in accordance with claim 1, wherein
   said integrated circuit device is integrated on one semiconductor chip.

3. An integrated circuit device in accordance with claim 1, further comprising a plurality of axon representing driving units provided in correspondence to respective ones of said plurality of axon representing signal lines for transferring state signals onto corresponding said axon representing signal lines,
   said plurality of axon representing driving units being arranged along said second side of said first right triangle.

4. An integrated circuit device in accordance with claim 3, further comprising a plurality of second synapse representing units being arrayed symmetrically to said plurality of synapse representing units with respect to said hypotenuse of said first right triangle, whereby said integrated circuit device comprises substantially rectangularly arrayed synapse representing units having common structures, and
   a second right triangle formed by said plurality of second synapse representing units has third and fourth sides being opposite to said first and second sides of said first right triangle respectively,
   said integrated circuit device further comprising second nerve cell representing units for said second synapse representing units, said second nerve cell representing units being arranged along said fourth side.

5. An integrated circuit device in accordance with claim 4, further comprising a plurality of axon driving units being arranged along said third side for transferring state signals to said second synapse representing units.

6. An integrated circuit device in accordance with claim 4, further comprising a plurality of second axon representing driving units being arranged along said fourth side in correspondence to respective ones of said second nerve cell representing units for transferring state signals of corresponding said nerve cell representing units onto related said axon representing signal lines,
   a signal transfer direction of said second axon representing driving units being opposite to a direction for transferring dendrite representing signals onto related said nerve cell units.

7. An integrated circuit device in accordance with claim 4, further comprising a plurality of educator signal control units provided for respective ones of said plurality of nerve cell representing units with respect to said first right triangle and said second nerve cell representing units with respect to said second right triangle for setting states of corresponding nerve cell representing units in accordance with educator information to be learned in said learning of said integrated circuit device,
   said educator signal control units for said plurality of nerve cell representing units with respect to said first right triangle are arranged along said first side of said first right triangle, and
   said educator signal control units for said second nerve cell representing units are arranged along said fourth side of said second right triangle.

8. An integrated circuit device in accordance with claim 1, further comprising a plurality of axon representing driving units provided in correspondence to respective ones of said plurality of nerve cell representing units for transferring state signals of corresponding nerve cell representing units onto corresponding axon representing signal lines, said plurality of axon representing driving units being arranged along said first side of said first right triangle so that a signal transfer direction on said dendrite representing signal lines related to corresponding said nerve cell representing units is opposite to a signal transfer direction on related said axon representing signal lines.

9. An integrated circuit device in accordance with claim 1, further comprising a plurality of educator signal control units provided in correspondence to respective ones of said nerve cell representing units for setting states of corresponding said nerve cell representing units in accordance with educator information to be learned in said learning of said integrated circuit device, said educator signal control units being arranged along said first side of said first right triangle.

10. An integrated circuit device in accordance with claim 1, further comprising a plurality of educator signal control units provided in correspondence to respective ones of said representing signal lines for transferring educator information to be learned to related said axon representing signal lines in said learning of said integrated circuit device, said educator signal control units being arranged along said second side of said first right triangle.

11. An integrated circuit device in accordance with claim 1, wherein each synapse representing unit includes means coupled to a different pair of axon representing signal lines and a different pair of said dendrite representing signal lines for weighting received pair of said axon representing signals with the same synapse representing load and transferring weighted axon representing signals to respective ones of said different pair of dendrite representing signal lines respectively, whereby one synapse representing unit represents symmetrical synapse representing loads and couples a pair of nerve cell representing units to another pair of nerve cell representing units.

12. An integrated circuit device in accordance with claim 1, wherein said axon representing signal lines and said dendrite representing signal lines are so arranged that one synapse representing unit couples a different pair of nerve cell representing units to another different pair of nerve cell representing units and said nerve cell representing units are interconnected to form a full connection neural network.

13. An integrated circuit device in accordance with claim 1, wherein each synapse representing unit includes:

learning control circuit means being activated in said learning for receiving a first axon representing signal Si and a second axon representing signal Sj and deriving change value information of synapse representing load of a corresponding synapse representing unit in accordance with predetermined learning rules, synapse representing load circuit means for changing a value of said synapse representing load in accordance with said change value information from said learning control circuit means and holding said changed synapse representing load Wij, first synapse representing coupling operating circuit means for transferring a first product signal indicating the product Wij·Si of said synapse representing load Wij and said first axon representing signal Si to a first dendrite representing signal line in response to said synapse representing load Wij being held in said synapse representing load circuit means and said first axon representing signal Si, second synapse representing coupling operating circuit means for transferring a second product signal indicating the product Wij·Sj of said synapse representing load Wij and said second axon representing signal Sj to a second dendrite representing signal line in response to said synapse representing load Wij being held in said synapse representing load circuit means and said second axon representing signal Sj, said synapse representing unit representing both of symmetrical synapse representing loads Wij and Wji, where Wij=Wji.

14. An integrated circuit device in accordance with claim 13, wherein said learning has a plus phase in which respective states of both input nerve cell representing units included in an input layer for receiving input data from the exterior and output nerve cell representing units included in an output layer for deriving output data indicating results of processing to the exterior are clamped at educator information to be learned in a neural network formed through one or more said integrated circuit devices and a minus phase in which only states of said input nerve cell representing units are clamped at said educator information to be learned, and each learning control circuit comprises:

means for operating the product of said first axon representing signal Si and said second axon representing signal Sj, said first and second axon representing signals being binary digital values, first and second storage means for storing the output of said product operating means, said first storage means storing the result $S^+i \cdot S^+j$ of product operation in said plus phase, said second storage means storing the result $S^-i \cdot S^-j$ of product operation in said minus phase, said first and second storage means storing the results of product operation in corresponding learning phases in response to externally supplied control signals, and circuit means for outputting a signal indicating an amount ΔWij of correction for said synapse representing load Wij in accordance with the following relational expression:

$$\Delta Wij = \eta \cdot (S^+i \cdot S^+j - S^-i \cdot S^-j)$$

where $\eta$ represents a predetermined learning coefficient, in response to said values stored in said first and second storage means.

15. An integrated circuit device in accordance with claim 13, wherein said learning has a plus phase mode in which states of both input nerve cell representing units included in an input layer for receiving input data supplied from the exterior and output nerve cell representing units included in an output layer for outputting results of processing are clamped at educator information to be learned and a minus phase mode in which states of said input nerve cell units are clamped at said educator information to be learned in a neural network formed through one or more said integrated circuit devices, each learning control circuit means comprises:

means for operating the product of said first axon representing signal Si and said second axon representing signal Sj, both of said first and second axon representing signals being binary digital signals,.

first register means coupled to the output of said means for operating the product for holding and outputting a received product operation signal in response to a first control signal, second register means coupled to the output of said first register means for holding and outputting the output of said first register means in response to a second control signal, third register means coupled to the output of said second register means for holding and outputting the output of said second register means in response to said first control signal, means for detecting match/mismatch of the outputs of said first register means and said third register means, and selective passage means for selectively passing a third control signal in response to the output of said detection means, said first control signal is generated when said first and second axon representing signals are defined in each mode of said plus phase and said minus phase, said second control signal is generated when learning modes are switched, said selective passage means passes said third control signal and supplies same to said synapse representing load circuit means as said synapse representing load change value information when said detection means indicates a mismatch, and the output of said third register means is supplied to said synapse representing load circuit means as signal information of said synapse representing load change value information, said plus phase is carried out and then said minus phase is carried out in said learning, whereby said selective passage means outputs a signal indicating the value of a synapse representing load change value Wij being expressed as:

$$\Delta Wij = \eta \cdot (S^+i \cdot S^+j - S^-i \cdot S^-j)$$

where $S^+i$ and $S^+j$ represent said first and second axon representing signals in said plus phase, $S^-i$ and $S^-j$ represent said first and second axon representing signals in said minus phase, and $\eta$ represents a predetermined learning coefficient provided by the pulse number of said third control signal.

16. An integrated circuit device in accordance with claim 13, wherein said learning has a plus phase in which respective states of both input nerve cell representing units included in an input layer for receiving input data from the exterior and output nerve cell representing units included in an output layer for deriving output data indicating results of processing to the exterior are clamped at educator information to be learned in a neural network formed through one or more said integrated circuit devices and a minus phase in which only states of said input nerve cell representing units are clamped at said educator information to be learned, each of said learning control circuit means comprises:

means for operating the product of said first axon representing signal Si and said second axon representing signal Sj, said first and second axon representing signals being binary digital values, means for storing the output of said means for operating the product, circuit means for outputting the following synapse representing load change values:

$$\Delta Wij = \eta \cdot Si \cdot Sj$$

through said value stored in said storage means, and means for setting the sign of said synapse representing load change value in response to a learning mode designating signal supplied from the exterior, said sign setting means setting the sign of said synapse representing load change value positive in said plus phase while setting the sign of said synapse representing load change value negative in said minor phase.

17. An integrated circuit device in accordance with claim 16, wherein said synapse representing load change value output circuit means includes means for selectively passing a first control signal in response to data stored in said storage means, said first control means being a pulse signal defining said learning coefficient.

18. An integrated circuit device in accordance with claim 13, wherein said learning control circuit means includes means for outputting said synapse representing load change value information in a pulse train signal and outputting a signal indicating the sign of said synapse representing load change value information, and each synapse representing load circuit means includes:

counter means, being capable of performing count-up and count-down operations, for counting a pulse number corresponding to a synapse representing load change value generated by said learning control circuit means in response to said sign indicating signal derived from corresponding said learning control circuit means, said counter means being capable of counting a value having a bit number larger than a prescribed bit number required for representing said synapse representing load and being adapted to derive a signal value indicating the value and sign of said synapse representing load, means for detecting whether or not a count value of said counter means is within a range between predetermined maximum and minimum limit values with respect to said synapse representing load, and means receiving said signal indicating the value of said synapse representing load from said counter means for holding same at a limit value of a corresponding said synapse representing load and outputting same when said detection means detects a count value being out of said range between maximum and minimum limit values of said synapse representing load while transferring said signal indicating said synapse representing load from said counter means when said detection means detects that the count value of said counter means is within said range.

19. An integrated circuit device in accordance with claim 18, wherein
- said counter means has specific upper and lower count limit values, and includes:
- means for counting said pulse signal received from said learning control circuit means until it reaches each specific upper or lower count limit value even if said count value exceeds said predetermined maximum or minimum limit value of said synapse representing load, and
- means for inhibiting a counting operation being in excess of said specific upper or lower limit value when said count value reaches said specific upper or lower limit value.

20. An integrated circuit device in accordance with claim 13, wherein
- said learning control circuit means includes means for outputting said change value information of said synapse representing load in a pulse train signal and outputting a signal indicating the sign of said change value information, and
- each of said synapse representing load circuits includes:
- count means for receiving said change value information indicating signal as a count-up/count-down indicating signal and counting a pulse number of said pulse train signal, said count means having less significant N bits outputting a synapse representing load value, a most significant bit indicating the sign of said synapse representing load, and at least one redundant bit between said less significant N bits and said most significant bit,
- first detection circuit means for detecting match/mismatch between data of said most significant bit and data of said redundant bit,
- means provided for said less significant N bits for outputting data of said less significant N bits as synapse representing load value data, said synapse representing load value data output means including means for passing said less significant N-bit data in response to a mismatch detecting signal received from said match/mismatch detection circuit means and outputting said less significant N-bit data preceding first supply of said match detecting signal in response to said match detecting signal regardless of said less significant N-bit data, and
- means for receiving said synapse representing load change value sign indicating signal and all output bits of said count means, detecting match/mismatch of received said signals and selectively passing said pulse train signal in accordance with the result of said detection, said selective passage means including means for inhibiting passage of said pulse train signal when said result of said detection indicates a match.

21. An integrated circuit device in accordance with claim 20, wherein
- said redundant bit is one bit, and
- said selective passage means for said less significant N bits includes second selective passage means provided in correspondence to respective ones of said N bits for selectively passing either corresponding bit data or said redundant bit data in response to the output of said first match/mismatch detection circuit means, said second selective passage means passing said redundant bit data when said first match/mismatch detection circuit means indicates a match.

22. An integrated circuit device in accordance with clam 13, wherein
- each one of said first and second synapse representing coupling operating circuit means includes:
- first gate voltage selection circuit means for selecting either a first reference voltage or a second reference voltage in response to a signal potential on a corresponding axon representing signal line,
- second gate voltage selection circuit means for selecting and outputting either an output voltage from said first gate voltage selection circuit means or said second reference voltage in response to a signal, indicating the value of said synapse representing load, outputted from said synapse representing load circuit means,
- third gate voltage selection circuit means for selectively outputting either said second reference voltage or said first reference voltage in response to said signal potential on said corresponding axon representing signal line or said signal indicating the value of said synapse representing load outputted from said synapse representing load circuit means, said third gate voltage selection circuit means selecting said second reference voltage only when said signal potential on said corresponding axon representing signal line indicates that corresponding said nerve cell representing unit is in an excitatory state and said signal, indicating the sign of said synapse representing load, received from said synapse representing load circuit means indicates a negative synapse representing load while selecting and outputting said first reference voltage at all other times,
- first current supply means for transferring a current corresponding to said signal indicating the value of said synapse representing load onto a corresponding dendrite representing signal line in response to the output from said second gate voltage selection circuit means, and
- second current supply means for supplying a current being responsive to positivity/negativity of said synapse representing load in response to the output of said third gate voltage selection circuit means,
- wherein a signal indicating the product of an axon representing signal on said axon representing signal line and a synapse representing load represented by said synapse representing load circuit means being transferred onto said dendrite representing signal line.

23. An integrated circuit device in accordance with claim 22, wherein
- said synapse representing load means represents the value of a synapse representing load in N bits while representing the sign of said synapse representing load in one bit,
- said second voltage selection circuit means includes:
- a plurality of first selective passage means provided in correspondence to respective said N bits for passing the output of said first gate voltage selection circuit means in response to corresponding synapse representing load bit data, and
- a plurality of second selective passage means provided in correspondence to respective said N bits for passing said second reference voltage in response to corresponding synapse representing load bit data, said selective passage means complementarily operating with said first selective passage means, outputs of said first and second selective passage means being connected to a common node, said first current supply means includes a plurality of first current conversion means provided in correspondence to respective said N bits for converting said second reference potential to current signals and transferring the same to related dendrite representing signal lines in response to signal potentials on said common nodes of corresponding said first and second selective passage means, each current suppliability of said plurality of first current conversion means being set in response to corresponding synapse representing load bit positions, and said second current supply means includes second current conversion means for converting said second reference potential to current signals and transferring the same onto said corresponding dendrite representing signal lines in response to the output of said third gate voltage selection circuit means, said second current conversion means having current suppliability greater than that of said first current conversion means.

24. An integrated circuit device in accordance with claim 23, wherein said first and second current supply means are formed by insulated gate field effect transistors which are connected in parallel between signal lines for transferring said second reference potential and said corresponding dendrite representing signal lines for receiving outputs of corresponding said gate voltage selection means in gates thereof, current suppliability of each said transistor being set by its conductance.

25. An integrated circuit device in accordance with claim 24, further comprising a plurality of second insulated gate field effect transistors provided between respective said insulated gate field effect transistors and said corresponding dendrite representing signal lines for receiving a third reference potential at gates thereof.

26. An integrated circuit device in accordance with claim 13, wherein said learning control circuit means outputs information defining said synapse representing load change value in a pulse train signal, said synapse representing load circuit means includes:

means for storing synapse representing load values, said synapse representing load value storage means including first capacitor means for storing a synapse representing load value representing excitatory coupling in the form of charges and second capacitor means for storing a synapse representing load value representing inhibitory coupling in the form of charges, and means for changing said synapse representing load values being stored in said synapse representing load value storage means in response to said pulse train signal received from said learning control circuit means, and said synapse representing coupling operating means includes means for joining weights corresponding to said synapse representing load stored in said synapse representing load value storage means to said axon representing signals on said corresponding axon representing signal lines and transferring the same onto corresponding said dendrite representing signal lines, said transfer means including means for supplying current signals being proportionate to the products of said axon representing signals and stored said synapse representing load values onto corresponding dendrite representing signal lines.

27. An integrated circuit device in accordance with claim 26, wherein said synapse representing load value change means includes means for transferring respective pulse signals of said pulse train signal received from said learning control circuit means to said first and second capacitor means by capacitive coupling.

28. An integrated circuit device in accordance with claim 26, wherein said learning control circuit means includes:

means for operating the product of said fist axon representing signal Si and said second axon representing signal Sj, and means for selectively supplying said pulse train signal to said synapse representing load value change means in response to the output of said product operating means and an externally supplied learning mode designating signal, said pulse train signal being supplied to change said synapse representing load values stored in said first capacitor means and said second capacitor means, said learning mode designating signal designating either a first learning mode in which both axon representing signals of input and output neuron representing units are fixed at the value of educator data to be learned or a second learning mode in which only axon representing signals of said input neuron representing units are fixed at the value of said educator data, and said selective application means includes means for generating synapse representing load change control pulses representing:

$$\Delta Wij = \eta \cdot Si \cdot Sj$$

in said first learning mode while representing:

$$\Delta Wij = -\eta \cdot Si \cdot Sj$$

in said second learning mode, where $\eta$ corresponds to a number of pulses of said pulse train signal, and $\Delta Wij$ represents the amount of synapse load change.

29. An integrated circuit device in accordance with claim 28, wherein said amount $\Delta Wij$ of synapse representing load change generated in said first learning control mode is transferred to said first capacitor means through capacitive coupling, and said amount $\Delta Wij$ of synapse representing load change generated in said second learning mode is transferred to said second capacitor means through capacitive coupling.

30. An integrated circuit device in accordance with claim 13, wherein said learning of said integrated circuit device has a plus phase in which axon representing signals indicating states of input neuron representing units for receiving input data from an exterior and output neuron representing units for outputting data indicating results of processing to the exterior are clamped at educator information to be learned and a minus phase in which only axon representing signals of said input neuron representing units are clamped at said educator information to be learned in a neural network formed through at least one said integrated circuit device, each of said learning control circuit means has a first terminal for outputting a first pulse train signal indicating an amount of synapse representing load change in said plus phase and a second terminal for outputting a second pulse train signal indicating an amount of synapse representing load change in said minus phase, each said learning control circuit means includes:

first capacitor means for coupling said first output terminal of said learning control circuit means with a first node, first diode means connected between said first node and a first reference potential forwardly from said first node, second diode means connected said first node and a second node forwardly from said second node, second capacitor means connected between said second node and said first reference potential, third capacitor means capacitively coupling said second terminal of said learning control circuit means with a third node, third diode means connected between said third node and a fourth node forwardly from said third node, fourth diode means connected between said third node and a second reference potential forwardly from said second reference potential, fourth capacitor means connected between said fourth node and said second reference potential, inverter means for inverting a corresponding axon representing signal and transferring the same to a fifth node, first current supply means for converting said first reference potential to a current signal and transferring the same to corresponding said dendrite representing signal line in response to the potential of said fifth node, the amount of current supply of said first current supply means being determined by the potential of said second node, second current supply means for converting said first reference potential to a current signal and transferring the same to said corresponding dendrite representing signal line in response to the signal potential of said fifth node, and third current supply means for converting said first reference potential to a current signal in response to said corresponding axon representing signal, the amount of current supply of said third current supply means being defined by said second reference potential, said first and second current supply means being complementarily activated with said third current supply means.

31. An integrated circuit device in accordance with claim 30, wherein each one of said first and second diode means and said third and fourth diode means is formed by an insulated gate field effect transistor having a gate and a first conduction terminal which are connected in common, a second conduction terminal providing a first electrode of a diode series body and a substrate region providing a second electrode of said diode series body, a common node of said first conduction terminal and said gate being coupled to corresponding capacitive coupling means.

32. An integrated circuit device in accordance with claim 13, wherein said learning control circuit means defines the amount of change of said synapse representing load by outputting a pulse train signal, said synapse representing load circuit means includes:

means for storing information indicating said synapse representing load in the form of charges, and means for changing said synapse representing load value stored in said synapse representing load value storage means in response to a pulse signal received from said learning control circuit, said synapse representing load value change means including charge pump means for changing the amount of charges stored in said synapse load value change means in response to a pulse signal received from said learning control circuit means, and said synapse representing coupling operating circuit means comprises means for joining a weight corresponding to said synapse representing load value stored in said synapse representing load value storage means to an axon representing signal on a corresponding axon representing signal line and transferring the same onto a corresponding dendrite representing signal line, said transfer means including means for supplying a current being proportionate to the product of a signal potential on said corresponding axon representing signal transfer line and said stored synapse representing load value onto said corresponding dendrite representing signal line.

33. An integrated circuit device in accordance with claim 32, wherein said learning control circuit means comprises:

first deriving means for deriving a first pulse train signal defining the amount of increase of a synapse representing load value, and second deriving means for deriving a second pulse train signal defining the amount of decrement of said synapse representing load value, said synapse representing load storage means comprises first capacitor means being connected between a first node and a first reference potential, said synapse representing load value change means comprises:

second capacitor means for transferring said first pulse signal train to a second node by capacitive coupling, first diode means connected between said second node and a second reference potential forwardly from said second node, second diode means connected between said first node and said second node forwardly from said first node, third capacitor means for transferring said second pulse signal train to a fourth node by capacitive coupling, third diode means connected between said first node and said fourth node forwardly from said fourth node, and fourth diode means connected between said fourth node and said first reference potential forwardly from said first reference potential, and said transfer means of said coupling operating circuit means includes:

means for inverting a corresponding said axon representing signal, first current supply means being activated in response to the output of said inversion means for converting said second reference potential to a current signal and transferring the same onto said corresponding axon representing signal line, the degree of current conversion of said first current supply means being defined by the potential of said first node, and second current supply means being activated in response to said corresponding axon representing signal for converting said second reference potential to a current signal and transferring the same onto said corresponding dendrite representing signal line, the degree of conversion into a current signal of said second current supply means being defined by said first reference potential.

34. An integrated circuit device in accordance with claim 33, wherein said first pulse train signal defines an amount of synapse load change being expressed as:

$$\Delta Wij = \eta \cdot Si \cdot Sj$$

and said second pulse train signal defines an amount of synapse load change being expressed as:

$$\Delta Wij = -\eta \cdot Si \cdot Sj$$

where Si and Sj represent said first and second axon representing signals and $\eta$ represents a predetermined positive learning coefficient, said first pulse train signal is generated in a learning cycle of a plus phase, while said second pulse train signal is generated in a learning cycle of a minus phase.

35. An integrated circuit device in accordance with claim 33, wherein a series body of said first and second diode means or a series body of said third and fourth diode means comprises one insulated gate field effect transistor having a first conduction terminal and a gate being coupled to corresponding capacitor means for transferring a pulse train signal by capacitive coupling, a substrate serving as a cathode of said series body and a second conduction terminal serving as an anode of said series body.

36. An integrated circuit device in accordance with claim 1, wherein each nerve cell representing units includes:

comparison means providing a function corresponding to the body of each nerve cell representing unit, said comparison means having a first input coupled to a corresponding dendrite representing signal line, and means coupled to a second input of said comparison means for generating a comparative reference voltage of said comparison means, said comparative reference voltage generating means including means being activated by an externally supplied logical binary voltage for generating a voltage being attenuated/vibrated with a time constant and a cycle predetermined particular to said comparative reference voltage generating means with respect to a reference bias potential determined specific to said comparative reference voltage generating means and transferring the same to said second input of said comparison means.

37. An integrated circuit device in accordance with claim 36, wherein resistive divider means for dividing a first reference potential and a second reference potential and supplying the result to said second input of said comparison means as said reference bias potential, and attenuated signal generating means for converting a logical binary signal received from the exterior to a signal being attenuated at a predetermined time constant and superposing the same on the output of said resistive divider means.

38. An integrated circuit device in accordance with claim 1, wherein said plurality of nerve cell units include visible nerve cell units forming an input layer for receiving input data and an output layer for deriving output data, and hidden nerve cell units, said integrated circuit device further comprises educator signal control circuit means provided in correspondence to respective ones of said nerve cell representing units for deriving educator signals to be learned by said integrated circuit device in said learning of said integrated circuit device in correspondence to respective nerve cell representing units, and each of said educator signal control circuit means comprises:

first storage means for holding and outputting externally supplied data defining the attribute of a corresponding nerve cell representing unit in an operation mode for defining the attribute of each said nerve cell representing unit while holding an outputting educator data transferring from the exterior through a same terminal as that receiving said attribute defining data in response to a first control signal in an operation mode for setting said educator signal and in said learning mode of said integrated circuit device, second storage means coupled to the output of said first storage means for holding and outputting said data defining the attribute of said corresponding nerve cell representing unit in response to a second control signal in said operation mode for defining the attribute of said corresponding nerve cell representing unit, said educator signal setting operation mode and said learning operation mode of said integrated circuit device, third storage means coupled to the output of said first storage means for holding and outputting said data defining the attribute of said corresponding nerve cell representing unit received from said first storage means in said operation mode for defining the attribute of said corresponding nerve cell representing unit while holding and outputting said educator data received from said first storage means in response to a third control signal in said educator signal setting operation mode and said learning operation mode of said integrated circuit device, and selection circuit means for selecting one of the output of said third storage means, predetermined first fixed data and data representing the state of said corresponding nerve cell representing unit in response to an educator data validation/invalidation indicating signal generated in said learning mode and said data defining an attribute of said corresponding nerve cell representing unit being held in and outputted from said second storage means and transferring the same onto an axon representing signal line provided in correspondence to each nerve cell representing unit, said attribute of said corresponding nerve cell representing unit defining data and said educator data being serially transferring to first storage means of an adjacent next-stage educator signal control circuit through said first and third storage means in said attribute defining operation mode and said educator signal setting operation mode.

39. An integrated circuit device in accordance with claim 38, further comprising fourth storage means provided between said third storage means and said selection circuit means for holding the output of said third storage means and transferring the same to said selection circuit means as educator data in response to a learning mode indicating signal.

40. An integrated circuit device in accordance with claim 38, further comprising a plurality of series of said first and third storage means, said plurality of series being provided in parallel with each other and connected to different educator signal input terminals, and further comprising means for selecting one of parallel outputs of said plurality of series and transferring the same to said selection circuit means, only the output of said first storage means provided in one of said plurality of series being coupled to the input of said second storage means.

41. An integrated circuit device having a learning function, being modelled on nerve cells, comprising:
a plurality of nerve cell representing units simulating functions of nerve cell bodies;
a plurality of axon representing signal lines for transferring signals indicating states of said nerve cell representing units, respectively, to synapse representing circuits;
a plurality of dendrite representing signal lines provided in correspondence to respective ones of said plurality of nerve cell representing units for transferring signals from said synapse representing circuits to corresponding said nerve cell representing units;
said synapse representing circuits provided on respective ones of crosspoints between said plurality of axon representing signal lines and said plurality of dendrite representing signal lines for coupling corresponding said axon representing signal lines with corresponding said dendrite representing signal lines with specific loads, said specific loads of said synapse representing circuits being set at optimum values in learning of said integrated circuit device, said synapse representing circuits being arrayed to substantially form at least one right triangle; and
a plurality of axon representing driving units provided in correspondence to respective ones of said plurality of axon representing signal lines for transferring signals indicating states of corresponding nerve cell representing units onto corresponding axon representing signal lines, said plurality of axon representing driving units being aligned along one of two sides making a right angle of said right triangle,
said plurality of nerve cell representing units being aligned along the other one of said two sides being at right angle.

42. An integrated circuit device having a learning function, being modelled on nerve cells, comprising:
a plurality of nerve cell representing units simulating functions of nerve cell bodies;
a plurality of axon representing signal lines for transferring signals indicating states of said nerve cell representing units, respectively, to synapse representing circuits;
a plurality of dendrite representing signal lines provided in correspondence to respective ones of said plurality of nerve cell representing units for transferring signals from said synapse representing circuits to corresponding said nerve cell representing units;
said synapse representing circuits provided on respective ones of crosspoints between said plurality of axon representing signal lines and said plurality of dendrite representing signal lines for coupling corresponding said axon representing signal lines with corresponding said dendrite representing signal lines with specific loads, said specific loads of said synapse representing circuits being set at optimum values in learning of said integrated circuit device, said synapse representing circuits being arrayed to substantially form at least one right triangle, said plurality of nerve cell representing units being aligned along a first one of two sides being at right angle of said right triangle; and
a plurality of axon representing driving units provided in correspondence to respective ones of said plurality of axon representing signal lines for transferring axon representing signals of related nerve cell representing units to corresponding axon representing signal lines, said plurality of axon representing driving units being arranged along said first side at said right triangle,
a dendrite representing signal line and an axon representing signal line, related to one nerve cell unit, being arranged in parallel with each other,
a signal transfer direction of each of said plurality of axon representing driving units being opposite to a signal transfer direction on said dendrite representing signal line connected to a related nerve cell representing unit.

43. An integrated circuit device having a learning function, being modelled on a nerve cell, said nerve cell model having a nerve cell representing unit simulating the function of a nerve cell body, an axon representing signal line for transferring a signal representing a state of said nerve cell representing unit to a synapse load representing circuit and a dendrite representing signal line for transferring a signal from said synapse load representing circuit to said nerve cell representing unit, said integrated circuit device having a plurality of nerve cell representing units, and comprising:
a plurality of synapse load representing circuits provided on respective ones of crosspoints between respective ones of a plurality of said axon representing signal lines and respective ones of a plurality of said dendrite representing signal lines for coupling said axon representing signal lines with said dendrite representing signal lines between corresponding said nerve cell representing units with specific loads, said specific load representing circuits being arrayed substantially in the form of a rectangle;
a plurality of first axon representing driving units arranged along first side of said rectangle for transferring signals indicating states of corresponding nerve cell representing units onto corresponding axon representing signal lines;

first nerve cell representing units arranged along a second side, being opposite to said first side, of said rectangle, dendrite representing signals associated with axon representing signals of said first axon representing driving units being transferred to dendrite representing signal lines for said first nerve cell representing units;

second axon representing driving units arranged along a third side of said rectangle for transferring axon representing signals indicating states of corresponding nerve cell representing units onto corresponding axon representing signal lines; and a plurality of second nerve cell representing units aligned along a fourth side, being opposite to said third side, of said rectangle, for receiving dendrite representing signals associated with respective ones of said axon representing signals transferred by said second axon representing driving units, said plurality of axon representing signal lines and said plurality of dendrite representing signal lines being arranged in column and row directions respectively.

44. An integrated circuit device in accordance with claim 43, wherein
each of said first and second axon representing driving units transfers an axon representing signal so that signals are transferred in the same direction on an axon representing signal line and a dendrite representing signal line being related to one nerve cell representing unit.

45. An integrated circuit device in accordance with claim 43, wherein
each of said first and second axon representing driving units transfers an axon representing signal so that signals are transferred in opposite directions on a dendrite representing signal line and an axon representing signal line being related to one said nerve cell unit.

* * * * *